(12) United States Patent
Liu et al.

(10) Patent No.: US 12,413,660 B2
(45) Date of Patent: Sep. 9, 2025

(54) ACCESSORY THEME ADAPTATION METHOD, APPARATUS, AND SYSTEM

(71) Applicant: HUAWEI TECHNOLOGIES CO., LTD., Shenzhen (CN)

(72) Inventors: Hao Liu, Shanghai (CN); Liping He, Shanghai (CN); Zhishan Zhuang, Shenzhen (CN); Wenbin Gu, Dongguan (CN); Yan Hu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 318 days.

(21) Appl. No.: 18/007,286

(22) PCT Filed: Jul. 30, 2021

(86) PCT No.: PCT/CN2021/109879
§ 371 (c)(1),
(2) Date: Jan. 27, 2023

(87) PCT Pub. No.: WO2022/022722
PCT Pub. Date: Feb. 3, 2022

(65) Prior Publication Data
US 2023/0275986 A1 Aug. 31, 2023

(30) Foreign Application Priority Data

Jul. 30, 2020 (CN) .......................... 202010753372.7
Aug. 31, 2020 (CN) .......................... 202010899647.8
(Continued)

(51) Int. Cl.
H04M 1/72409 (2021.01)
H04M 1/60 (2006.01)
H04M 1/72412 (2021.01)

(52) U.S. Cl.
CPC ... *H04M 1/724097* (2022.02); *H04M 1/6066* (2013.01); *H04M 1/72412* (2021.01)

(58) Field of Classification Search
CPC ......... H04M 1/724097; H04M 1/6066; H04M 1/72412; H04M 1/724092;
(Continued)

(56) References Cited

U.S. PATENT DOCUMENTS

2005/0026661 A1* 2/2005 Rheenen .............. H04B 1/3833
455/575.8
2010/0235768 A1 9/2010 Agevik et al.
(Continued)

FOREIGN PATENT DOCUMENTS

CN 103995649 A 8/2014
CN 104360795 A 2/2015
(Continued)

Primary Examiner — Farid Seyedvosoghi
(74) Attorney, Agent, or Firm — Leydig, Voit & Mayer, Ltd.

(57) ABSTRACT

A headset theme adaptation method is provided to automatically obtain related information such as a device model and a device identifier of a headset case protective cover through multi-end linkage between a mobile phone, a headset, the headset case protective cover, and a cloud server (for example, a server of a cloud theme market). A headset theme adapted to the protective cover is downloaded and applied based on the related information, to implement personalized experience of headset theme adaptation.

20 Claims, 130 Drawing Sheets

(30) Foreign Application Priority Data

Aug. 31, 2020 (CN) .......................... 202010899683.4
Sep. 10, 2020 (CN) .......................... 202010949373.9

(58) Field of Classification Search
CPC ........... H04M 1/72448; H04M 1/7243; H04M
1/72403; G06F 3/0488; H04R 1/1016;
H04R 1/1041; H04R 1/10; H04R
2420/07; H04R 2201/10; H04W 4/80;
Y02D 30/70; H04B 5/00
See application file for complete search history.

(56) References Cited

U.S. PATENT DOCUMENTS

2011/0159924 A1* 6/2011 Gonzalez ............ H04M 1/7246
715/764
2012/0035989 A1* 2/2012 Abel ................... H04M 1/0283
705/14.1
2018/0341448 A1* 11/2018 Behzadi ................ G06F 3/0484

FOREIGN PATENT DOCUMENTS

CN 107172288 A 9/2017
EP 3383010 A1 10/2018

* cited by examiner

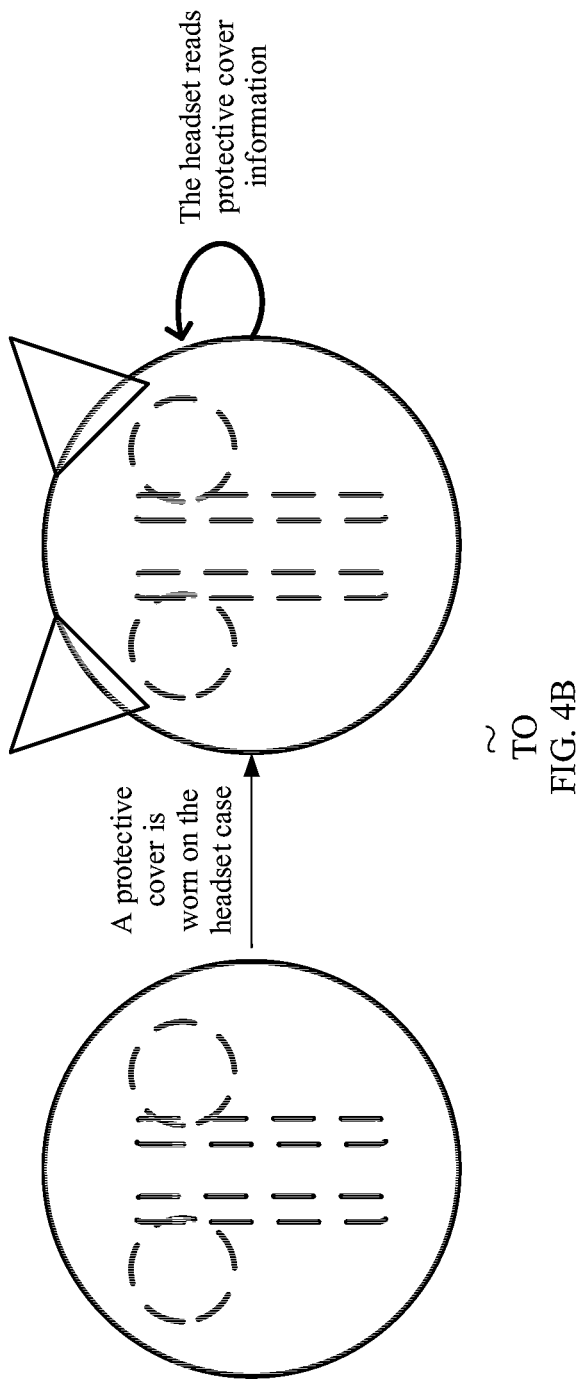

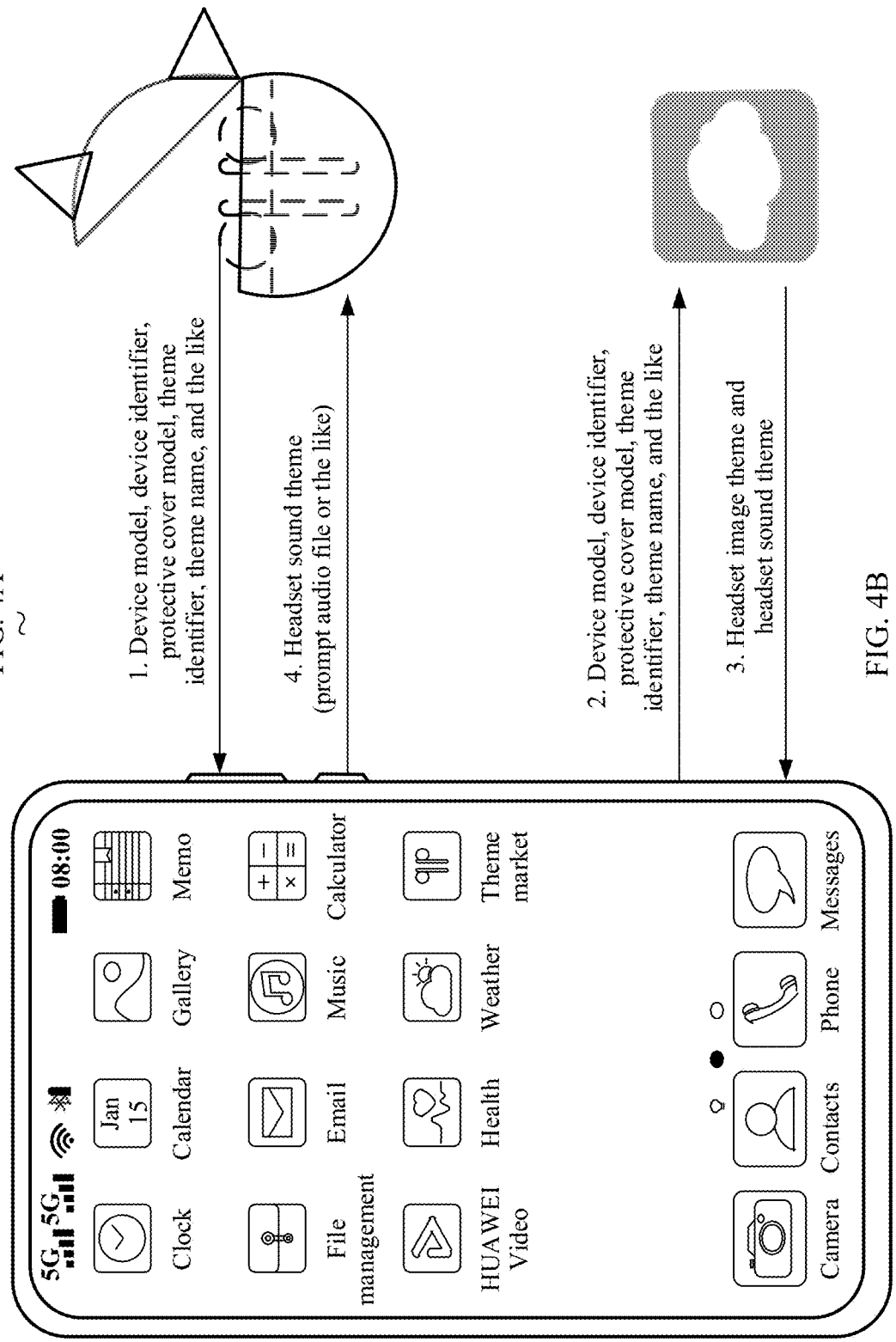

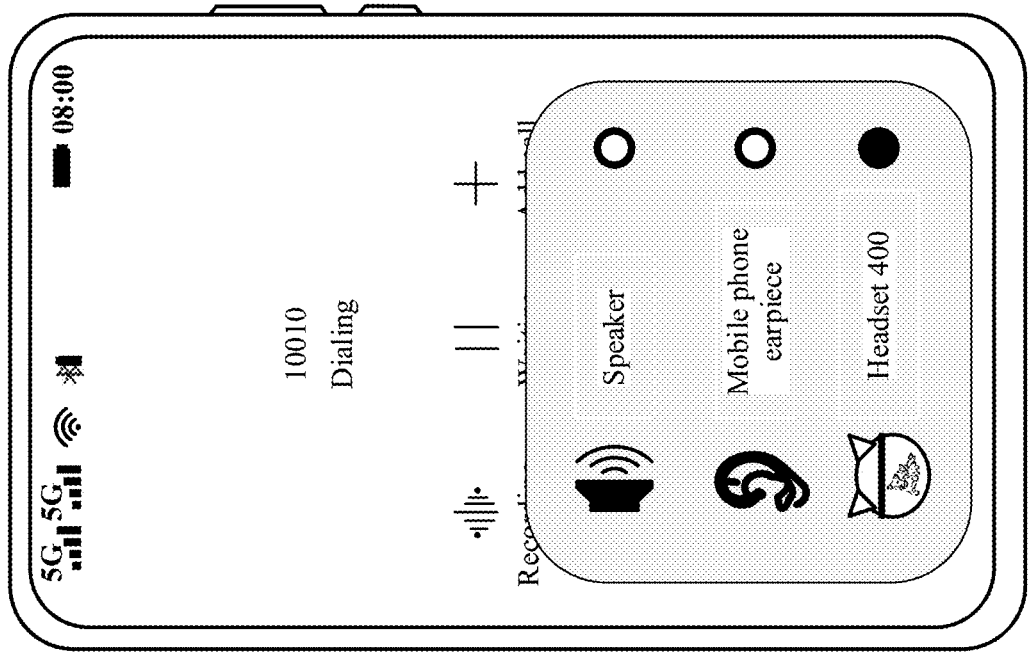
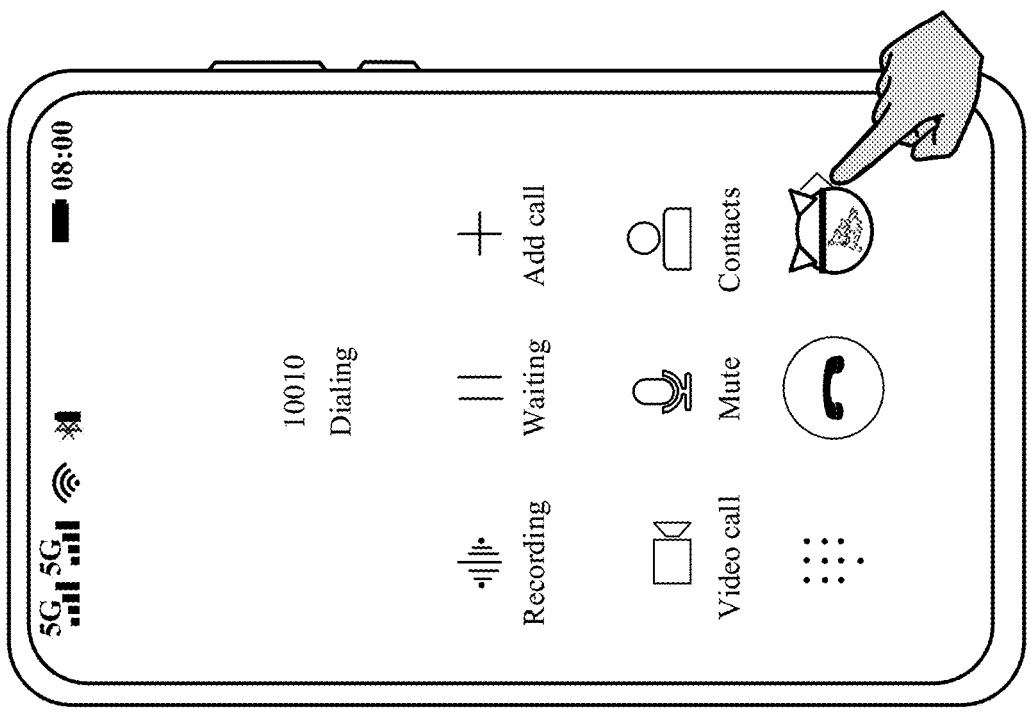
FIG. 16C

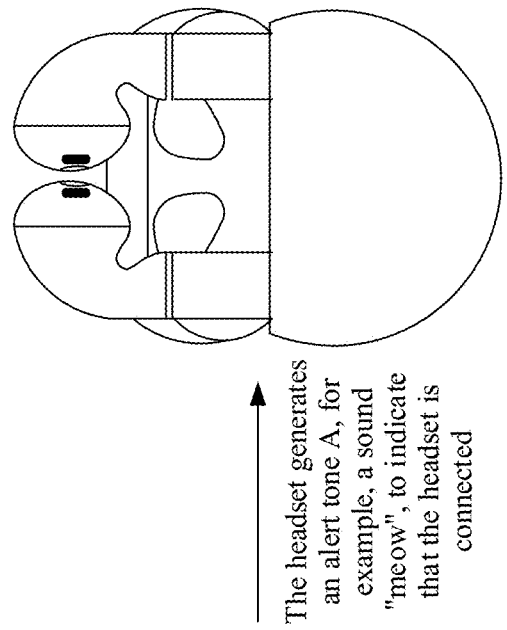
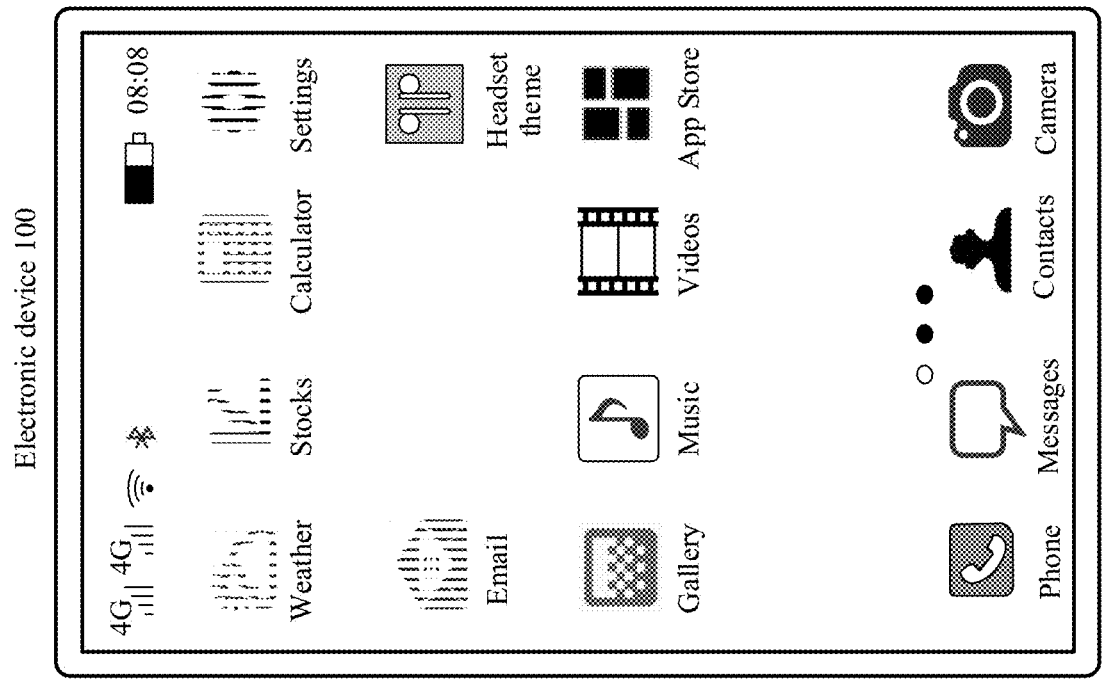
FIG. 35A

ACCESSORY THEME ADAPTATION METHOD, APPARATUS, AND SYSTEM

CROSS-REFERENCE TO RELATED APPLICATIONS

This application is a national stage of International Application No. PCT/CN2021/109879, filed on Jul. 30, 2021, which claims priority to Chinese Patent Application No. 202010949373.9, filed on Sep. 10, 2020 and Chinese Patent Application No. 202010753372.7, filed on Jul. 30, 2020 and Chinese Patent Application No. 202010899647.8, filed on Aug. 31, 2020 and Chinese Patent Application No. 202010899683.4, filed on Aug. 31, 2020. All the aforementioned applications are hereby incorporated by reference in their entireties.

TECHNICAL FIELD

Embodiments of this application relate to the field of electronic technologies, and in particular, to an accessory theme adaptation method, an apparatus, and a system.

BACKGROUND

Currently, for users who use Bluetooth headsets of a same model, Bluetooth headsets displayed on mobile phones of the users are the same, and usually appearance renderings of the Bluetooth headsets are displayed. Display effects of the Bluetooth headsets are seriously homogeneous and cannot meet personalized requirements of the users.

SUMMARY

Embodiments of this application provide an accessory theme adaptation method, an apparatus, and a system, to implement personalized experience of headset theme adaptation through multi-end linkage between a mobile phone, a headset/headset case, the headset/a headset case protective cover, and a cloud server (for example, a server in a cloud theme market). For details, refer to the following descriptions of a first aspect to an eighth aspect.

According to a first aspect, an accessory theme adaptation method is provided, and is applied to a wireless communications system. The wireless communications system includes a first electronic device and a first accessory device, and the first electronic device is being connected to or is connected to the first accessory device.

The method may include the following steps:

The first electronic device may detect a first usage scenario. In response to this, the first electronic device may display a first interface element, where the first interface element may be an interface element in the first usage scenario in a first accessory theme, the first accessory theme includes at least one interface element, and the first accessory device may not wear an appearance part or wear a first appearance part.

The first electronic device may detect that the first accessory device wears a second appearance part and the first electronic device may be in the first usage scenario, and the first electronic device may display a second interface element, where the second appearance part is different from the first appearance part, the second interface element is an interface element in a second accessory theme, the second accessory theme includes at least one interface element. the second interface element is different from the first interface element, and the second interface element corresponds to the second appearance part, where the first usage scenario includes at least one of a usage scenario in which the first electronic device establishes a communication connection to the first accessory device and a usage scenario in which a user views a device status of the first accessory device after the communication connection is established.

With reference to the first aspect, in some embodiments, the first electronic device may obtain the second accessory theme by using indication information of the second appearance part from the first accessory device in but not limited to the following manners:

Manner 1: The first electronic device obtains the second accessory theme from a cloud server by using the indication information of the second appearance part from the first accessory device. The cloud server may be a cloud server that provides a mobile phone theme, where the mobile phone theme includes an accessory theme, or the cloud server may be a cloud server that provides a headset theme.

Manner 2: The first electronic device obtains the second accessory theme from an accessory theme stored in the first electronic device. The accessory theme stored in the first electronic device includes one or more of the following: an accessory theme downloaded by the first electronic device from the cloud server, an accessory theme that is shared by a third electronic device and that is received by the first electronic device, an accessory theme searched for by the first electronic device on a network based on an image shot by a camera, or an accessory theme generated by the first electronic device based on an image shot by a camera.

Manner 3: The first electronic device requests, by using the indication information of the second appearance part from the first accessory device, to obtain the second accessory theme from a second electronic device.

With reference to the first aspect, in some embodiments, the first electronic device may detect, in but not limited to the following manners, that the first accessory device wears the second appearance part:

Manner 1: The first electronic device receives first event information reported by the first accessory device, where the first event information indicates that the first accessory device wears the second appearance part, and the first event information may be sent by the first accessory device when the first accessory device detects that the first accessory device wears the second appearance part. In addition, the first electronic device may further receive indication information that is of the second appearance part and that is sent by the first accessory device, where the indication information is obtained by the first accessory device from the second appearance part when the first accessory device detects that the first accessory device wears the second appearance part.

Manner 2: The first electronic device receives second event information reported by the second appearance part, where the second event information indicates that the first accessory device wears the second appearance part, and is sent by the second appearance part when the second appearance part detects that the first accessory device wears the second appearance part. In addition, the first electronic device may further receive indication information that is of the second appearance part and that is sent by the second appearance part, where the indication information is sent by the second appearance part to the first electronic device when the second appearance part detects that the first accessory device wears the second appearance part.

With reference to the first aspect, in some embodiments, the second appearance part includes a headset case or a headset case protective cover.

With reference to the first aspect, in some embodiments, the second accessory device includes the following audio device: a headset, and the first usage scenario further includes the following usage scenario: selecting an audio output channel during a call.

With reference to the first aspect, in some embodiments, that the first electronic device replaces the first accessory theme with a second headset theme may specifically include: The first electronic device replaces, with an image resource referenced by an interface element in the second accessory theme, an image resource referenced by a same interface element in the first accessory theme. The first electronic device transmits, to the first accessory device, an audio resource referenced by an alert tone in the second accessory theme, and the first accessory device replaces, with the audio resource referenced by the alert tone in the second accessory theme, an audio resource referenced by a same alert tone in the first accessory theme.

With reference to the first aspect, in some embodiments, the indication information of the second appearance part includes one or more of the following: device identification information of the second appearance part (for example, a device model and a device identifier of the headset case protective cover), theme identification information of an accessory theme adapted to the second appearance part (for example, a theme logo and a theme name of a headset theme adapted to the headset case protective cover), and appearance description information of the second appearance part (for example, an appearance rendering of the headset case protective cover).

According to a second aspect, an electronic device is provided. The electronic device may be the first electronic device in the first aspect, and includes a plurality of functional units, configured to correspondingly perform the method according to any one of the possible implementations of the first aspect.

According to a third aspect, an accessory device is provided. The accessory device may be the first accessory device in the first aspect, and includes a plurality of functional units, configured to correspondingly perform the method according to any one of the possible implementations of the first aspect.

According to a fourth aspect, an electronic device is provided. The electronic device may be the first electronic device in the first aspect, and may be configured to perform the method according to the first aspect. The electronic device may include a Bluetooth communications processing module, a display, a processor, and a memory. The memory stores one or more programs, and the processor invokes the one or more programs, so that a computer performs the method according to the first aspect.

According to a fifth aspect, an accessory device is provided. The accessory device may be the first accessory device in the first aspect, and may be configured to perform the method according to the first aspect. The accessory device may include a Bluetooth communications processing module, a display, a processor, and a memory: The memory stores one or more programs, and the processor invokes the one or more programs, so that a computer performs the method according to the first aspect.

According to a sixth aspect, a computer-readable storage medium is provided. The readable storage medium stores instructions, and when the instructions are run on a computer, the computer is enabled to perform the method according to the first aspect.

According to a seventh aspect, a computer program product including instructions is provided. When the computer program product runs on a computer, the computer is enabled to perform the method according to the first aspect.

According to an eighth aspect, a communications system is provided, and includes a first electronic device and a first accessory device. The devices in the communications system may cooperate with each other to implement the method according to the first aspect.

This application further provides an accessory theme sharing method. This can support sharing of a headset theme between users, to meet a personalized requirement of the user for the headset theme, increase interaction between the users, and improve user experience. For details, refer to the following descriptions of a ninth aspect to an eighteenth aspect.

According to a ninth aspect, an accessory theme sharing method is provided, and is applied to a wireless communications system. The wireless communications system includes a first electronic device, a first accessory device, a second electronic device, and a second accessory device. The first electronic device and the first accessory device are devices of a sharing party, and the first electronic device is being connected to or is connected to the first accessory device. The second electronic device and the second accessory device are devices of a shared party, and the second electronic device is being connected to or is connected to the second accessory device.

The method may include: The second electronic device may detect a first usage scenario. In response to this, the second electronic device may display a first interface element, where the first interface element may be an interface element in the first usage scenario in the first accessory theme. The first electronic device sends a second accessory theme to the second electronic device, where the second accessory theme may also include interface elements in one or more usage scenarios. The second electronic device may receive a second headset theme, and replace the first accessory theme with the second headset theme, where an image resource referenced by an interface element in the second accessory theme is different from an image resource referenced by a same interface element in the first accessory theme. The second electronic device may detect a first usage scenario. In response to this, the second electronic device displays a second interface element, where the second interface element is an interface element in the first usage scenario in the second accessory theme.

The first usage scenario may include a usage scenario in which the second electronic device establishes a communication connection to the second accessory device, and a usage scenario in which a user views a device status of the second accessory device after the communication connection is established.

The first accessory theme may be an accessory theme that is set for the second accessory device, and may be used to present one or more of an appearance and a device status of the second accessory device. The first accessory theme includes interface elements in one or more usage scenarios, and the one or more usage scenarios include the first usage scenario.

This can support sharing of a headset theme between users, to meet a personalized requirement of the user for the headset theme, increase interaction between the users, and improve user experience.

With reference to the ninth aspect, in some embodiments, before the first electronic device sends the second accessory theme to the second electronic device, the first electronic device may further detect an operation that a sharing party selects the second accessory theme to share with a shared party.

With reference to the ninth aspect, in some embodiments, before the first electronic device sends the second accessory theme to the second electronic device, the method further includes the following steps:

The first electronic device requests to obtain a device model of the second accessory device from the second electronic device.

The first electronic device selects the second accessory theme from a plurality of accessory themes based on the device model of the second accessory device.

With reference to the ninth aspect, in some embodiments, before the first electronic device sends the second accessory theme to the second electronic device, the first electronic device may further receive a sharing request from the second electronic device.

With reference to the ninth aspect, in some embodiments, the sharing request may be sent by the second electronic device when the second electronic device detects one or more of the following events: the second accessory device changes from wearing no protective cover to wearing a protective cover, a protective cover worn by the second electronic device changes, and the second electronic device discovers the first electronic device through short-range communication, where short-range communication includes near field communication NFC or Bluetooth.

With reference to the ninth aspect, in some embodiments, the sharing request may carry a device model of the second accessory device. Before the first electronic device sends the second accessory theme to the second electronic device, the first electronic device may further select the second accessory theme from a plurality of accessory themes based on the device model of the second accessory device.

With reference to the ninth aspect, in some embodiments, the plurality of accessory themes include one or more of the following: an accessory theme downloaded by the first electronic device from a cloud server, an accessory theme that is shared by a third electronic device and that is received by the first electronic device, an accessory theme searched for by the first electronic device on a network based on an image shot by a camera, or an accessory theme generated by the first electronic device based on an image shot by a camera.

With reference to the ninth aspect, in some embodiments, the plurality of accessory themes may be stored in the first electronic device, or the plurality of accessory themes may be stored in cloud storage space corresponding to the first electronic device.

With reference to the ninth aspect, in some embodiments, before the first electronic device sends the second accessory theme to the second electronic device, the method further includes: The first electronic device discovers the second electronic device through short-range communication, where short-range communication includes near field communication NFC or Bluetooth.

With reference to the ninth aspect, in some embodiments, before the first electronic device sends the second accessory theme to the second electronic device, the method further includes: The first electronic device requests, through a short-range communication connection, to obtain a device model of the second accessory device from the second electronic device. If the device model of the second accessory device is the same as a device model of the first accessory device, the second accessory theme is an accessory theme used by the first accessory device. If the device model of the second accessory device is different from a device model of the first accessory device, the second accessory theme is found by the first electronic device or the second electronic device on a network based on the device model of the second accessory device, or the second accessory theme is an accessory theme that is found by the first electronic device or the second electronic device on a network based on identification information of an accessory theme used by the first accessory device and that adapts to the device model of the second accessory device.

With reference to the ninth aspect, in some embodiments, the second accessory device includes the following audio device: a headset, and the first usage scenario further includes the following usage scenario: selecting an audio output channel during a call.

With reference to the ninth aspect, in some embodiments, when a second usage scenario is detected, the second accessory device may further output a first alert tone, where the first alert tone is an alert tone in the second usage scenario in the first accessory theme, and the first accessory theme may include an alert tone in one or more usage scenarios, and the one or more usage scenarios include the second usage scenario. After the second electronic device replaces the first accessory theme with the second headset theme, when a second usage scenario is detected, the second accessory device may further output a second alert tone, where the second alert tone is an alert tone in the second usage scenario in the second accessory theme. An audio resource referenced by the alert tone in the second accessory theme is different from an audio resource referenced by a same alert tone in the first accessory theme. The second usage scenario includes a usage scenario in which the second electronic device establishes a communication connection to the second accessory device, a usage scenario in which the communication connection is broken, a usage scenario in which a battery level of the headset is low; or a usage scenario in which the headset is worn.

With reference to the ninth aspect, in some embodiments, that the second electronic device replaces the first accessory theme with the second headset theme may specifically include: The second electronic device transmits, to the second accessory device, an audio resource referenced by an alert tone in the second accessory theme. The second accessory device replaces, with the audio resource referenced by the alert tone in the second accessory theme, an audio resource referenced by a same alert tone in the first accessory theme.

With reference to the ninth aspect, in some embodiments, an interface element in the usage scenario in which the second electronic device establishes the communication connection to the second accessory device includes one or more of the following: an interface element used to display an appearance of the headset, an interface element used to display a battery level of the headset, an interface element used to display an appearance of a headset case of the headset, and an interface element used to display a battery level of the headset case. An interface element in the usage scenario in which the user views the device status of the second accessory device includes one or more of the following: an interface element used to display an appearance of the headset, an interface element used to display a battery level of the headset, an interface element used to display an appearance of a headset case of the headset, and an interface element used to display a battery level of the headset case.

An interface element in the usage scenario of selecting an audio output channel during a call includes an interface element indicating an audio output channel such as the headset.

With reference to the ninth aspect, in some embodiments, before the first electronic device replaces the first accessory theme with the second accessory theme, the first electronic device may further display an audition interface, where the audition interface is used to display an alert tone included in the second accessory theme.

With reference to the ninth aspect, in some embodiments, before the first electronic device replaces the first accessory theme with the second accessory theme, the first electronic device may further display a preview interface, where the preview interface is used to display an interface element included in the second accessory theme.

With reference to the ninth aspect, in some embodiments, the preview interface may include a plurality of pages, and the plurality of pages are separately used to display interface elements in different usage scenarios that are included in the second accessory theme.

With reference to the ninth aspect, in some embodiments, before the first electronic device sends the second accessory theme to the second electronic device, the first electronic device may further display a first device list, where devices in the first device list may include a device discovered by the first electronic device or a device that is being connected to the first electronic device. The first electronic device may detect an operation of selecting the second electronic device from the first device list.

With reference to the ninth aspect, in some embodiments, that the second electronic device replaces the first accessory theme with the second headset theme specifically includes: The second electronic device replaces, with an image resource referenced by an interface element in the second accessory theme, an image resource referenced by a same interface element in the first accessory theme.

According to a tenth aspect, a method is provided, and may include: An electronic device (for example, a mobile phone or a tablet computer) may detect a first usage scenario, for example, a usage scenario in which the electronic device is connected to an accessory device (for example, a headset), a usage scenario in which a user views a device status of the accessory device on a "leftmost screen", or a usage scenario in which the user selects an audio output channel during a call. In response to the detected first usage scenario, the first electronic device may display a first interface element, where the first interface element may be an interface element in the first usage scenario in a first accessory theme, for example, an icon or a background picture. The first accessory theme is an accessory theme that is set for the accessory device, and may be used to display one or more of an appearance and a device status of the accessory device. The first accessory theme may include interface elements in one or more usage scenarios, and the one or more usage scenarios include the first usage scenario. Compared with a second accessory theme, the first accessory theme may be a previously used accessory theme.

The first electronic device may collect an image by using a camera, and obtain the second accessory theme by using the collected image. Then, the first electronic device may replace the first accessory theme with the second accessory theme. Similar to the first accessory theme, the second accessory theme also includes interface elements in the foregoing one or more usage scenarios. Different from the first accessory theme, an image resource referenced by an interface element in the second accessory theme is different from an image resource referenced by a same interface element in the first accessory theme.

Then, the first electronic device may detect the first usage scenario. In response to the detected first usage scenario, the first electronic device may display a second interface element, where the second interface element may be an interface element in the first usage scenario in the second accessory theme.

This can support the user in changing a headset theme, to meet a personalized requirement of the user and improve user experience. In particular, this can support the user in generating a headset image theme based on the image (for example, an image of a headset/headset case/headset case protective cover) obtained by the camera to replace a previously used headset image theme, so as to meet a personalized requirement of the user and improve user experience.

In the method according to the tenth aspect, the electronic device (for example, the mobile phone or the tablet computer) may be referred to as the first electronic device, and the accessory device (for example, the headset) may be referred to as a second electronic device. The device status of the second electronic device may include a battery level of the second electronic device.

In the method according to the tenth aspect, the first usage scenario may include one or more of the following: a usage scenario in which the first electronic device establishes a communication connection to the second electronic device, and a usage scenario in which the user views the device status of the second electronic device after the communication connection is established.

In the method according to the tenth aspect, that the first electronic device collects an image by using a camera may specifically mean that the first electronic device collects a picture through photographing by the camera, or the first electronic device collects a video through recording by the camera.

With reference to the tenth aspect, in some embodiments, the second electronic device may include the following audio device: a headset. When the second electronic device is an audio device, the first usage scenario may further include the following usage scenario: a usage scenario of selecting an audio output channel during a call.

With reference to the tenth aspect, in some embodiments, when the second electronic device is an audio device such as the headset, interface elements in usage scenarios may be as follows:

An interface element in the usage scenario in which the first electronic device establishes the communication connection to the second electronic device may include one or more of the following: an interface element used to display an appearance of the headset, an interface element used to display a battery level of the headset, an interface element used to display an appearance of a headset case of the headset, and an interface element used to display a battery level of the headset case.

An interface element in the usage scenario in which the user views the device status of the second electronic device may include one or more of the following: an interface element used to display an appearance of the headset, an interface element used to display a battery level of the headset, an interface element used to display an appearance of a headset case of the headset, and an interface element used to display a battery level of the headset case.

An interface element in the usage scenario of selecting an audio output channel during a call includes an interface element indicating an audio output channel such as the headset.

With reference to the tenth aspect, in some embodiments, that the first electronic device replaces the first accessory theme with the second accessory theme may specifically include: The first electronic device may replace, with an image resource referenced by an interface element in the second accessory theme, an image resource referenced by a same interface element in the first accessory theme. During specific replacement, the electronic device may replace image resources in a one-to-one correspondence based on a framework of the accessory theme. The framework of the accessory theme specifies mapping relationships between interface elements in the accessory theme and image resources to be referenced by the interface elements. For example, Table 1 in the following embodiment shows an example of a framework of an accessory theme, that is, a framework of a headset image theme.

With reference to the tenth aspect, in some embodiments, that the first electronic device obtains, by using the collected image, the second accessory theme configured for the second electronic device may specifically include: The first electronic device may find the second accessory theme on a network by using the collected image, where the second accessory theme is an accessory theme that matches the collected image. Herein, the matched accessory theme may mean that an image resource (for example, a picture or an icon) referenced by the accessory theme and a shot picture have exactly same or partially same image content.

With reference to the tenth aspect, in some embodiments, that the first electronic device obtains, by using the collected image, the second accessory theme configured for the second electronic device may specifically include: The first electronic device may generate the second accessory theme by using the collected image, where an image resource referenced by an interface element in the second accessory theme may be obtained by using the collected image. Specifically, the electronic device may generate a headset image theme based on a framework of an accessory theme by using a shot picture. The electronic device may specifically convert the shot picture into an image resource referenced by each image interface element in the framework of the headset image theme, for example, scale down a front picture of a headset case protective cover to a picture of a small size, to become an image resource that needs to be referenced by a headset case icon in a leftmost screen usage scenario in Table 1.

With reference to the tenth aspect, in some embodiments, the method may further include: Before replacing the first accessory theme with the second accessory theme, the first electronic device displays a preview interface, where the preview interface may be used to display an interface element included in the second accessory theme, the preview interface includes a plurality of pages, and the plurality of pages are separately used to display interface elements in different usage scenarios that are included in the second accessory theme.

With reference to the tenth aspect, in some embodiments, that the first electronic device collects an image by using a camera may specifically include: The first electronic device identifies a second electronic device from the image collected by the camera, and then the first electronic device may display a prompt used to guide the user to shoot the second electronic device. Then, the first electronic device may detect the shooting operation, and store an image of the second electronic device or a protective cover of the second electronic device. In this case, the first electronic device may obtain the second accessory theme by using the collected image of the second electronic device. When the second electronic device is a headset, the image of the second electronic device may include one or more of the following: an image of the headset, an image of a headset case of the headset, and an image of a headset case protective cover.

With reference to the tenth aspect, in some embodiments, when detecting one or more of the following events, the first electronic device may guide the user to shoot an image of an accessory device such as a headset case protective cover/headset/headset case, to replace the headset image theme: the second electronic device changes from wearing no protective cover to wearing a protective cover, and the protective cover worn by the second electronic device changes. Specifically, these events may be reported by the second electronic device to the first electronic device.

With reference to the tenth aspect, in some embodiments, that the first electronic device obtains the second accessory theme by using the collected image may specifically include: detecting an operation of selecting an image from a gallery by the user, and obtaining the second accessory theme by using the image selected by the user, where the gallery includes the image collected by the camera.

According to an eleventh aspect, an electronic device is provided. The electronic device may be the first electronic device or the second electronic device in the ninth aspect, or may be the first electronic device in the tenth aspect, and includes a plurality of functional units, configured to correspondingly perform the method according to any one of the possible implementations of the ninth aspect or the tenth aspect.

According to a twelfth aspect, an audio device is provided. The audio device may be the first accessory device or the second accessory device in the ninth aspect, or may be the second electronic device in the tenth aspect, and includes a plurality of functional units, configured to correspondingly perform the method according to any one of the possible implementations of the ninth aspect or the tenth aspect.

According to a thirteenth aspect, an electronic device is provided. The electronic device may be the first electronic device or the second electronic device in the ninth aspect, or may be the first electronic device in the tenth aspect, and may be configured to perform the method according to the ninth aspect or the tenth aspect. The electronic device may include a Bluetooth communications processing module, a display, a processor, and a memory. The memory stores one or more programs, and the processor invokes the one or more programs, so that a computer performs the method according to the ninth aspect or the tenth aspect.

According to a fourteenth aspect, an audio device is provided. The audio device may be the first accessory device or the second accessory device in the ninth aspect, or may be the second electronic device in the tenth aspect, and may be configured to perform the method according to the ninth aspect or the tenth aspect. The audio device may include a Bluetooth communications processing module, a display, a processor, and a memory. The memory stores one or more programs, and the processor invokes the one or more programs, so that a computer performs the method according to the ninth aspect or the tenth aspect.

According to a fifteenth aspect, a computer-readable storage medium is provided. The readable storage medium stores instructions, and when the instructions are run on a computer, the computer is enabled to perform the method according to the ninth aspect or the tenth aspect.

According to a sixteenth aspect, a computer program product including instructions is provided. When the computer program product runs on a computer, the computer is enabled to perform the method according to the ninth aspect or the tenth aspect.

According to a seventeenth aspect, a communications system is provided, and includes a first electronic device, a first accessory device, a second electronic device, and a second accessory device. The first electronic device and the first accessory device are devices of a sharing party, and the first electronic device is being connected to or is connected to the first accessory device. The second electronic device and the second accessory device are devices of a shared party, and the second electronic device is being connected to or is connected to the second accessory device. The devices in the communications system may cooperate with each other to implement the method according to the ninth aspect.

According to an eighteenth aspect, a communications system is provided, and includes a first electronic device, a second electronic device, and a second accessory device. The first electronic device is being connected to or is connected to the second electronic device. The devices in the communications system may cooperate with each other to implement the method according to the tenth aspect.

Embodiments of this application provide an accessory theme setting method and a related device. This can support a user in changing a headset theme, to meet a personalized requirement of the user and improve user experience. In particular, this can support the user in generating a headset image theme based on an image (for example, an image of a headset/headset case/headset case protective cover) obtained by a camera to replace a previously used headset image theme, so as to meet a personalized requirement of the user and improve user experience. For details, refer to the following descriptions of a nineteenth aspect to a twenty-third aspect.

According to a nineteenth aspect, a method is provided, and may include: An electronic device (for example, a mobile phone or a tablet computer) may detect a first usage scenario, for example, a usage scenario in which the electronic device is connected to an accessory device (for example, a headset), a usage scenario in which a user views a device status of the accessory device on a "leftmost screen", or a usage scenario in which the user selects an audio output channel during a call. In response to the detected first usage scenario, the first electronic device may display a first interface element, where the first interface element may be an interface element in the first usage scenario in a first accessory theme, for example, an icon or a background picture. The first accessory theme is an accessory theme that is set for the accessory device, and may be used to display one or more of an appearance and a device status of the accessory device. The first accessory theme may include interface elements in one or more usage scenarios, and the one or more usage scenarios include the first usage scenario. Compared with a second accessory theme, the first accessory theme may be a previously used accessory theme.

The first electronic device may collect an image by using a camera, and obtain the second accessory theme by using the collected image. Then, the first electronic device may replace the first accessory theme with the second accessory theme. Similar to the first accessory theme, the second accessory theme also includes interface elements in the foregoing one or more usage scenarios. Different from the first accessory theme, an image resource referenced by an interface element in the second accessory theme is different from an image resource referenced by a same interface element in the first accessory theme.

Then, the first electronic device may detect the first usage scenario. In response to the detected first usage scenario, the first electronic device may display a second interface element, where the second interface element may be an interface element in the first usage scenario in the second accessory theme.

This can support the user in changing a headset theme, to meet a personalized requirement of the user and improve user experience. In particular, this can support the user in generating a headset image theme based on the image (for example, an image of a headset/headset case/headset case protective cover) obtained by the camera to replace a previously used headset image theme, so as to meet a personalized requirement of the user and improve user experience.

In the method according to the nineteenth aspect, the electronic device (for example, the mobile phone or the tablet computer) may be referred to as the first electronic device, and the accessory device (for example, the headset) may be referred to as a second electronic device. The device status of the second electronic device may include a battery level of the second electronic device.

In the method according to the nineteenth aspect, the first usage scenario may include one or more of the following: a usage scenario in which the first electronic device establishes a communication connection to the second electronic device, and a usage scenario in which the user views the device status of the second electronic device after the communication connection is established.

In the method according to the nineteenth aspect, that the first electronic device collects an image by using a camera may specifically mean that the first electronic device collects a picture through photographing by the camera, or the first electronic device collects a video through recording by the camera.

With reference to the nineteenth aspect, in some embodiments, the second electronic device may include the following audio device: a headset. When the second electronic device is an audio device, the first usage scenario may further include the following usage scenario: a usage scenario of selecting an audio output channel during a call.

With reference to the nineteenth aspect, in some embodiments, when the second electronic device is an audio device such as the headset, interface elements in usage scenarios may be as follows:

An interface element in the usage scenario in which the first electronic device establishes the communication connection to the second electronic device may include one or more of the following: an interface element (for example, an icon 311 in FIG. 3A or an icon 611 in FIG. 16A) used to display an appearance of the headset, an interface element (for example, an icon 312 in FIG. 3A or an icon 612 in FIG. 16A) used to display an appearance of a headset case of the headset, an interface element (for example, an icon 313 in FIG. 3A or an icon 613 in FIG. 16A) used to display a battery level of the headset, and an interface element used to display a battery level of the headset case.

An interface element in the usage scenario in which the user views the device status of the second electronic device may include one or more of the following: an interface element (an icon 611 in FIG. 16A) used to display an appearance of the headset, an interface element (an icon 612 in FIG. 16A) used to display an appearance of a headset case of the headset, an interface element (an icon 613 in FIG. 16A) used to display a battery level of the headset, and an interface element used to display a battery level of the headset case.

An interface element in the usage scenario of selecting an audio output channel during a call includes an interface element indicating an audio output channel such as the headset.

With reference to the nineteenth aspect, in some embodiments, that the first electronic device replaces the first accessory theme with the second accessory theme may specifically include: The first electronic device may replace, with an image resource referenced by an interface element in the second accessory theme, an image resource referenced by a same interface element in the first accessory theme. During specific replacement, the electronic device may replace image resources in a one-to-one correspondence based on a framework of the accessory theme. The framework of the accessory theme specifies mapping relationships between interface elements in the accessory theme and image resources to be referenced by the interface elements. For example, Table 1 in the following embodiment shows an example of a framework of an accessory theme, that is, a framework of a headset image theme.

With reference to the nineteenth aspect, in some embodiments, that the first electronic device obtains, by using the collected image, the second accessory theme configured for the second electronic device may specifically include: The first electronic device may find the second accessory theme on a network by using the collected image, where the second accessory theme is an accessory theme that matches the collected image. Herein, the matched accessory theme may mean that an image resource (for example, a picture or an icon) referenced by the accessory theme and a shot picture have exactly same or partially same image content.

With reference to the nineteenth aspect, in some embodiments, that the first electronic device obtains, by using the collected image, the second accessory theme configured for the second electronic device may specifically include: The first electronic device may generate the second accessory theme by using the collected image, where an image resource referenced by an interface element in the second accessory theme may be obtained by using the collected image. Specifically, the electronic device may generate a headset image theme based on a framework of an accessory theme by using a shot picture. The electronic device may specifically convert the shot picture into an image resource referenced by each image interface element in the framework of the headset image theme, for example, scale down a front picture of a headset case protective cover to a picture of a small size, to become an image resource that needs to be referenced by a headset case icon in a leftmost screen usage scenario in Table 1.

With reference to the nineteenth aspect, in some embodiments, the method may further include: Before replacing the first accessory theme with the second accessory theme, the first electronic device displays a preview interface, where the preview interface may be used to display an interface element included in the second accessory theme, the preview interface includes a plurality of pages, and the plurality of pages are separately used to display interface elements in different usage scenarios that are included in the second accessory theme. For example, a page shown in FIG. 9 may be used to display an image interface element in a usage scenario of "establishing a connection", to present a headset image theme in the usage scenario of "establishing a connection". For example, a page shown in FIG. 9 may be used to display an image interface element in a "leftmost screen" usage scenario, to present a headset image theme in the "leftmost screen" usage scenario. In addition, the preview interface may be further used to display an image interface element in another usage scenario, for example, an image interface element in a usage scenario of "selecting an audio channel during a call", to present a headset image theme in the another usage scenario.

With reference to the nineteenth aspect, in some embodiments, that the first electronic device collects an image by using a camera may specifically include: The first electronic device identifies a second electronic device from the image collected by the camera, and then the first electronic device may display a prompt used to guide the user to shoot the second electronic device. Then, the first electronic device may detect the shooting operation, and store an image of the second electronic device or a protective cover of the second electronic device. In this case, the first electronic device may obtain the second accessory theme by using the collected image of the second electronic device. When the second electronic device is a headset, the image of the second electronic device may include one or more of the following: an image of the headset, an image of a headset case of the headset, and an image of a headset case protective cover.

With reference to the nineteenth aspect, in some embodiments, when detecting one or more of the following events, the first electronic device may guide the user to shoot an image of an accessory device such as a headset case protective cover/headset/headset case, to replace the headset image theme: the second electronic device changes from wearing no protective cover to wearing a protective cover, and the protective cover worn by the second electronic device changes. Specifically, these events may be reported by the second electronic device to the first electronic device.

With reference to the nineteenth aspect, in some embodiments, that the first electronic device obtains the second accessory theme by using the collected image may specifically include: detecting an operation of selecting an image from a gallery by the user, and obtaining the second accessory theme by using the image selected by the user, where the gallery includes the image collected by the camera.

According to a twentieth aspect, an electronic device is provided, including a plurality of functional units, configured to correspondingly perform the method according to any one of the possible implementations of the nineteenth aspect.

According to a twenty-first aspect, an electronic device is provided, and may be configured to perform the accessory theme replacement method according to the nineteenth aspect. The electronic device may include a Bluetooth communications processing module, a display, a processor, and a memory. The memory stores one or more programs, and the processor invokes the one or more programs, so that a computer performs the accessory theme replacement method according to the nineteenth aspect.

According to a twenty-second aspect, a computer-readable storage medium is provided. The readable storage medium stores instructions, and when the instructions are run on a computer, the computer is enabled to perform the accessory theme replacement method according to the nineteenth aspect.

According to a twenty-third aspect, a computer program product including instructions is provided. When the computer program product runs on a computer, the computer is enabled to perform the accessory theme replacement method according to the nineteenth aspect.

BRIEF DESCRIPTION OF DRAWINGS

FIG. 4A and FIG. 4B are a schematic diagram of an accessory theme adaptation scenario according to an embodiment of this application;

FIG. 16A to FIG. 16D show a series of user interfaces of a headset theme applied to an electronic device 200 according to an embodiment;

FIG. 35A to FIG. 35D are schematic diagrams of another group of interfaces according to an embodiment of this application;

DESCRIPTION OF EMBODIMENTS

The following clearly and completely describes the technical solutions in embodiments of this application with reference to the accompanying drawings in embodiments of this application.

Figure 1:
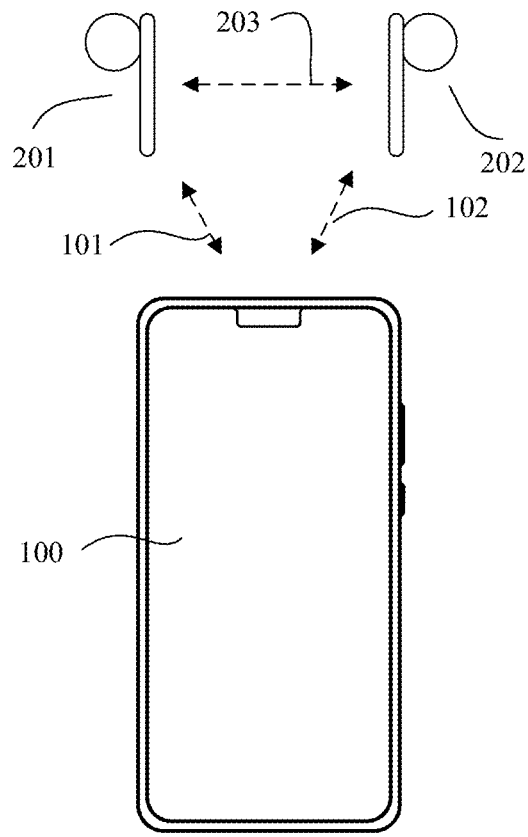
FIG. 1 is a schematic diagram of a wireless audio system according to an embodiment of this application.

FIG. 1 shows an example of a wireless audio system in this application.

The wireless audio system may include an electronic device 100 and a wireless audio device 200. The wireless audio device 200 may include an audio output device 201 and an audio output device 202. The audio output device 201 and the audio output device 202 may be respectively a left earbud and a right earbud of a Bluetooth headset.

There is no cable connection between the audio output device 201 and the audio output device 202. The audio output device 201 and the audio output device 202 may communicate with each other through a wireless communication connection 203. The audio output device 201 and the audio output device 202 may be true wireless stereo (TWS) earbuds, and may be respectively a left earbud and a right earbud in a pair of TWS earbuds.

In the wireless audio system, the audio output device 201 and the audio output device 202 may separately establish wireless communication connections to the electronic device 100. For example, the audio output device 201 and the electronic device 100 may establish a wireless communication connection 101, and may exchange audio data, a play control message, a call control message, and the like through the wireless communication connection 101. Similarly, the electronic device 100 and the audio output device 202 may establish a wireless communication connection 102, and may exchange audio data, a play control message, a call control message, and the like through the wireless communication connection 102.

In addition to those shown in FIG. 1, the electronic device 100, the audio output device 201, and the audio output device 202 may have different physical forms and sizes. This is not limited in this application.

The wireless audio system shown in FIG. 1 may be a wireless audio system implemented according to the Bluetooth protocol. That is, wireless communication connections (for example, the wireless communication connection 101, the wireless communication connection 102, and the wireless communication connection 203) between the electronic device 100, the audio output device 201, and the audio output device 202 may be Bluetooth communication connections.

It should be noted that an example in which the electronic device 100 in this embodiment of this application is a mobile phone is used. Alternatively, the electronic device 100 may be a tablet computer or the like. This is not limited herein. For a specific structure of the electronic device 100, refer to the following specific embodiments and related accompanying drawings. Details are not described herein.

Figure 2A:
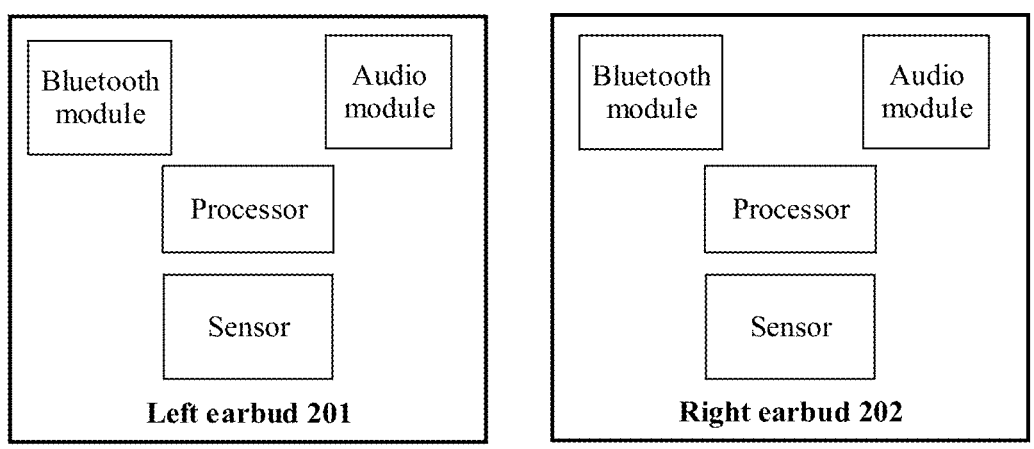
FIG. 2A is a schematic diagram of a structure of a wireless audio device 200 according to an embodiment of this application.

FIG. 2A shows an example of structures of the audio output device 201 and the audio output device 202 in FIG. 1. As shown in FIG. 2A, the audio output device 201 and the audio output device 202 each may include a Bluetooth module, an audio module, a sensor, and a processor.

In addition to the components shown in FIG. 2A, the audio output device 201 and the audio output device 202 each may further include other components. For example, a memory, a receiver, and an indicator may be configured.

In addition to the Bluetooth headset shown in FIG. 1, the audio output device 201 and the audio output device 202 may alternatively be audio output devices of other types. For example, in a home theater scenario, the audio output device 201 and the audio output device 202 may alternatively be respectively two speakers in the home theater scenario: a left channel speaker and a right channel speaker.

Figure 2B:
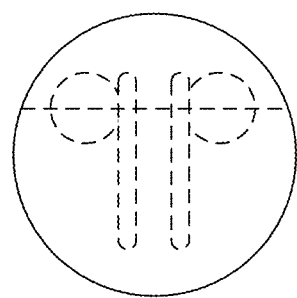
FIG. 2B is a schematic diagram of a headset case according to an embodiment of this application.
Figure 2C:
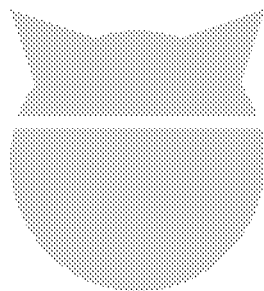
FIG. 2C is a schematic diagram of a headset case protective cover according to an embodiment of this application.

As shown in FIG. 1, the audio output device 201 and the audio output device 202 may be respectively a left earbud and a right earbud in TWS earbuds, and a headset case shown in FIG. 2B may be configured for the left earbud and the right earbud. The headset case has functions of accommodating and charging the TWS earbuds. A headset case protective cover shown in FIG. 2C may be configured for the headset case, and the headset case protective cover may provide a protection function for the headset case.

TWS earbuds are used as an example. As shown in FIG. 3A to FIG. 3D, the electronic device 100 may provide a series of image interface elements (such as icons and pictures) to reflect appearances of the TWS earbuds, a headset case, and the like connected to the electronic device 100, and device status information such as battery levels of the TWS earbuds and the headset case. The series of interface elements can form a headset theme.

Figure 3A:
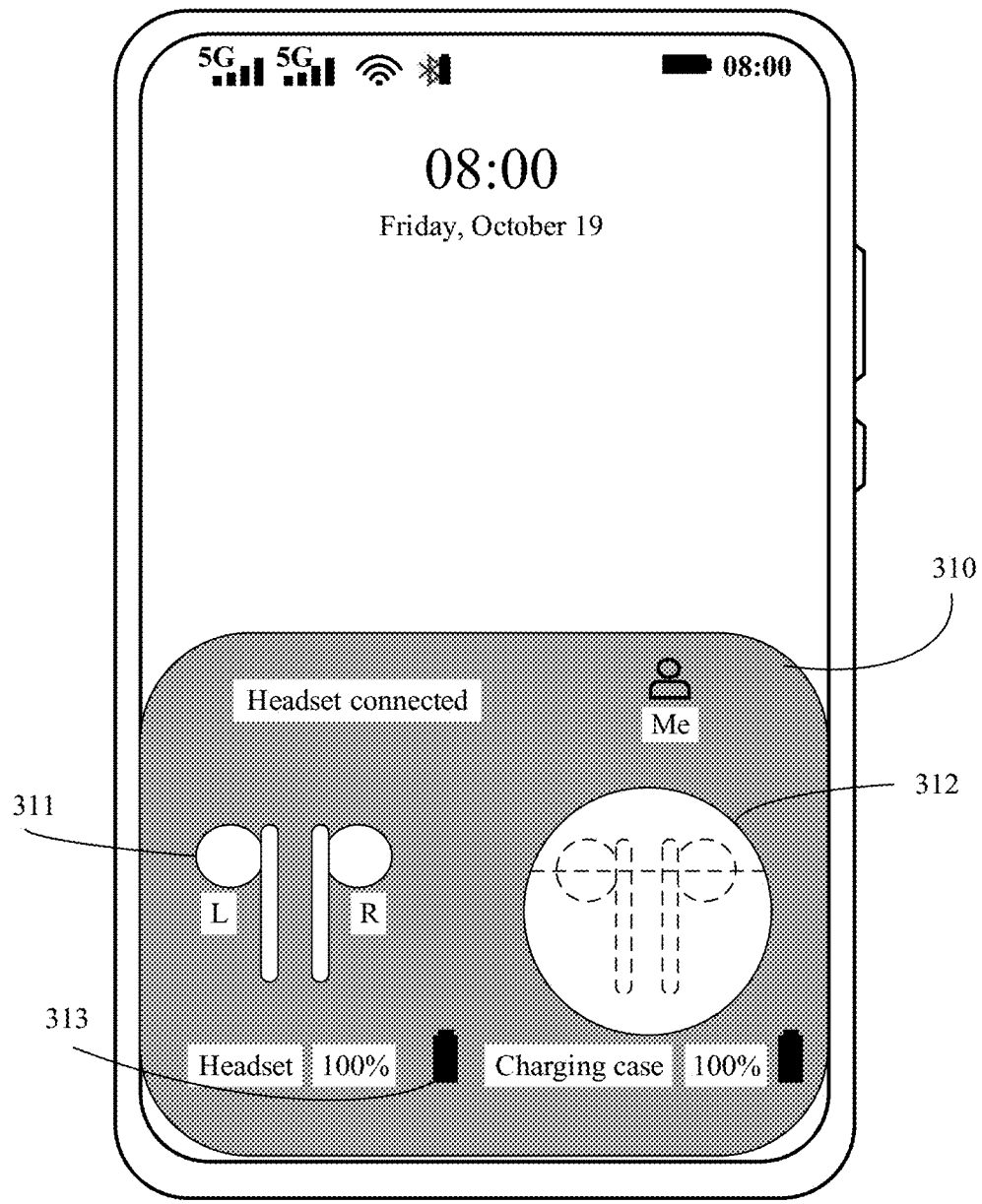
FIG. 3A to FIG. 3E each are a schematic diagram of an interface obtained when an electronic device is connected to a wireless audio device 200 according to an embodiment of this application.

As shown in FIG. 3A, when the TWS earbuds are connected to the electronic device 100, the electronic device 100 may display a pop-up window interface 310. The pop-up window interface 310 displays a series of image interface elements, for example, a headset background 311, a headset case background 312, and a headset case battery level icon 313. The series of image interface elements may be used to indicate appearances of the headset, the headset case, and the like connected to the electronic device 100, and device status information such as battery levels of the headset and the headset case. Both the appearance and the device status information are presented in a style that is set by default, for example, the appearances of the headset, the headset case, and the like are consistent with physical objects, are simple, and cannot be changed by a user.

Figure 3B:
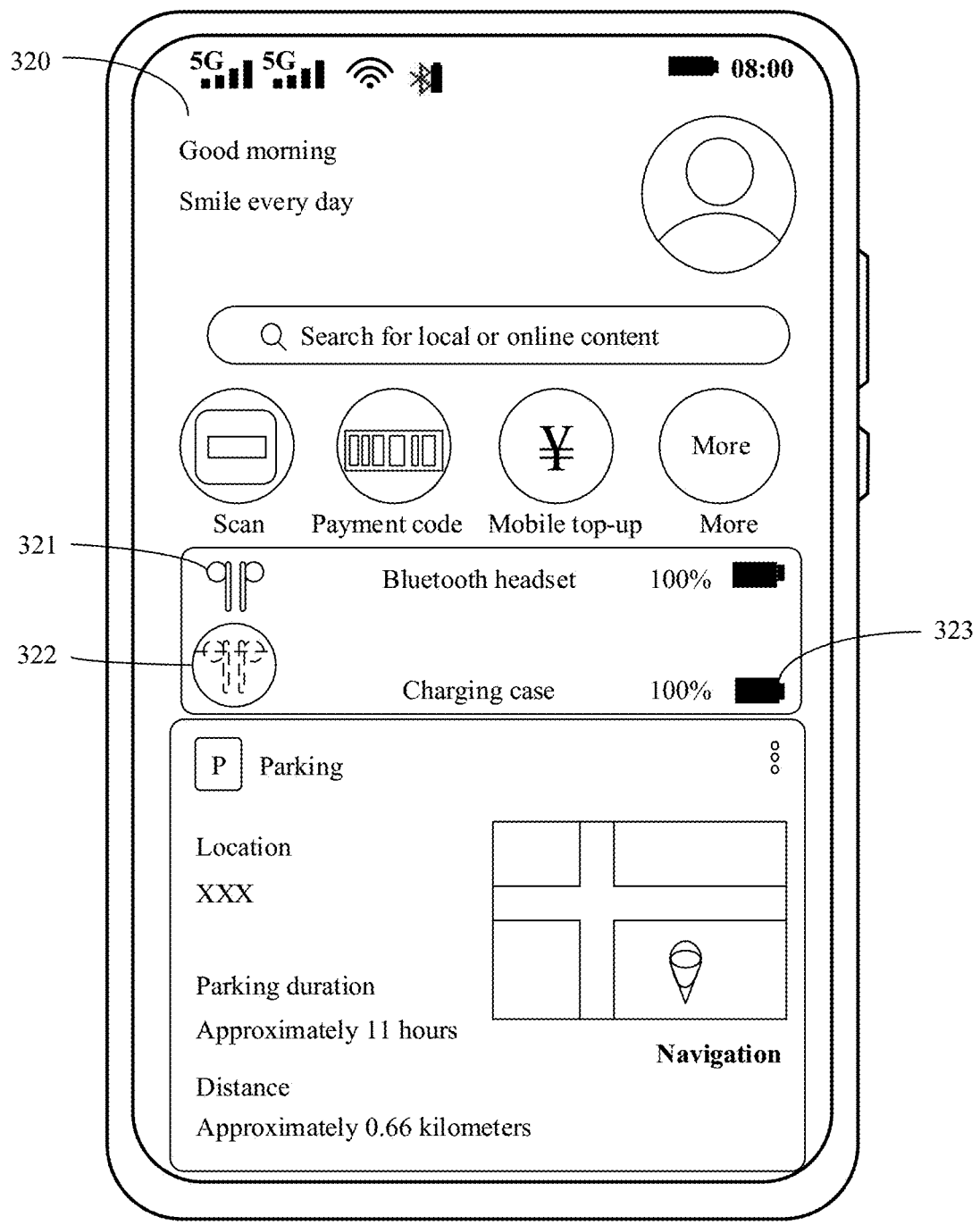

As shown in FIG. 3B, after the TWS earbuds are connected to the electronic device 100, the electronic device 100 may also display a series of image interface elements in a user interface 320 (which may also be referred to as a "leftmost screen"), for example, a headset background 321, a headset case background 322, and a headset case battery level icon 323. The series of image interface elements may also be used to indicate appearances of the headset, the headset case, and the like connected to the electronic device 100, and device status information such as battery levels of the headset and the headset case. Both the appearance and the device status information are also presented in a style that is set by default, for example, the appearances of the headset, the headset case, and the like are consistent with physical objects, are simple, and cannot be changed by a user.

The "leftmost screen" may also be referred to as Hiboard, an intelligent assistant, or HiSuggestion. A leftmost screen interface in this embodiment of this application may also be understood as an intelligent assistant interface, a HiSuggestion interface, or the like. The names described in this embodiment of this application should not be understood as having a limitative meaning. The user interface 320 (which may also be referred to as the "leftmost screen") is described in detail in the following embodiment. Details are not described herein.

Figure 3C:
Figure 3D:
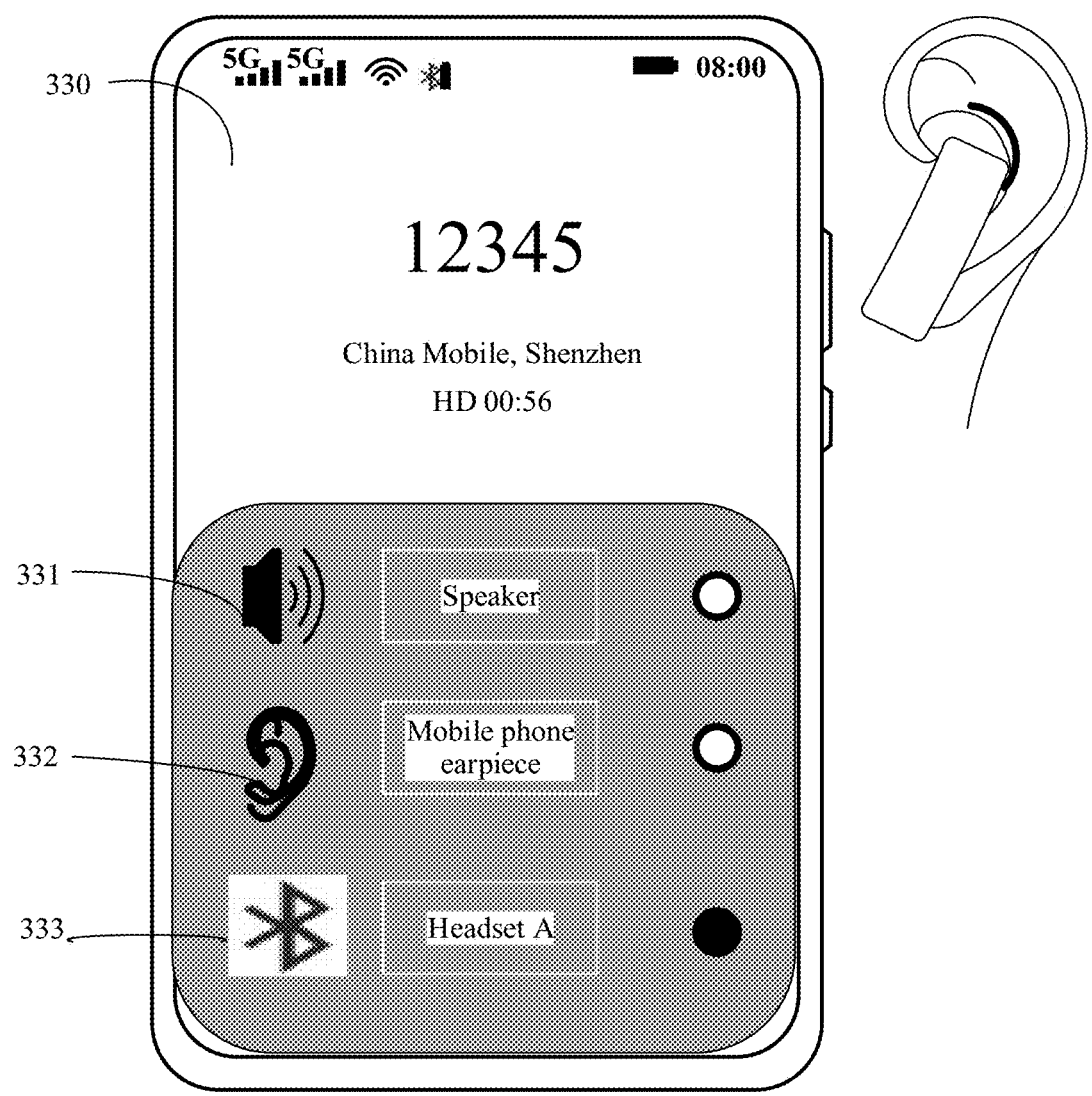

As shown in FIG. 3C and FIG. 3D, during a call, the electronic device 100 may alternatively display a plurality of audio output channel options in a user interface 330. For example, an icon 333 represents an audio output channel option such as a Bluetooth headset, an icon 331 represents an audio output channel option such as a speaker, an icon 332 represents an audio output channel option such as a receiver, and the like. The icon 333 corresponding to the Bluetooth headset is set by default and cannot be changed by a user.

Figure 3E:
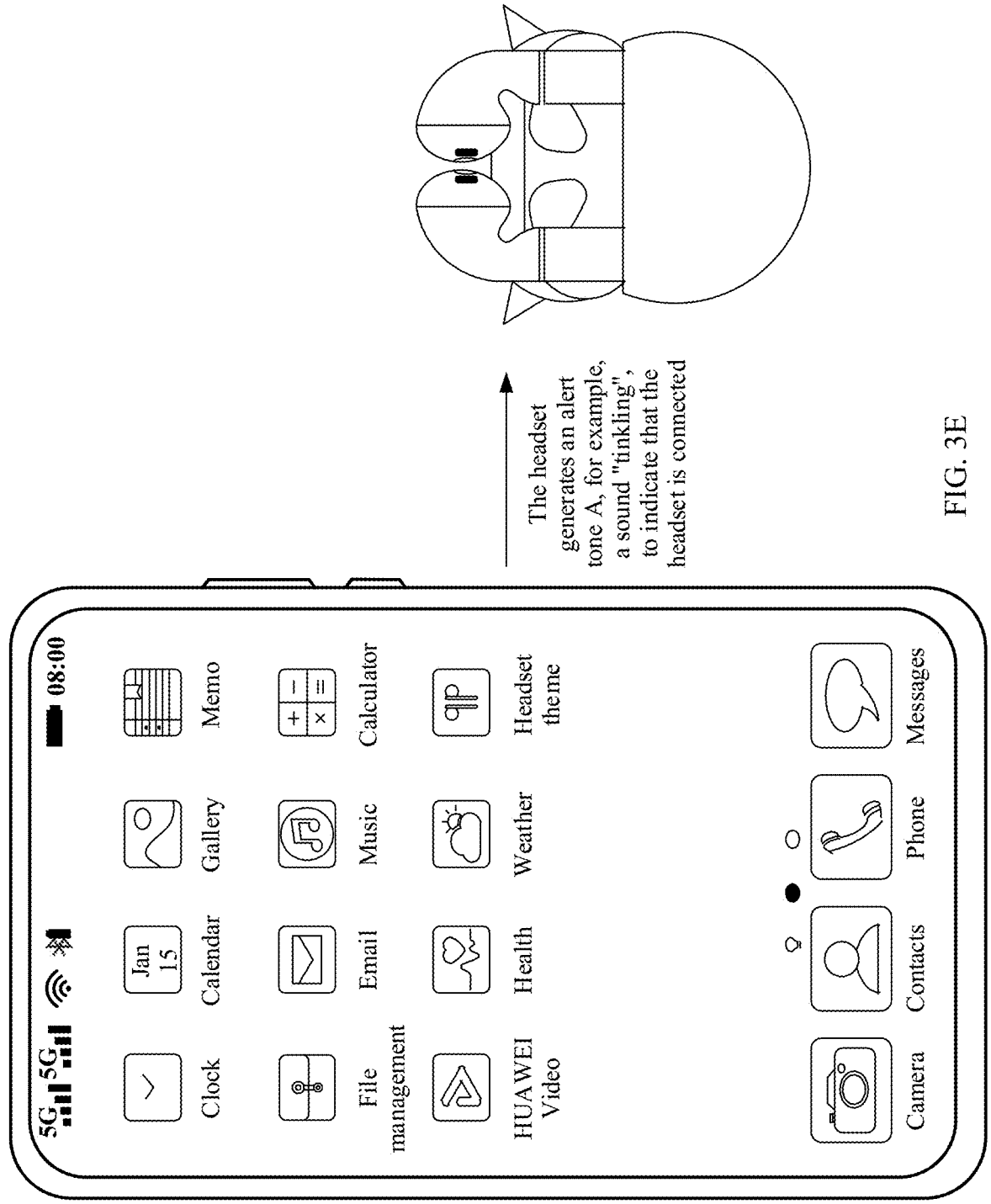

In addition, the headset theme may further include a series of alert tones that are set by default, for example, an alert tone indicating that a connection is established, an alert tone indicating that a battery level is low, and an alert tone indicating that a connection is broken. The alert tone indicating that the connection is established may be generated by the TWS earbuds when the TWS earbuds are connected to the electronic device 100, the alert tone indicating that the battery level of the headset is low is generated by the TWS earbuds when a battery level of the TWS earbuds is low, and the alert tone indicating that the connection is broken is generated by the TWS earbuds when the TWS earbuds are disconnected from the electronic device 100. As shown in FIG. 3E, when the TWS earbuds are connected to the electronic device 100, the TWS earbuds generate an alert tone B, for example, a sound "tinkling", to indicate that the headset is connected. The series of alert tones that are set by default are also presented in a very single style and cannot be changed by a user or shared with another user.

It can be learned that currently, a theme (which may include an image interface element and an alert tone) of the TWS earbuds is single, and cannot meet a personalized requirement of the user.

Embodiments of this application provide a headset theme adaptation method, so that related information such as a device model and a device identifier of a headset case protective cover can be automatically obtained through multi-end linkage between a mobile phone, a headset, the headset case protective cover, and a cloud server (for example, a server of a cloud theme market), and a headset theme adapted to the protective cover is downloaded and applied based on the related information, to implement personalized experience of headset theme adaptation.

In this application, wireless communications components such as near field communication (NFC) and Bluetooth are built in the headset case protective cover, and wireless communications components such as NFC and Bluetooth may also be built in the headset case, to facilitate communication between the headset case and the protective cover, for example, exchange information such as the device model and the device identifier of the protective cover. In this way, the headset case may communicate with the electronic device 100 to transmit the information to the electronic device 100, so that the electronic device 100 obtains the adapted headset theme based on the information. Alternatively, the headset case may first transmit the information to the headset. For example, the headset case and the headset may form a wired communications interface to transmit the information by using a metal probe disposed in the headset case. Then, the headset communicates with the electronic device 100 to transmit the information to the electronic device 100. This is not limited. The protective cover may directly communicate with the headset, to transmit the information to the electronic device 100. Optionally, in embodiments of this application, the protective cover may further directly communicate with the electronic device 100, to transmit the information such as the device model and the device identifier of the protective cover to the electronic device 100, so that the electronic device 100 obtains the adapted headset theme based on the information.

The headset theme mentioned in this application may include the following two aspects: a headset image theme and a headset sound theme. The headset image theme may be presented by the electronic device 100 such as a mobile phone, and may provide a series of image interface elements, to reflect appearances of the headset, the headset case, and the like connected to the electronic device 100, and device status information such as battery levels of the headset and the headset case. The headset image theme may be presented in a specific scenario of the electronic device 100, for example, a usage scenario in which the headset is connected to the electronic device 100 shown in FIG. 3A, a "leftmost screen" usage scenario shown in FIG. 3B, or a usage scenario of selecting an audio output channel during a call shown in FIG. 3C and FIG. 3D. The headset sound theme may be rendered by the headset, and may provide a plurality of different alert tones, to indicate different states of the headset, for example, a state in which the headset is connected to the electronic device 100, a state in which a battery level of the headset is low, and a state in which the headset is disconnected from the electronic device 100. As shown in FIG. 3E, when the TWS earbuds are connected to the electronic device 100, the TWS earbuds generate an alert tone B, for example, a sound "tinkling", to indicate that the headset is connected. The series of alert tones that are set by default are also presented in a very single style and cannot be changed by a user or shared with another user.

In addition to the TWS earbuds, the method provided in embodiments of this application may be further applied to other types of accessory devices, such as over-ear headphones, a flex-form earphone, a speaker, an augmented reality (AR)/virtual reality (VR) device, a stylus, a watch, and a wearable device. When these accessory types are applicable, the headset theme mentioned in embodiments of this application may be adaptively referred to as an accessory theme, and the headset theme adaptation method provided in embodiments of this application may be adaptively referred to as an accessory theme adaptation method. In addition to Bluetooth, a manner of communication between the accessory and the electronic device 100 (for example, a mobile phone, a tablet computer, or a smart screen) may alternatively be another manner, for example, wireless fidelity (Wi-Fi), Wi-Fi direct, or cellular mobile communication.

To simplify description, the following describes embodiments of this application in detail by using an example of automatically adapting a headset theme (which may also be referred to as headset theme adaptation), and it is assumed that a new protective cover worn by a headset 200 matching the electronic device 100 is in a "Cute animal" design style. The new protective cover is briefly referred to as a protective cover AS-1 below. Before the headset theme is automatically adapted, for example, a headset theme configured for the headset 200 may be shown in FIG. 3A to FIG. 3D. FIG. 3A shows an example of a headset image theme presented in a usage scenario in which the electronic device 100 establishes a connection to the headset 200. FIG. 3B shows an example of a headset image theme presented in a usage scenario of viewing the headset 200 on a leftmost screen. FIG. 3C and FIG. 3D show examples of headset image themes presented in a usage scenario of selecting an audio output channel during a call.

FIG. 4A and FIG. 4B show an example of an accessory theme adaptation scenario according to an embodiment of this application.

As shown in FIG. 4A and FIG. 4B, once it is detected that a new protective cover AS-1 is worn on the headset case, the headset 200 may interact with the protective cover AS-1 through communication such as NFC or Bluetooth, to obtain information such as a device model and a device identifier (cover ID) of the protective cover AS-1, or a theme identifier (theme ID) and a theme name of a headset theme that adapts to the protective cover AS-1. Subsequently, the headset 200 may send the information to the electronic device 100 connected to the headset 200. The electronic device 100 may use the information to download, from a server of a service provider such as a cloud theme market, a headset theme adapted to the protective cover AS-1. Then, the electronic device 100 may replace a previously used headset theme with the downloaded headset theme. The electronic device 100 sends, to the headset 200, audio resources referenced by various alert tones in the headset theme, so that the headset 200 can subsequently replace previously used audio resources with the audio resources.

In this way, in a scenario in which the new protective cover is worn on the headset case or the like, update of the headset theme may be automatically triggered, to obtain a headset theme that adapts to the new protective cover, so as to meet a personalized requirement of a user for the headset theme and improve user experience. The new protective cover is worn on the headset case in the following two cases:

Case 1: The headset case changes from having no matching protective cover to wearing a protective cover for the first time.

Case 2: The protective cover worn on the headset case is replaced.

In addition to the event that the new protective cover is worn on the headset case, a condition for triggering multi-end linkage between the electronic device 100, the headset/headset case, the headset case protective cover, and a cloud server (for example, the server of the cloud theme market) to implement headset theme adaptation may be another condition. For example, headset theme adaptation is triggered at intervals. For another example, the user touches a button or an area on the headset case or the protective cover to trigger headset theme adaptation. For still another example, headset theme adaptation is triggered when the headset case is opened. This condition is not limited in this application.

The headset theme is essentially a resource package, which may include an image resource and an audio resource. An image resource such as a video or a picture may be referenced to form an interface element in the headset theme. An audio file in a format such as MP3 may be referenced to form an alert tone in the headset theme, for example, an alert tone indicating that a battery level of the headset is low. The resources referenced by the headset theme are organized based on a framework of the headset theme to form the headset theme. The framework of the headset theme and one-to-one theme replacement based on the framework of the headset theme are described in the following embodiment. Details are not described herein. Based on the headset theme sharing scenario described above, the following first describes in detail a user interface (UI) provided in embodiments of this application.

The term "user interface" in the specification, claims, and accompanying drawings of this application is a medium interface for interaction and information exchange between an application or an operating system and a user, and implements conversion between an internal form of information and a form that can be accepted by the user. The user interface is usually in a representation form of a graphical user interface (GUI), which is a user interface that is related to a computer operation and that is displayed in a graphical manner. The user interface may be an interface element such as an icon, a window, or a control displayed on a display of an electronic device, and the control may include a visual interface element such as an icon, a button, a menu, a tab, a text box, a dialog box, a status bar, a navigation bar, or a widget.

Figure 5A:
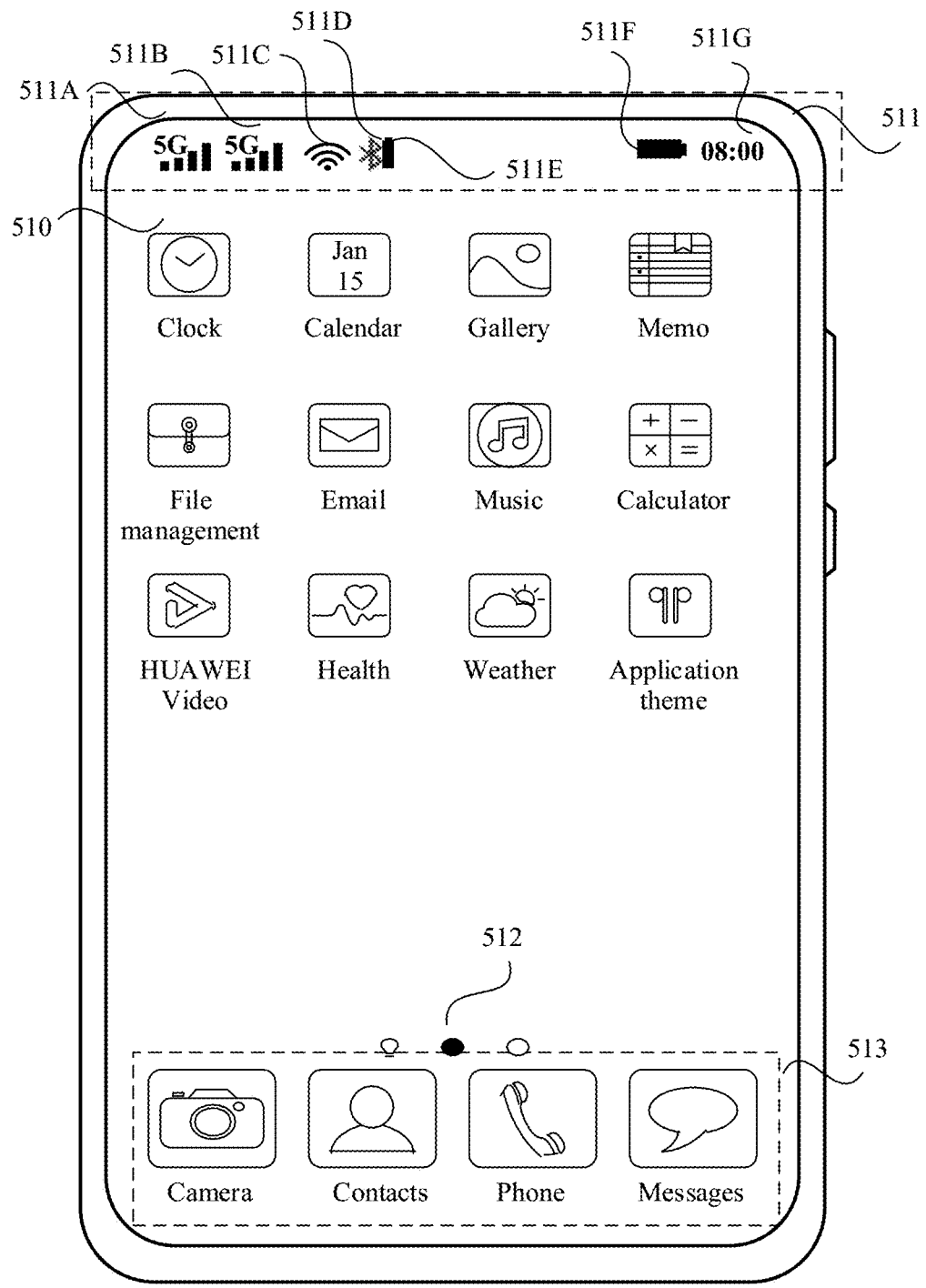
FIG. 5A and FIG. 5B are schematic diagrams of a group of user interfaces according to an embodiment of this application.

FIG. 5A shows an example of a user interface 510 that is on an electronic device 100 and that is used to display an application installed on the electronic device 100.

As shown in FIG. 5A, the user interface 510 may include a status bar 511, a page indicator 512, a tray 513 having frequently-used application icons, and a plurality of other application icons.

The status bar 511 may include one or more signal strength indicators (for example, a signal strength indicator 511A and a signal strength indicator 511B) of a mobile communication signal (which may also be referred to as a cellular signal), one or more signal strength indicators 511C of a wireless fidelity (Wi-Fi) signal, a battery status indicator 511F, and a time indicator 511G.

When/after the electronic device 100 is connected to the TWS earbuds, the status bar 511 may further display an indicator 511D and an indicator 511E. The display indicator 511D may be used to indicate that the electronic device 100 successfully enables Bluetooth and is connected to the TWS earbuds, and the indicator 511E may be used to indicate a remaining battery level of the TWS earbuds.

The page indicator 512 may be used to indicate a location relationship between a currently displayed page and another page.

The tray 513 having frequently-used application icons may include a plurality of tray icons (for example, a Camera application icon, a Contacts application icon, a Phone application icon, and a Messages application icon), and the tray icons remains displayed during page switching. The tray icons are optional. This is not limited in this embodiment of this application.

The other application icons may be a plurality of application icons, for example, a Clock application icon, a Calendar application icon, a Gallery application icon, a Memo application icon, a File management application icon, an Email application icon, a Music application icon, a Calculator application icon, a HUAWEI Video application icon, a Health application icon, a Weather application icon, and an Application theme application icon. The other application icons may be distributed on a plurality of pages, and the page indicator 512 may be further used to indicate a specific page on which an application is currently browsed by a user. The user may slide leftward or rightward in an area including the other application icons, to browse an application icon on another page.

In some embodiments, the user interface 510 shown in FIG. 5A may be a home screen. It may be understood that FIG. 5A merely shows an example of a user interface of the electronic device 100, and should not constitute a limitation on this embodiment of this application.

Figure 5B:
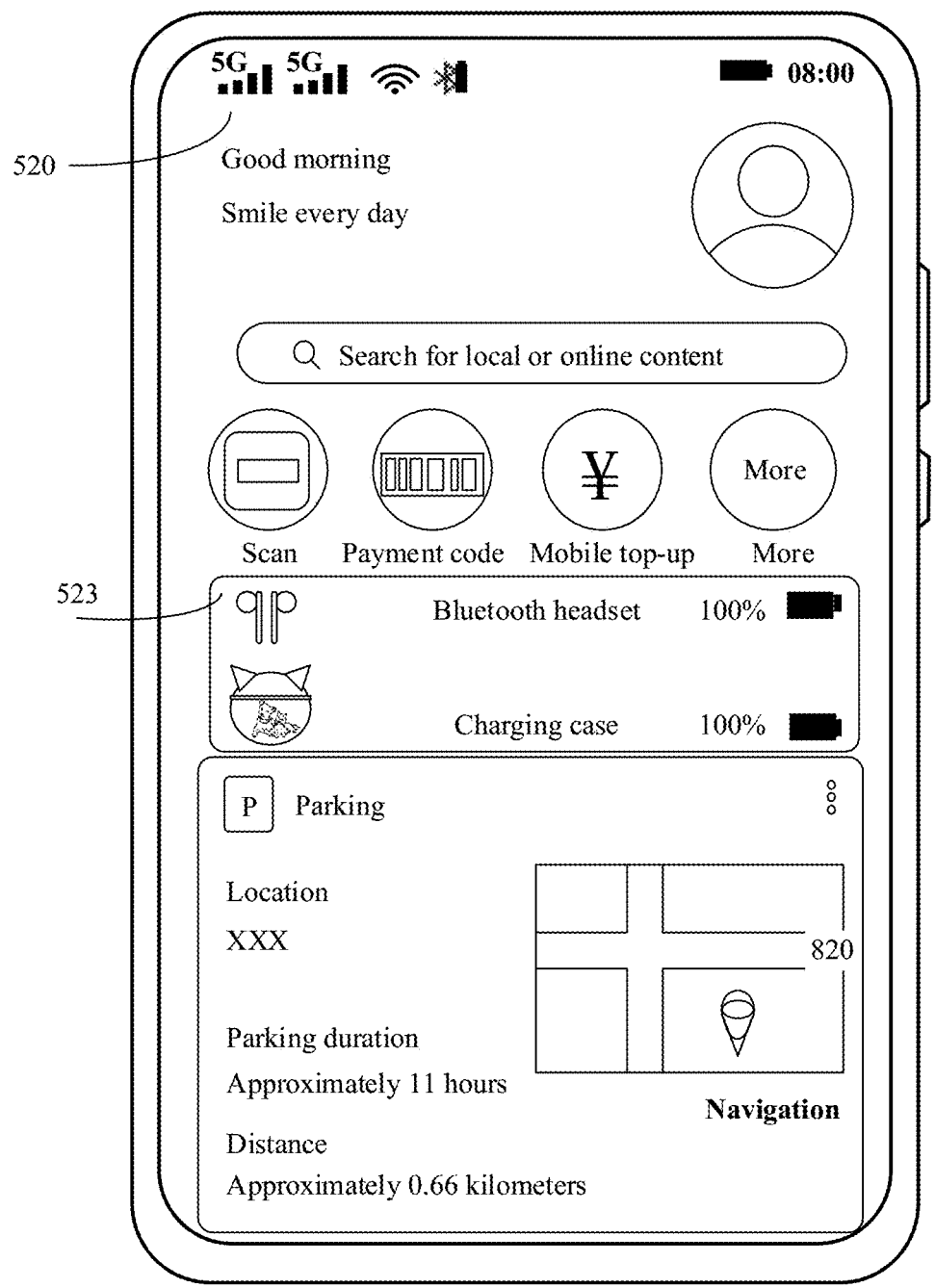

FIG. 5B shows an example of a leftmost screen interface 520 of the electronic device 100.

As shown in FIG. 5B, the leftmost screen interface 520 may include a search control 521, a quick service control 522 (for example, Scan, Payment code, Mobile top-up, and More), a parking information display window 524, and the like.

After the electronic device 100 is connected to the TWS earbuds, the electronic device 100 may detect a sliding operation (for example, a rightward sliding operation) of the user in the user interface 510 shown in FIG. 5A. In response to the sliding operation, the electronic device 100 displays the leftmost screen interface 520. In this case, the leftmost screen interface 520 may display a window 523, and the window 523 displays appearances of a headset, a headset case, and the like connected to the electronic device 100, and device status information such as battery levels of the headset and the headset case.

It may be understood that FIG. 5B merely shows the example of the leftmost screen interface 520 of the electronic device 100, and should not constitute a limitation on this embodiment of this application.

The leftmost screen interface 520 in FIG. 5B is the same as the user interface 320 in FIG. 3B, and a text description of the leftmost screen interface 520 in FIG. 5B is also applicable to the user interface 320 in FIG. 3B.

FIG. 6A to FIG. 6D, FIG. 7A to FIG. 7C, and FIG. 8A and FIG. 8B show examples of a series of user interfaces for automatically adapting a headset theme based on a mobile phone theme market.

The mobile phone theme market may be an application, may be responsible for managing a mobile phone theme stored on a cloud server, and provide functions such as searching for and downloading a mobile phone theme. The mobile phone theme market may also be responsible for recording device information (for example, a mobile phone model, a mobile phone ID, a headset model, and a headset ID) to which different mobile phone themes stored on the cloud server adapt, or recording theme IDs of different mobile phone themes. The mobile phone theme in the mobile phone theme market includes a headset theme, and a style of the headset theme and a style of the mobile phone theme may be unified. For example, a mobile phone theme of a "Cute animal" style may include a headset theme that is also of the "Cute animal" style. A mobile phone theme that adapts to a protective cover AS-1 may include a headset theme that adapts to the protective cover AS-1. Therefore, the headset theme may also be changed by changing the mobile phone theme, to implement headset theme adaptation.

(1) FIG. 6A to FIG. 6D show examples of user interfaces for searching a mobile phone theme market for a mobile phone theme in response to a fact that a headset wears a new protective cover AS-1.

Figure 6A:
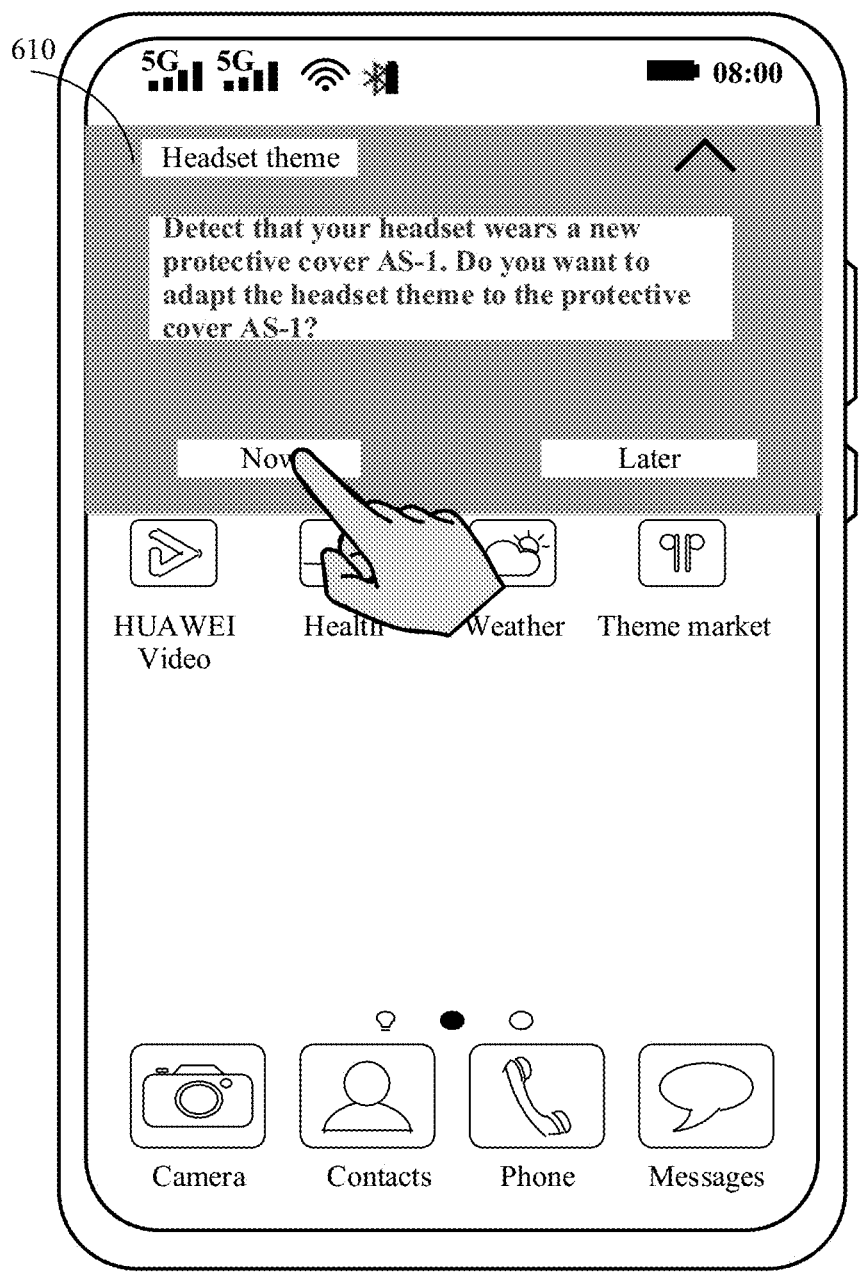
FIG. 6A to FIG. 6D are schematic diagrams of another group of interfaces according to an embodiment of this application.
Figure 6B:
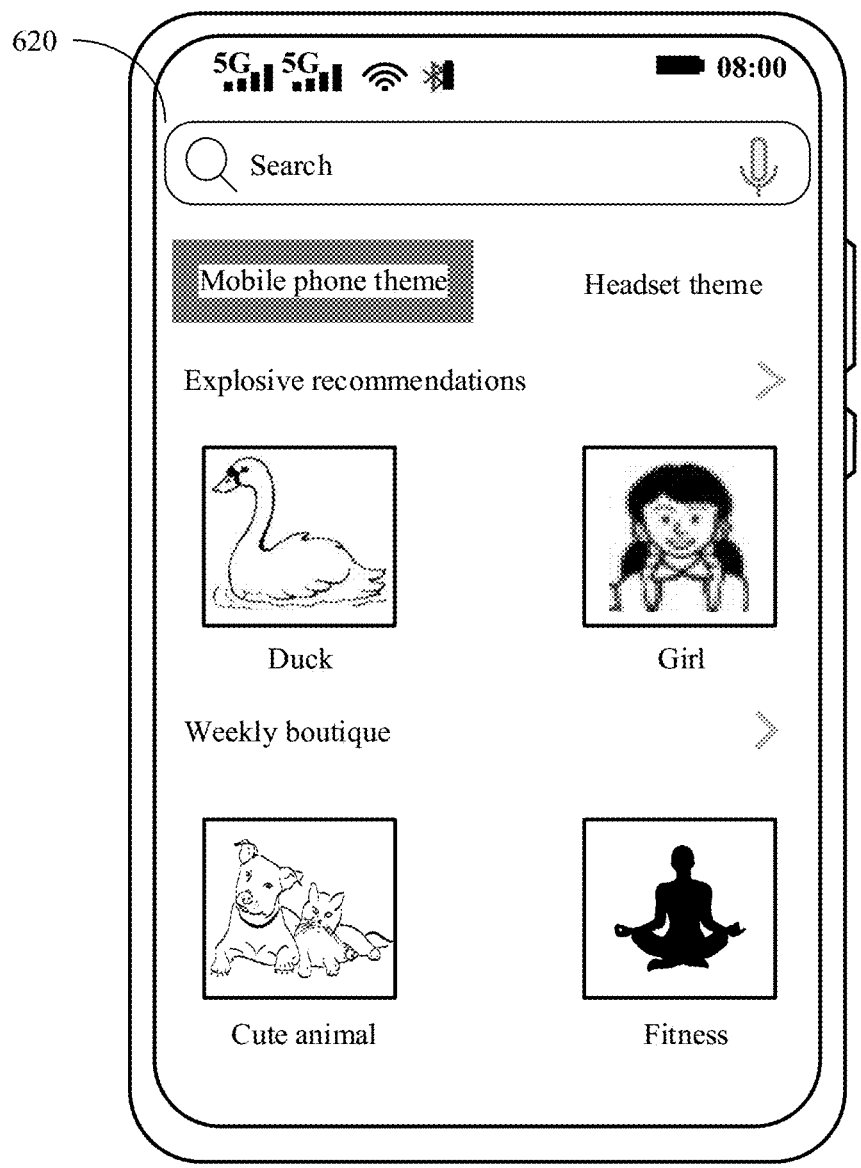

After learning that the new protective cover AS-1 is worn on the headset case, the electronic device 100 may display an example notification 610 shown in FIG. 6A. The notification 610 may be used to notify a user of the event and may be used to ask the user whether to change a mobile phone theme to adapt to the protective cover AS-1. The event that the new protective cover AS-1 is worn on the headset case may be reported by the headset 200 to the electronic device 100. In addition to the event, information such as a device model and a device identifier (cover ID) of the protective cover AS-1, or a theme identifier (theme ID) and a theme name of a headset theme that adapts to the protective cover AS-1 may be further reported. The information may be used by the electronic device 100 to subsequently obtain the mobile phone theme that adapts to the protective cover AS-1.

Figure 6C:
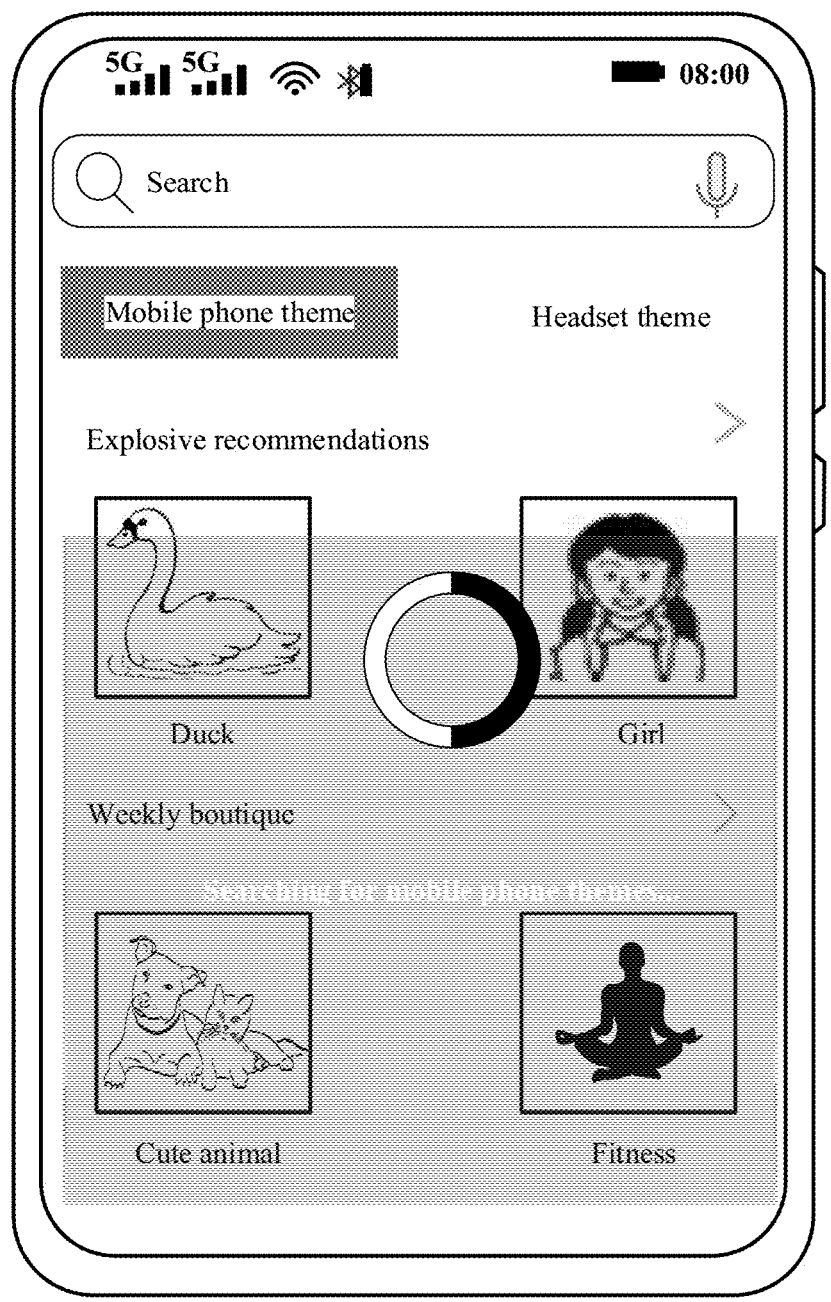

The electronic device 100 may detect an operation of adapting the mobile phone theme to the protective cover AS-1 by the user, for example, a tap operation on an option "Now" shown in FIG. 6A. In response to the operation, the electronic device 100 may display an example interface 620 shown in FIG. 6B. The interface 620 may display a mobile phone theme provided by a mobile phone theme market, for example, a "Duck" mobile phone theme, a "Girl" mobile phone theme, a "Cute animal" mobile phone theme, and a "Fitness" mobile phone theme. In addition, the electronic device 100 may further request a cloud server of the mobile phone theme market to search the mobile phone theme market for the mobile phone theme that adapts to the protective cover AS-1, and as shown in FIG. 6C and FIG. 6D, display a search progress in the example interface 620 shown in FIG. 6B, and finally display the result, that is, a found "Cute animal" mobile phone theme.

Figure 7A:
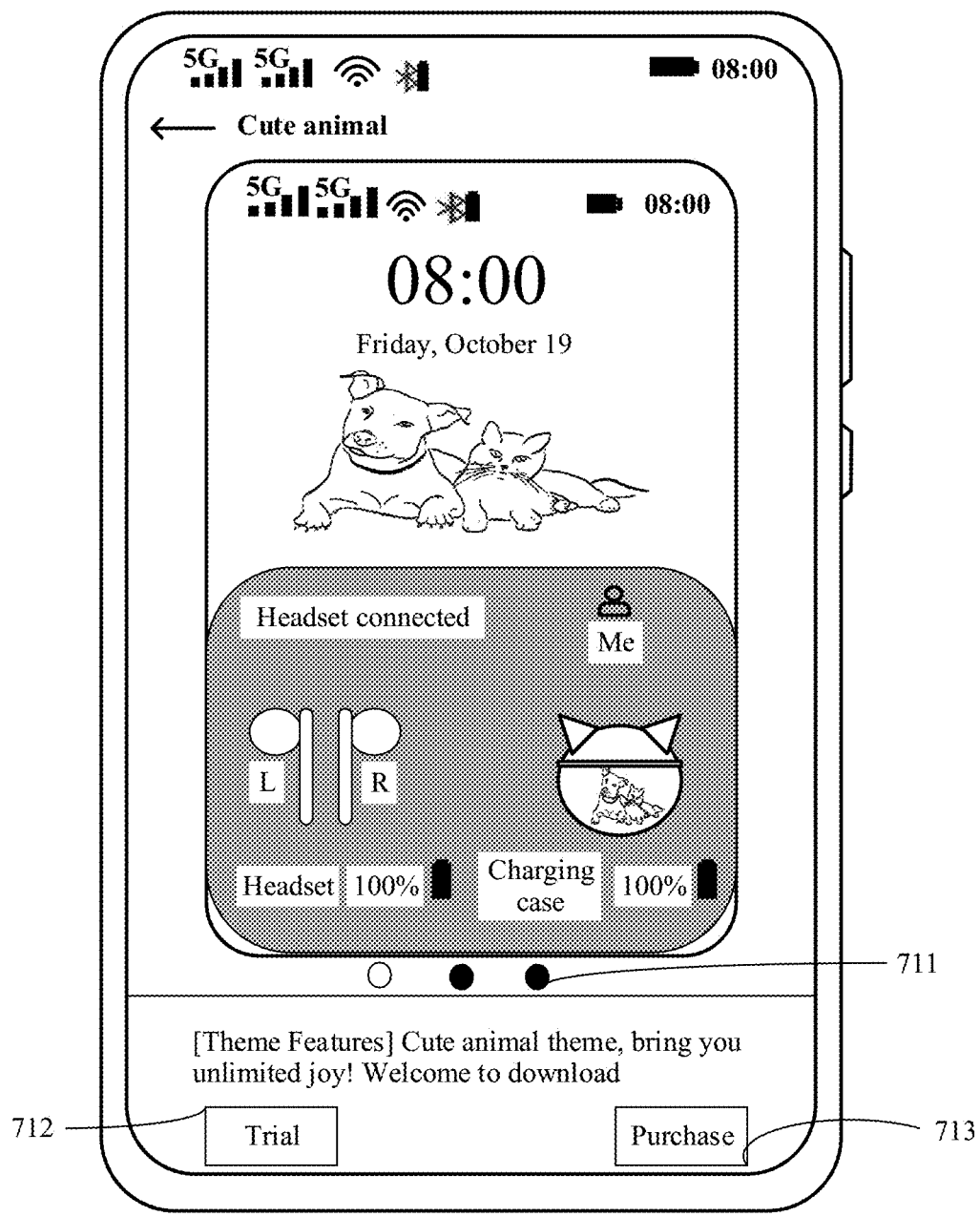
FIG. 7A to FIG. 7C are schematic diagrams of another group of interfaces according to an embodiment of this application.
Figure 7B:
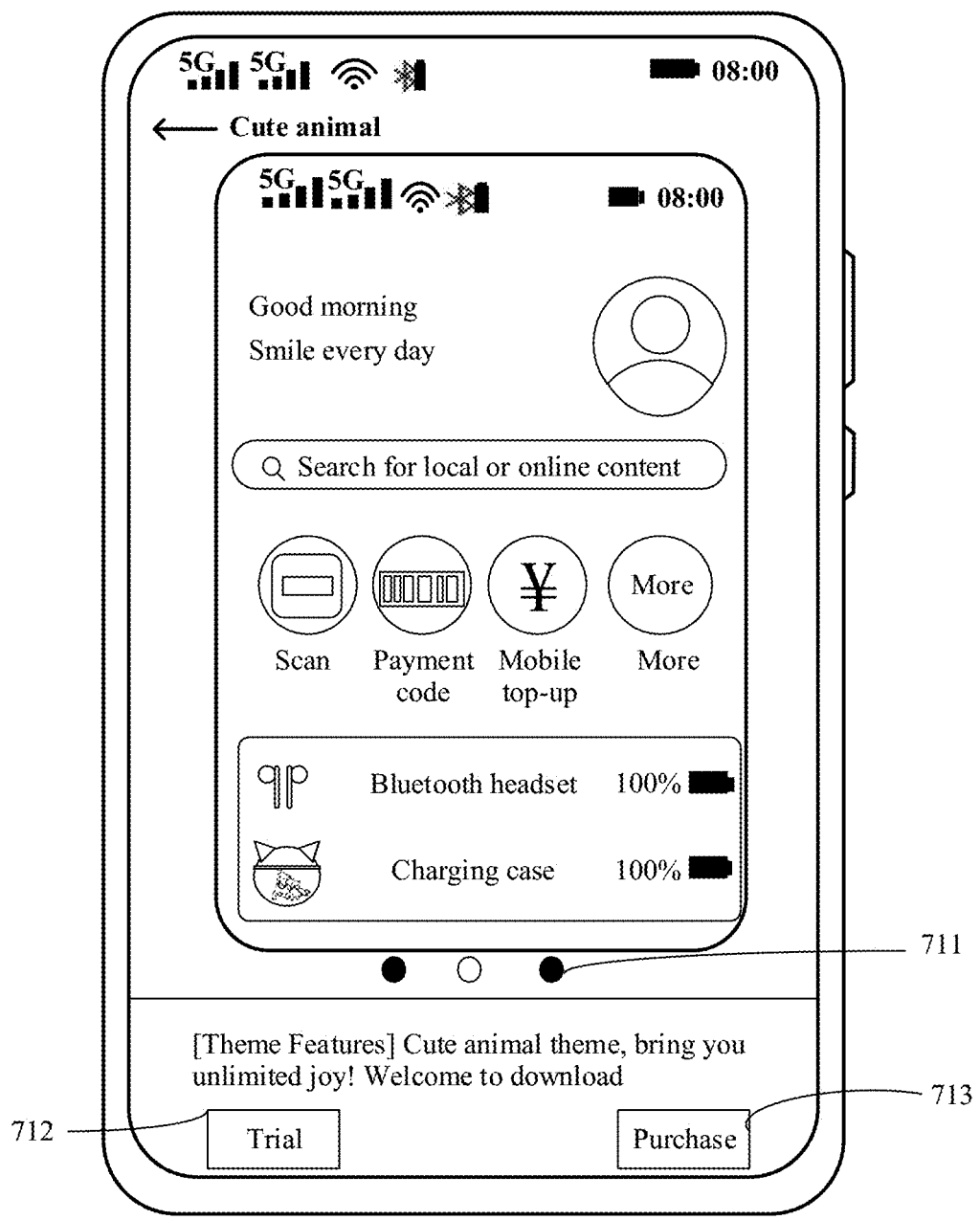
Figure 7C:
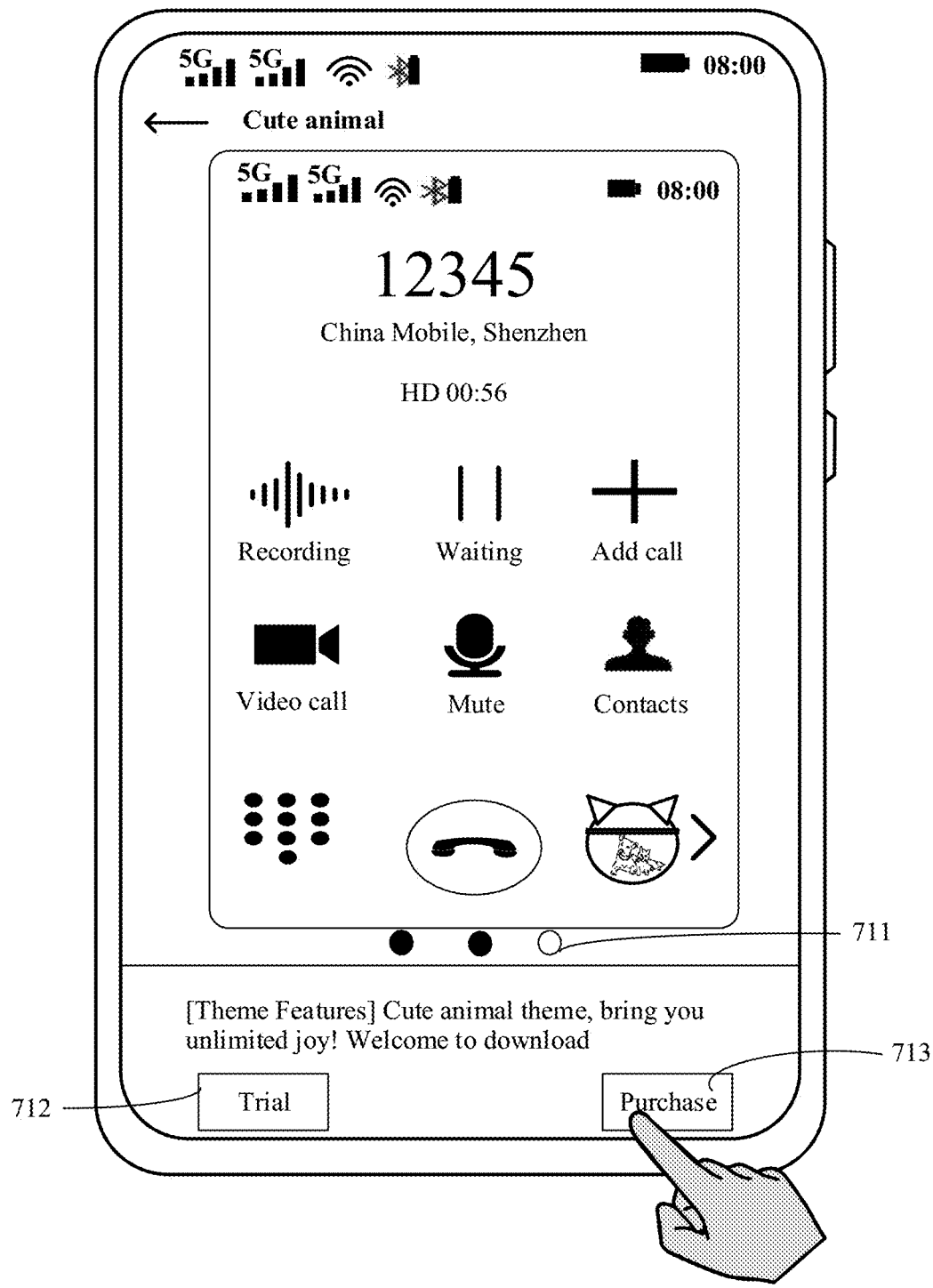

(2) FIG. 7A to FIG. 7C show examples of user interfaces for previewing and downloading a found mobile phone theme.

Figure 6D:
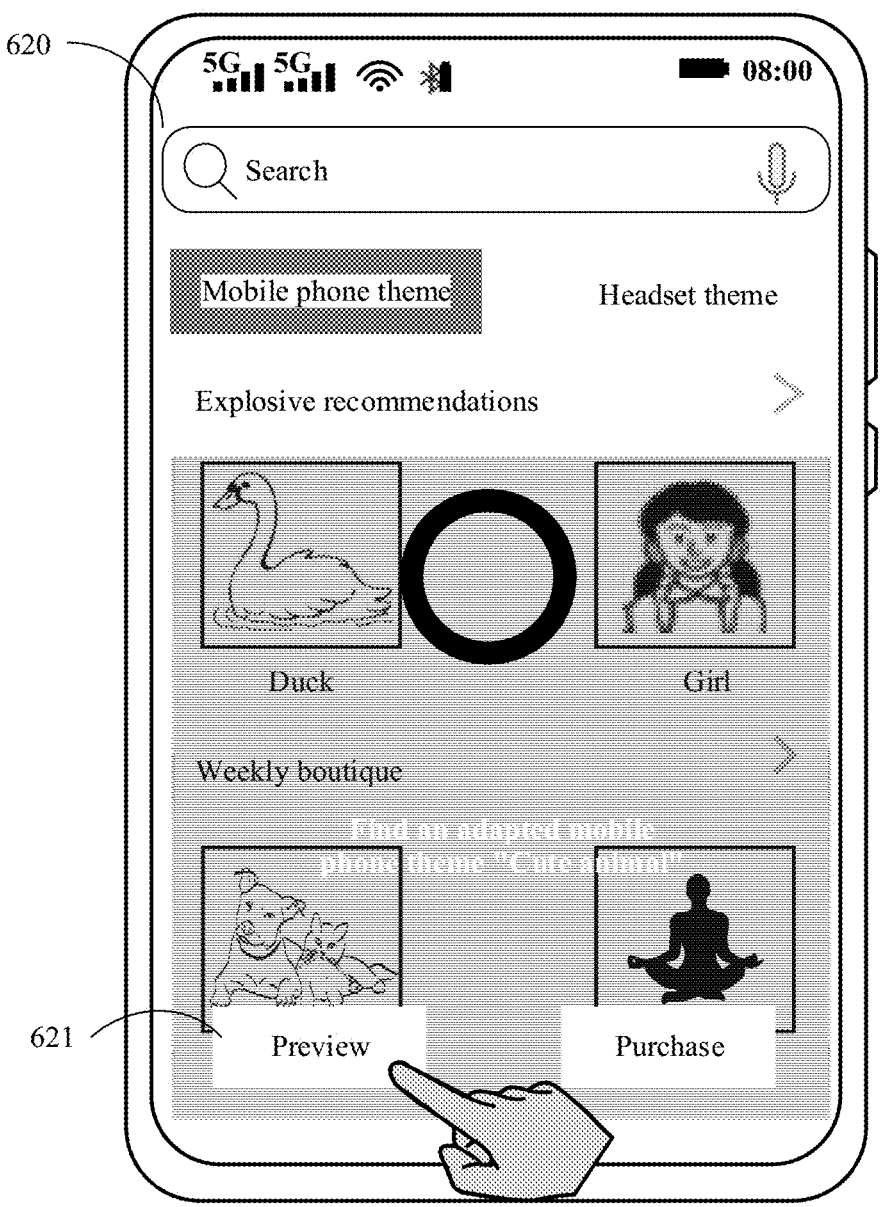

After finding the mobile phone theme (for example, the "Cute animal" mobile phone theme) that adapts to the protective cover AS-1, the electronic device 100 may detect an operation performed by the user to preview the "Cute animal" mobile phone theme, for example, an operation of tapping a preview control 621 in the user interface 620 shown in FIG. 6D. In response to the operation, as shown in FIG. 7A to FIG. 7C, the electronic device 100 may display a preview interface of the mobile phone theme, where the preview interface is used to present the "Cute animal" mobile phone theme.

As shown in FIG. 7A to FIG. 7C, the "Cute animal" mobile phone theme includes a headset theme that is also of a "Cute animal" style. The preview interface may include a plurality of pages, which may be separately used to display image interface elements in different usage scenarios that are included in the headset theme. Specifically, a page shown in FIG. 7A may be used to display an image interface element in a usage scenario of "establishing a connection", to present a headset image theme in the usage scenario of "establishing a connection". Specifically, a page shown in FIG. 7B may be used to display an image interface element in a "leftmost screen" usage scenario, to present a headset image theme in the "leftmost screen" usage scenario. Specifically, a page shown in FIG. 7C may be used to display an image interface element in a usage scenario of "selecting an audio output channel during a call", to present a headset image theme in the usage scenario of "selecting an audio output channel during a call".

The preview interface may further include a page indicator 711. The page indicator 711 indicates a location relationship between a currently displayed page and another page, and headset image themes in different cases may be viewed by sliding leftward or rightward in the preview interface.

The electronic device 100 may detect an operation of downloading a "Cute animal" mobile phone theme by the user, for example, an operation of tapping a trial control 712 or a purchase control 713 shown in FIG. 7A to FIG. 7C. In response to the operation, the electronic device 100 may download the "Cute animal" mobile phone theme from the cloud server of the mobile phone theme market.

After downloading the "Cute animal" mobile phone theme, the electronic device may replace a previously used mobile phone theme with the "Cute animal" mobile phone theme. Different from a previously used headset theme, a headset theme included in the "Cute animal" mobile phone theme may be referred to as a new headset theme.

Herein, replacing the mobile phone theme includes replacing the previously used headset theme with the headset theme included in the "Cute animal" mobile phone theme. Replacement of the headset theme includes the following two aspects: replacement of a headset image theme and replacement of a headset sound theme. Descriptions are separately provided below.

A. Replacement of the Headset Image Theme

The previously used headset image theme may be an example headset image theme used by default by the electronic device 100 shown in FIG. 3A to FIG. 3C, or may be a replaced headset image theme, for example, a replaced headset image theme by using the method provided in embodiments of this application.

Herein, that the electronic device 100 replaces the previously used headset image theme with a new headset image theme may be specifically implemented in the following manner: The electronic device 100 replaces, with an image resource (for example, a video or a picture) referenced by the new headset image theme, an image resource referenced by the previous headset image theme. During specific replacement, the electronic device 100 may replace image resources in a one-to-one correspondence based on a framework of the headset image theme. The framework of the headset image theme specifies mapping relationships between image interface elements in the headset image theme and image resources to be referenced by the image interface elements. For example, the framework of the headset image theme may be shown in Table 1.

TABLE 1

| Usage scenario | Image interface element | Image resource |
| --- | --- | --- |
| Establishing a connection | Left earbud background | Img1.jpg |
| | Right earbud background | Img2.jpg |
| | Headset case background | Img3.jpg |
| | Headset case protective cover background | Img4.jpg |
| Leftmost screen | Left earbud icon | Img5.jpg |
| | Right earbud icon | Img6.jpg |
| | Headset case icon | Img7.jpg |
| | Headset case protective cover icon | Img8.jpg |
| Selecting an audio output channel during a call | Icon of an audio output channel option of a headset | Img9.jpg |

As shown in Table 1, the headset image theme may be an image interface element package, including image interface elements presented by the theme in different usage scenarios, and one image interface element is formed by referring to one or more image resources. For example, the headset image theme that is shown in FIG. 3A and that is presented when a communication connection to the headset is established may be represented by an image interface element in the pop-up window usage scenario of establishing a connection in Table 1. For another example, the headset image theme that is shown in FIG. 3B and that is presented on a leftmost screen may be represented by an image interface element in the leftmost screen usage scenario in Table 1. The headset image theme that is shown in FIG. 3C and FIG. 3D and that is presented when an audio output channel is selected during a call may be represented by an image interface element in the usage scenario of selecting an audio output channel during a call in Table 1.

In addition, the example framework of the headset image theme that is shown in Table 1 may further specify a specification of each image interface element, for example, a size and a shape.

During replacement of the headset image theme, image resources may be replaced in a one-to-one correspondence based on image interface elements. For example, an image resource referenced by a left earbud icon in a leftmost screen usage scenario in the previously used headset image theme is correspondingly replaced with the image resource referenced by the left earbud icon in the leftmost screen usage scenario in the new headset image theme.

B. Replacement of the Headset Sound Theme

A previously used headset sound theme may be a default headset sound theme of the headset before delivery, or may be a replaced headset sound theme, for example, a replaced headset sound theme by using the method provided in embodiments of this application. To complete replacement of the headset sound theme, the electronic device 100 first needs to send the headset sound theme (mainly an audio resource referenced by the headset sound theme) to the headset 200 through communication such as Bluetooth.

Herein, replacing the previously used headset sound theme with a new headset sound theme may be specifically implemented in the following manner: The headset 200 replaces, with an audio resource referenced by the new headset sound theme, an audio resource referenced by the previously used headset sound theme. During specific replacement, the headset B may replace audio resources in a one-to-one correspondence based on a framework of the headset sound theme. For example, an audio resource referenced by an "alert tone indicating that a connection is established" in the previously used headset sound theme is correspondingly replaced with an audio resource "ringtone 1" referenced by an "alert tone indicating that a connection is established" in the headset sound theme. For example, the framework of the headset sound theme may be shown in Table 2. The electronic device may specifically map a selected audio resource to each sound in the framework of the headset sound theme, for example, map the "ringtone 1" to the "alert tone indicating that the connection is established", so that the "ringtone 1" becomes an alert tone in a usage scenario of establishing a Bluetooth connection in Table 2.

TABLE 2

| Usage scenario | Sound | Audio resource |
| --- | --- | --- |
| Establishing a connection | Alert tone indicating that the connection is established | Ringtone 1.mp3 |
| Breaking a connection | Alert tone indicating that the connection is broken | Ringtone 2.mp3 |
| Battery level of a headset is low | Alert tone indicating that the battery level is low | Ringtone 3.mp3 |
| User wears a headset | Alert tone indicating that the headset is worn | Ringtone 4.mp3 |
| Enabling noise reduction | Alert tone indicating that noise reduction is enabled | Ringtone 5.mp3 |

As shown in Table 2, the framework of the headset sound theme specifies mapping relationships between sounds in the headset sound theme and audio resources mainly referenced by the sounds. The headset sound theme may be a sound package, including sounds presented by the theme in different usage scenarios. In addition, the example framework of the headset sound theme that is shown in Table 2 may further specify an attribute of each sound, for example, a playback length and a file format.

Figure 8A:
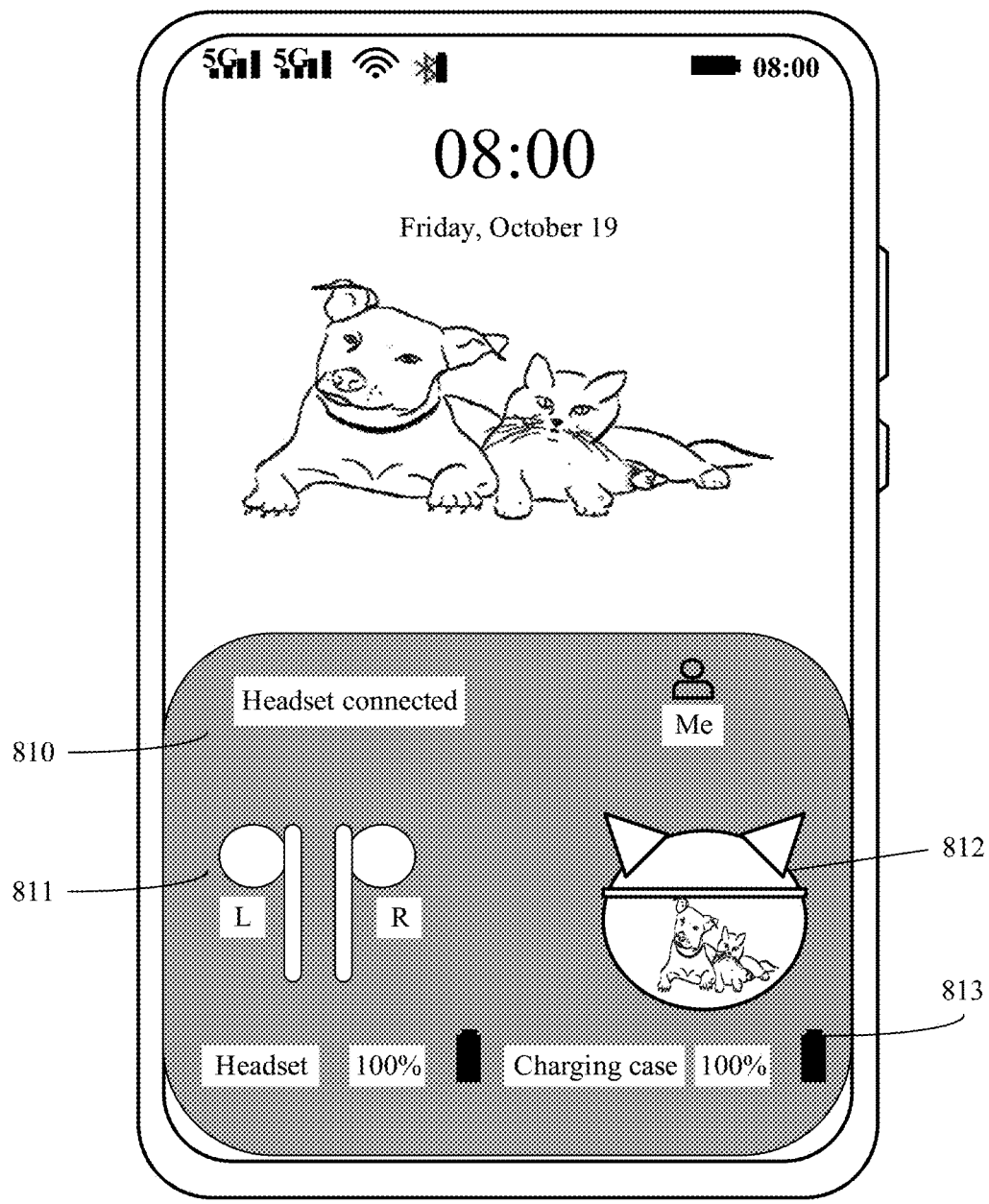
FIG. 8A and FIG. 8B are schematic diagrams of another group of interfaces according to an embodiment of this application.
Figure 8B:
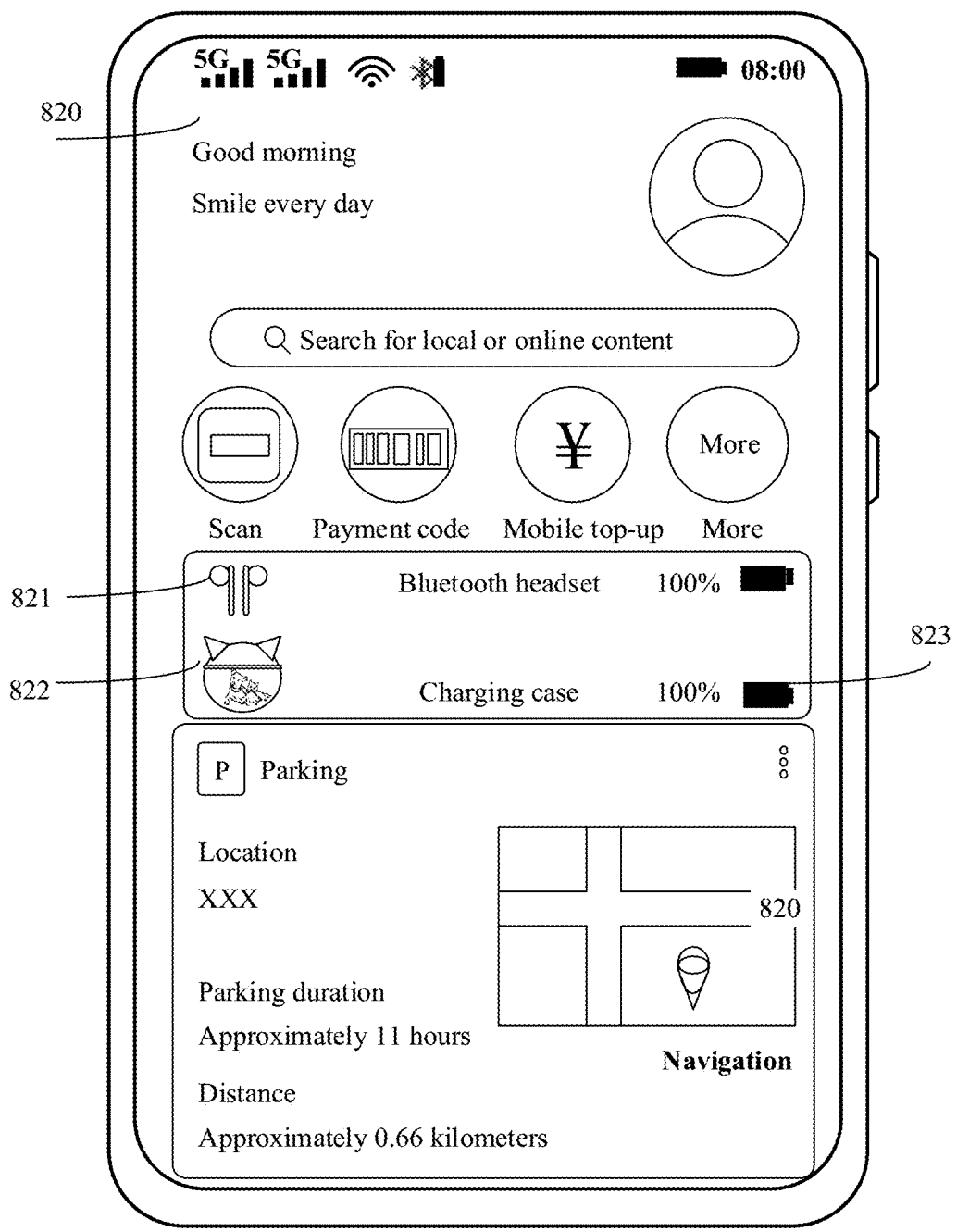

(3) FIG. 8A and FIG. 8B show examples of a series of user interfaces for applying a new mobile phone theme.

As shown in FIG. 8A and FIG. 8B, the electronic device 100 may display a mobile phone theme of a "Cute animal" style, for example, display a wallpaper or a screen saver of the "Cute animal" style. In addition, the electronic device 100 further presents headset themes of the "Cute animal" style in the usage scenarios defined in, for example, Table 1.

For example, as shown in FIG. 8A, when the headset 200 is connected to the electronic device 100, the electronic device 100 may display a pop-up window interface 810. The pop-up window interface 810 displays a series of image interface elements, for example, a headset background 811, a headset case protective cover background 812, and a headset case battery level icon 813.

For example, as shown in FIG. 8B, after the headset 200 is connected to the electronic device 100, the electronic device 100 may display a series of image interface elements in a user interface 820 (which may also be referred to as a "leftmost screen"), for example, a headset background 821, a headset case background 822, and a headset case battery level icon 823.

In addition to the headset themes shown in FIG. 8A and FIG. 8B, the electronic device 100 may further present a newly generated headset theme in another headset usage scenario, for example, a usage scenario of selecting an audio output channel during a call.

It can be learned that, a difference from the previously used headset image themes shown in FIG. 3A and FIG. 3B lies in that the headset case protective cover backgrounds shown in FIG. 8A and FIG. 8B correspondingly replace the headset case backgrounds in FIG. 3A and FIG. 3B, that is, the electronic device 100 replaces the previously used headset image theme with a new headset image theme. In this way, a personalized requirement of the user is met and user experience is improved.

In addition, after replacement of the headset sound theme is completed, the headset 200 may output a replaced sound in various usage scenarios specified in the framework of the headset sound theme, so that a user who wears the headset can feel an alert tone different from an alert tone of an original style, to meet a personalized requirement of the user.

Figure 9:
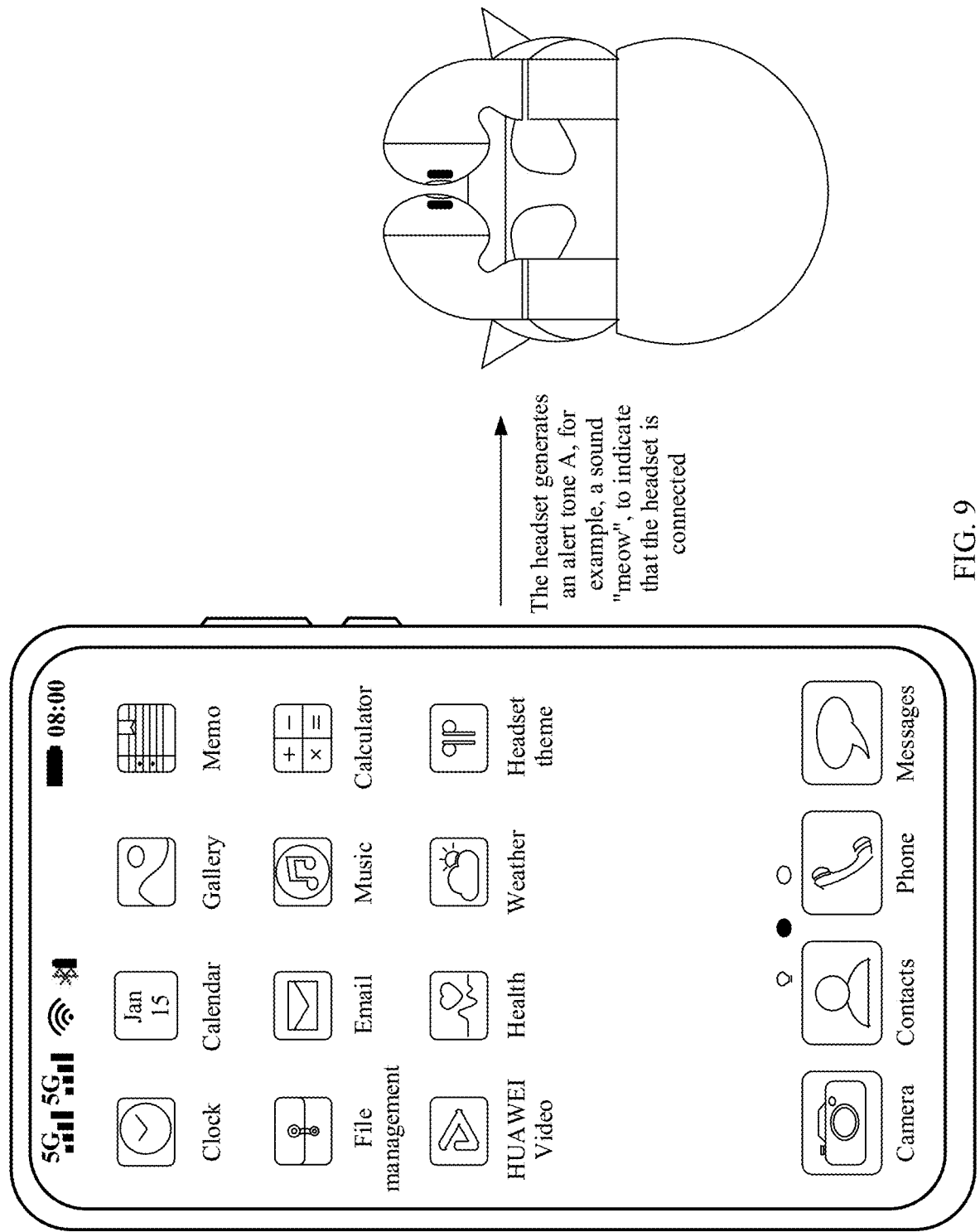
FIG. 9 is a schematic diagram of an interface according to an embodiment of this application.

As shown in FIG. 9, after the previously used headset sound theme is replaced with a new headset sound theme, in a usage scenario of "establishing a connection", the headset 200 may output an alert tone "meow", to indicate the user who wears the headset that the headset 200 is connected to the electronic device 100. In the previously used headset sound theme shown in FIG. 3E, an alert tone in the usage scenario of "establishing a connection" is a sound "tinkling". It can be learned that, a difference from the previously used headset sound theme shown in FIG. 3E lies in that a presentation style of the new headset sound theme is different from a presentation style of the previously used headset sound theme, to meet a personalized requirement of the user and improve user experience.

In addition to the foregoing described manner of obtaining the headset theme that adapts to the protective cover AS-1 from the cloud server, the following describes another manner of obtaining a headset theme that adapts to a protective cover AS-1 from a cloud server. A difference lies in that the cloud server in the following embodiments is a server of a headset theme market.

FIG. 10A to FIG. 10D, FIG. 11A to FIG. 11C, and FIG. 12A and FIG. 12B show examples of a series of user interfaces for automatically adapting a headset theme based on a headset theme market.

The headset theme market may be an application, may be responsible for managing a headset theme stored on a cloud server, and provide functions such as searching for and downloading a headset theme. The headset theme market may also be responsible for recording device information (for example, a headset model and a headset ID) to which different headset themes stored on the cloud server adapt, or recording theme IDs of different headset themes or the like.

(1) FIG. 10A to FIG. 10D show examples of user interfaces for searching a headset theme market for a headset theme in response to a fact that a headset wears a new protective cover AS-1.

Figure 10A:
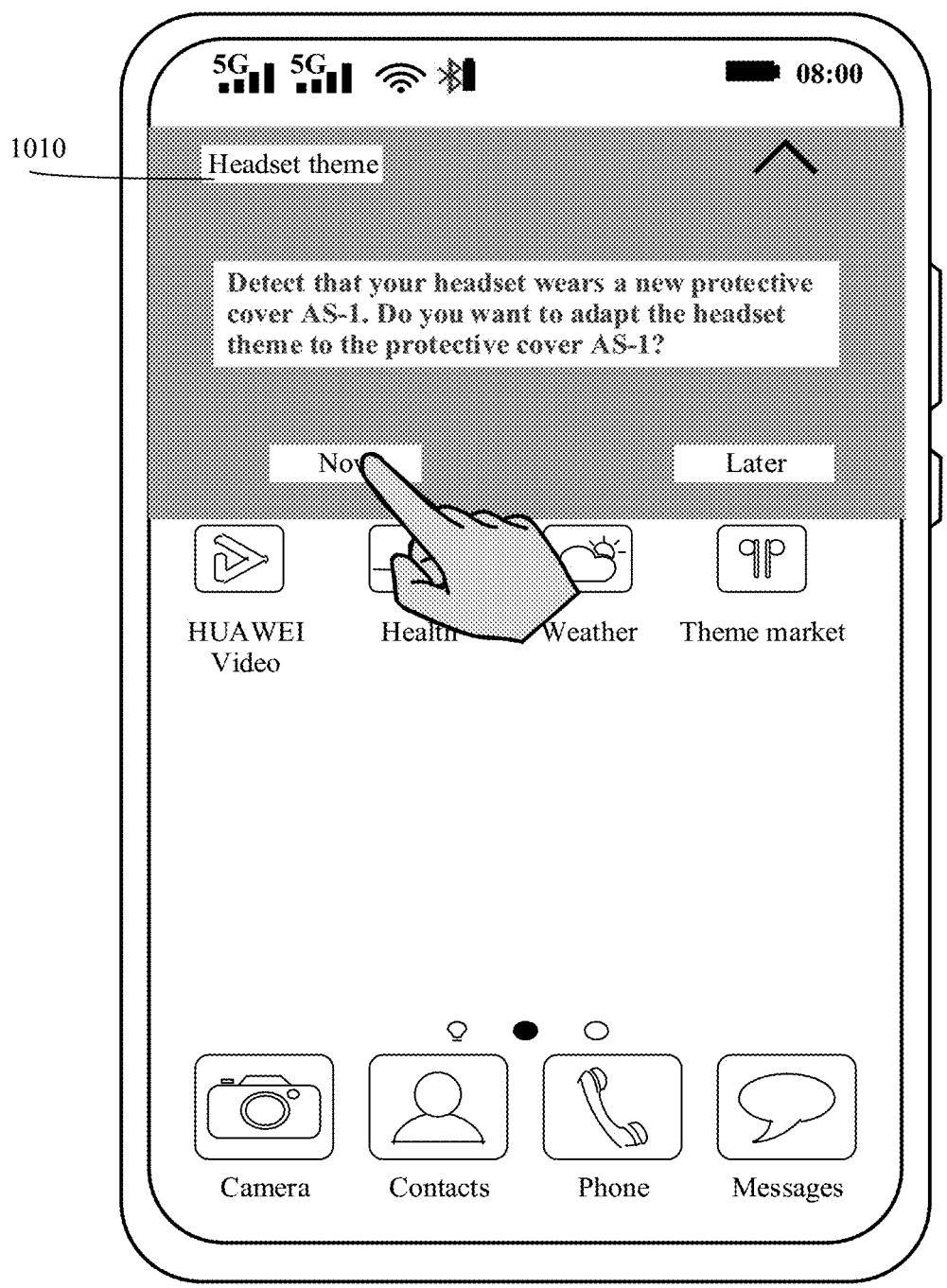
FIG. 10A to FIG. 10D are schematic diagrams of another group of interfaces according to an embodiment of this application.
Figure 10B:
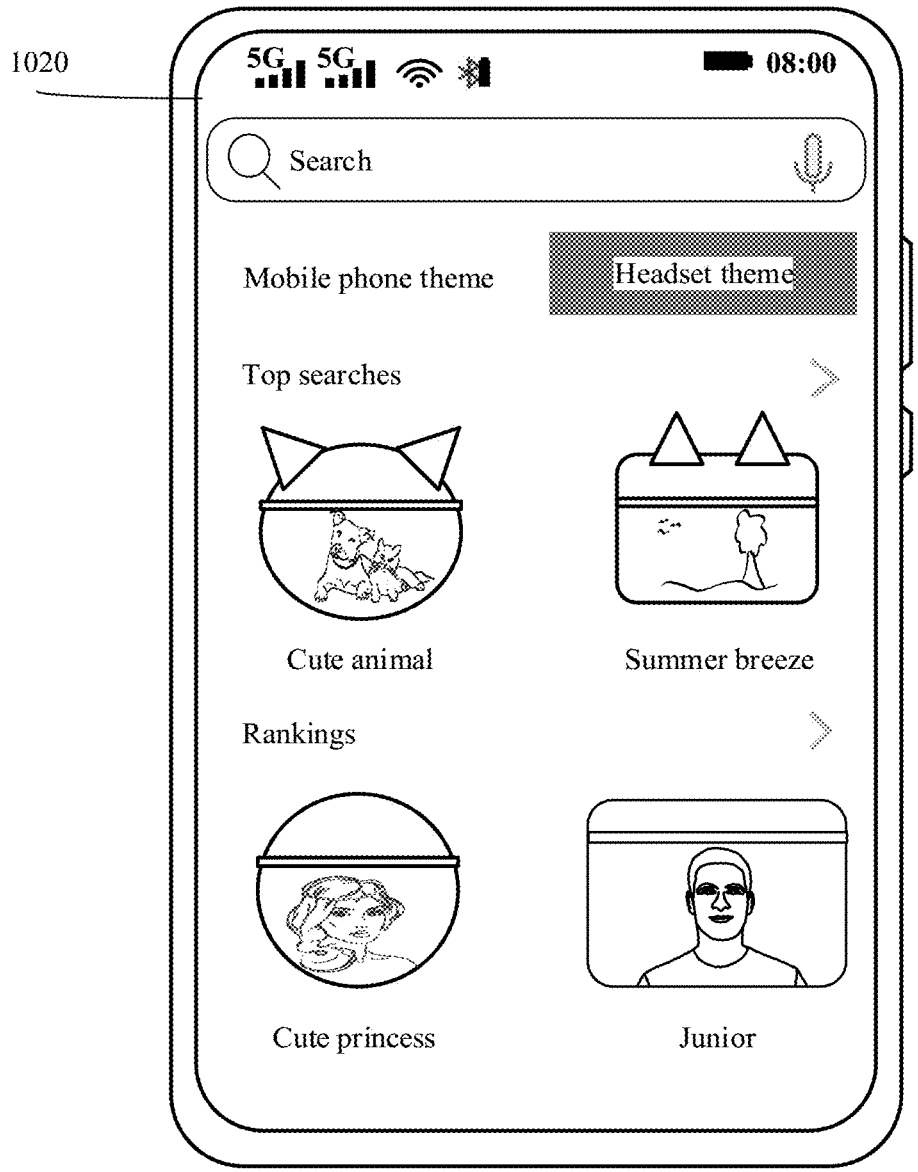

After learning that the new protective cover AS-1 is worn on the headset case, the electronic device 100 may display an example notification 1010 shown in FIG. 10A. The notification 1010 may be used to notify a user of the event and may be used to ask the user whether to change a headset theme to adapt to the protective cover AS-1. The event that the new protective cover AS-1 is worn on the headset case may be reported by the headset 200 to the electronic device 100. In addition to the event, information such as a device model and a device identifier (cover ID) of the protective cover AS-1, or a theme identifier (theme ID) and a theme name of a headset theme that adapts to the protective cover AS-1 may be further reported. The information may be used by the electronic device 100 to subsequently obtain the headset theme that adapts to the protective cover AS-1.

Figure 10C:
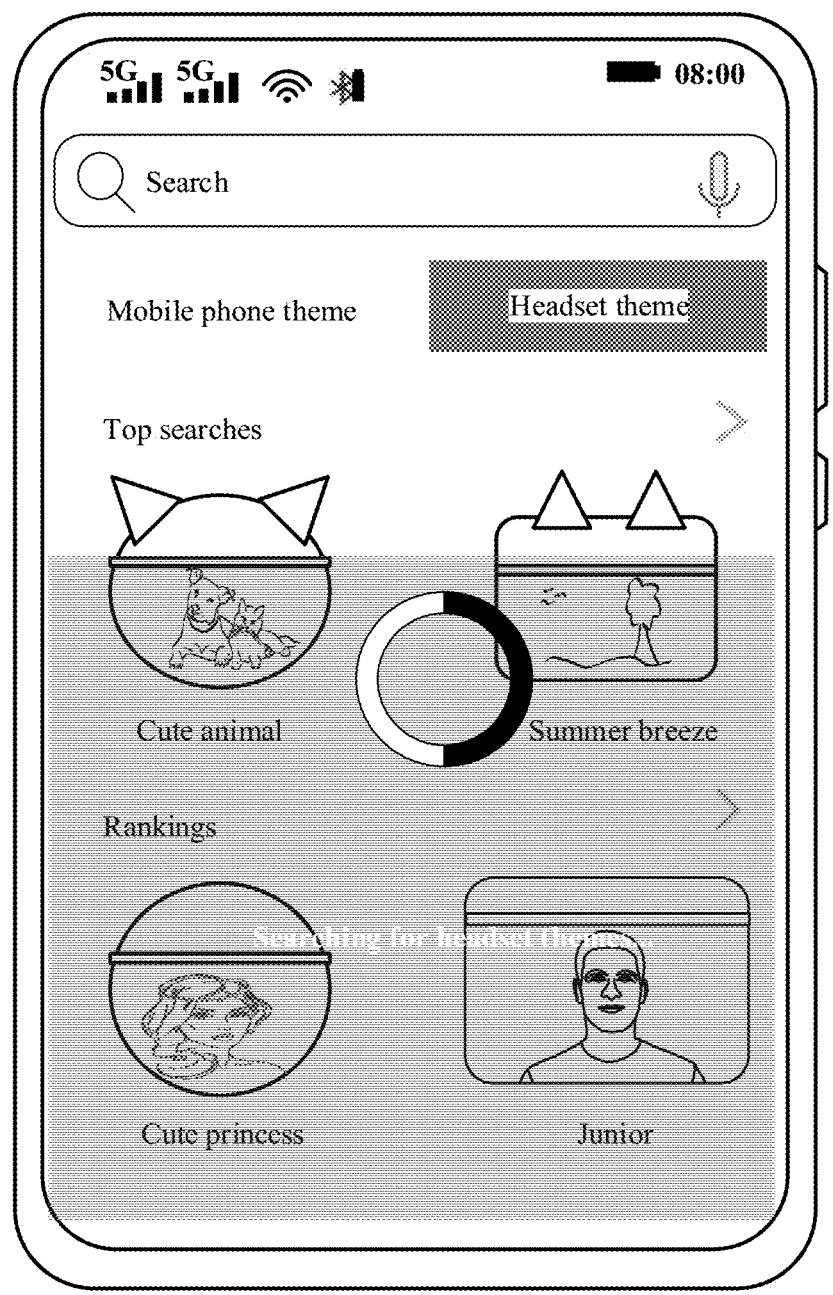

The electronic device 100 may detect an operation of adapting the headset theme to the protective cover AS-1 by the user, for example, a tap operation on an option "Now" shown in FIG. 10A. In response to the operation, the electronic device 100 may display an example interface 1020 shown in FIG. 10B. The interface 1020 may display a headset theme provided by a headset theme market, for example, a "Cute animal" headset theme, a "Summer breeze" headset theme, a "Cute princess" headset theme, and a "Junior" headset theme. In addition, the electronic device 100 may further request a cloud server of the headset theme market to search the headset theme market for the headset theme that adapts to the protective cover AS-1, and as shown in FIG. 10C and FIG. 10D, display a search progress in the example interface 1020 shown in FIG. 10B, and finally display the result, that is, a found "Cute animal" headset theme.

Figure 11A:
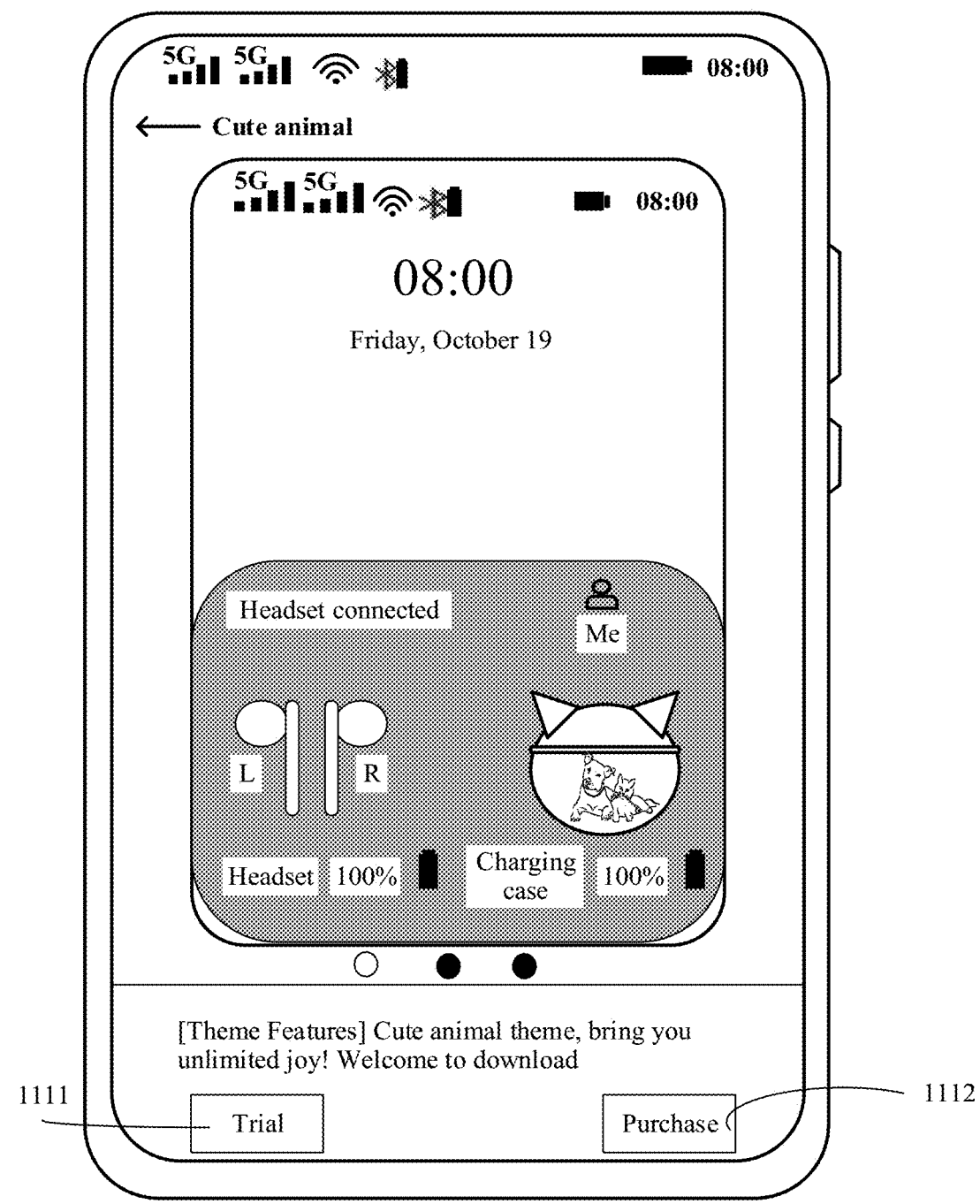
FIG. 11A to FIG. 11C are schematic diagrams of another group of interfaces according to an embodiment of this application.
Figure 11B:
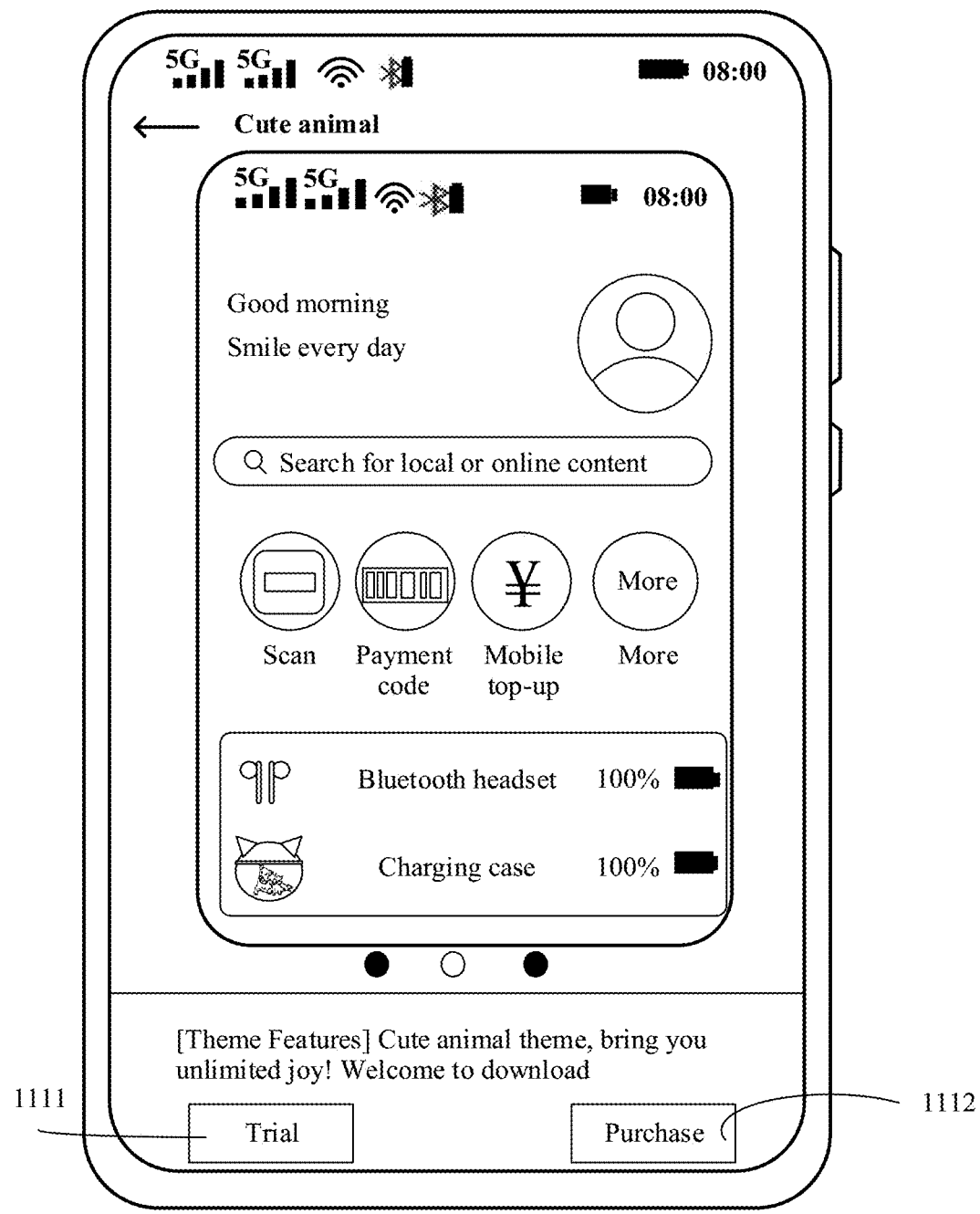
Figure 11C:
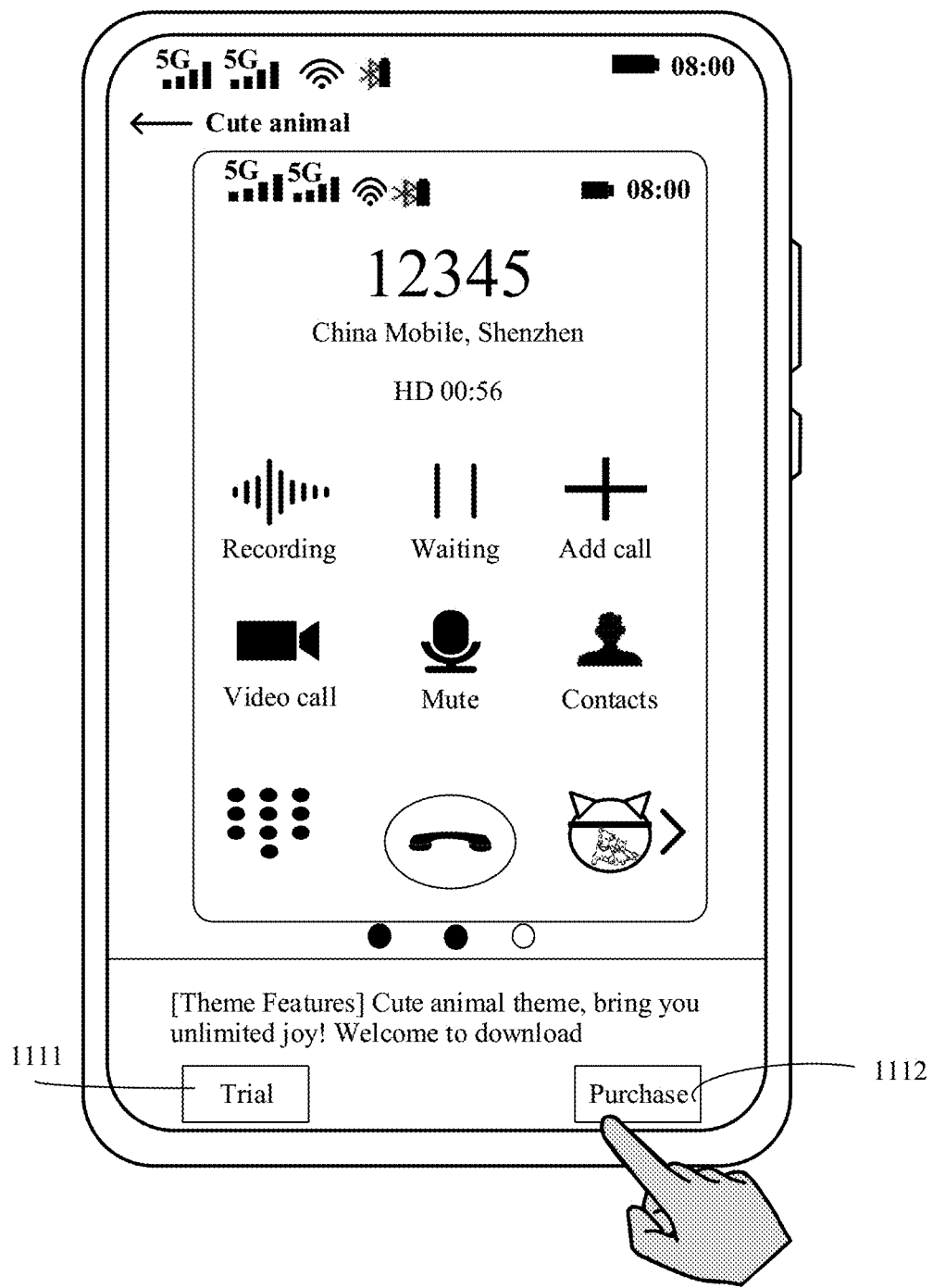

(2) FIG. 11A to FIG. 11C show examples of user interfaces for previewing and downloading a found headset theme.

Figure 10D:
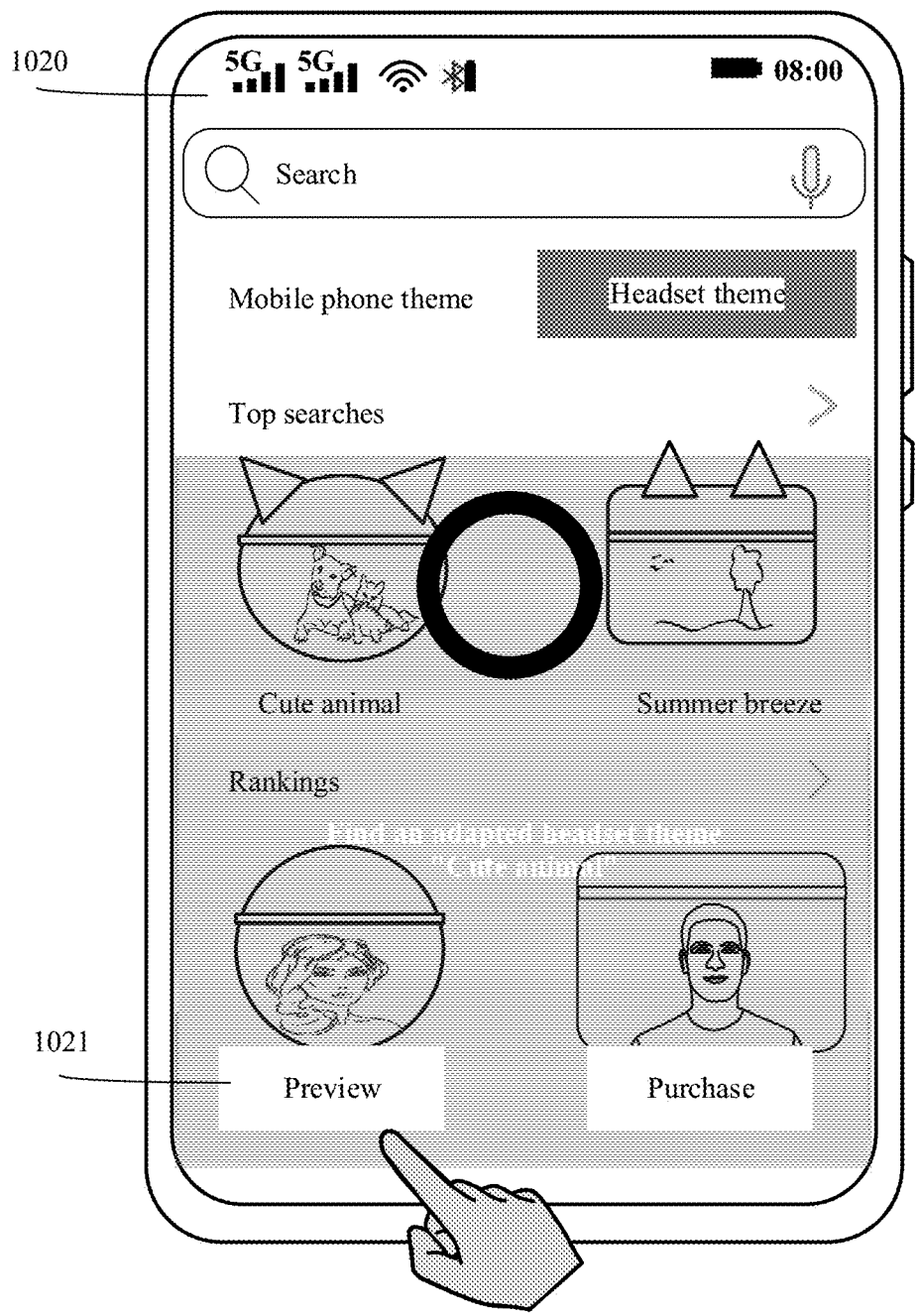

After finding the headset theme (for example, the "Cute animal" headset theme) that adapts to the protective cover AS-1, the electronic device 100 may detect an operation performed by the user to preview the "Cute animal" headset theme, for example, an operation of tapping a preview control 1021 in the user interface 1020 shown in FIG. 10D. In response to the operation, as shown in FIG. 11A to FIG. 11C, the electronic device 100 may display a preview interface of the headset theme, where the preview interface is used to present the "Cute animal" headset theme.

For the example interface for previewing the "Cute animal" headset theme that is shown in FIG. 11A to FIG. 11C, refer to the foregoing descriptions of FIG. 7A to FIG. 7C. Details are not described herein again.

The electronic device 100 may detect an operation of downloading a "Cute animal" headset theme by the user, for example, an operation of tapping a trial control 1111 or a purchase control 1112 shown in FIG. 11A to FIG. 11C. In response to the operation, the electronic device 100 may download the "Cute animal" headset theme from the cloud server of the headset theme market.

After downloading the "Cute animal" headset theme, the electronic device may replace a previously used headset theme with the "Cute animal" headset theme. Different from the previously used headset theme, a headset theme included in the "Cute animal" headset theme may be referred to as a new headset theme.

For replacement of the headset theme, refer to the related descriptions in the foregoing embodiments. Details are not described herein again.

Figure 12A:
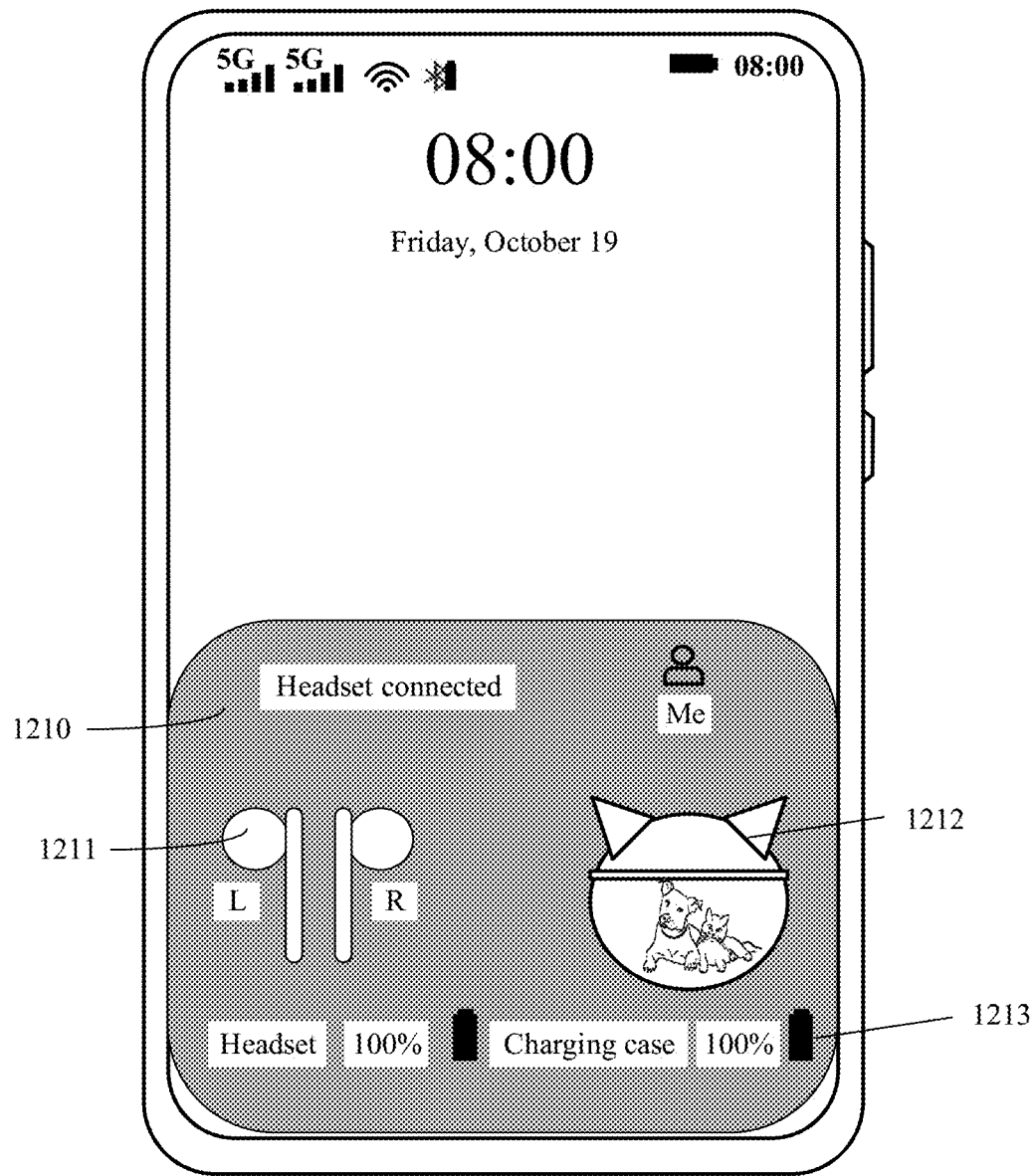
FIG. 12A and FIG. 12B are schematic diagrams of another group of interfaces according to an embodiment of this application.
Figure 12B:
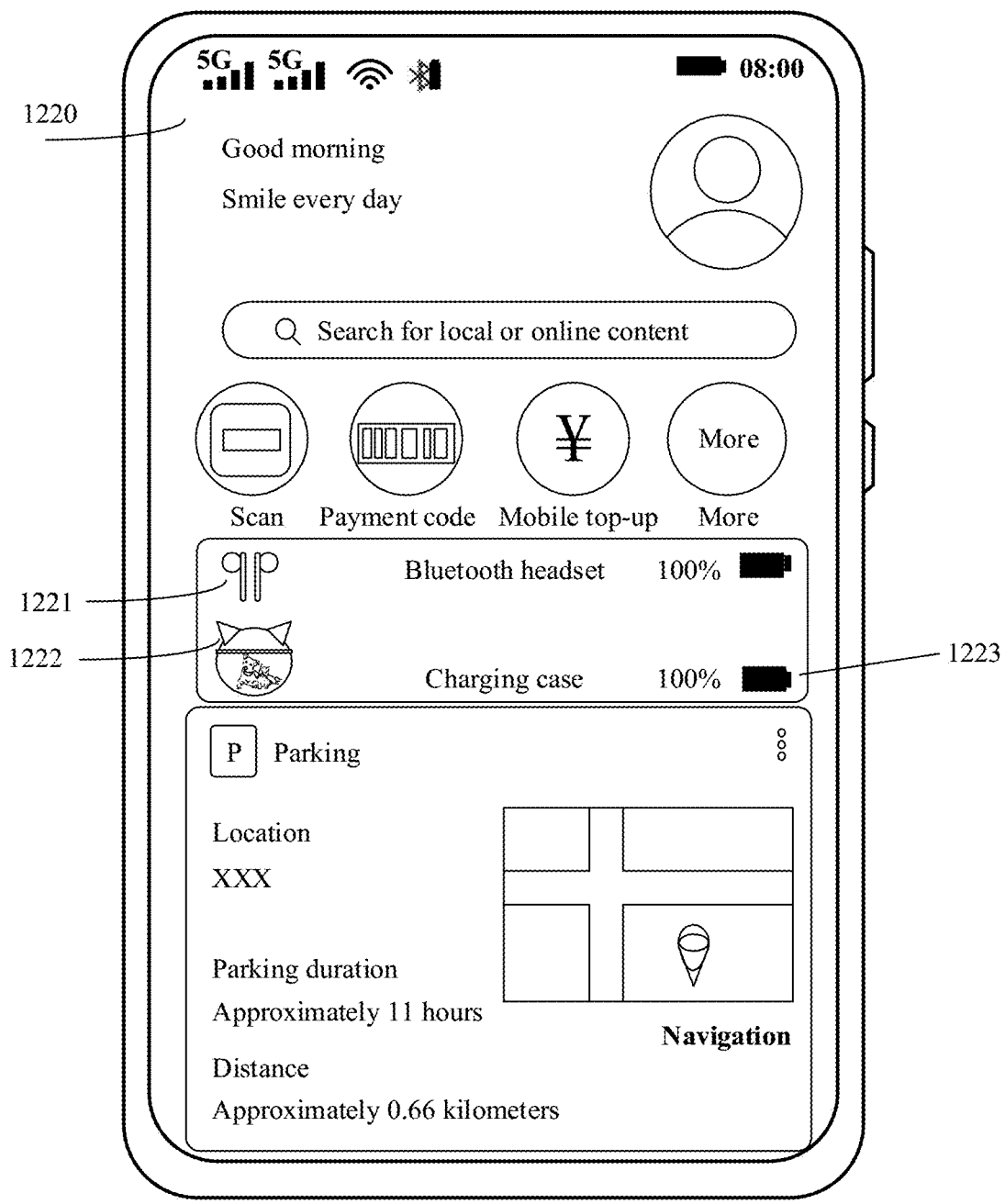

(3) FIG. 12A and FIG. 12B show examples of a series of user interfaces for applying a new headset theme.

As shown in FIG. 12A, when the headset 200 is connected to the electronic device 100, the electronic device 100 may display a pop-up window interface 1210. The pop-up window interface 1210 displays a series of image interface elements, for example, a headset background 1211, a headset case protective cover background 1212, and a headset case battery level icon 1213.

As shown in FIG. 12B, after the headset 200 is connected to the electronic device 100, the electronic device 100 may display a series of image interface elements in a user interface 1220 (which may also be referred to as a "leftmost screen"), for example, a headset background 1221, a headset case background 1222, and a headset case battery level icon 1223.

In addition to the headset themes shown in FIG. 12A and FIG. 12B, the electronic device 100 may further present a newly generated headset theme in another headset usage scenario, for example, a usage scenario of selecting an audio output channel during a call.

It can be learned that, a difference from the previously used headset image themes shown in FIG. 3A and FIG. 3B lies in that the headset case protective cover backgrounds shown in FIG. 12A and FIG. 12B correspondingly replace the headset case backgrounds in FIG. 3A and FIG. 3B, that is, the electronic device 100 replaces the previously used headset image theme with a new headset image theme. In this way, a personalized requirement of the user is met and user experience is improved.

In addition, after replacement of the headset sound theme is completed, the headset 200 may output a replaced sound in various usage scenarios specified in the framework of the headset sound theme, so that a user who wears the headset can feel an alert tone different from an alert tone of an original style, to meet a personalized requirement of the user.

In addition to adapting the headset theme to the new protective cover AS-1 based on the cloud server in the foregoing embodiments, the electronic device 100 may further adapt a headset theme to the new protective cover AS-1 based on local search, that is, obtain, through local search, the headset theme adapted to the protective cover AS-1. Details are provided below.

FIG. 13A to FIG. 13D, FIG. 14A to FIG. 14E, and FIG. 15A and FIG. 15B show examples of a series of user interfaces for automatically adapting a headset theme based on a local headset theme library in the electronic device 100.

The headset theme library may be an application, and may be responsible for managing a headset theme stored locally in the electronic device 100. The headset theme library may also be responsible for recording device information (for example, a headset model and a headset ID) to which different locally stored headset themes adapt, or recording theme IDs of different headset themes or the like.

(1) FIG. 13A to FIG. 13D show examples of user interfaces for locally searching for a headset theme in response to a fact that a headset wears a new protective cover AS-1.

Figure 13A:
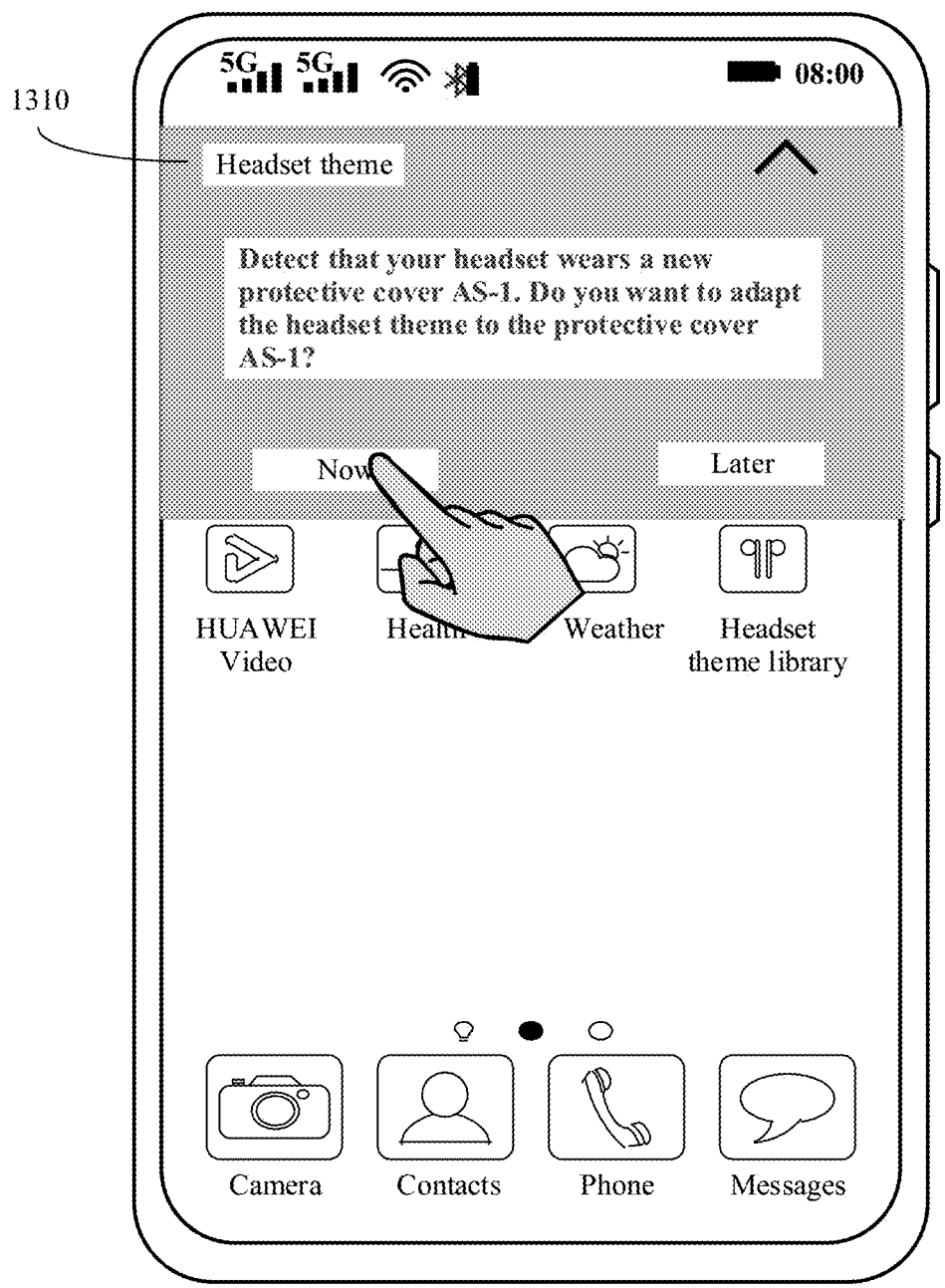
FIG. 13A to FIG. 13D show user interfaces for locally searching for a headset theme in response to a fact that a headset wears a new protective cover AS-1 according to an embodiment.

After learning that the new protective cover AS-1 is worn on the headset case, the electronic device 100 may display an example notification 1310 shown in FIG. 13A. The notification 1310 may be used to notify a user of the event and may be used to ask the user whether to change a headset theme to adapt to the protective cover AS-1. The event that the new protective cover AS-1 is worn on the headset case may be reported by the headset 200 to the electronic device 100. In addition to the event, information such as a device model and a device identifier (cover ID) of the protective cover AS-1, or a theme identifier (theme ID) and a theme name of a headset theme that adapts to the protective cover AS-1 may be further reported. The information may be used by the electronic device 100 to subsequently locally search for the headset theme that adapts to the protective cover AS-1.

The electronic device 100 may detect an operation of adapting the headset theme to the protective cover AS-1 by the user, for example, a tap operation on an option "Now" shown in FIG. 13A. In response to the operation, the electronic device 100 may display an example interface 1320 shown in FIG. 13B. The interface 1320 may display one or more headset themes stored in the electronic device 100, for example, "Headset theme 1", "Headset theme 2", "Headset theme 3", and "Headset theme 4".

The one or more headset themes may be obtained by the electronic device 100 in but not limited to the following manners: Manner 1: The one or more headset themes are previously downloaded from a server of a headset theme provider such as a mobile phone theme market. Manner 2: The one or more headset themes are obtained through searching on a network or local modeling by using an image that is of a headset/headset case/headset case protective cover and that is shot by a camera of the electronic device 100. Manner 3: The one or more headset themes are shared by another device. Specific implementations of the last two manners are described in detail below with reference to FIG. 24A and FIG. 24B, FIG. 25A to FIG. 25H, FIG. 26, FIG. 27A to FIG. 27I, FIG. 28A and FIG. 28B, FIG. 29A and FIG. 29B, FIG. 30A to FIG. 30D, FIG. 31A to FIG. 31F, FIG. 35A to FIG. 35D, FIG. 36A to FIG. 36C, and FIG. 37A to FIG. 37D. Details are not described herein.

Figure 13B:
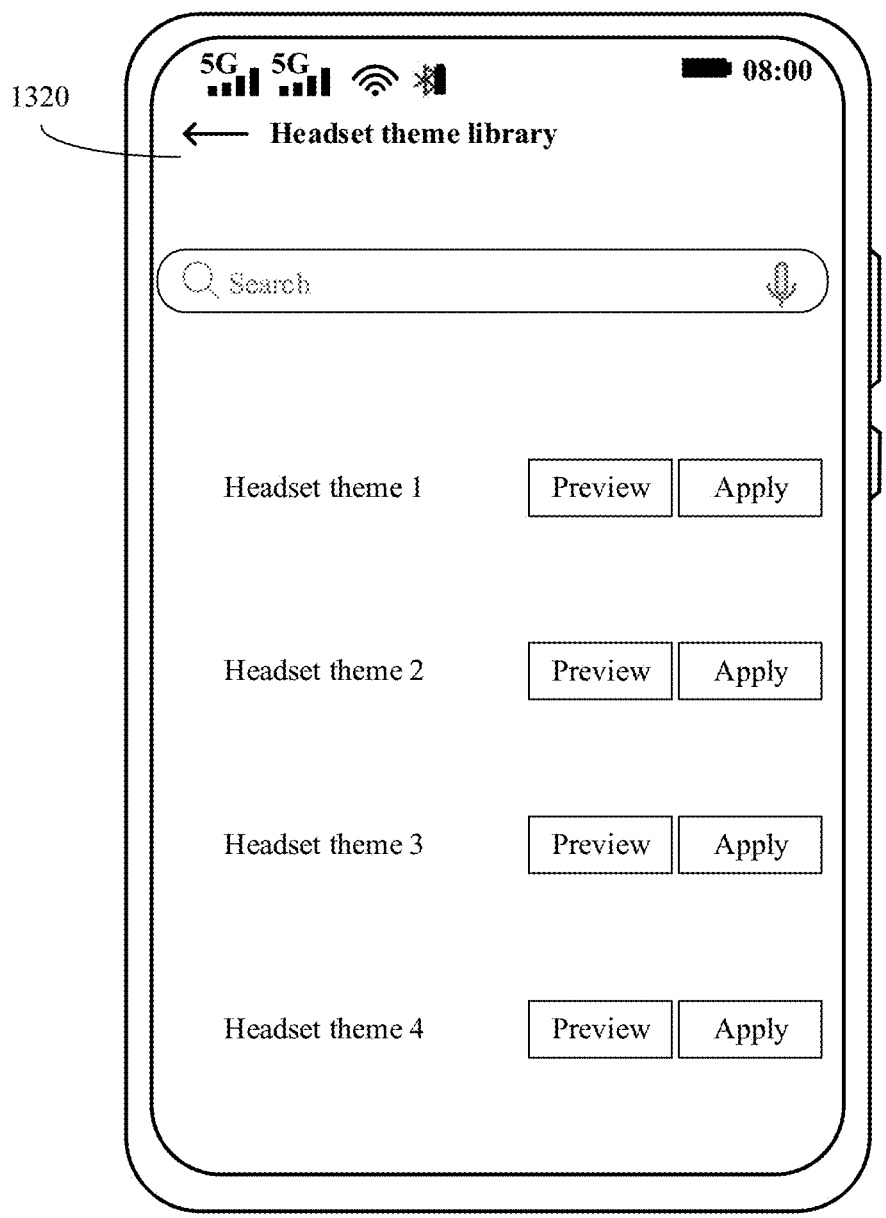
Figure 13C:
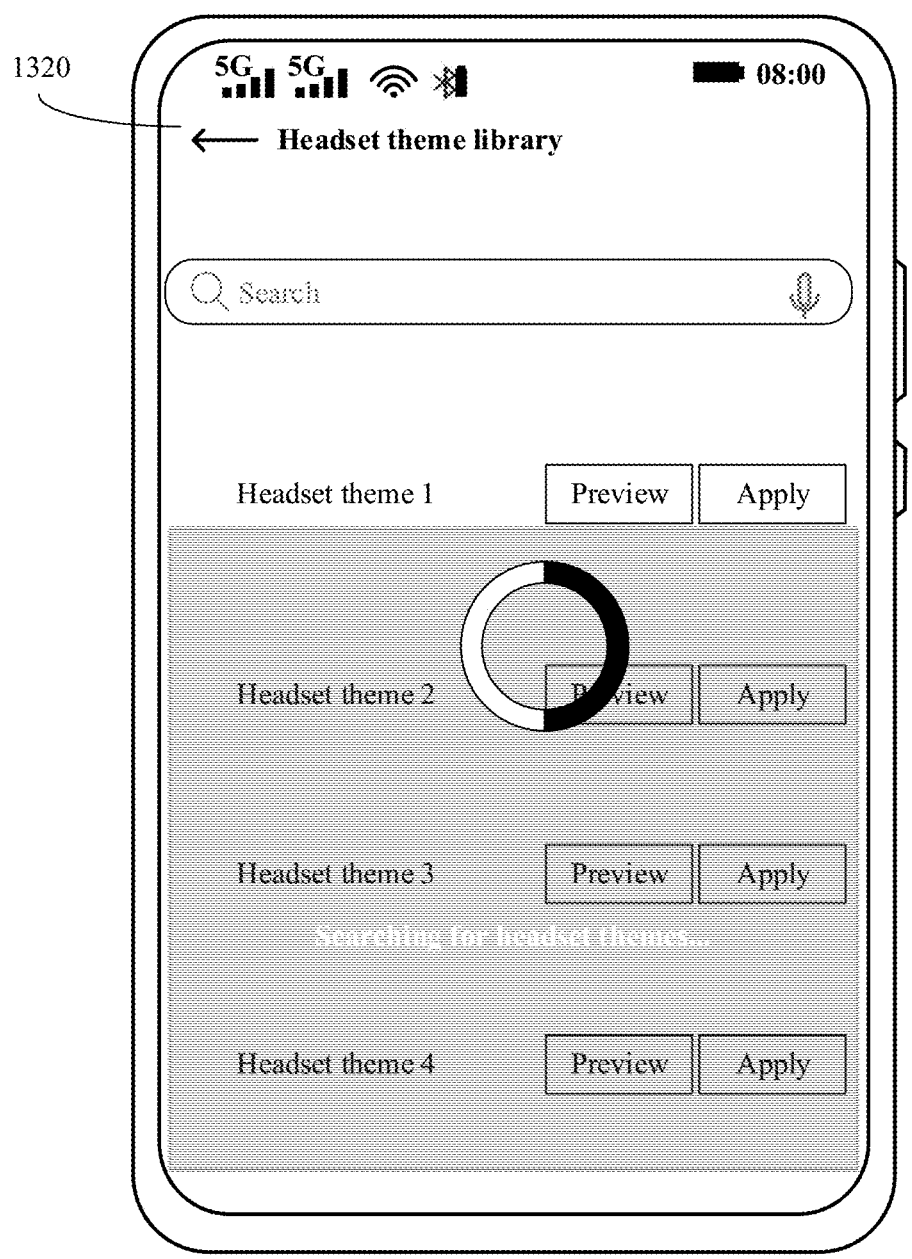
Figure 13D:
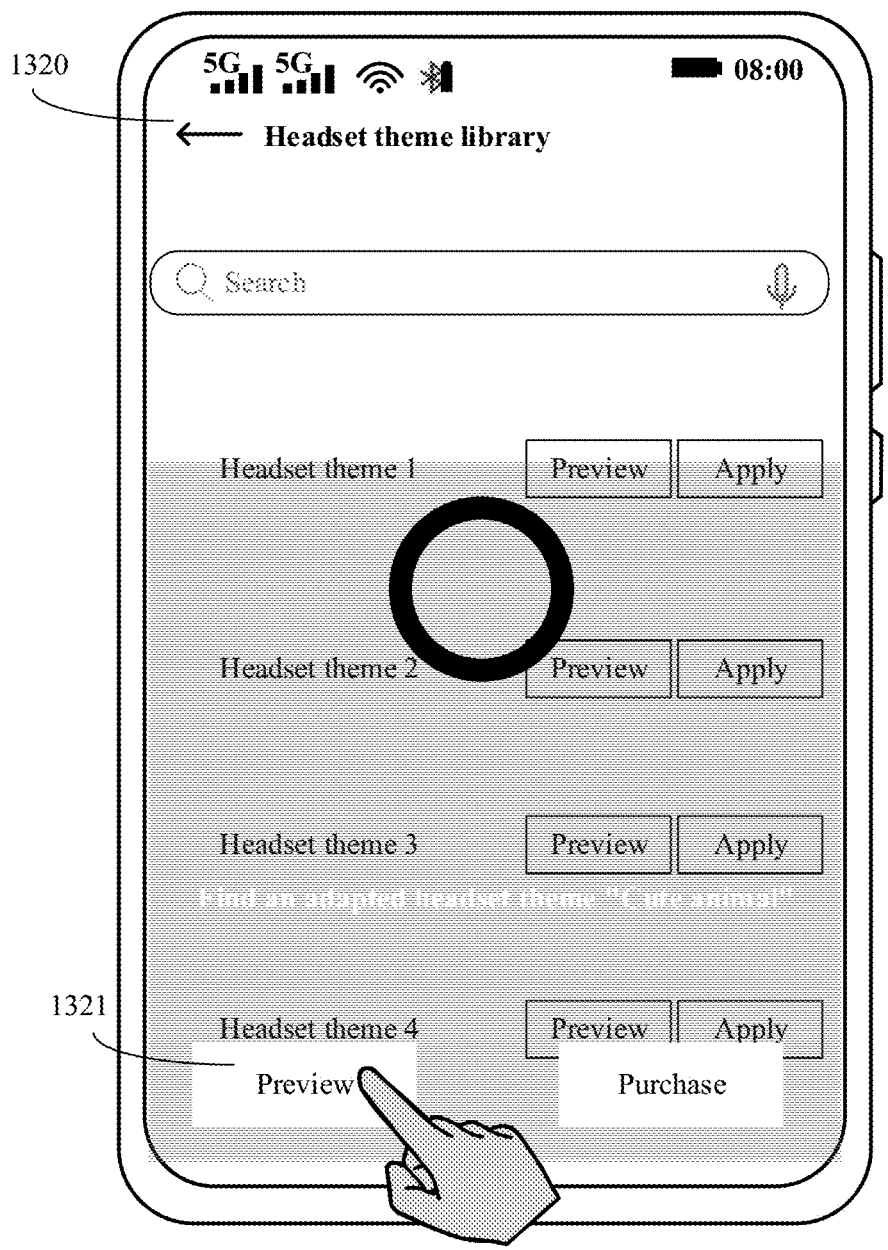

In addition, the electronic device 100 may further search the headset themes stored in the electronic device 100 for a headset theme suitable for the protective cover AS-1, and as shown in FIG. 13C to FIG. 13D, display a search progress in the example interface 1320 shown in FIG. 13B, and display the result, that is, a found "Cute animal" headset theme.

(2) FIG. 14A to FIG. 14E show examples of user interfaces for previewing and applying a found headset theme.

Figure 14A:
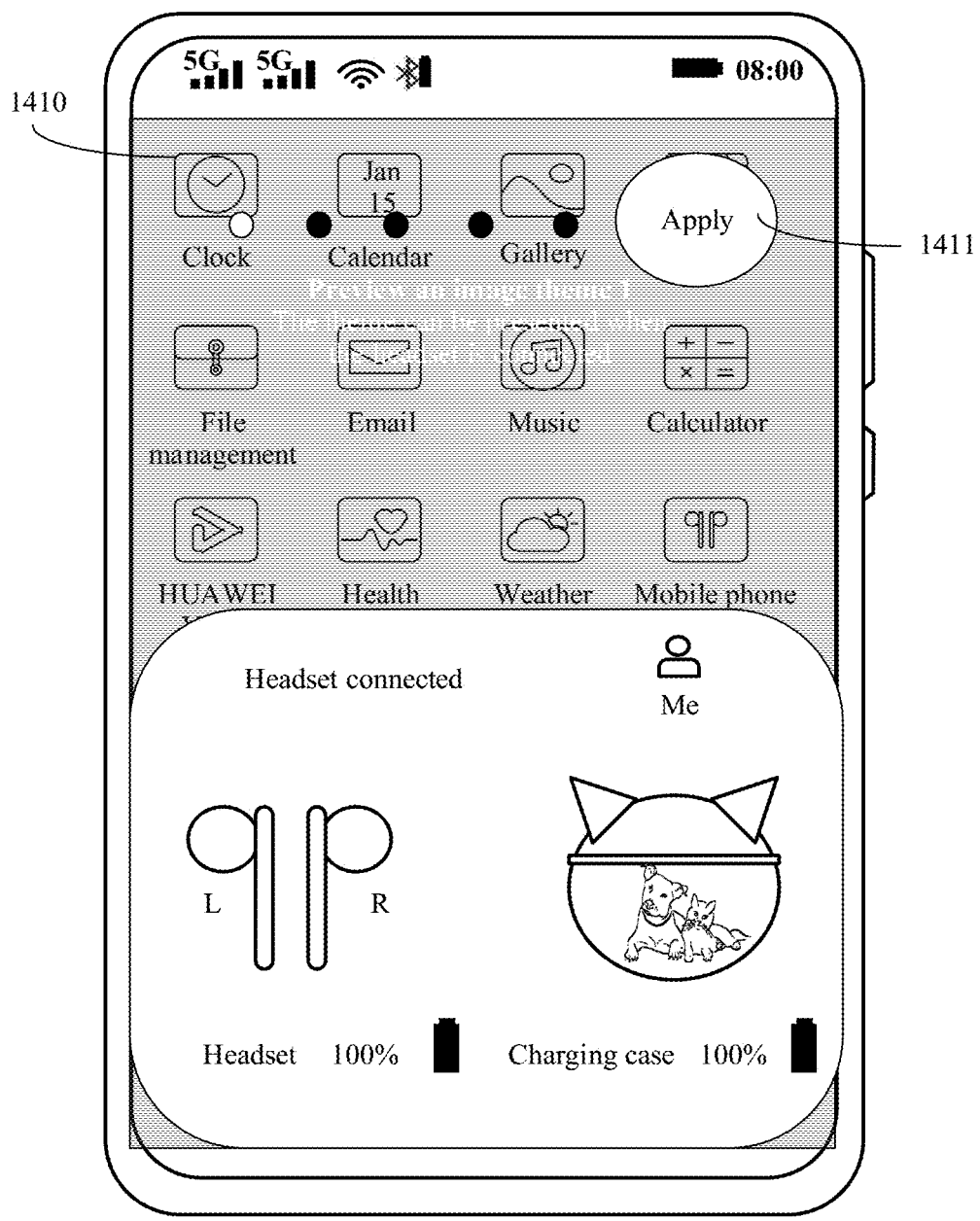
FIG. 14A to FIG. 14E show user interfaces for previewing and applying a found headset theme according to an embodiment.
Figure 14B:
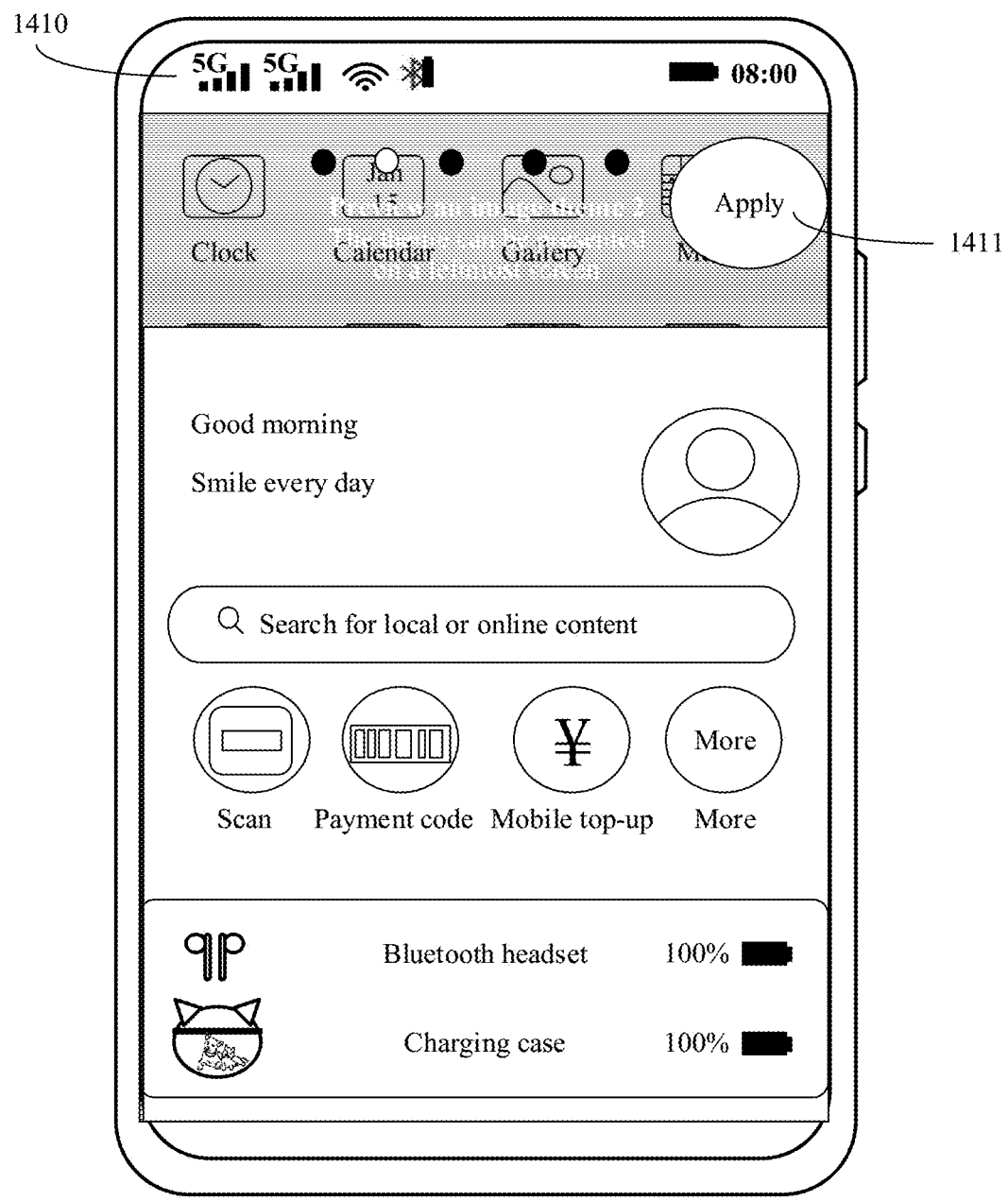
Figure 14C:
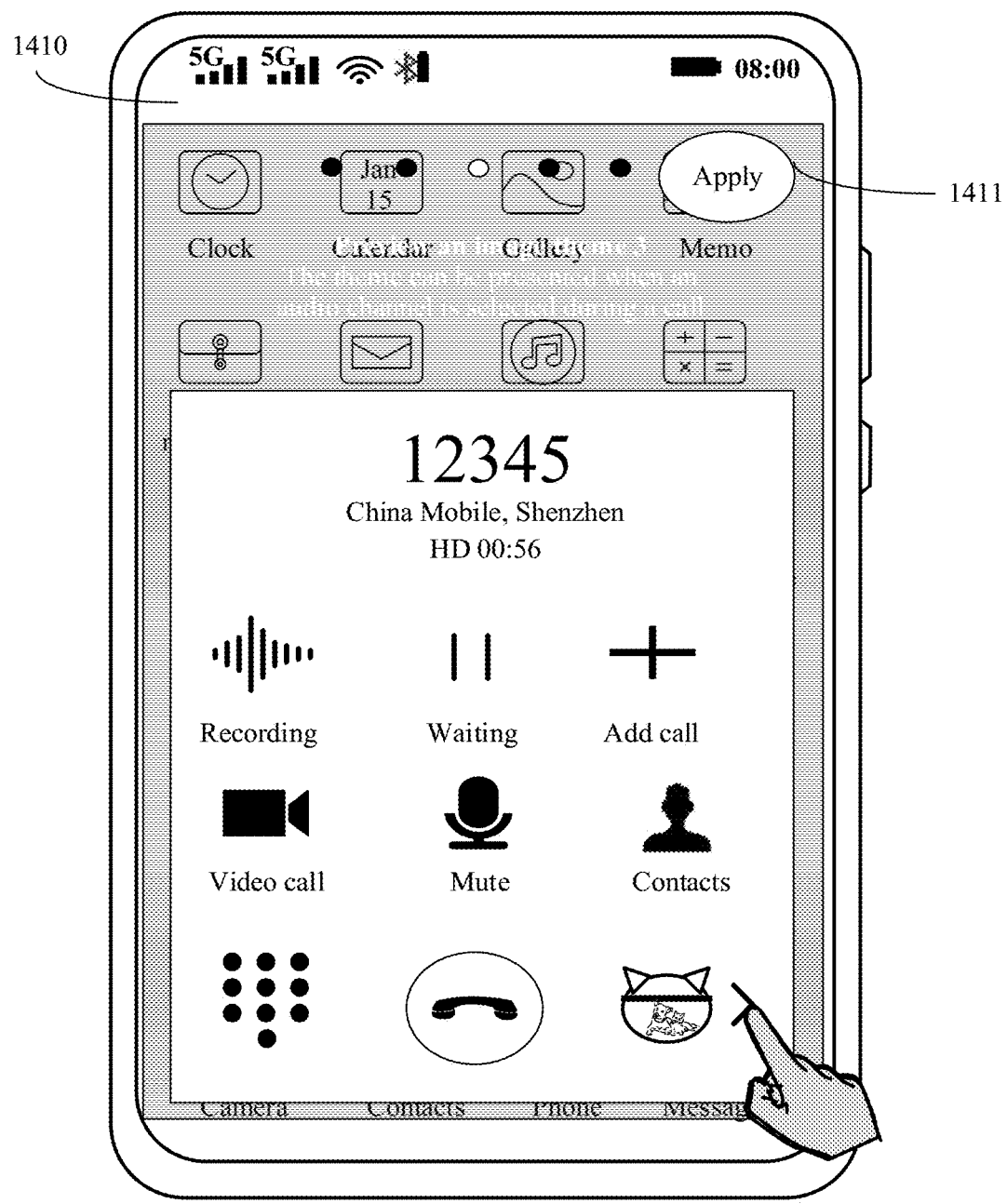
Figure 14D:
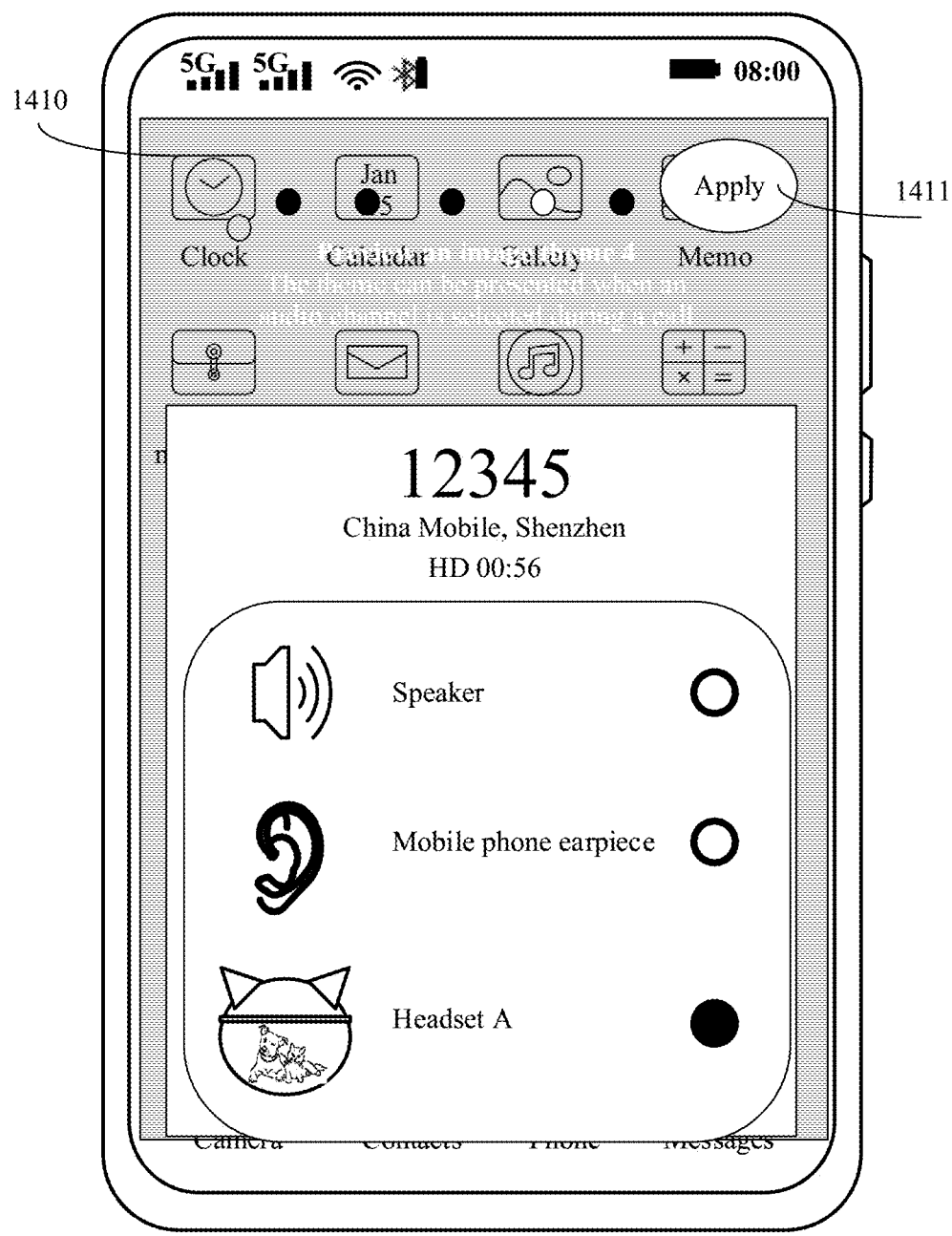
Figure 14E:
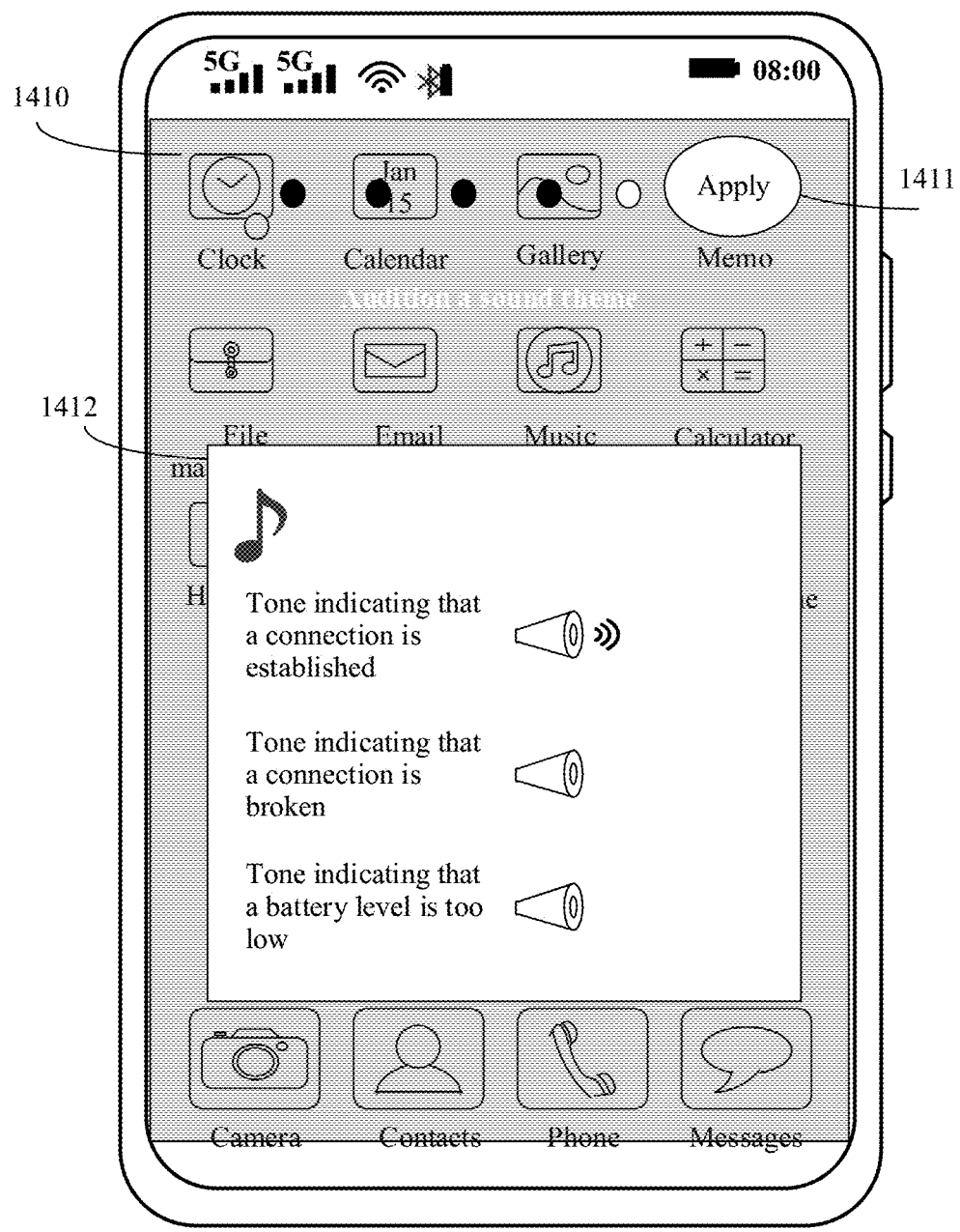

After finding the headset theme (for example, the "Cute animal" headset theme) that adapts to the protective cover AS-1, the electronic device 100 may detect an operation performed by the user to preview the "Cute animal" headset theme, for example, an operation of tapping a preview control 1321 in the user interface 1320 shown in FIG. 13D. In response to the operation, the electronic device 100 may display a preview interface 1410 of the headset image theme in FIG. 14A to FIG. 14D, where the preview interface is used to display an image interface element in the "Cute animal" headset theme. As shown in FIG. 14E, the electronic device 100 may further display an audition interface of a headset sound theme, where the audition interface is used to present an audition option 1412 of each alert tone in the "Cute animal" headset theme, so that the user can audition the alert tone.

After finding the "Cute animal" headset theme, the electronic device 100 may further detect an operation performed by the user to apply the "Cute animal" headset theme, for example, an operation of tapping an apply control 1411 shown in FIG. 14A to FIG. 14E. In response to the operation, the electronic device 100 may replace a previously used headset theme with the "Cute animal" headset theme. Different from the previously used headset theme, a headset theme included in the "Cute animal" headset theme may be referred to as a new headset theme. For replacement of the headset theme, refer to the related descriptions in the foregoing embodiments. Details are not described herein again.

Figure 15A:
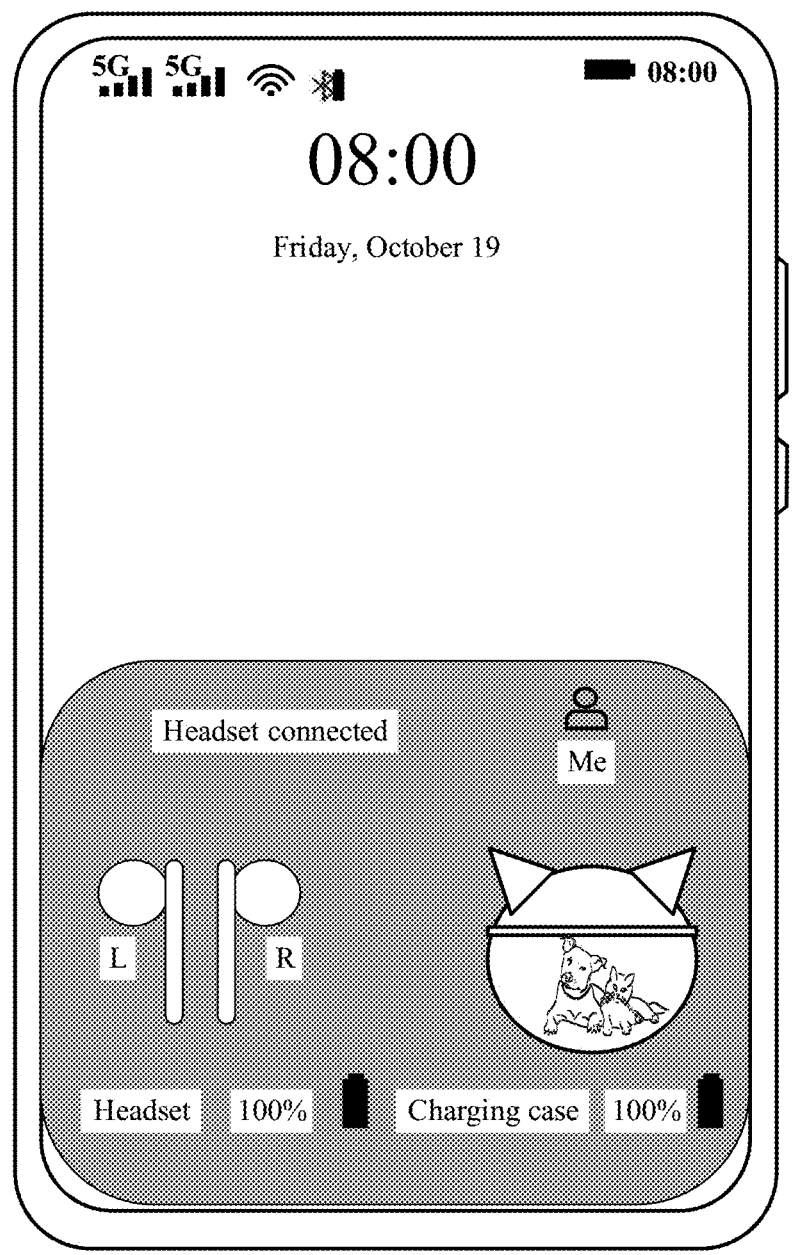
FIG. 15A to FIG. 15B show a series of user interfaces for applying a new headset theme according to an embodiment.
Figure 15B:
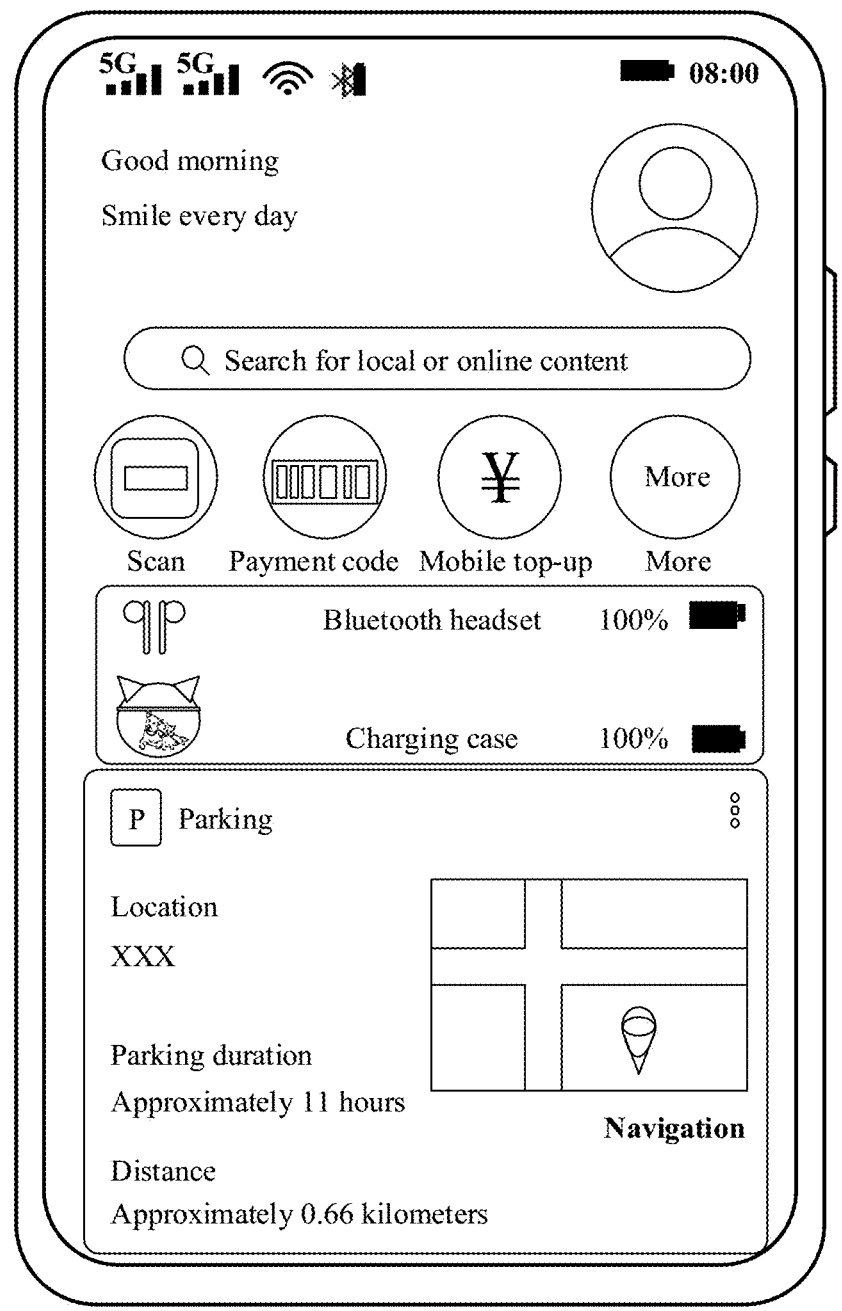

(3) FIG. 15A and FIG. 15B show examples of a series of user interfaces for applying a new headset theme.

For the example user interfaces shown in FIG. 15A and FIG. 15B, refer to the foregoing descriptions of FIG. 12A and FIG. 12B. Details are not described herein again.

In addition to adapting the headset theme to the new protective cover AS-1 based on the cloud server and adapting the headset theme to the new protective cover AS-1 based on local search in the foregoing embodiments, the electronic device 100 may further adapt the headset theme to the new protective cover AS-1 based on instant sharing, that is, request a nearby device or a remote device to share the headset theme that adapts to the protective cover AS-1. An example in which a nearby device is requested to perform instant sharing is used below for description.

FIG. 16A to FIG. 16D, FIG. 17A and FIG. 17B, FIG. 18A to FIG. 18D, and FIG. 19A to FIG. 19E show examples of a series of user interfaces for adapting a headset theme based on instant sharing.

For ease of description, it is assumed that a sharing party is a "user 1" and a shared party is a "user 2". A device of the sharing party includes an electronic device 200 (for example, a mobile phone of the "user 1") and a headset A (for example, a headset of the "user 1"), and a device of the shared party includes an electronic device 100 (for example, a mobile phone of the "user 2") and a headset B (for example, a headset of the "user 2").

Figure 16A:
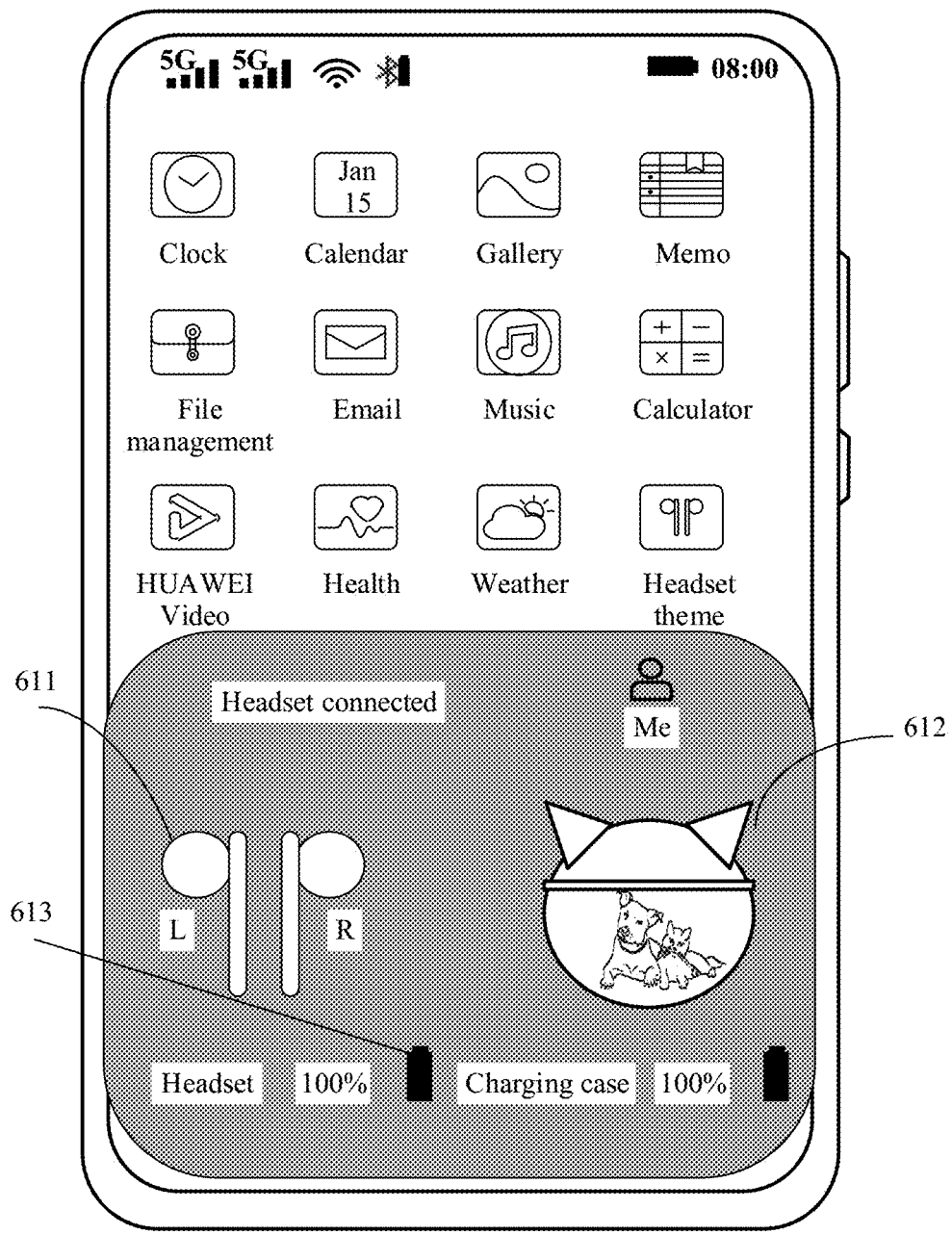
Figure 16B:
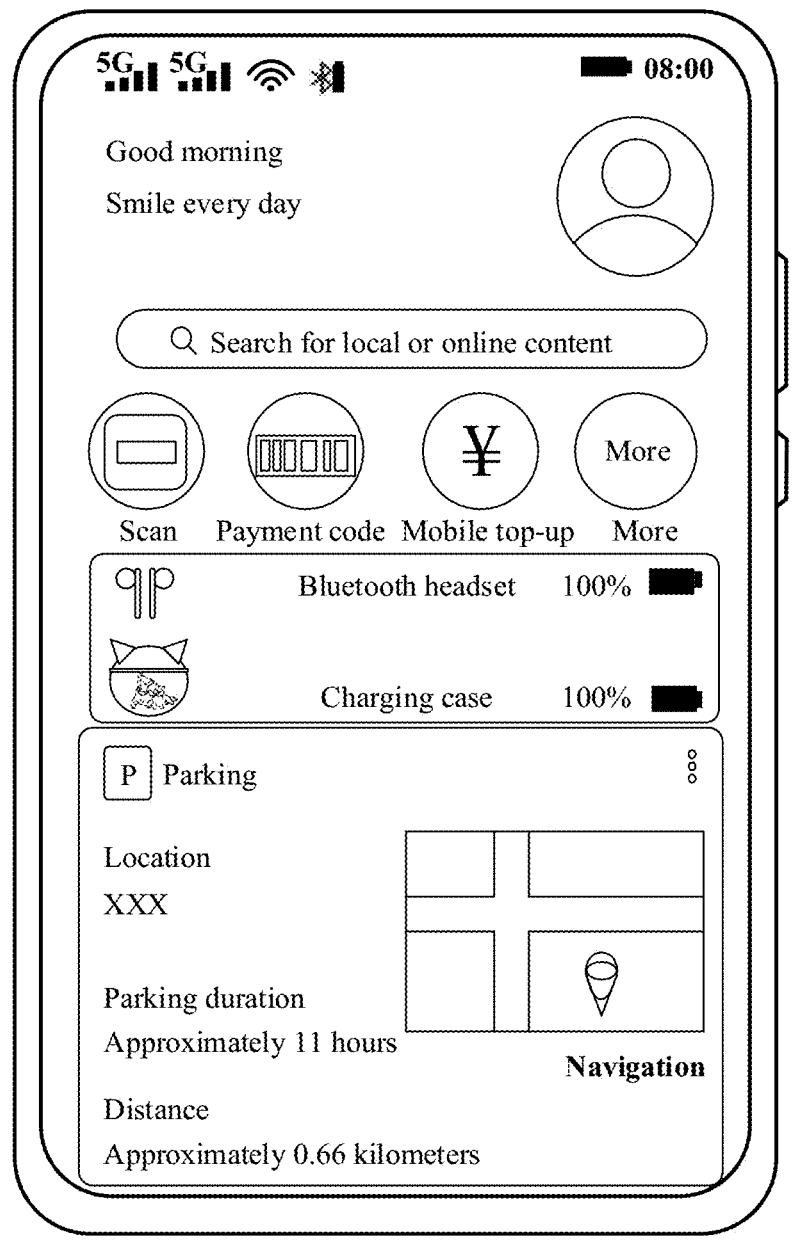
Figure 16D:
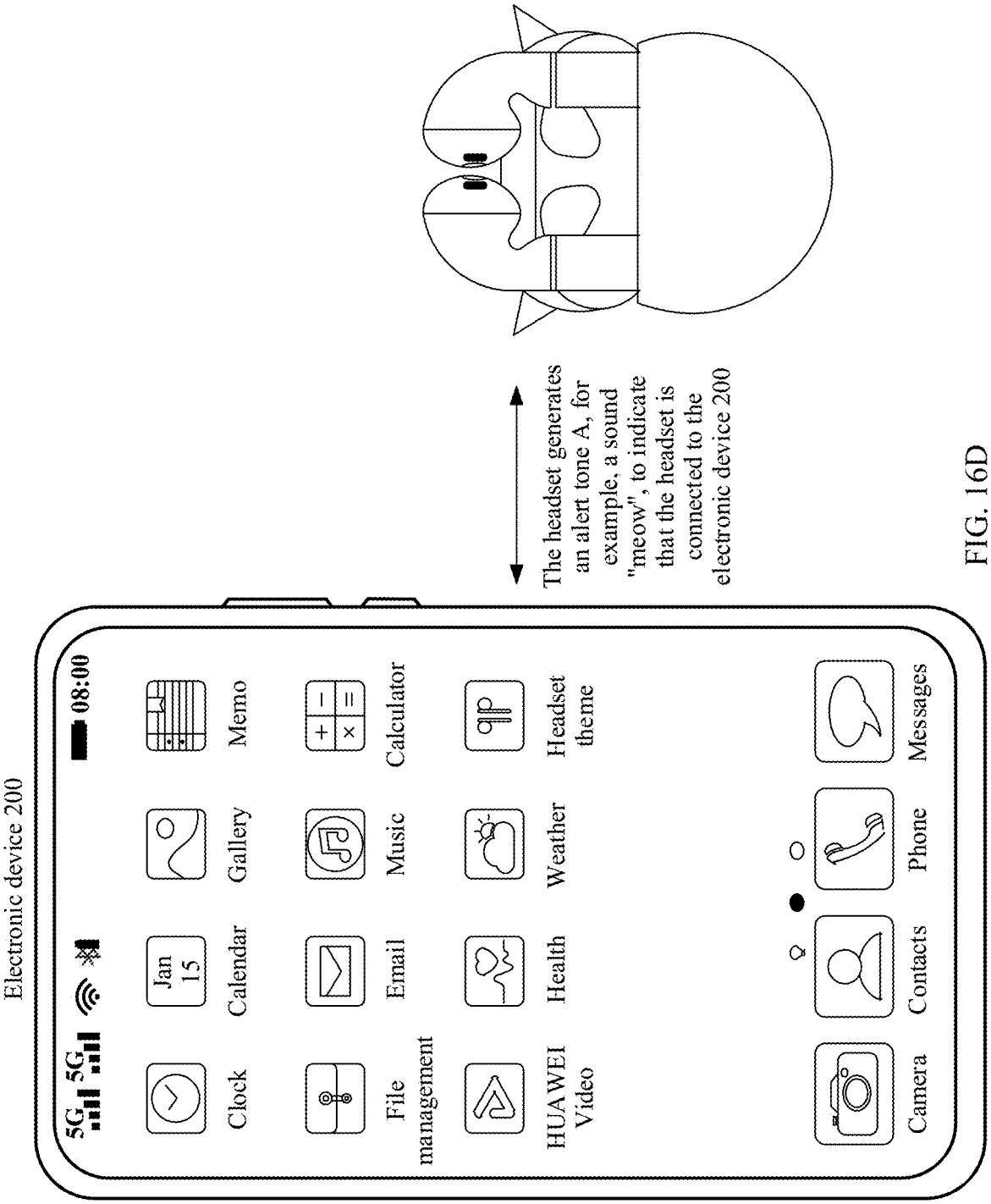

Before a headset theme is shared, an example headset theme used by the shared party ("user 2") may be shown in FIG. 3A to FIG. 3D. Details are not described herein again. Before a headset theme is shared, an example headset theme used by the sharing party ("user 1") may be shown in FIG. 16A to FIG. 16C. FIG. 16A shows an example of a headset image theme presented by the electronic device 200 of the sharing party in a usage scenario of establishing a connection (between the electronic device 200 and the headset B). FIG. 16B shows an example of a headset image theme presented by the electronic device 200 of the sharing party in a leftmost screen usage scenario. FIG. 16C shows an example of a headset image theme presented by the electronic device 200 of the sharing party in a usage scenario of selecting an audio output channel during a call. In addition, FIG. 16D further shows a headset sound theme presented by the headset B of the sharing party in a usage scenario of establishing a connection.

Figure 17A:
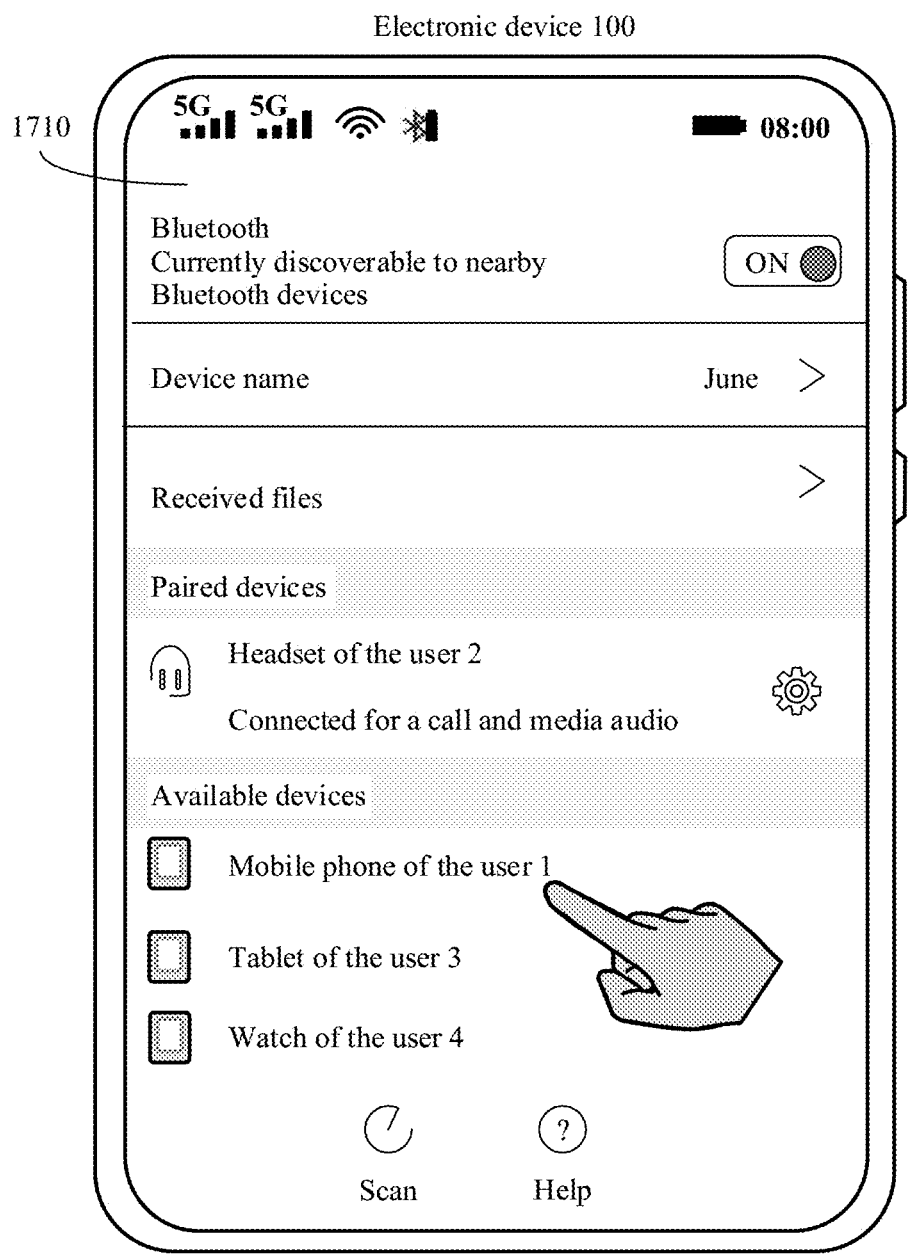
FIG. 17A and FIG. 17B show user interfaces for establishing a Bluetooth connection between a sharing party and a shared party according to an embodiment.
Figure 17B:
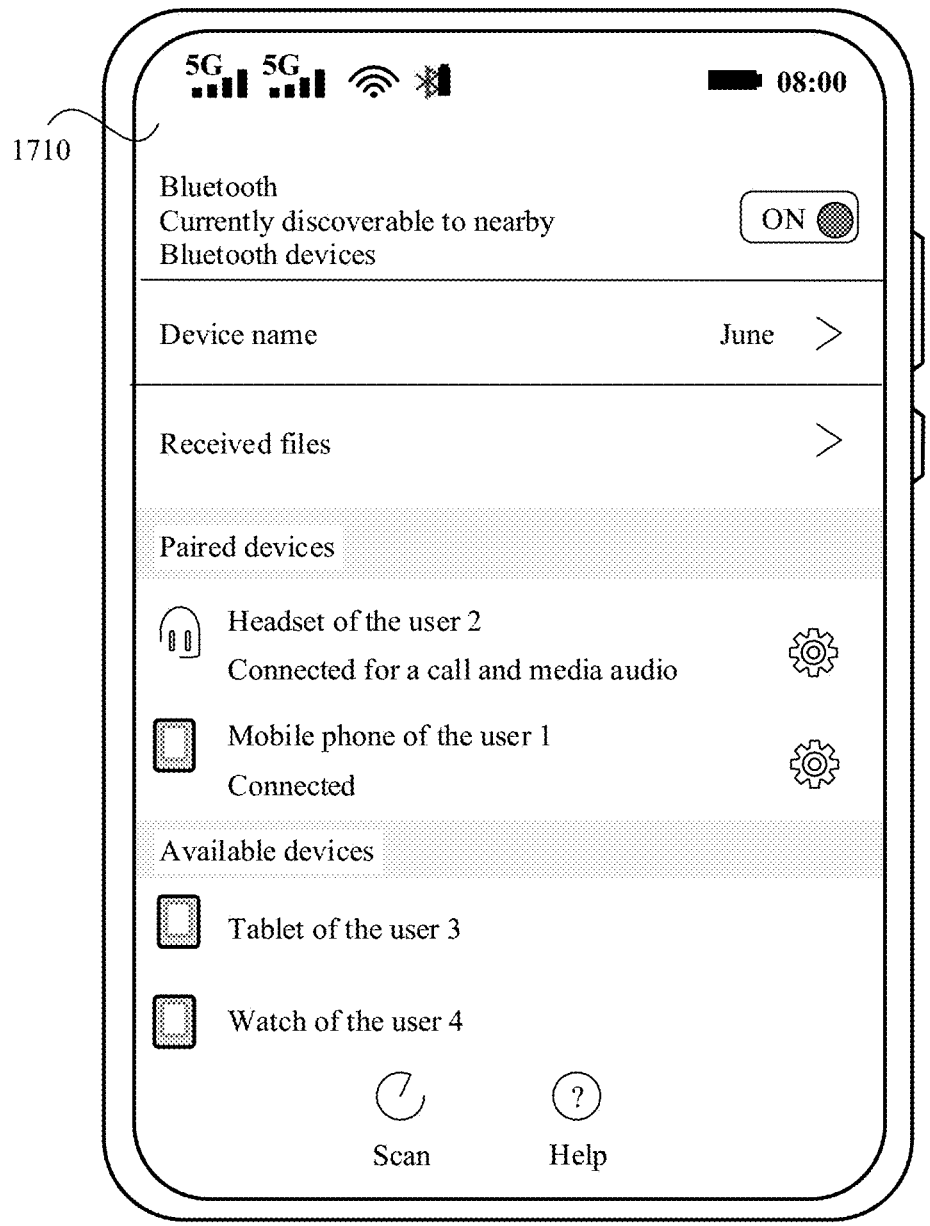

(1) FIG. 17A to FIG. 17B show a user interface for establishing a Bluetooth connection between a sharing party and a shared party.

As shown in FIG. 17A, the electronic device 100 (for example, the "mobile phone of the user 2") may display, in a user interface 1710, nearby devices discovered by the electronic device 100, for example, "Mobile phone of the user 1", "Tablet of the user 3", and "Watch of the user 4". The electronic device 100 may detect, in the user interface 1710, an operation that the user selects the electronic device 200 (for example, the "mobile phone of the user 2") from the discovered nearby devices. In response to the operation, the electronic device 100 may establish a Bluetooth connection to the electronic device 200, and as shown in FIG. 17B, may display a device name of the electronic device 200, for example, "Mobile phone of the user 1", in a list of connected devices displayed in the user interface 1710.

In addition to the Bluetooth connection, a connection established between the electronic device 100 and the electronic device 200 may also be another communication connection, for example, a Wi-Fi direct connection, a Wi-Fi connection, or a cellular mobile communication connection.

(2) FIG. 18A to FIG. 18D show examples of user interfaces for initiating instant sharing in response to a fact that a headset wears a new protective cover AS-1.

Figure 18A:
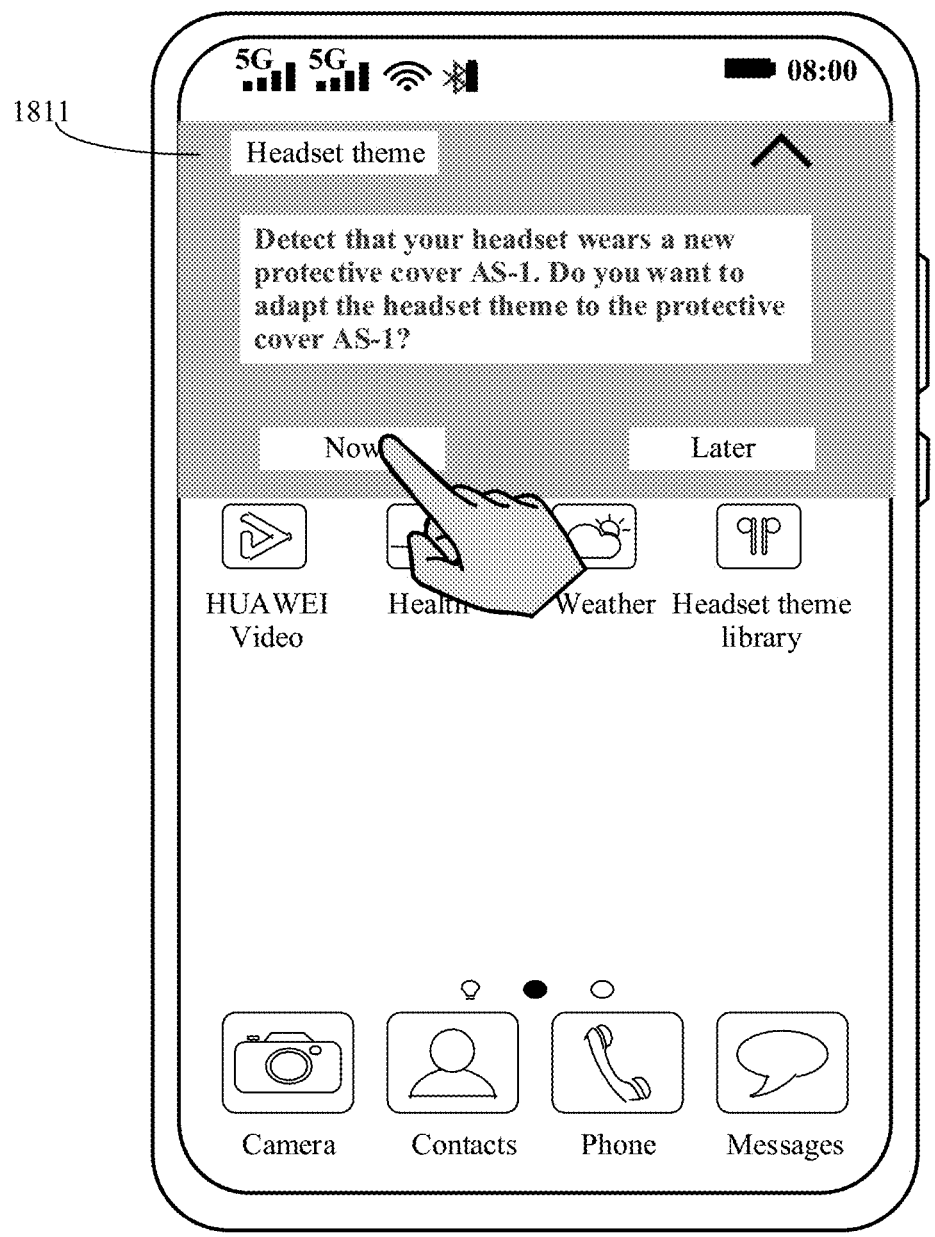
FIG. 18A to FIG. 18D show user interfaces for initiating instant sharing in response to a fact that a headset wears a new protective cover AS-1 according to an embodiment.

After learning that the new protective cover AS-1 is worn on the headset case, the electronic device 100 may display an example notification 1811 shown in FIG. 18A. The notification 1811 may be used to notify a user of the event and may be used to ask the user whether to change a headset theme to adapt to the protective cover AS-1. The event that the new protective cover AS-1 is worn on the headset case may be reported by the headset 200 to the electronic device 100. In addition to the event, information such as a device model and a device identifier (cover ID) of the protective cover AS-1, or a theme identifier (theme ID) and a theme name of a headset theme that adapts to the protective cover AS-1 may be further reported. The information may be used by the electronic device 100 to subsequently locally search for the headset theme that adapts to the protective cover AS-1.

The electronic device 100 may detect an operation of adapting the headset theme to the protective cover AS-1 by the user, for example, a tap operation on an option "Now" shown in FIG. 18A. In response to the operation, the electronic device 100 may display an example notification shown in FIG. 18B. The notification 1812 may display nearby devices having a headset theme adapted to the protective cover AS-1, for example, "Mobile phone of the user 1", "Tablet of the user 3", and "Band of the user 4".

Figure 18B:
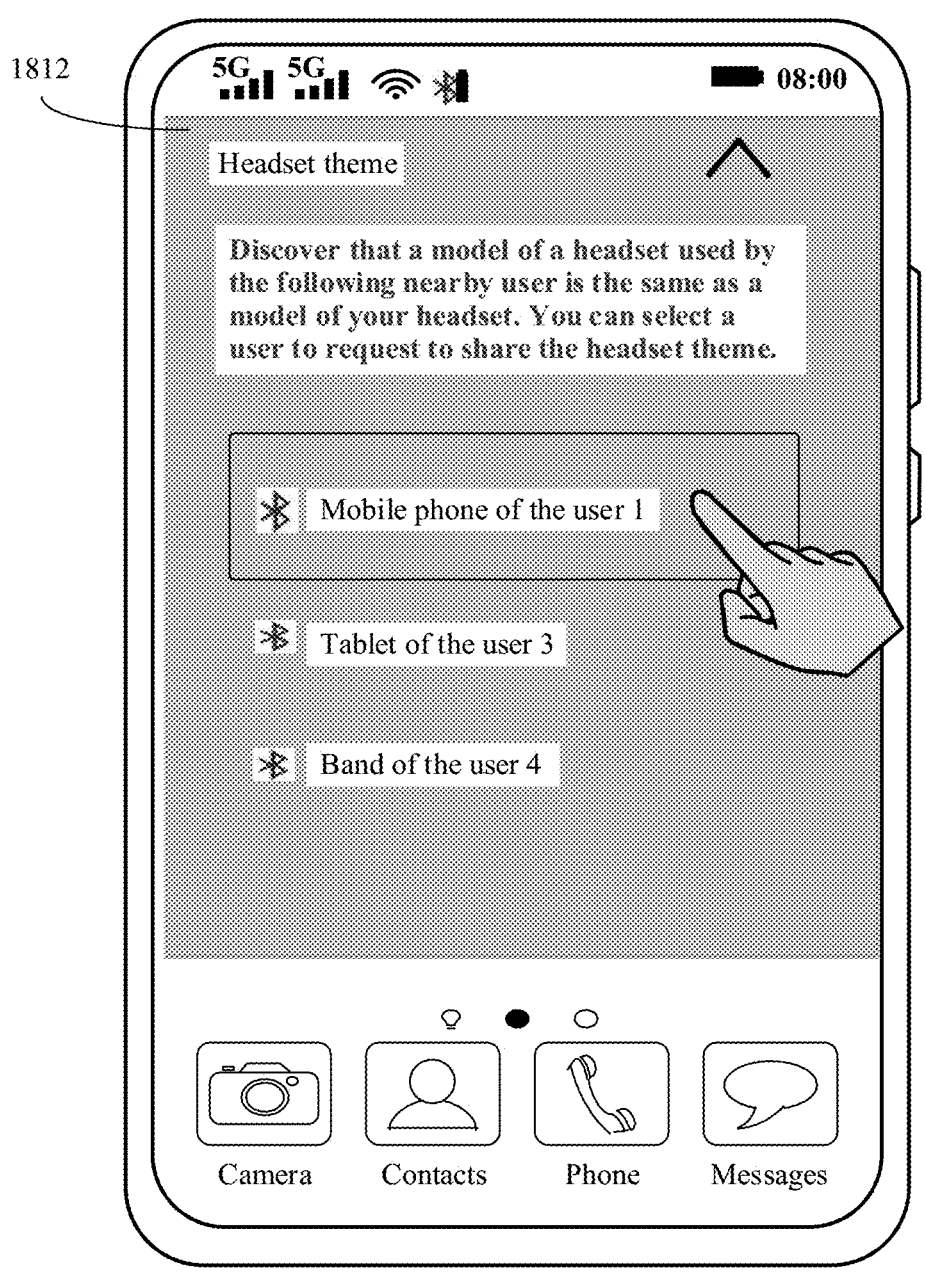

The electronic device 100 may detect an operation of selecting a nearby device to request sharing of a headset theme, for example, an operation of selecting "Mobile phone of the user 1" in an interface shown in FIG. 18B. In response to the operation, the electronic device 100 may send a sharing request to the electronic device 200, where the sharing request may carry information such as a device model and a device identifier of the protective cover AS-1, or a theme identifier and a theme name of a headset theme that adapts to the protective cover AS-1, to request the electronic device 200 to share the headset theme that adapts to the protective cover AS-1.

Figure 18C:
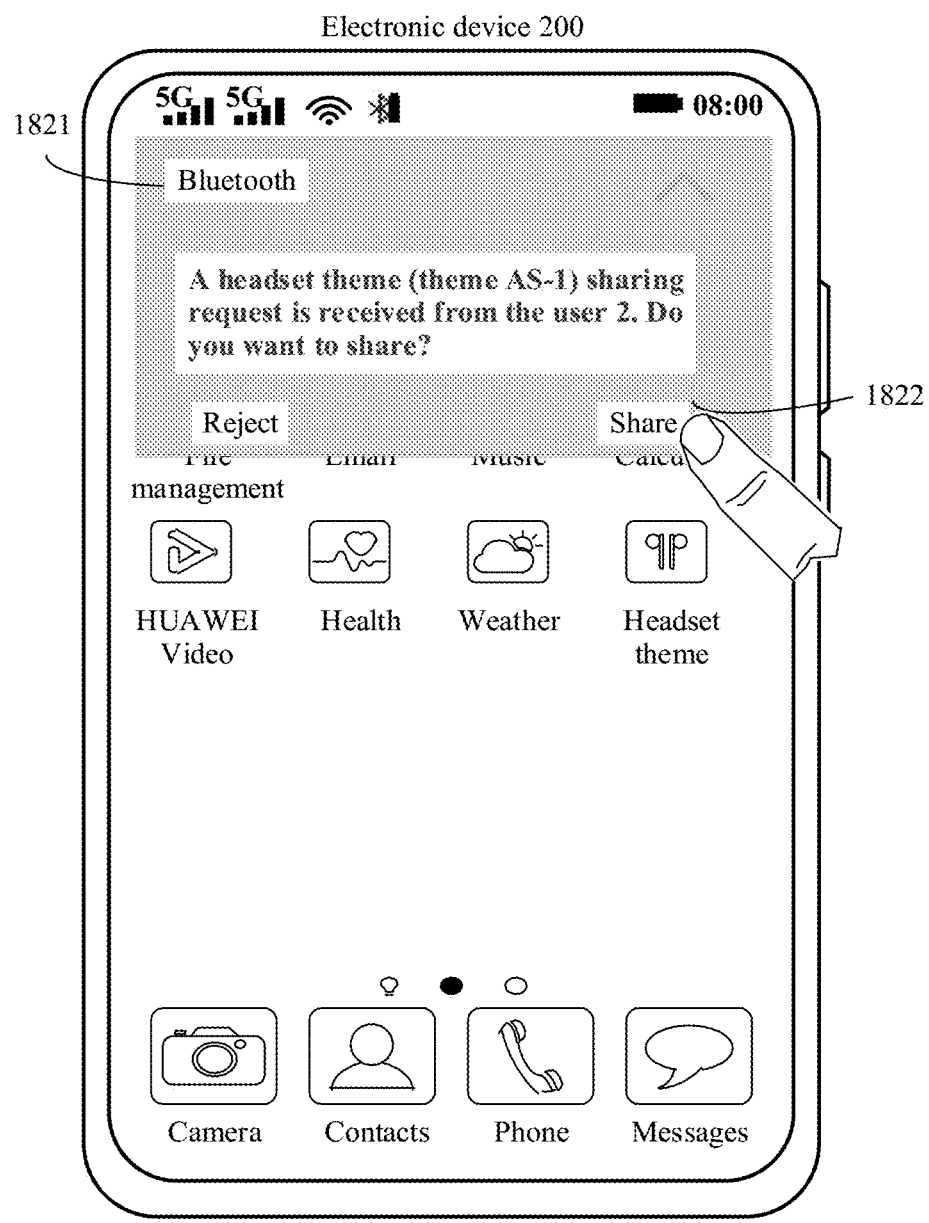

Correspondingly, as shown in FIG. 18C, the electronic device 200 may receive the sharing request from the electronic device 100, and display a notification 1821, where the notification 1821 may be used to indicate that the sharing request is received. The electronic device 200 may detect an operation of accepting the sharing request by the user, for example, an operation of tapping a share control 1822. In response to the operation, the electronic device 200 may send, to the electronic device 100, the headset theme adapted to the protective cover AS-1.

Figure 18D:
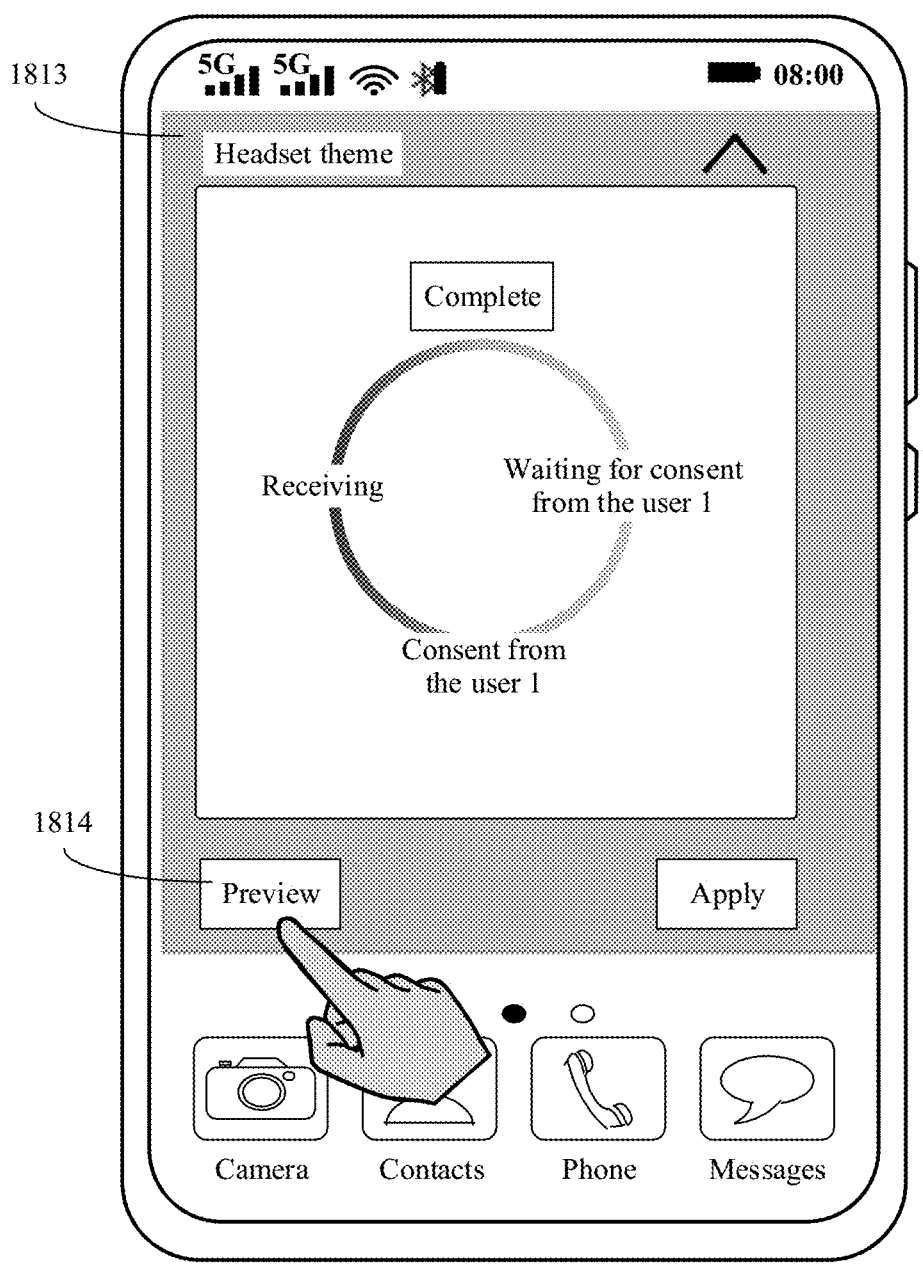

In a process from sending the sharing request to the electronic device 200 to waiting for the headset theme from the electronic device 200, the electronic device 100 may display an example interface shown in FIG. 18D, where the interface 1810 may display a sharing progress.

(3) FIG. 19A to FIG. 19E show examples of user interfaces of previewing and applying an instantly shared headset theme.

After receiving the headset theme adapted to the protective cover AS-1 from the electronic device 200, the electronic device 100 may detect an operation performed by the user to preview the headset theme, for example, an operation of tapping a preview control 1814 in a notification 1813 shown in FIG. 18D. In response to the operation, the electronic device 100 may display a preview interface 1910 of a headset image theme in FIG. 19A to FIG. 19D, and an audition interface of a headset sound theme shown in FIG. 19E.

Figure 19A:
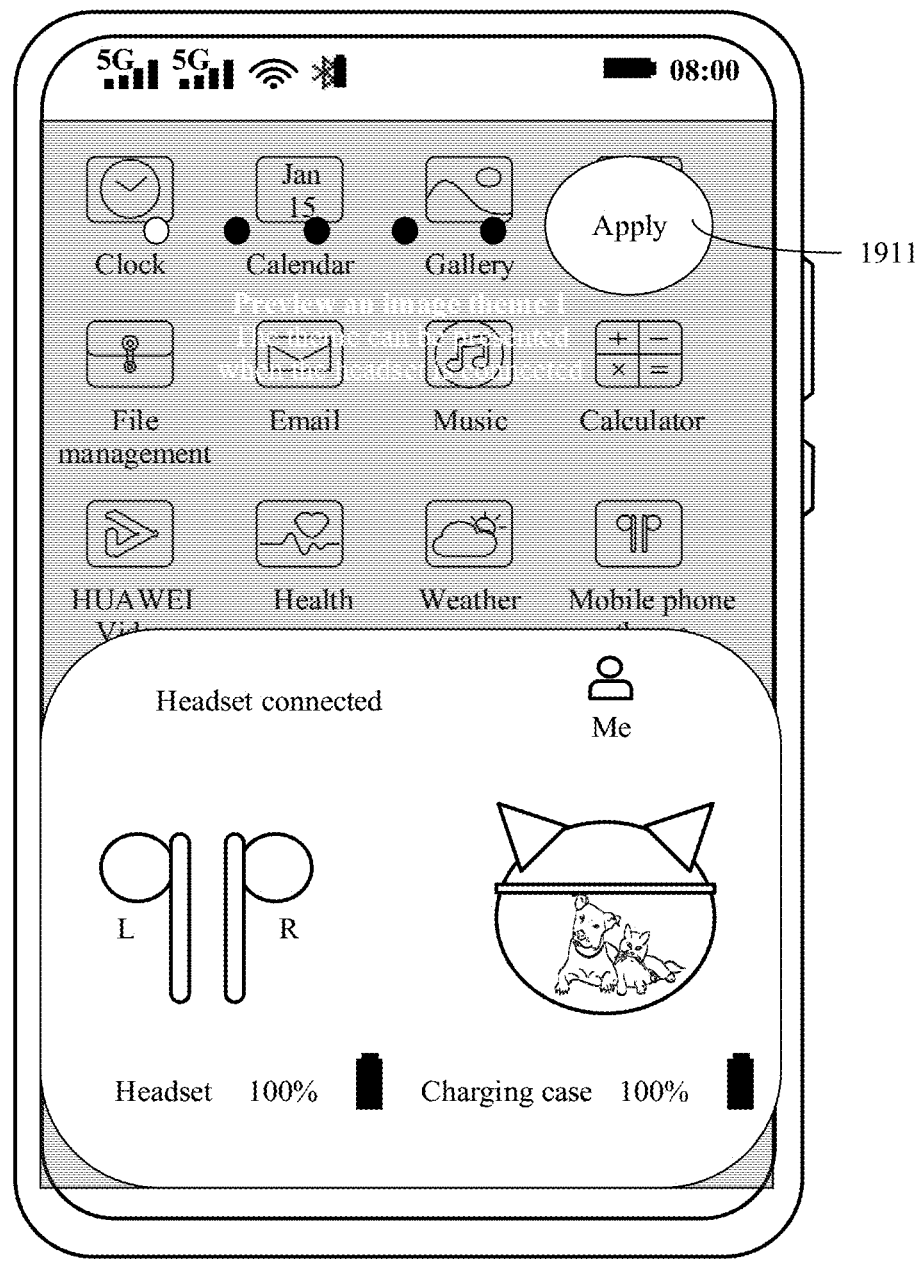
FIG. 19A to FIG. 19E show user interfaces for previewing an instantly shared headset theme according to an embodiment.
Figure 19B:
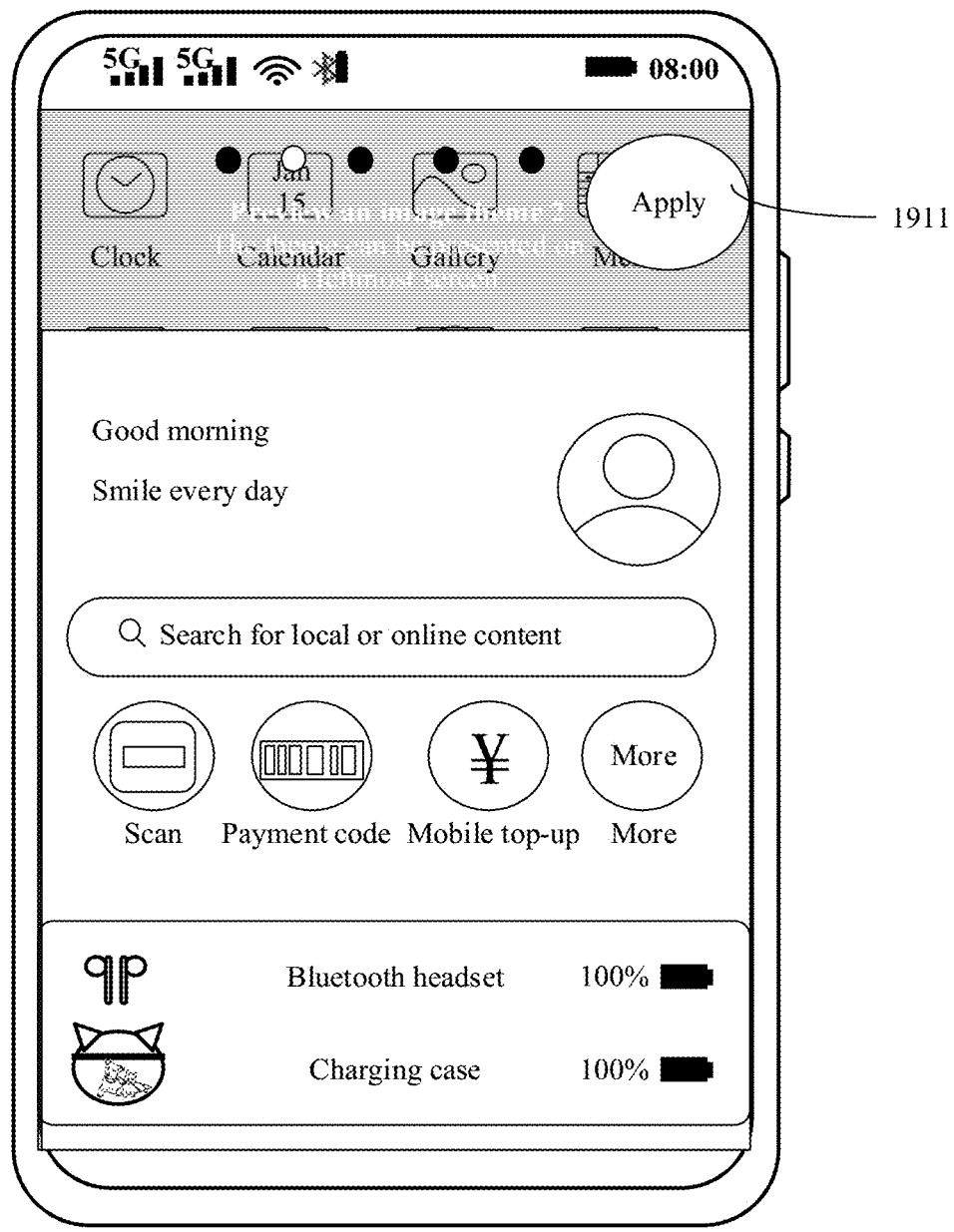
Figure 19C:
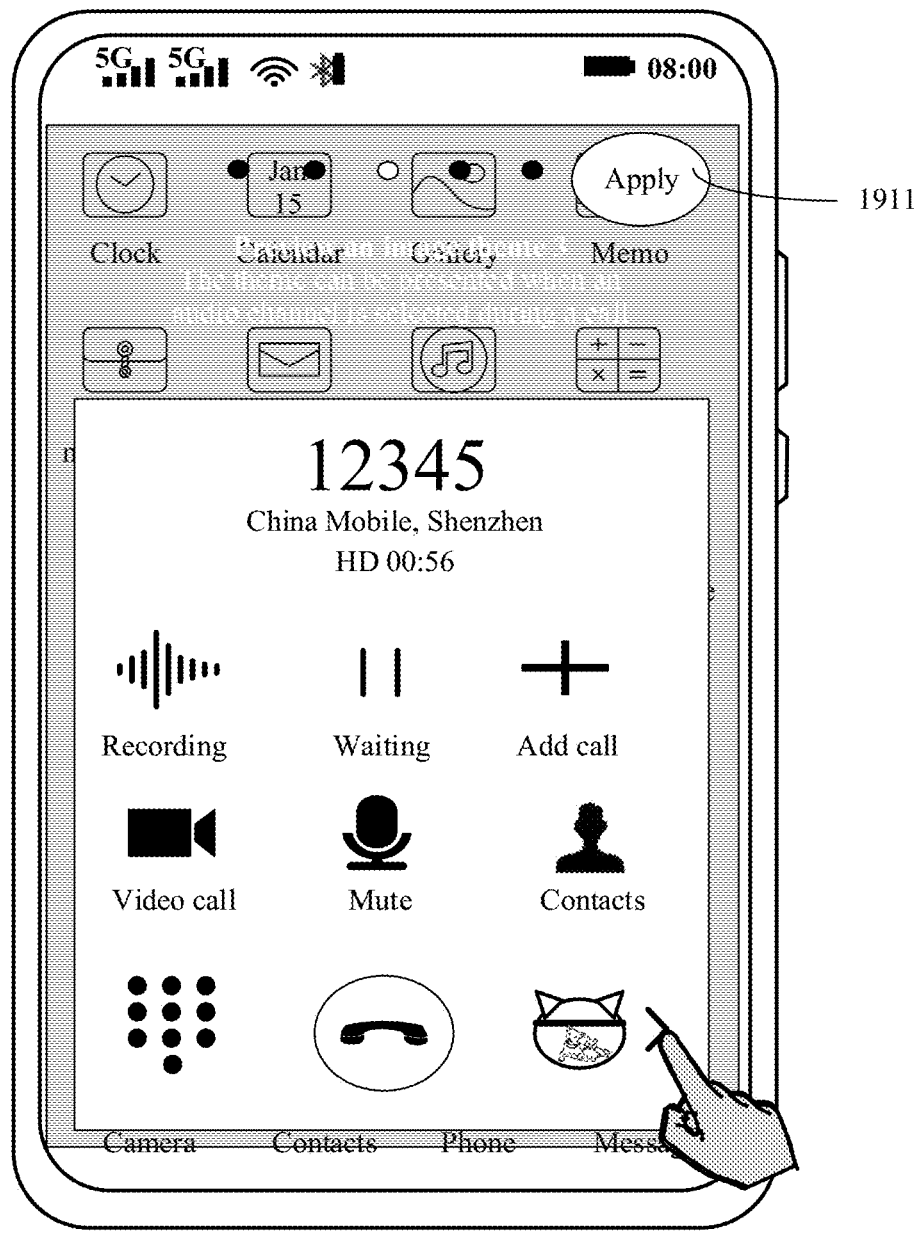
Figure 19D:
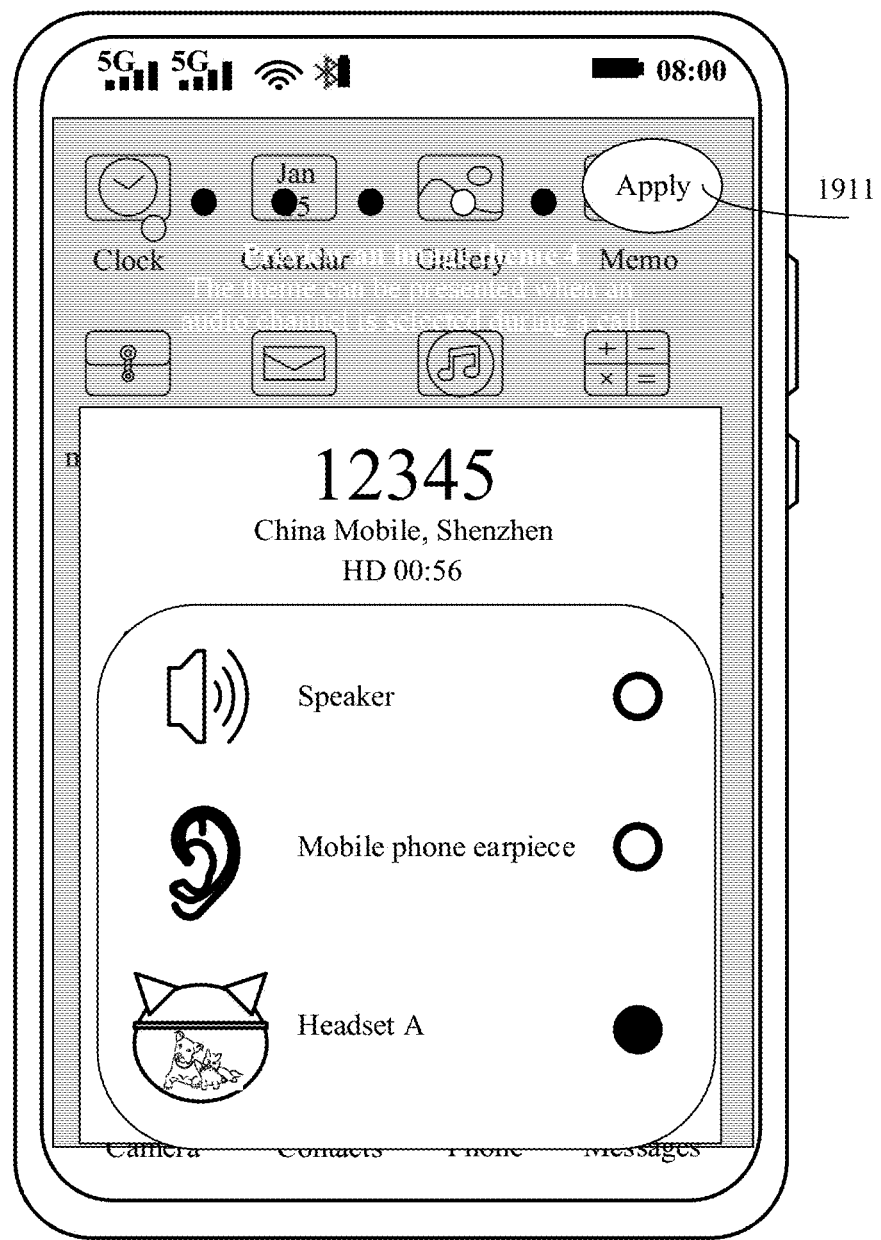
Figure 19E:
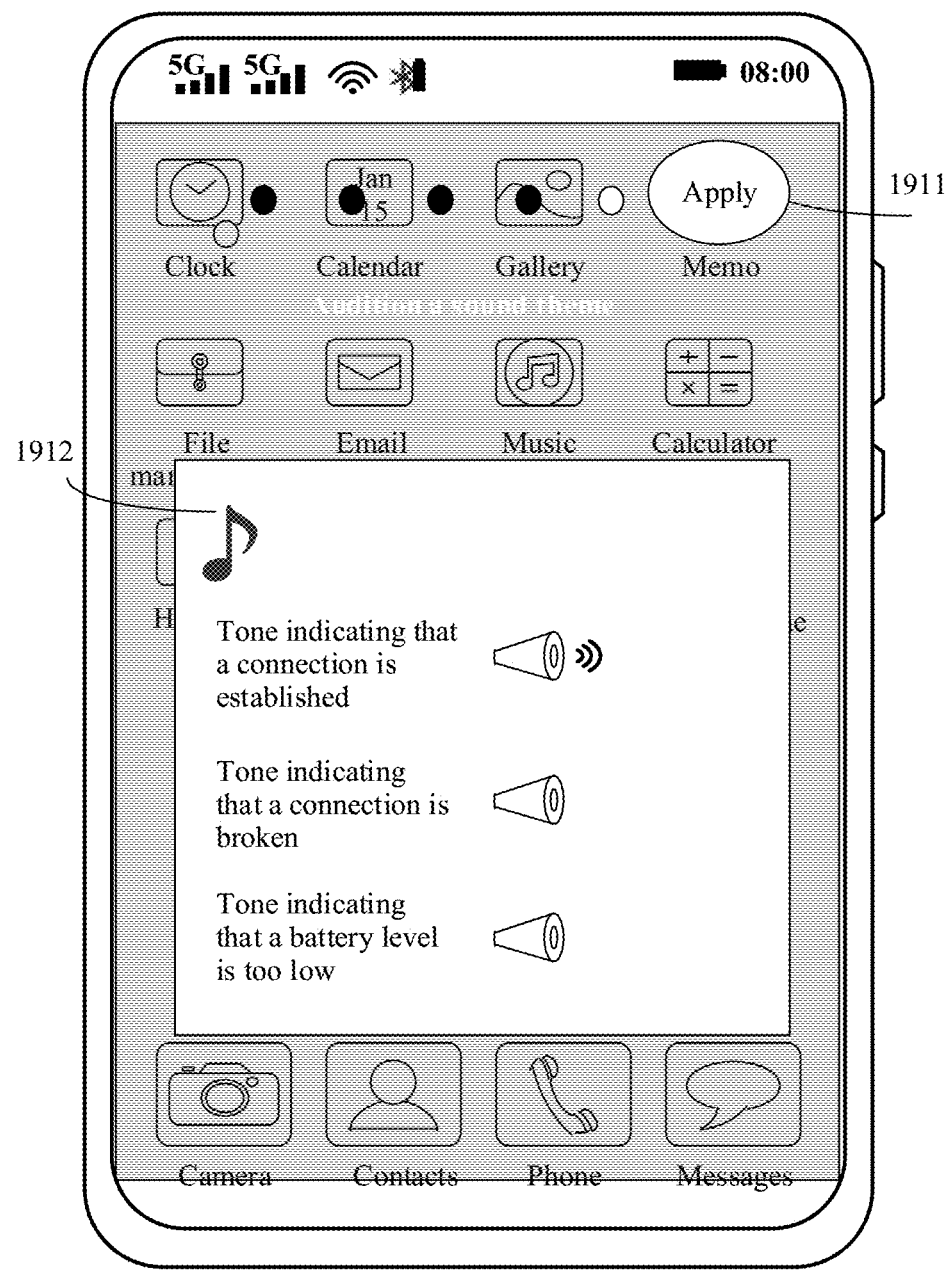

For the preview interface 1910 in FIG. 19A to FIG. 19D and the audition interface shown in FIG. 19E, respectively refer to the foregoing descriptions of FIG. 14E. Details are not described herein again.

After receiving the headset theme adapted to the protective cover AS-1 from the electronic device 200, the electronic device 100 may further detect an operation performed by the user to apply the headset theme, for example, an operation of tapping an apply control 1911 shown in FIG.

19A to FIG. 19E. In response to the operation, the electronic device 100 may replace a previously used headset theme with the headset theme. For replacement of the headset theme, refer to the related descriptions in the foregoing embodiments. Details are not described herein again.

Figure 20A:
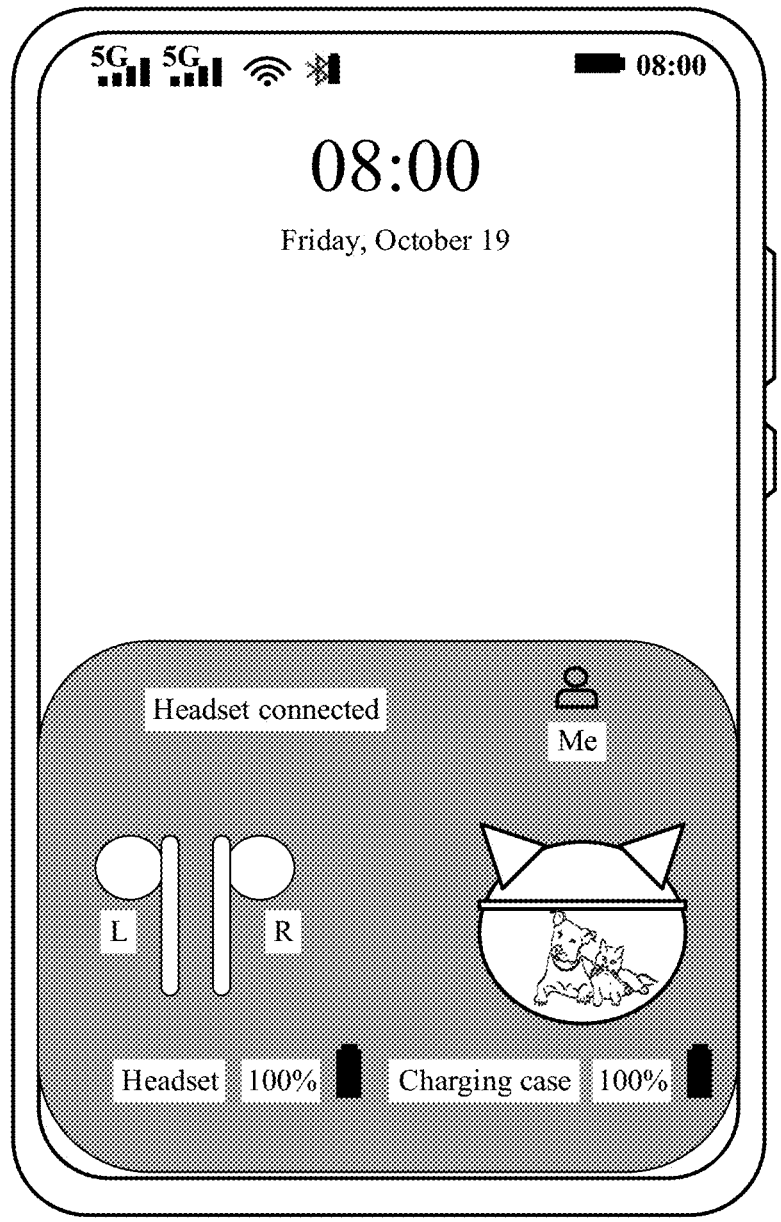
FIG. 20A and FIG. 20B show a series of user interfaces for applying a new headset theme according to an embodiment of this application.
Figure 20B:
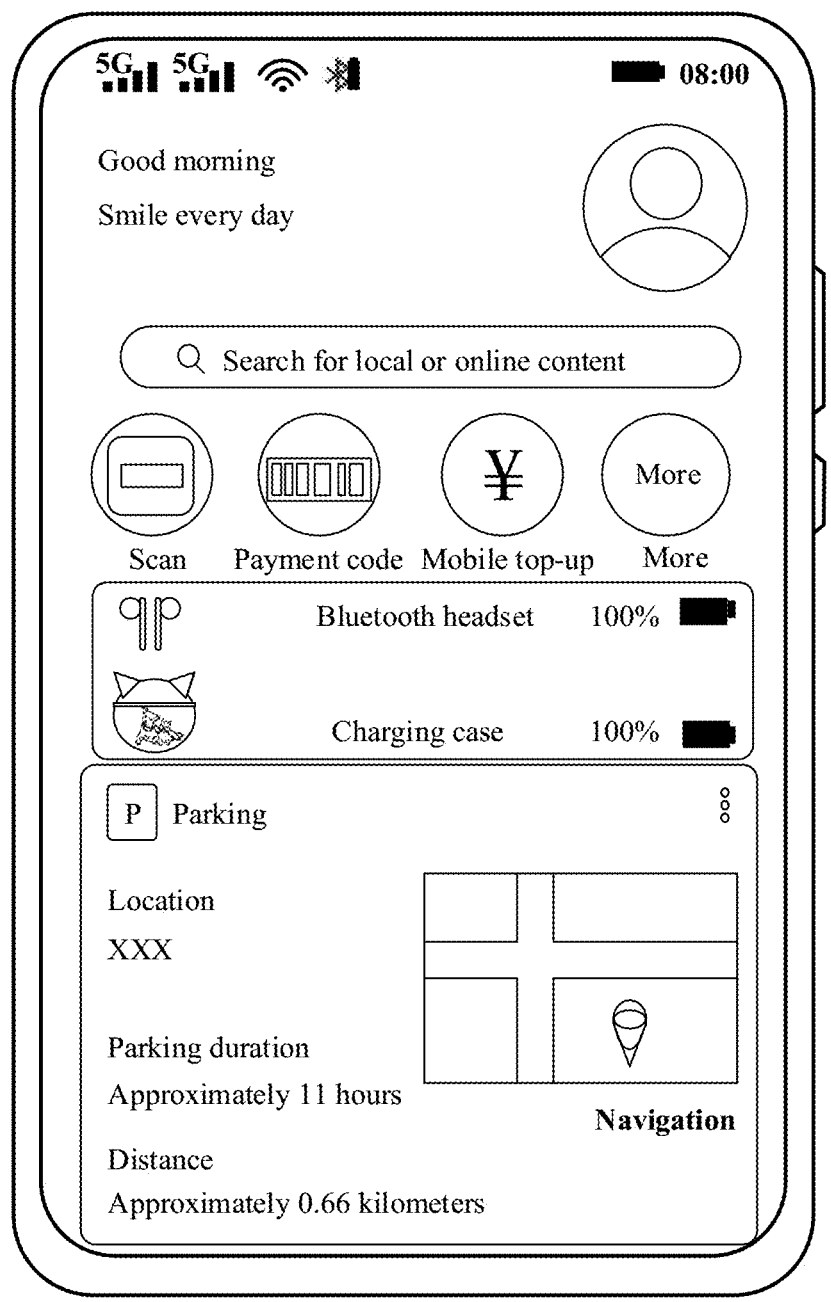

(3) FIG. 20A and FIG. 20B show examples of a series of user interfaces for applying a new headset theme.

For the example user interfaces shown in FIG. 20A and FIG. 20B, refer to the foregoing descriptions of FIG. 12A and FIG. 12B. Details are not described herein again.

It can be learned from the foregoing series of user interfaces that, in embodiments of this application, adaptation of an accessory theme such as the headset theme may be automatically triggered when an appearance part such as the headset case protective cover is changed, so that the accessory theme is changed with the appearance part, to implement accessory theme adaptation, and also meet a personalized requirement of the user. In addition to that in the foregoing example user interfaces, after detecting that the appearance part is updated, the electronic device may directly obtain an accessory theme adapted to the appearance part and replace the headset theme without user interaction, for example, trigger replacement of the theme without the user operation shown in FIG. 6A. In this way, when entering a specific usage scenario (for example, a usage scenario such as "establishing a connection", "leftmost screen", and "selecting an audio output channel during a call") again, the user can see an updated accessory theme that adapts to a new appearance part. This is simple and efficient. With reference to the foregoing series of user interfaces, the following mainly describes, in detail by using an example in which the accessory device is a headset, a main procedure of an accessory theme adaptation method provided in embodiments of this application.

Figure 21A:
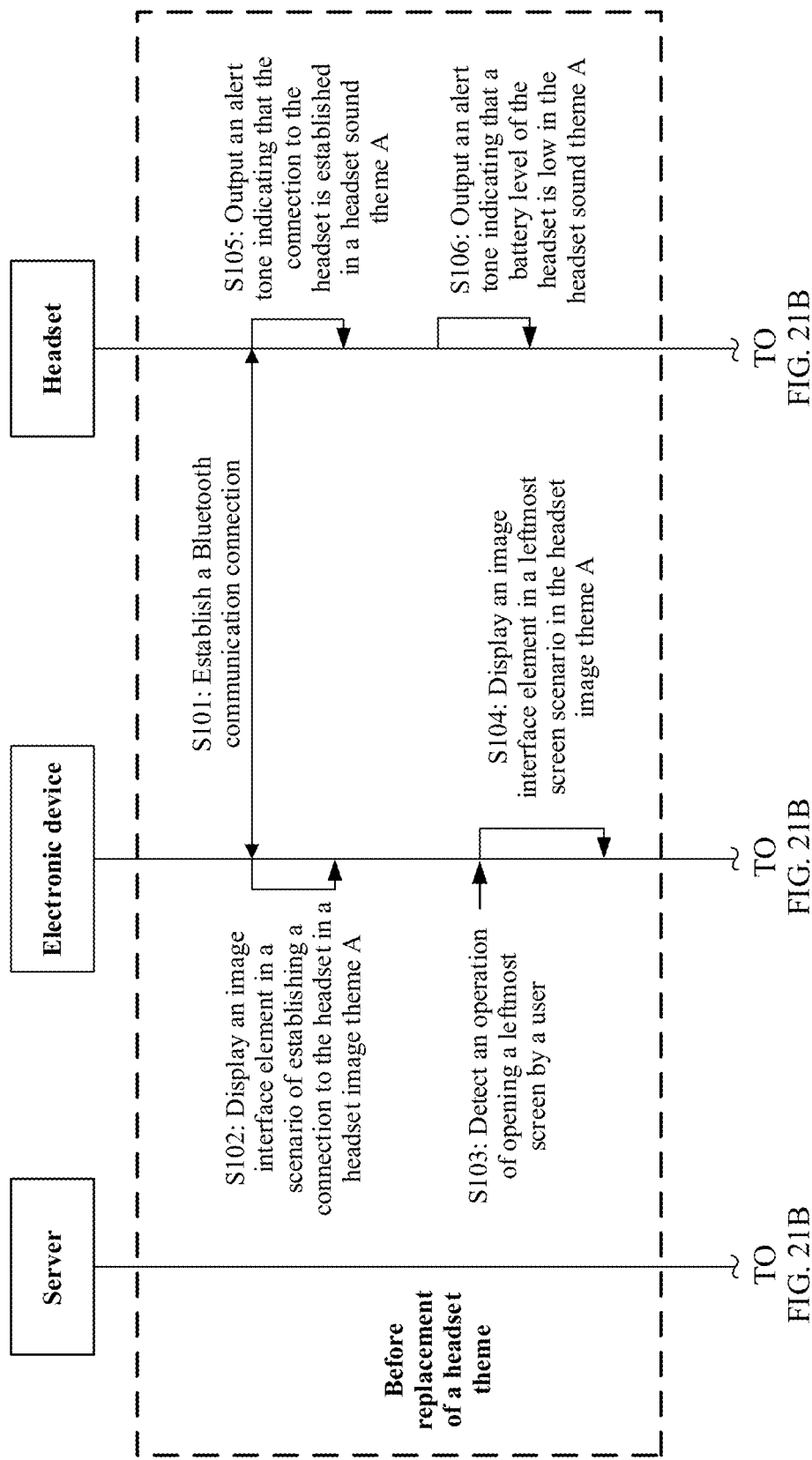
FIG. 21A to FIG. 21C are a schematic flowchart of an accessory theme adaptation method based on a server according to an embodiment of this application.
Figure 21B:
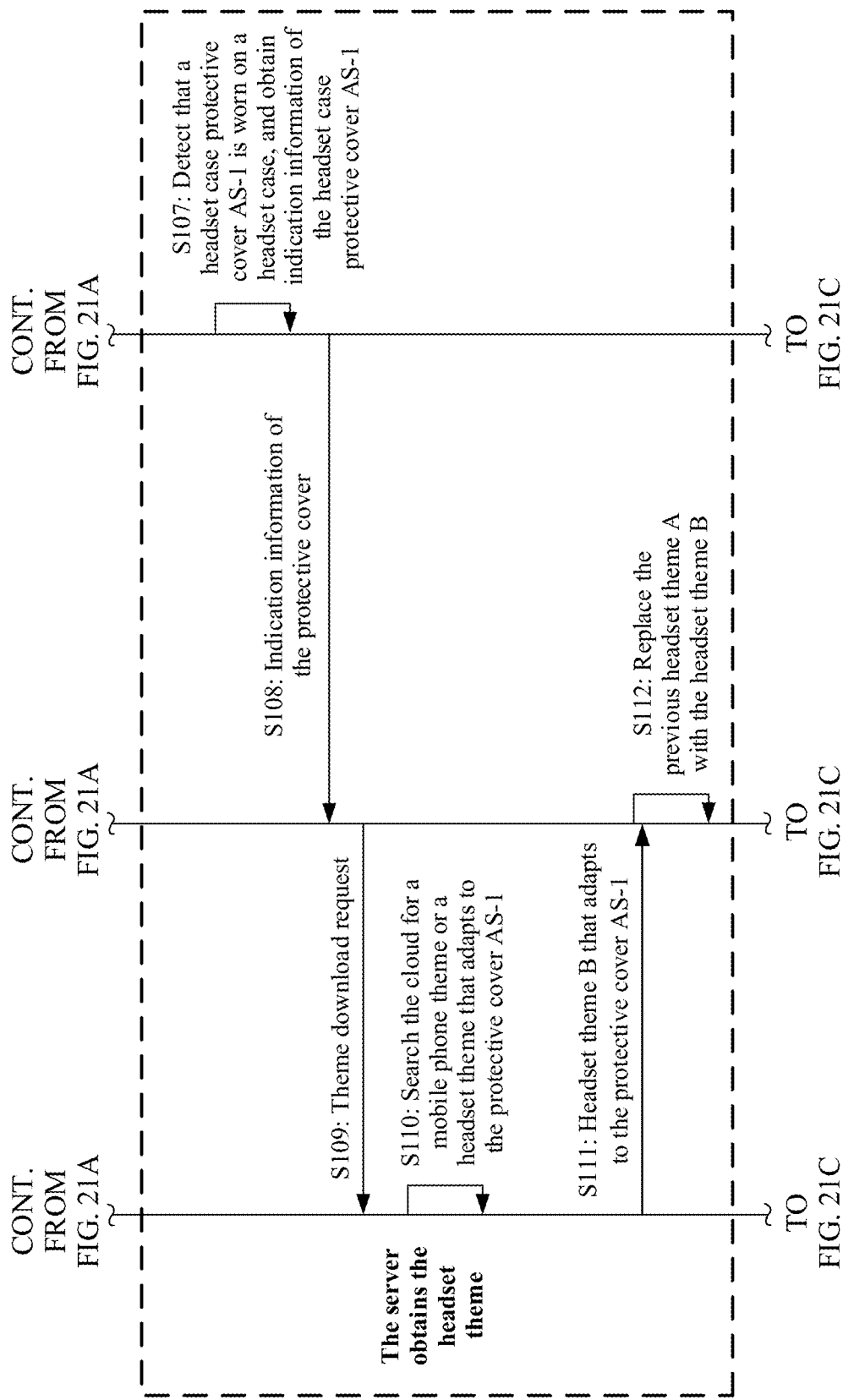
Figure 21C:
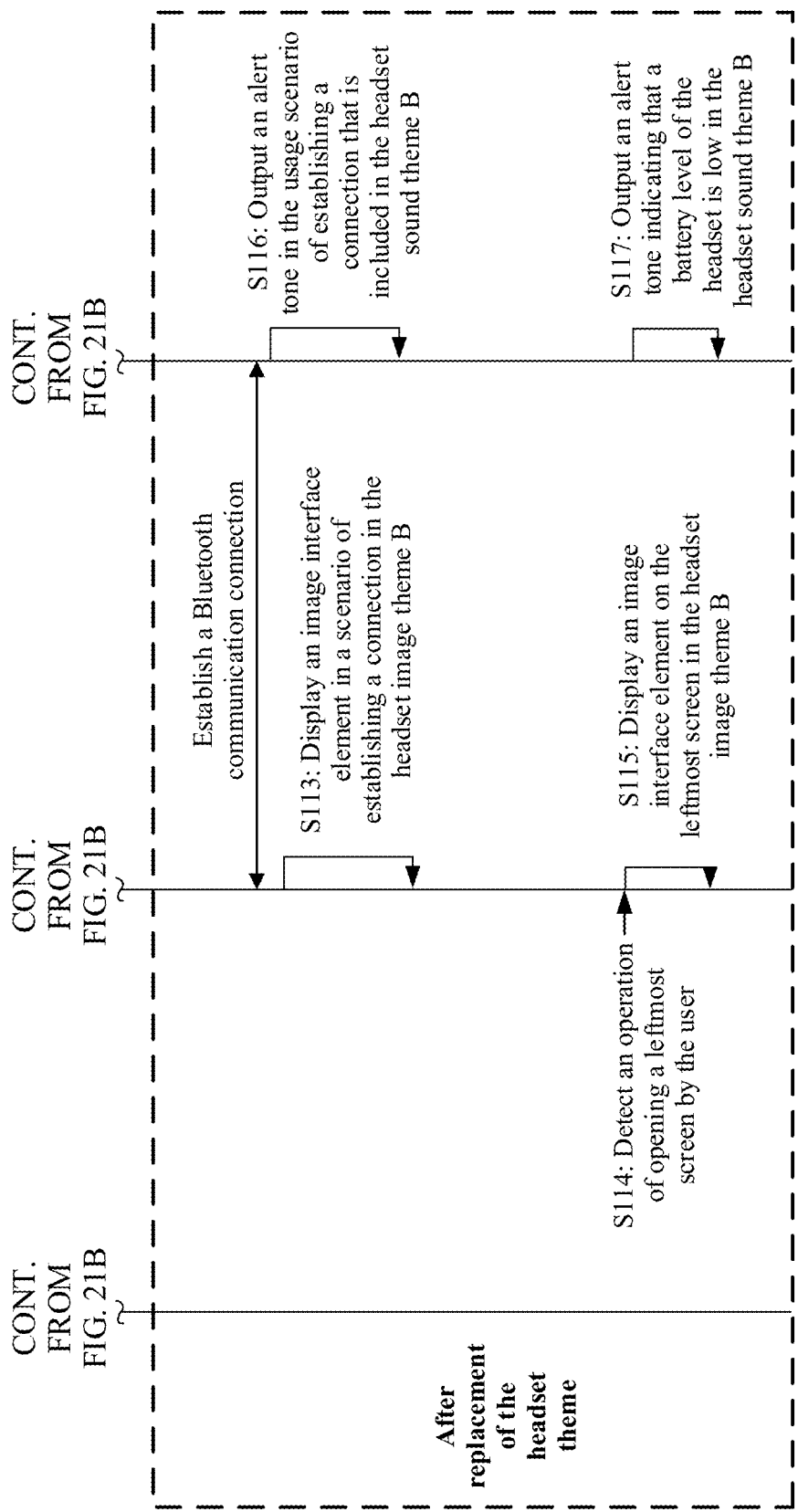

FIG. 21A to FIG. 21C show an example of a procedure of a method for automatically adapting an accessory theme based on a cloud server of a theme provider such as a mobile phone theme market or a headset theme market according to an embodiment of this application. Details are provided below.

Phase 1 (S101 to S106): Before Replacement of a Headset Theme

S101: Establish a Bluetooth connection between an electronic device and a headset.

The electronic device and the headset may exchange audio data, a play control message, a call control message, and the like based on the Bluetooth connection. In addition to the Bluetooth connection, a connection established between the electronic device and an accessory device such as the headset may also be another communication connection, for example, a Wi-Fi direct connection or a cellular mobile communication connection.

S102 to S104: The electronic device may present a headset image theme A.

That the electronic device presents the headset image theme A may mean that the electronic device displays an image interface element included in the headset image theme A. Specifically, the electronic device may present the headset image theme A in different usage scenarios (referring to Table 1).

For example, in S102, in a usage scenario of establishing a (Bluetooth) connection, the electronic device may display an image interface element in the usage scenario of establishing a connection that is included in the headset image theme A, for example, a series of image interface elements related to the headset in the pop-up window shown in FIG. 3A, such as the headset icon 311, the headset case icon 312, and the headset case battery level icon 313.

For example, in S103 and S104, in a leftmost screen usage scenario, the electronic device may display an image interface element in the leftmost screen usage scenario that is included in the headset image theme A, for example, a series of image interface elements related to the headset on the leftmost screen shown in FIG. 3B, such as the headset icon 321, the headset case icon 322, and the headset case battery level icon 323.

In addition to the usage scenario of establishing a (Bluetooth) connection and the leftmost screen usage scenario, the electronic device may further present the headset image theme A in another usage scenario, for example, a usage scenario of selecting an audio output channel during a call in Table 1, as shown in FIG. 3D and FIG. 3E. Different from a headset image theme B to be mentioned below, the headset image theme A may be referred to as a previously used headset image theme, an old headset image theme, or the like.

S105 and S106: The headset may present a headset sound theme A.

That the headset presents a headset sound theme A may mean that the headset outputs a sound included in the headset sound theme A. Specifically, the headset may present the headset sound theme A in different usage scenarios (referring to Table 2).

In a usage scenario of establishing a (Bluetooth) connection, the headset may output (or play) a sound in the usage scenario of establishing a connection that is included in the headset sound theme A, for example, a sound "tinkling".

In a usage scenario of breaking a (Bluetooth) connection, the headset may output (or play) a sound in the usage scenario of breaking a connection that is included in the headset sound theme A, for example, a sound "drip".

In a usage scenario in which a battery level of a headset is low, the headset may output (or play) a sound in the usage scenario in which a battery level of a headset is low that is included in the headset sound theme A, for example, a sound "knock".

In addition to the usage scenario of establishing a connection, the usage scenario of breaking a connection, and the usage scenario in which a battery level of a headset is low, the electronic device may further present the headset sound theme A in another usage scenario, for example, a usage scenario in which a user wears a headset or a usage scenario of enabling noise reduction. Different from a headset sound theme B to be mentioned below, the headset sound theme A may be referred to as a previously used headset sound theme, an old headset sound theme, or the like.

Phase 2 (S107 to S112): Implement Headset Theme Adaptation Through Multi-End Linkage Between a Protective Cover, the Headset, the Electronic Device, and a Cloud Server S107: Detect that an appearance part of the headset changes.

Specifically, the headset detects that a protective cover AS-1 is worn on the headset case, and obtains indication information of the protective cover AS-1.

Herein, the indication information of the appearance part such as the protective cover AS-1 may be used to indicate what kind of appearance part the protective cover AS-1 is, and may be used to determine a headset theme adapted to the appearance part such as the protective cover AS-1. The indication information of the protective cover AS-1 may be, for example, information such as a device model and a device identifier of the protective cover AS-1, or a theme identifier and a theme name of a headset theme adapted to the protective cover AS-1. In addition to the information, the indication information of the protective cover AS-1 may also be information (which may also be referred to as appearance indication information or appearance description information) used to indicate an appearance of the appearance part, such as an appearance rendering of the protective cover AS-1.

In this application, the headset may detect, in but not limited to the following manners, that the new protective cover AS-1 is worn on the headset case:

Manner 1: The headset case first senses, by using a communications technology such as NFC or infrared, an event that the protective cover AS-1 is worn on the headset case, and then reports the event to the headset. For example, the headset case may report, through a wired communications interface formed by a metal probe disposed in the headset case, the event to the headset placed in the headset case. In addition to the event, the indication information of the protective cover AS-1 may be further reported.

Manner 2: The protective cover AS-1 first senses, by using a communications technology such as NFC or infrared, an event that the protective cover AS-1 is worn on the headset case, and then reports the event to the headset through a Bluetooth connection. In addition to the event, the indication information of the protective cover AS-1 may be further reported.

As described above, to detect the event that the new protective cover AS-1 is worn on the headset case, a wireless communications component such as NFC or infrared may be built in each of the headset case and the headset case protective cover. To report the event to the headset, a wireless communications component such as Bluetooth may be further built in each of the headset case and the headset case protective cover.

In addition to the protective cover, the appearance part of the headset may also be a headset case storing the headset, and the headset can also detect a change of the headset case, to trigger the electronic device to adapt a headset theme to a new headset case.

For another type of accessory device, the appearance part may have a broader meaning. For example, an appearance part of a stylus may be a pen box storing the stylus (and may also charge the stylus), or may even be a pen box protective cover outside the pen box. For another example, an appearance part of AR/VR glasses may be a glasses case storing the glasses (and may also charge the glasses), or may even be a glasses case protective cover outside the glasses case. For still another example, an appearance part of a band or a watch may be a detachable strap of the band or the watch. The accessory theme adaptation method provided in embodiments of this application is applicable to various accessory devices with different appearance parts, and a type of the appearance part is not limited.

S108 to S111: Download a headset theme B adapted to a new appearance part (the headset case protective cover AS-1) of the headset.

For example, in S108, the headset may send the indication information of the protective cover AS-1 to the connected electronic device, for example, information such as a device model and a device identifier of the protective cover AS-1, or a theme identifier and a theme name of a headset theme adapted to the protective cover AS-1.

Further, the headset may first determine whether the appearance part of the headset changes, and then send the indication information to the electronic device after determining that the appearance part changes, to avoid unnecessary headset theme adaptation triggered when a same appearance part is removed or worn for a plurality of times. A condition for determining that the appearance part changes may include but are not limited to the following:

1. The headset changes from having no matching appearance part (for example, the headset case protective cover) to wearing the protective cover AS-1.

2. An appearance part (for example, the headset case protective cover) previously worn by the headset is different from the protective cover AS-1.

For example, in S109 to S111, after receiving the indication information of the protective cover AS-1 from the headset, the electronic device may download, from a cloud server of a theme provider such as a mobile phone theme market or a headset theme market, a mobile phone theme or a headset theme that adapts to the protective cover AS-1.

Specifically, for example, in S109, the electronic device may send a theme download request to the cloud server of the theme provider such as the mobile phone theme market or the headset theme market, where the request may carry the indication information of the protective cover AS-1. For example, in S110, after receiving the request, the server may find, based on the indication information of the protective cover AS-1 such as the device model and the device identifier of the protective cover AS-1 or the theme identifier and the theme name of the headset theme adapted to the protective cover AS-1, the mobile phone theme or the headset theme that adapts to the protective cover AS-1. Then, for example, in S111, the server may transmit the mobile phone theme or the headset theme to the electronic device.

Further, to avoid unnecessary accessory theme adaptation triggered when a same appearance part is removed or worn for a plurality of times, the electronic device may first determine whether the appearance part of the headset changes, and then send the theme download request to the server after determining that the appearance part changes. For the condition for determining that the appearance part changes, refer to related descriptions in S108. Details are not described herein again.

In addition, for human-computer interaction processes such as preview and downloading in downloading of the mobile phone theme and downloading of the headset theme, refer to the foregoing descriptions of FIG. 6C and FIG. 6D and FIG. 10C and FIG. 10D. Details are not described herein again. The headset theme B may be the "Cute animal" headset theme mentioned in the foregoing content.

S112: Apply the downloaded headset Theme B.

Specifically, after downloading, from the cloud server of the theme provider such as the mobile phone theme market or the headset theme market, the mobile phone theme or the headset theme that adapts to the protective cover AS-1, the electronic device may replace a previously used mobile phone theme with the downloaded mobile phone theme, or replace a previously used headset theme with the downloaded headset theme.

Herein, replacing the headset theme includes replacing the previously used headset theme A with the headset theme B included in the downloaded headset theme. For replacement of the headset theme, refer to the related content in the foregoing embodiments. Details are not described herein again. Different from the previously used headset theme A, the headset theme B included in the downloaded mobile phone theme or the directly downloaded headset theme B may be referred to as a new headset theme.

Phase 3 (S113 to S117): After Replacement of the Headset Theme

S113 to S115: The electronic device may present a headset image theme B.

That the electronic device presents a headset image theme B may mean that the electronic device displays an image interface element included in the headset image theme B. Specifically, the electronic device may present the headset image theme B in different usage scenarios (referring to Table 1). For details, refer to an implementation in which the electronic device presents the headset image theme A in S102 to S104. A difference lies in that image resources referenced by the headset image theme A and the headset image theme B are different.

During replacement of a headset image theme, the headset image theme presented by the electronic device is different from the previously used headset image theme. For example, in a usage scenario of establishing a (Bluetooth) connection, the electronic device may display an image interface element in the usage scenario of establishing a connection that is included in the headset image theme B, for example, a series of image interface elements related to the headset in the pop-up window shown in FIG. 8A, such as the headset background 811, the headset case protective cover background 812, and the headset case battery level icon 813. A difference from the previously used headset image theme shown in FIG. 3A lies in that a presentation style of the new headset image theme is different from a presentation style of the previously used headset image theme, to meet a personalized requirement of the user and improve user experience.

S116 and S117: The headset may present a headset sound theme B. For details, refer to S105 and S106. A difference lies in that audio resources referenced by the headset sound theme A and the headset sound theme B are different.

During replacement of a headset sound theme, the headset sound theme presented by the headset is different from the previously used headset sound theme. For example, when a battery level of the headset is low, the headset outputs a sound "meow". A difference from the previously used headset sound theme shown in FIG. 3E lies in that a presentation style of the new headset sound theme is different from a presentation style of the previously used headset sound theme, to meet a personalized requirement of the user and improve user experience.

It can be learned that, in the embodiment in FIG. 21A to FIG. 21C, accessory theme adaptation may be implemented through multi-end linkage between the appearance part such as the protective cover, the headset, the electronic device, and the cloud server, to meet a personalized requirement of the user. In addition to the event that the new protective cover is worn on the headset case, a condition for triggering multi-end linkage between the protective cover, the headset, the electronic device, and the cloud server to implement headset theme adaptation may be another condition. For example, headset theme adaptation is triggered at intervals. For another example, the user touches a button or an area on the headset case or the protective cover to trigger headset theme adaptation. For still another example, headset theme adaptation is triggered when the headset case is opened. This condition is not limited in this application.

In addition to adapting the headset theme to the new protective cover AS-1 based on the cloud server in the foregoing embodiments, the electronic device 100 may further adapt a headset theme to the new protective cover AS-1 based on local search, that is, obtain, through local search, the headset theme adapted to the protective cover AS-1. Details are provided below.

Figure 22A:
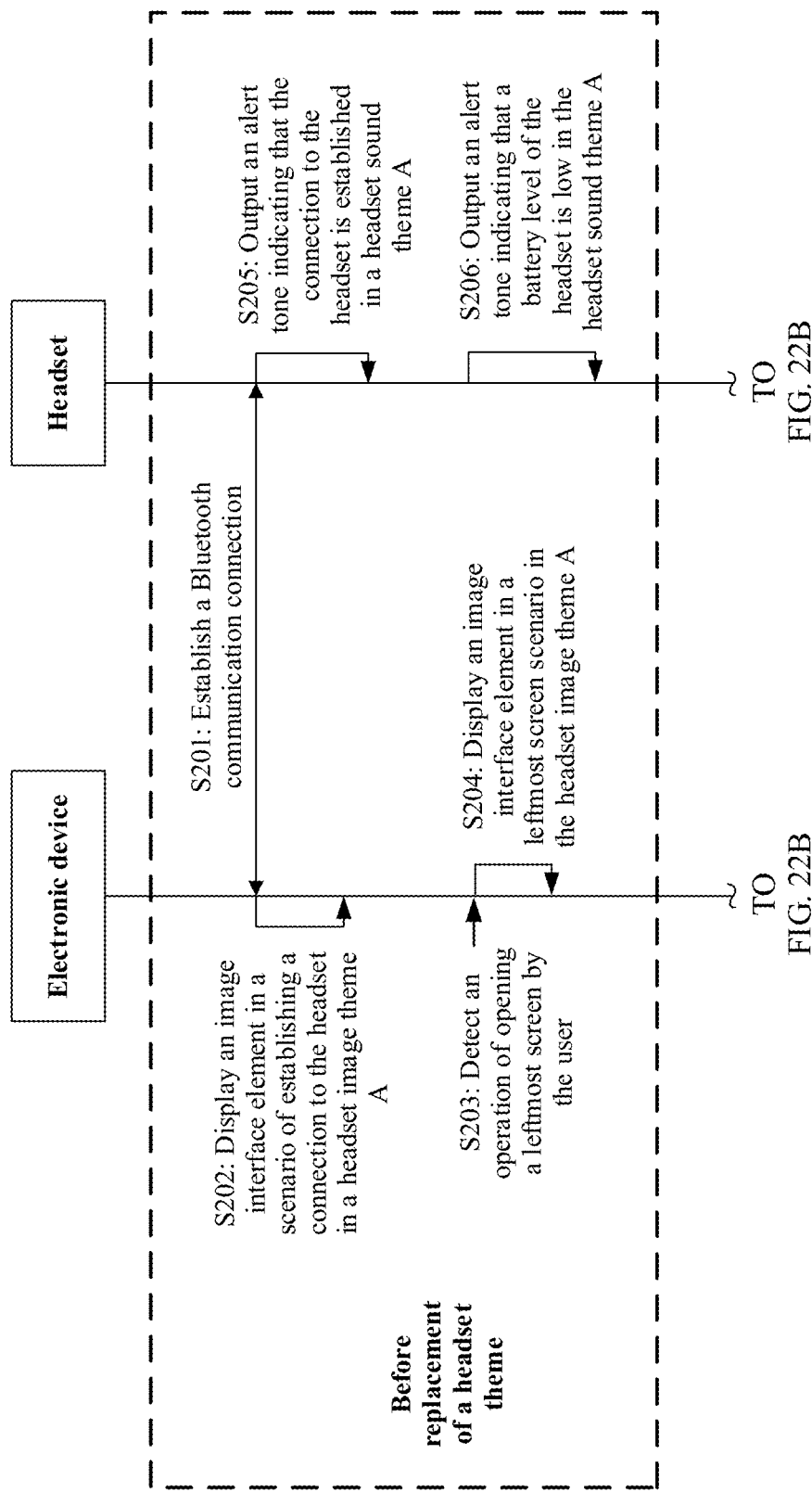
FIG. 22A to FIG. 22C are a schematic flowchart of an adaptation method based on a local headset theme library according to an embodiment of this application.
Figure 22B:
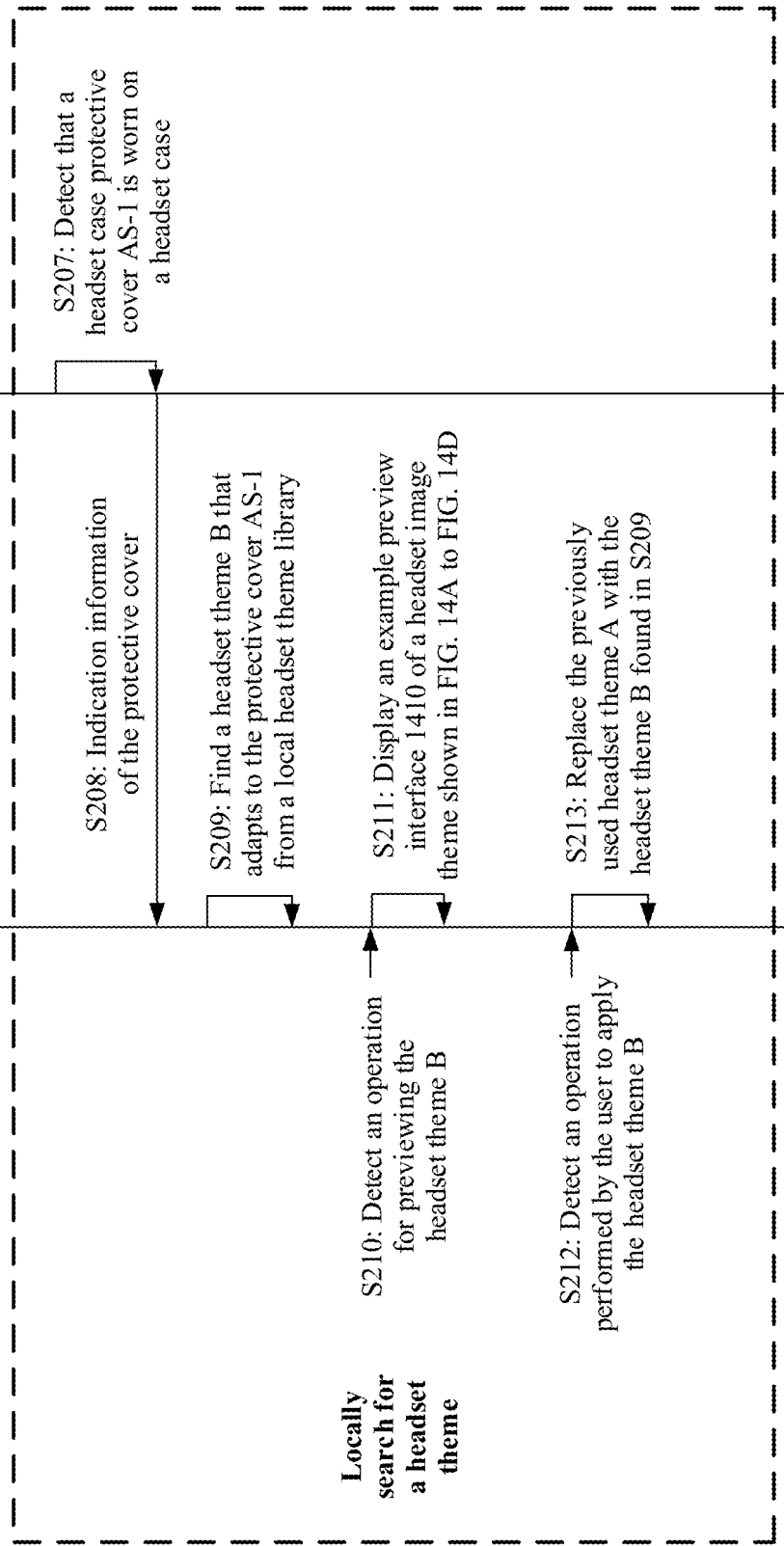
Figure 22C:
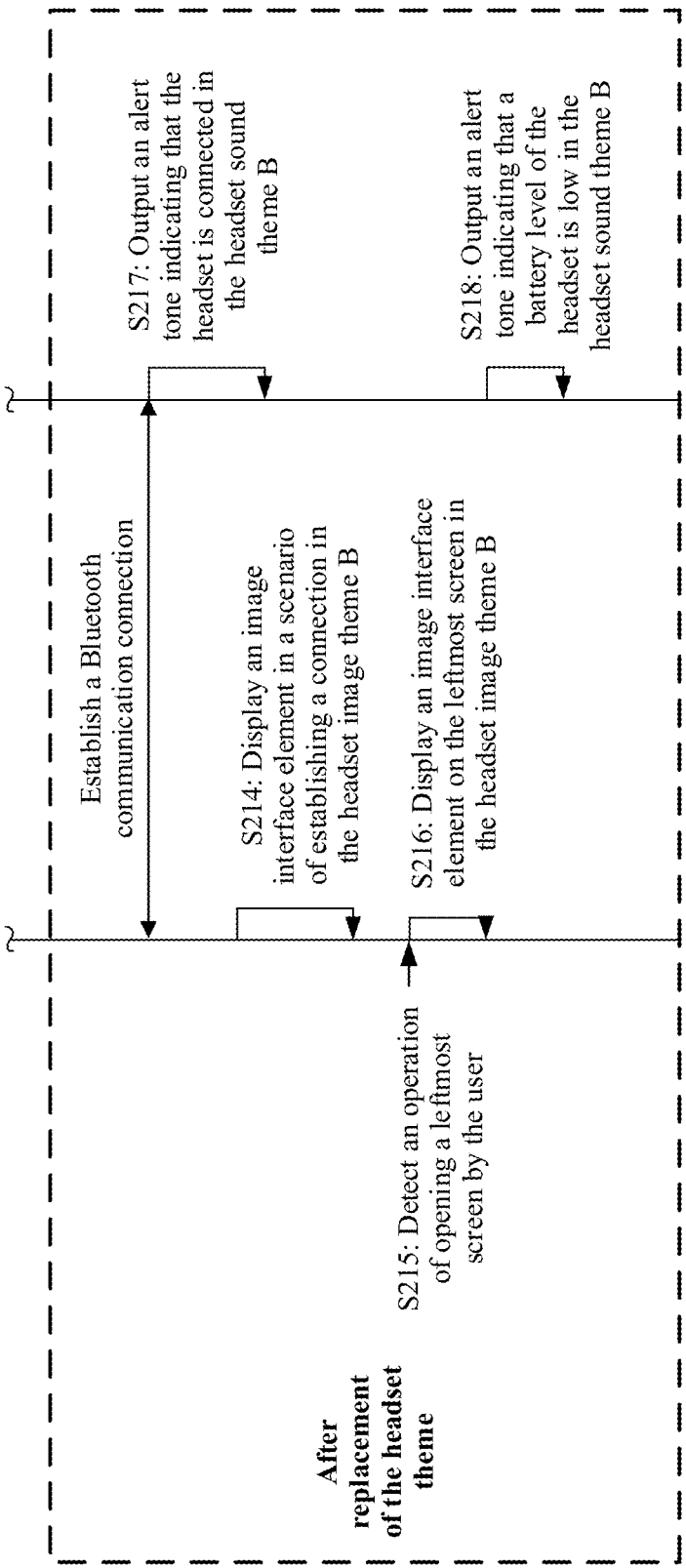

FIG. 22A to FIG. 22C show an example of a procedure of a method for automatically adapting an accessory theme based on an accessory theme such as a headset theme stored in an electronic device according to an embodiment of this application. Details are provided below.

Phase 1 (S201 to S206): Before Replacement of a Headset Theme

For Phase 1, refer to Phase 1 in the embodiment in FIG. 21A. That is, for specific content of S201 to S206, refer to content of S101 to S106. Details are not described herein again.

Phase 2 (S207 to S213): Implement Headset Theme Adaptation Based on the Headset Theme Stored in the Electronic Device S207: Detect that an appearance part of the headset changes.

For details, refer to S107 in the embodiment in FIG. 21B. The details are not described herein again.

S208 and S209: Locally obtain, from the electronic device, a headset theme adapted to a new appearance part (the headset case protective cover AS-1) of the headset.

For example, in S208, the headset may send the indication information of the protective cover AS-1 to the connected electronic device, for example, information such as a device model and a device identifier of the protective cover AS-1, or a theme identifier and a theme name of a headset theme adapted to the protective cover AS-1. For details, refer to S108 in the embodiment in FIG. 22. The details are not described herein again.

For example, in S209, after receiving the indication information of the protective cover AS-1 from the headset, the electronic device may find a headset theme suitable for the protective cover AS-1 from locally stored headset themes.

The headset themes stored in the electronic device may be obtained by the electronic device 100 in but not limited to the following manners: Manner 1: The headset themes are previously downloaded from a server of a headset theme provider such as a mobile phone theme market. Manner 2: The headset themes are obtained through searching on a network or local modeling by using an image that is of a headset/headset case/headset case protective cover and that is shot by a camera of the electronic device 100. Manner 3: The headset themes are shared by another device. Specific implementations of the last two manners are described in detail below with reference to FIG. 24A and FIG. 24B, FIG. 25A to FIG. 25H, FIG. 26, FIG. 27A to FIG. 27I, FIG. 28A and FIG. 28B, FIG. 29A and FIG. 29B, FIG. 30A to FIG. 30D, FIG. 31A to FIG. 31F, FIG. 35A to FIG. 35D, FIG. 36A to FIG. 36C, and FIG. 37A to FIG. 37D. Details are not described herein.

S210 to S213: Preview and apply a locally found headset theme.

For example, in S210 and S211, after finding the headset theme adapted to the protective cover AS-1, the electronic device may detect an operation performed by the user to preview the headset theme, for example, an operation of tapping the preview control 1321 in the user interface 1320 shown in FIG. 13D. In response to the operation, the electronic device may display the example preview interface 1410 of the headset image theme shown in FIG. 14A to FIG. 14D, where the preview interface is used to display an image interface element in the headset theme found in S209. As shown in FIG. 14E, the electronic device may further display an audition interface of a headset sound theme, where the audition interface is used to present the audition option 1412 of each alert tone in the headset theme found in S209, so that the user can audition the alert tone.

For example, in S212 and S213, after finding the headset theme adapted to the protective cover AS-1, the electronic device may detect an operation performed by the user to apply the headset theme, for example, an operation of tapping the apply control 1411 shown in FIG. 14A to FIG. 14E. In response to the operation, the electronic device may replace a previously used headset theme with the headset theme found in S209. Different from the previously used headset theme, the headset theme found in S209 may be referred to as a new headset theme. For replacement of the headset theme, refer to the related descriptions in the foregoing embodiments. Details are not described herein again.

Phase 3 (S214 to S218): After Replacement of the Headset Theme

For Phase 3, refer to Phase 3 in the embodiment in FIG. 21C. Details are not described herein again.

In the embodiment in FIG. 22A to FIG. 22C, headset theme adaptation may be implemented based on the headset themes stored in the electronic device, to meet a personalized requirement of the user and improve user experience. Similarly, headset theme adaptation may also be implemented based on a mobile phone theme stored in the electronic device, where the mobile phone theme includes a headset theme, and a headset theme included in a mobile phone theme adapted to the protective cover AS-1 is adapted to the protective cover AS-1. How to replace the previously used headset theme with the headset theme in the adapted mobile phone theme is described in the foregoing embodiments. Details are not described herein again.

In addition to adapting the headset theme to the new protective cover AS-1 based on the cloud server and adapting the headset theme to the new protective cover AS-1 based on local search in the foregoing embodiments, the electronic device 100 may further adapt the headset theme to the new protective cover AS-1 through instant sharing. Details are provided below.

Figure 23A:
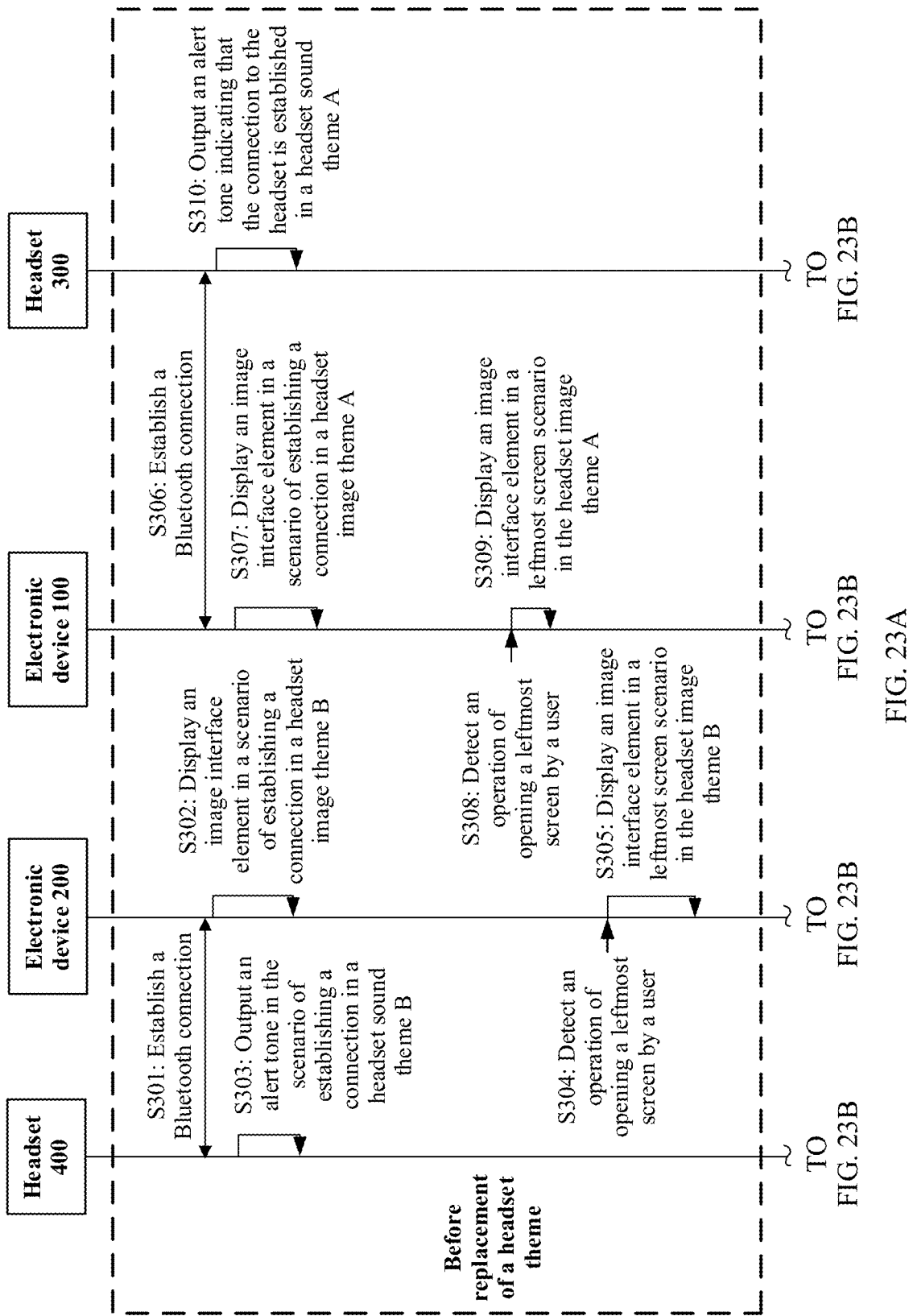
FIG. 23A to FIG. 23C are a schematic flowchart of an adaptation method based on sharing a headset theme by another electronic device according to an embodiment of this application.
Figure 23B:
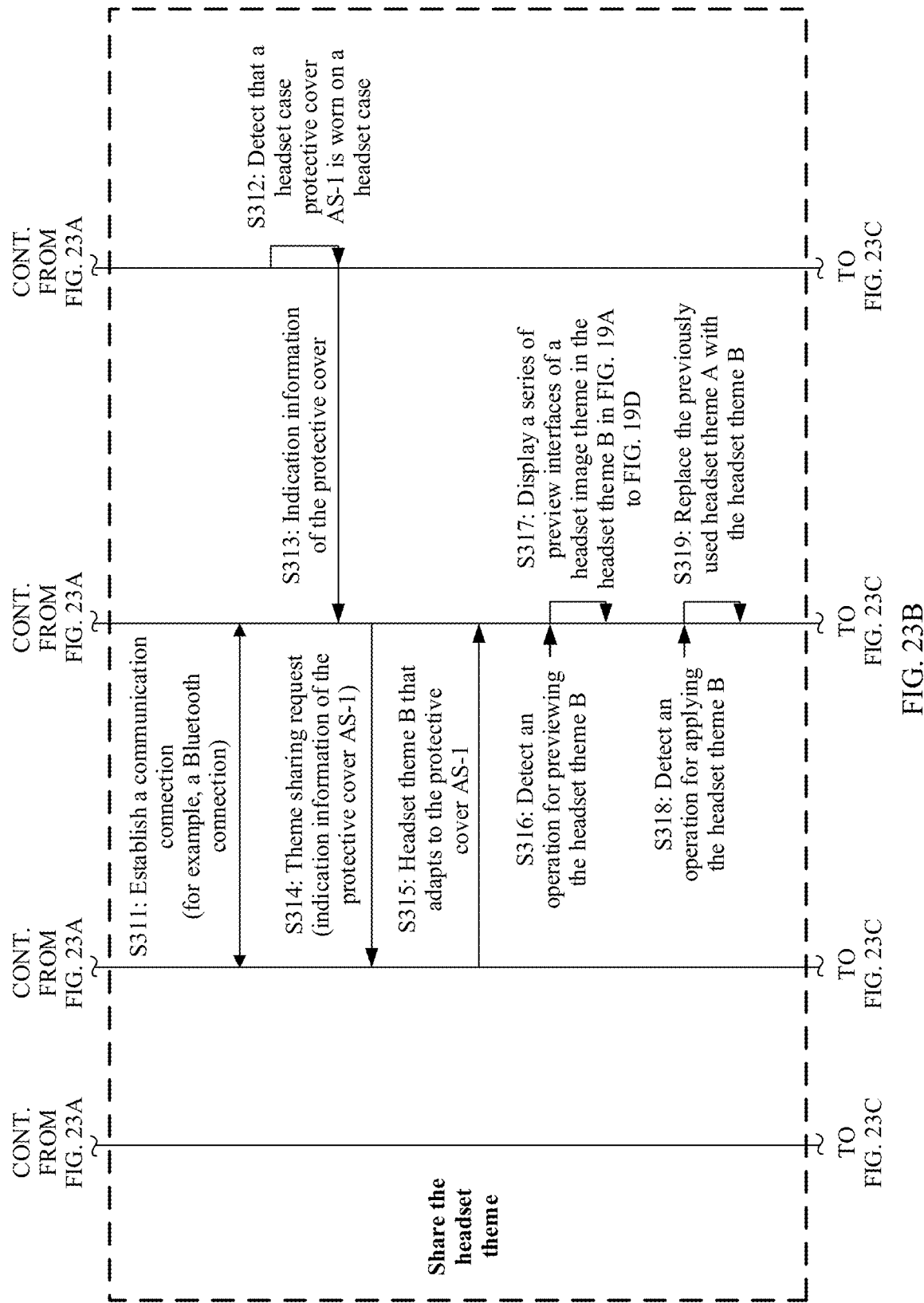
Figure 23C:
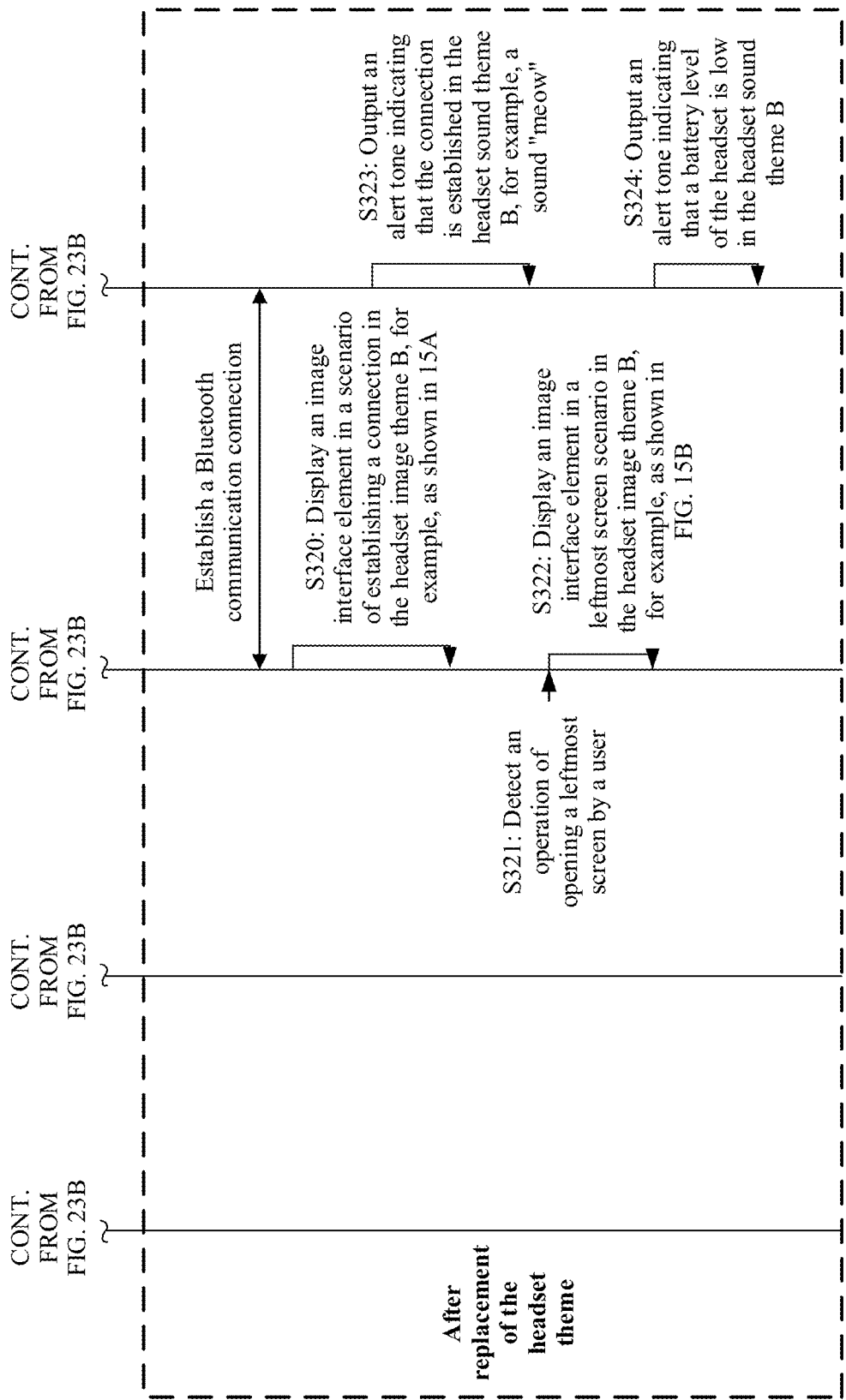

FIG. 23A to FIG. 23C show an example of a procedure of an accessory theme adaptation method based on instant sharing according to an embodiment of this application. Details are provided below.

Phase 1 (S301 to S310): Before Sharing of a Headset Theme

S301 to S305: Before sharing of the headset theme, a sharing party presents a headset theme B in various usage scenarios.

Specifically, an electronic device 200 of the sharing party ("user 1") may present the headset theme B in different usage scenarios, where the headset theme B may include a headset image theme B and a headset sound theme B. The electronic device 200 may specifically present the headset image theme B in different usage scenarios (referring to Table 1), and a headset 400 connected to the electronic device 200 may specifically present the headset sound theme B in different usage scenarios (referring to Table 2).

S306 to S310: Before sharing of the headset theme, a shared party presents a headset theme A in various usage scenarios.

Specifically, an electronic device 100 of the shared party ("user 2") may present the headset theme A in different usage scenarios, where the headset theme A may include a headset image theme A and a headset sound theme A. The electronic device 100 may specifically present the headset image theme A in different usage scenarios (referring to Table 1), and a headset 300 connected to the electronic device 100 may specifically present the headset sound theme A in different usage scenarios (referring to Table 2).

For S301 to S305, refer to Phase 3 in the embodiment in FIG. 22C. For S306 to S310, refer to Phase 1 in the embodiment in FIG. 21A. Details are not described herein again. A difference lies in that an image resource and an audio resource referenced by the headset theme B may be different from an image resource and an audio resource referenced by the headset theme A.

Phase 2 (S311 and S312): Implement Headset Theme Adaptation Through Instant Sharing S311: Establish a communication connection between the electronic device 100 and the electronic device 200.

The communication connection may be established before the shared party requests the sharing party to share the headset theme, or may be established when the shared party requests the sharing party to share the headset theme. This is not limited in this embodiment of the present invention.

The communication connection may be a Bluetooth connection. FIG. 17A and FIG. 17B show examples of user interfaces for establishing a Bluetooth connection between an electronic device 100 of a sharing party and an electronic device 200 of a shared party. For details, refer to the descriptions in the foregoing embodiments. In addition to the Bluetooth connection, a connection established between the electronic device 100 and the electronic device 200 may also be another communication connection, for example, a Wi-Fi direct connection, a Wi-Fi connection, or a cellular mobile communication connection. When the connection between the electronic device 100 and the electronic device 200 is a short-range communication connection such as a Bluetooth connection or a Wi-Fi direct connection, the electronic device 200 is a device near the electronic device 100. When the connection between the electronic device 100 and the electronic device 200 is a short-range communication connection such as a Wi-Fi connection or a cellular mobile communication connection, the electronic device 200 may be a remote device that can be accessed by the electronic device 100.

S312: A headset 300 of the shared party may detect that an appearance part of the headset 300 changes, that is, a new protective cover AS-1 is worn. For details, refer to S107 in the embodiment in FIG. 21B. The details are not described herein again.

S313: The headset 300 of the shared party may send indication information of the protective cover AS-1 to the electronic device 100 of the shared party.

S314 and S315: The electronic device 100 may send a sharing request to the electronic device 200, where the sharing request may carry the indication information of the protective cover such as a device model and a device identifier of the protective cover AS-1, or a theme identifier and a theme name of a headset theme that adapts to the protective cover AS-1, to request the electronic device 200 to share the headset theme that adapts to the protective cover AS-1. Correspondingly, the electronic device 200 may receive the sharing request from the electronic device 100. In response to the request, the electronic device 200 may send, to the electronic device 100, a headset theme B adapted to the protective cover AS-1.

That is, for a new appearance part (the headset case protective cover AS-1) of the headset, the electronic device 100 may request the nearby electronic device 200 or the remote electronic device 200 to share the adapted headset theme B.

For a human-computer interaction process in an instant sharing process of the headset theme, refer to the foregoing descriptions of FIG. 18A to FIG. 18D. Details are not described herein again. The headset theme B may be the "Cute animal" headset theme mentioned in the foregoing content.

S316 to S319: Preview and apply the instantly shared headset theme B.

For example, in S316 and S317, after receiving the headset theme B adapted to the protective cover AS-1 from the electronic device 200, the electronic device 100 may detect an operation performed by the user to preview the headset theme B, for example, an operation of tapping the preview control 1814 in the notification 1813 shown in FIG. 18D. In response to the operation, the electronic device 100 may display the series of example preview interfaces of the headset image theme in the headset theme B shown in FIG. 19A to FIG. 19D, and an audition option 1912 of the headset sound theme in the headset theme B shown in FIG. 19E.

For example, in S318 and S319, after receiving the headset theme B adapted to the protective cover AS-1 from the electronic device 200, the electronic device 100 may further detect an operation performed by the user to apply the headset theme B, for example, an operation of tapping the apply control 1911 shown in FIG. 19A to FIG. 19E. In response to the operation, the electronic device 100 may replace the previously used headset theme A with the headset theme B. For replacement of the headset theme, refer to the related descriptions in the foregoing embodiments. Details are not described herein again.

Phase 3 (S320 to S324): After Replacement of the Headset Theme

Specifically, after sharing of the headset theme, the shared party presents a headset theme A in various usage scenarios.

Specifically, the electronic device 100 of the shared party ("user 2") may present the headset theme A in different usage scenarios, where the headset theme A may include the headset image theme A and the headset sound theme A. The electronic device 100 may specifically present the headset image theme A in different usage scenarios (referring to Table 1), and the headset 300 connected to the electronic device 100 may specifically present the headset sound theme A in different usage scenarios (referring to Table 2).

For S320 to S34, refer to Phase 3 in the embodiment in FIG. 21C. Details are not described herein again.

It can be learned that, in the embodiment in FIG. 23A to FIG. 23C, headset theme adaptation may be implemented through instant sharing of the headset theme, to meet a personalized requirement of the user and improve user experience. Similarly, headset theme adaptation may also be implemented through instant sharing of a mobile phone theme, where the mobile phone theme includes a headset theme, and a headset theme included in a mobile phone theme adapted to the protective cover AS-1 is adapted to the protective cover AS-1. How to replace the previously used headset theme with the headset theme in the adapted mobile phone theme is described in the foregoing embodiments. Details are not described herein again.

The headset themes stored in the electronic device 100 may be generated and obtained through searching on a network or local modeling based on an image that is of a headset/headset case/headset case protective cover and that is shot by a camera of the electronic device 100. Descriptions are provided in detail below with reference to FIG. 24A and FIG. 24B, FIG. 25A to FIG. 25H, FIG. 26, FIG. 27A to FIG. 27I, FIG. 28A and FIG. 28B, and FIG. 29A and FIG. 29B.

FIG. 24A and FIG. 24B, FIG. 25A to FIG. 25H, FIG. 26, FIG. 27A to FIG. 27I, and FIG. 28A and FIG. 28B show examples of a series of user interfaces for generating a headset image theme by searching for a headset theme on a network/through local modeling by using a picture shot by a camera to replace the headset theme/headset image theme.

Figure 24A:
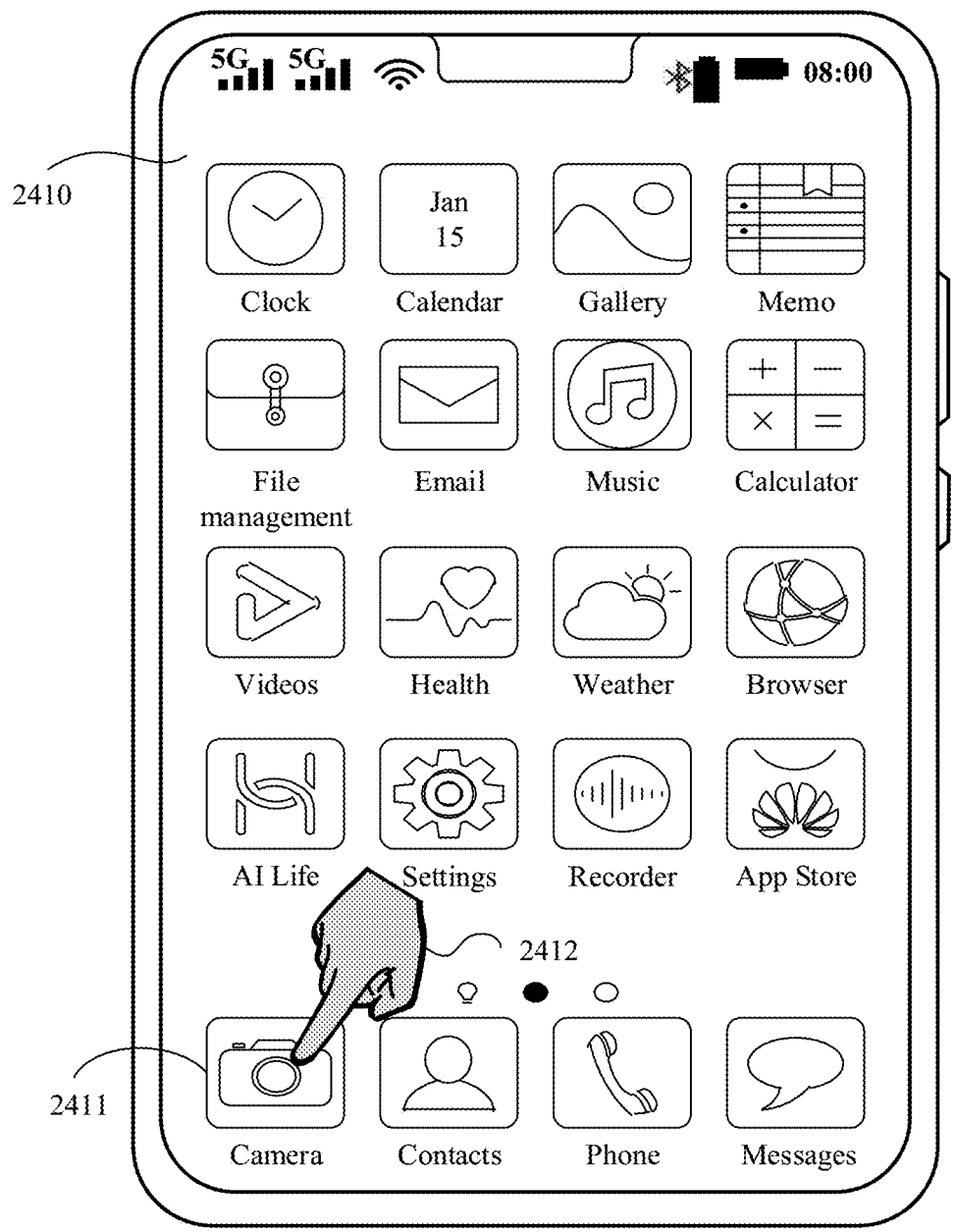
FIG. 24A and FIG. 24B are schematic diagrams of another group of interfaces according to an embodiment of this application.
Figure 24B:
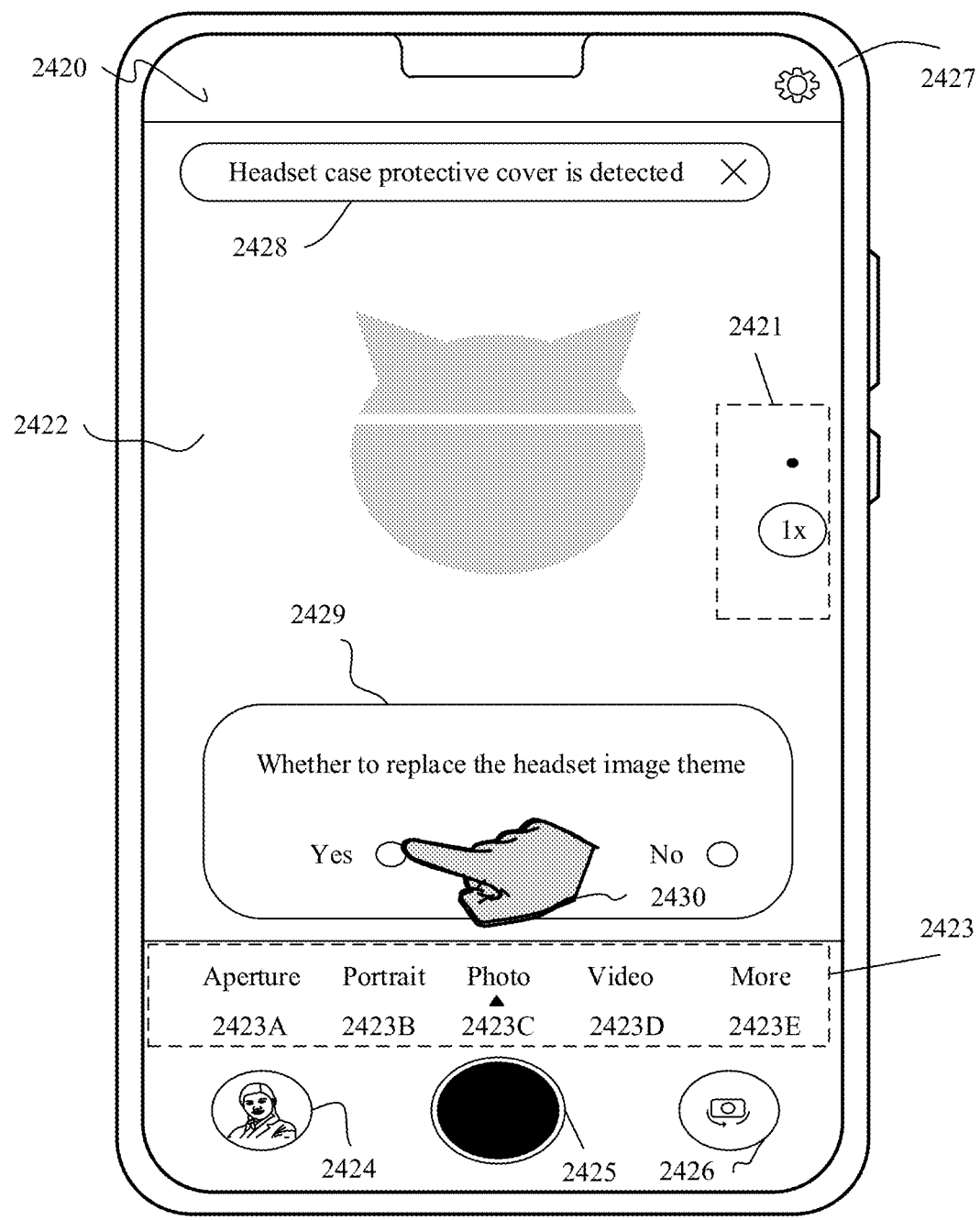

(1) FIG. 24B shows an example of a user interface for recognizing a shooting scenario through artificial intelligence (AI).

As shown in FIG. 24A, the electronic device 100 detects an operation of opening a "Camera" application by a user (for example, an operation 2412 of tapping an example camera application icon 2411 shown in FIG. 24A). In response to the operation, the electronic device 100 may display an example user interface 2420 of the camera application shown in FIG. 24B.

The user interface 2420 may be a user interface of a default shooting mode of the camera application, and may be used by the user to perform shooting by using the camera (a front-facing camera or a rear-facing camera) of the electronic device 100. When the camera application is opened, the electronic device 100 may display, in the user interface 2420, an image collected by the camera. The camera application is an image shooting application on an electronic device such as a smartphone or a tablet computer. A name of the application is not limited in this application. That is, the user may tap the camera application icon 2411 to open the user interface 2420 of the camera application. In addition to the camera application, the user may also open a user interface 2420 in another application.

As shown in FIG. 24B, the user interface 2420 may include a zoom ratio 2421, a preview box 2422, a camera mode option 2423, a gallery shortcut control 2424, a shooting control 2425, a camera flip control 2426, and a setting control 2427.

The zoom ratio 2421 may be used to indicate a scale of transformation of a preview angle of view presented by an image displayed in the preview box 2422. A larger zoom ratio 2421 indicates a smaller preview angle of view presented by the image displayed in the preview box 2422. Conversely, a smaller zoom ratio 2421 indicates a larger preview angle of view presented by the image displayed in the preview box 2422. As shown in FIG. 24B, 1X may be a default zoom ratio of the camera application. The default zoom ratio is not limited in this embodiment of this application.

One or more shooting mode options may be displayed in the camera mode option 2423. The one or more shooting mode options may include an aperture mode option 2423A, a portrait mode option 2423B, a photo mode option 2423C, a video mode option 2423D, and a more option 2423E. The one or more shooting mode options may be represented as text information in the interface, for example, "Aperture", "Portrait", "Photo", "Video", and "More". In addition to the text information, the one or more shooting mode options may also be represented as icons or interactive elements (IE) in other forms in the interface. When the electronic device 100 detects a user operation performed on a shooting mode option, in response to the operation, the electronic device 100 may enable a shooting mode selected by the user. Specifically, when the electronic device 100 detects a user operation performed on the more option 2423E, in response to the operation, the electronic device 100 may further display more other shooting mode options, such as a slow-motion shooting mode option, to present more abundant shooting functions to the user. In addition to that shown in FIG. 24B, the more option 2423E may not be displayed in the camera mode option 2423, and the user may browse another shooting mode option by sliding leftward/rightward in the camera mode option 2423.

The gallery shortcut control 2424 may be used to open a gallery application, and may support the user to conveniently view shot a picture and a video without exiting the camera application and then opening the gallery application. The gallery application is a picture management application on an electronic device such as a smartphone or a tablet computer, and may also be referred to as "Albums". A name of the application is not limited in this embodiment. The gallery application may support the user in performing various operations on a picture and a video that are stored in the electronic device, for example, operations such as browsing, editing, deletion, and selection.

The shooting control 2425 may be used to listen on a user operation used to trigger image collection, such as shooting or recording. The electronic device 100 may detect a user operation performed on the shooting control 2425, for example, a tap operation. In response to the operation, the electronic device 100 may store the image in the preview box 2422 as a picture or a video in the gallery application. In addition, the electronic device 100 may further display a thumbnail of the stored picture or video in the gallery shortcut control 2424.

The camera flip control 2426 may be used to listen on a user operation used to trigger camera flip. The electronic device 100 may detect a user operation performed on the camera flip control 2426, for example, a tap operation. In response to the operation, the electronic device 100 may flip the camera, for example, switch a rear-facing camera to a front-facing camera.

The setting control 2427 may be used to adjust parameters (such as a resolution and a filter) for shooting an image, and enable or disable some manners for shooting (such as scheduled shooting, smile capturing, and voice-activated shooting). The setting control 2427 may be further used to set more other shooting functions. This is not limited in this embodiment of this application.

The preview box 2422 may be used to display an image collected by the camera in real time. The electronic device 100 may display, in the preview box 2422, the image collected by the camera.

As shown in FIG. 24B, when the electronic device 100 identifies a headset case protective cover from images in the preview box 2422, the electronic device 100 may display a prompt 2428 and a prompt 2429 in the preview box 2422, where the prompt 2428 may be used to indicate the user that a current shooting scenario is identified as a shooting scenario of the headset case protective cover, and the prompt 2429 may be used to prompt the user to replace a headset theme. The electronic device 100 may detect an operation 2430 performed by the user to trigger replacement of the headset theme (for example, a tap operation 2430 on the prompt 2429). In response to the operation 2430, the electronic device 100 may display an example user interface 2510 for guiding the user to shoot the headset case protective cover shown in FIG. 25A. That is, when the current shooting scenario is identified (for example, through AI recognition) as the shooting scenario of the headset case protective cover, the electronic device 100 may further guide the user to shoot an image of the headset case protective cover, to provide an image resource for subsequently generating a new headset theme.

(2) FIG. 25A to FIG. 25H show examples of user interfaces for guiding a user to shoot a headset case protective cover.

Figure 25A:
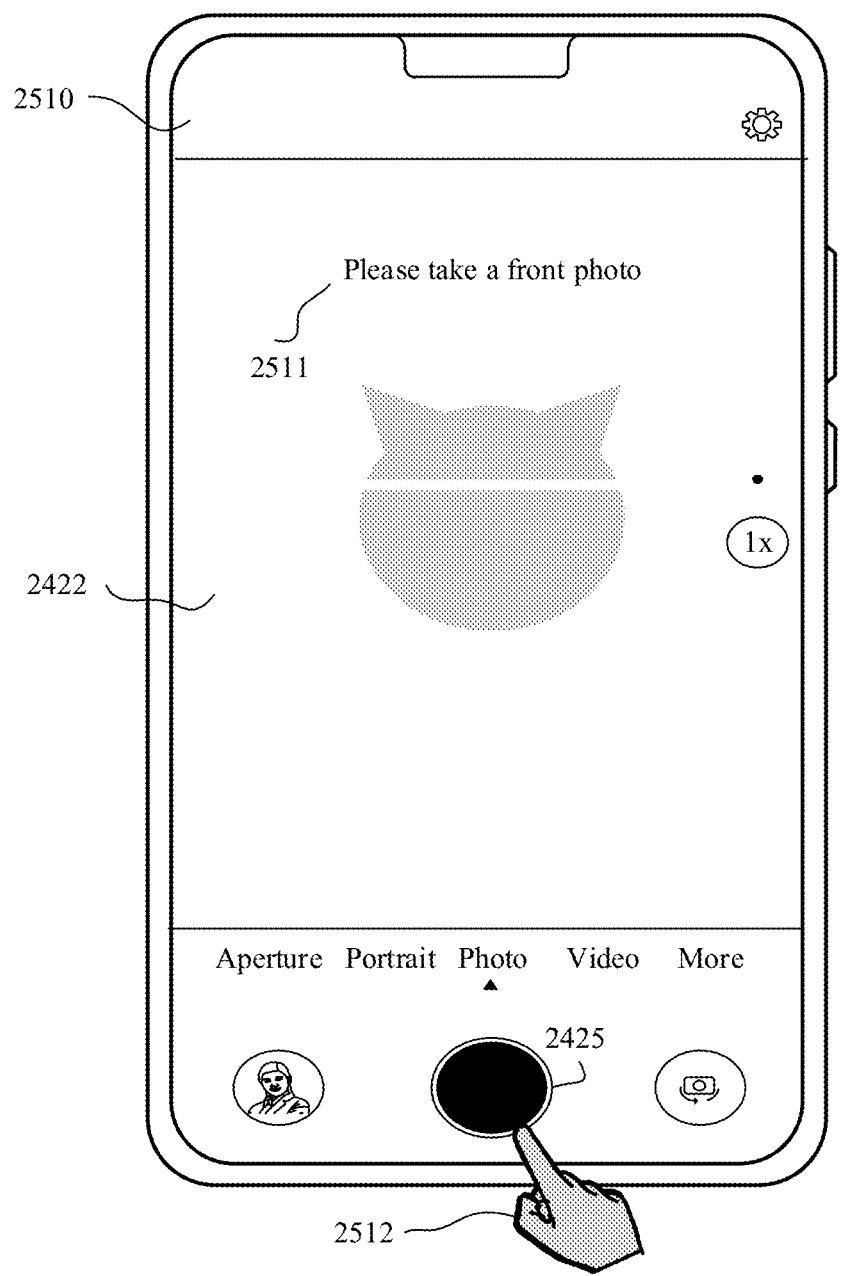
FIG. 25A to FIG. 25H are schematic diagrams of another group of interfaces according to an embodiment of this application.

FIG. 25A shows an example of a user interface 2510 for guiding a user to shoot a front side of a headset case protective cover. As shown in FIG. 25A, the user interface 2510 may display a prompt 2511, and the prompt 2511 may be used to prompt the user to shoot a front side of the headset case protective cover.

The electronic device 100 may detect a user operation 2512 performed on the shooting control 2425. In response to the operation 2512, the electronic device 100 may store the shot image as a picture in the gallery. The picture may be used as a basis for subsequently obtaining the new headset theme.

Figure 25B:
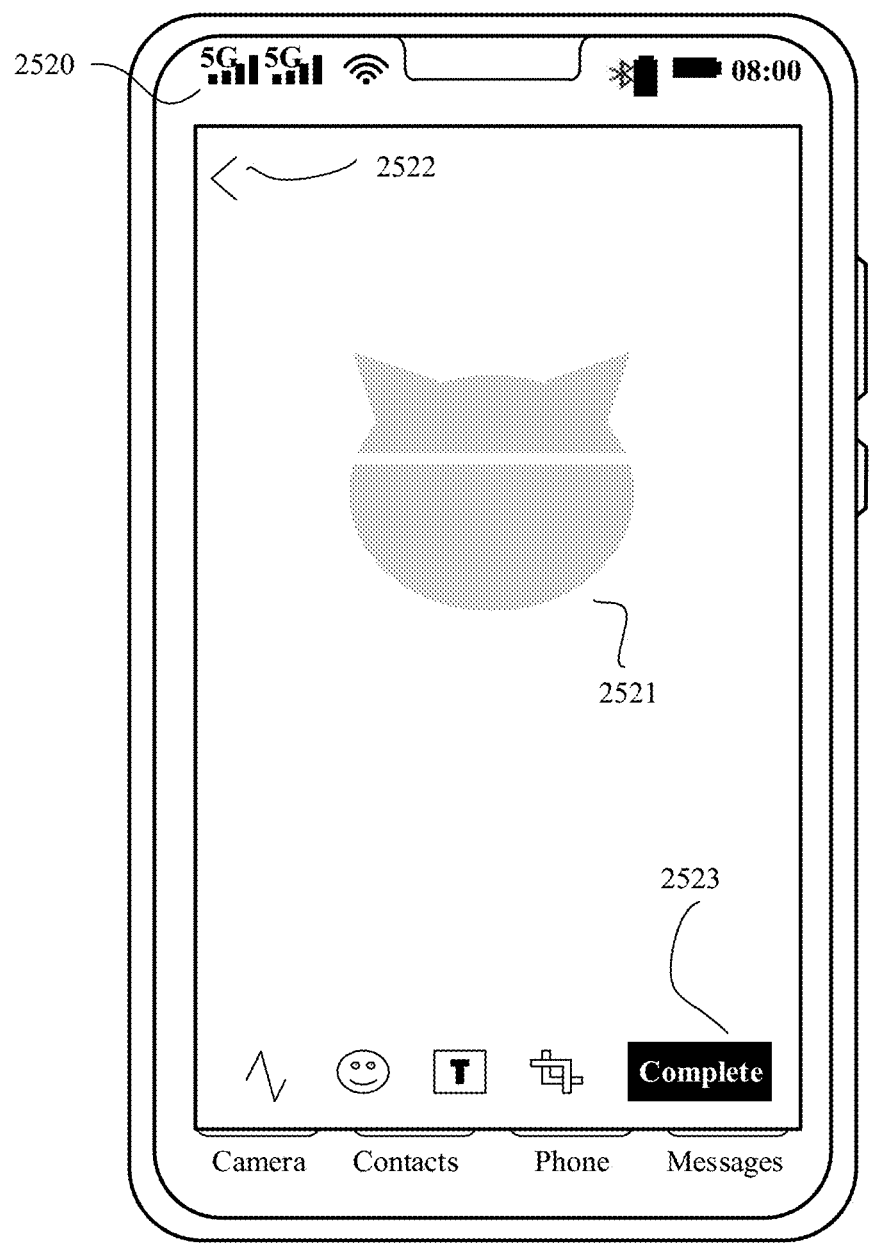

The electronic device 100 may further display a picture preview interface 2520 shown in FIG. 25B, so that the user first previews a shot picture and then determines whether to store the picture. When detecting a user operation for confirming storing the shot picture, for example, an operation of tapping a control 2523 in the picture preview interface 2520, the electronic device 100 may store the picture in the gallery. When detecting a user operation for canceling storing the shot picture, for example, an operation of tapping a control 2522 in the picture preview interface 2520, the electronic device 100 does not store the picture in the gallery, and cancels displaying the picture preview interface 2520, so that the user returns to the user interface 2510, to help the user re-shoot the headset case protective cover.

Figure 25C:
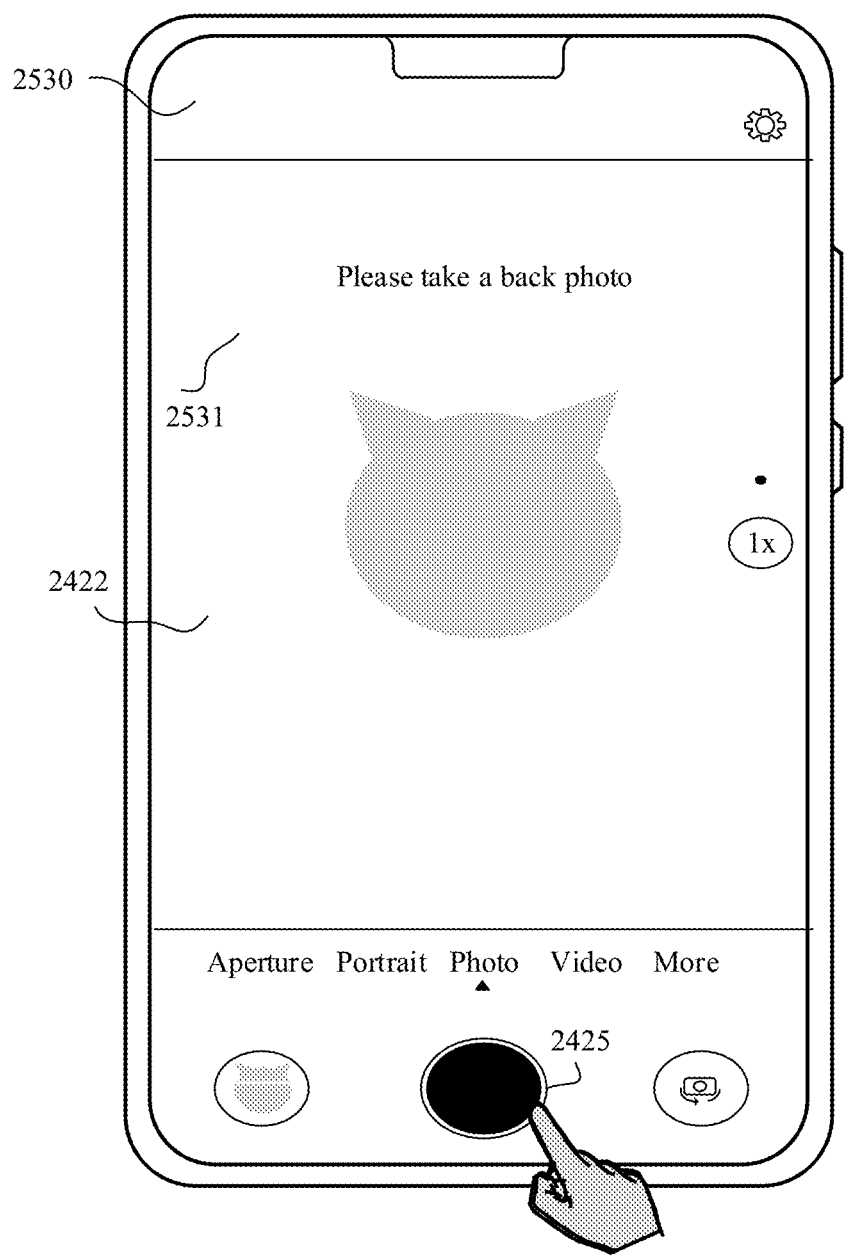
Figure 25D:
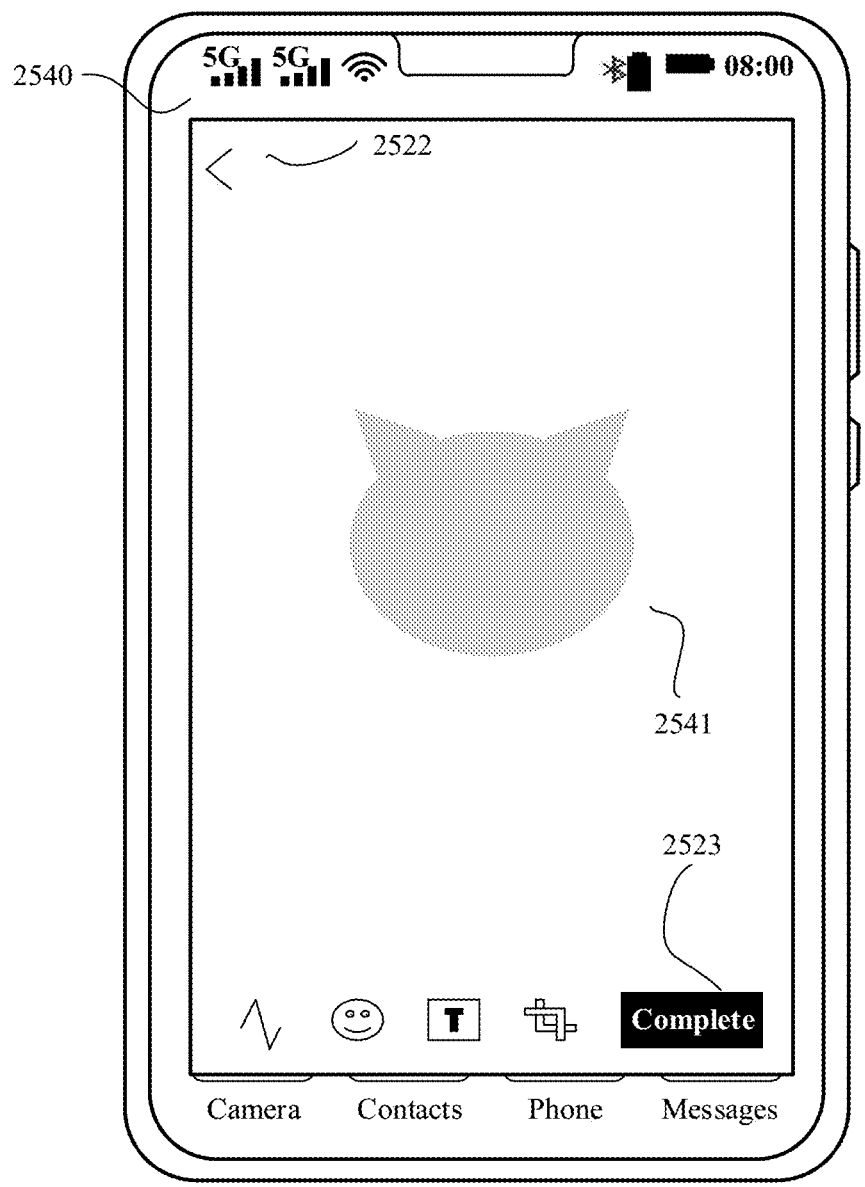

FIG. 25C shows an example of a user interface 2530 for guiding a user to shoot a back side of a headset case protective cover. To help the user first preview a shot picture and then determine whether to store the picture, in addition to the user interface 2530 shown in FIG. 25C, the electronic device 100 may further display a picture preview interface 2540 shown in FIG. 25D. For user interaction related to the user interface 2530 and the picture preview interface 2540, respectively refer to user interaction related to the user interface 2510 and the picture preview interface 2520. Details are not described herein again.

Figure 25E:
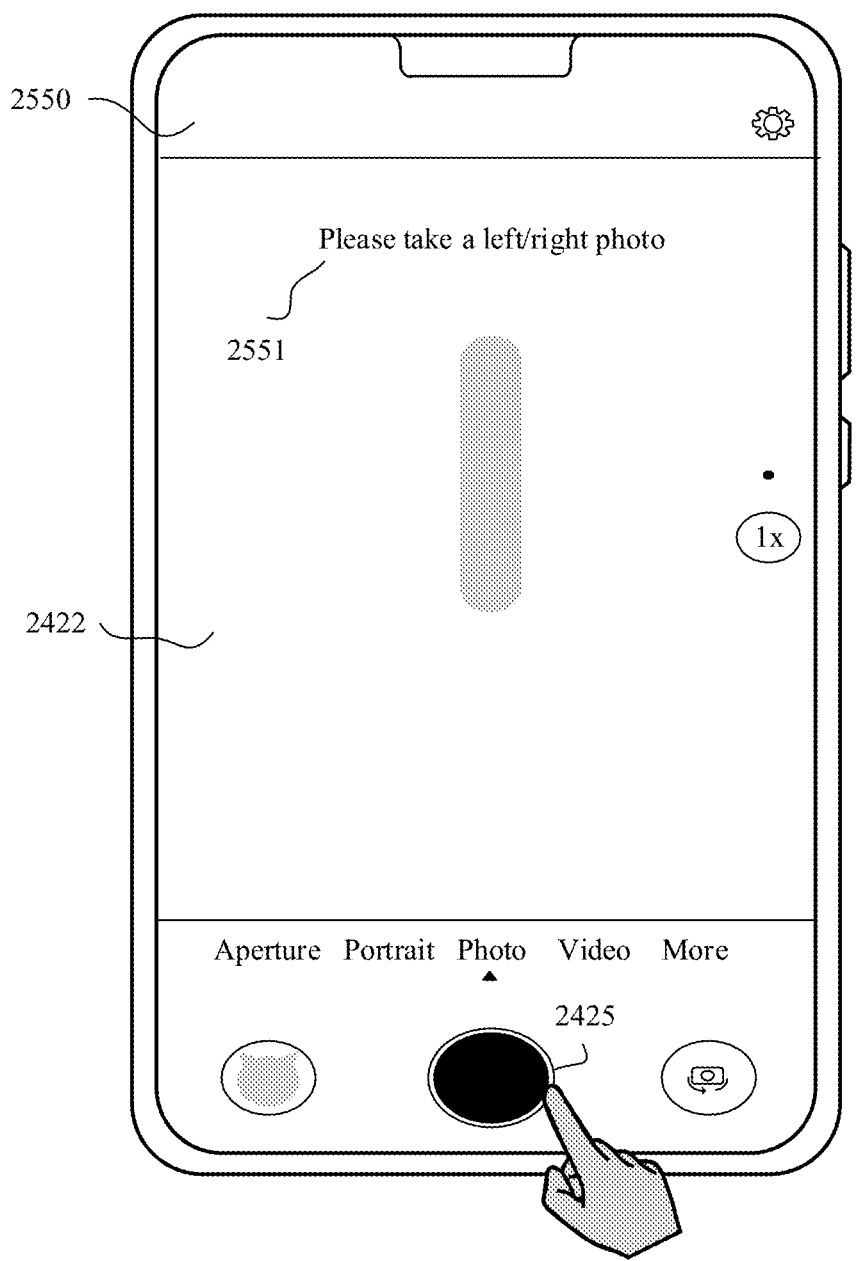
Figure 25F:
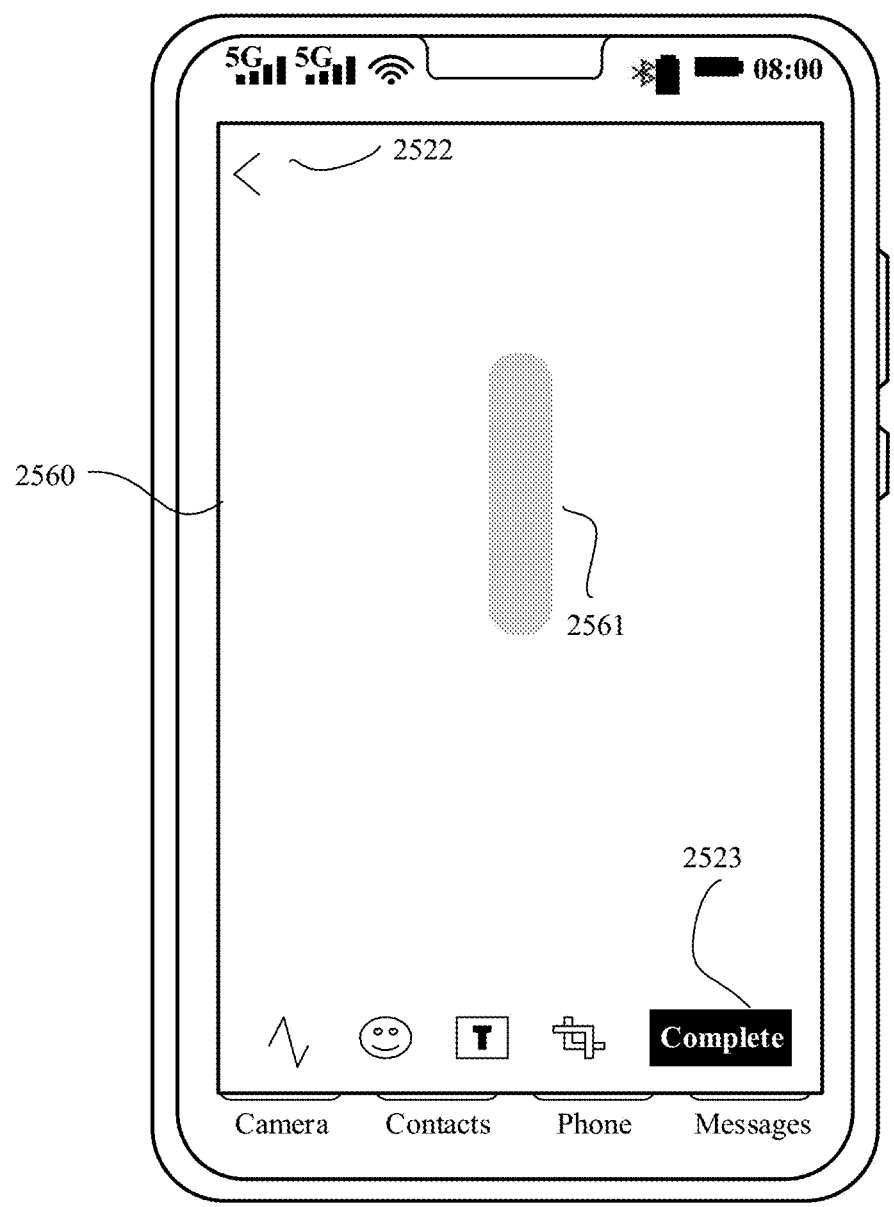

FIG. 25E shows an example of a shooting interface 2550 of a left/right picture of a headset case protective cover. To help the user first preview the shot picture and then determine whether to store the picture, in addition to the user interface 2550 shown in FIG. 25E, the electronic device 100 may further display a picture preview interface 2560 shown in FIG. 25F. For user interaction related to the user interface 2550 and the picture preview interface 2560, respectively refer to user interaction related to the user interface 2510 and the picture preview interface 2520. Details are not described herein again.

Figure 25G:
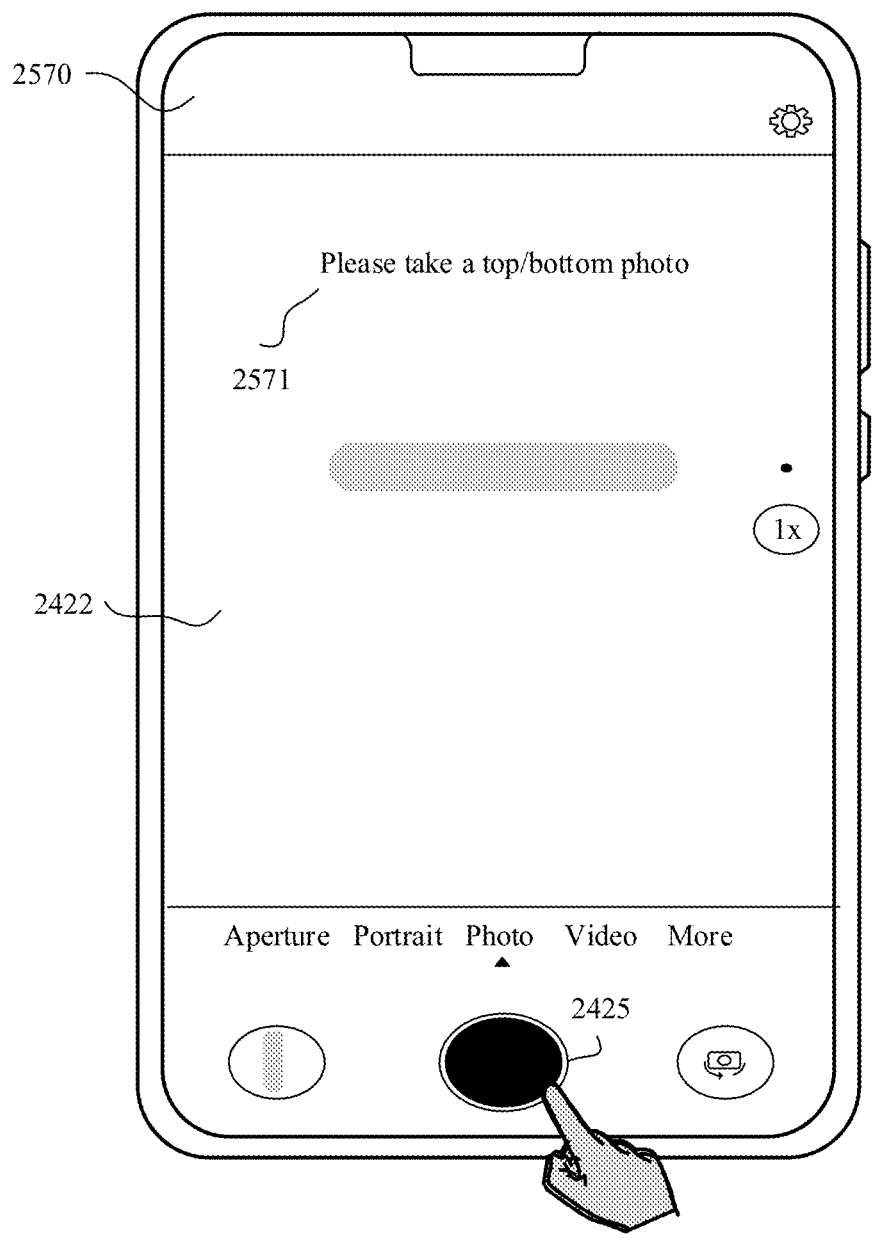
Figure 25H:
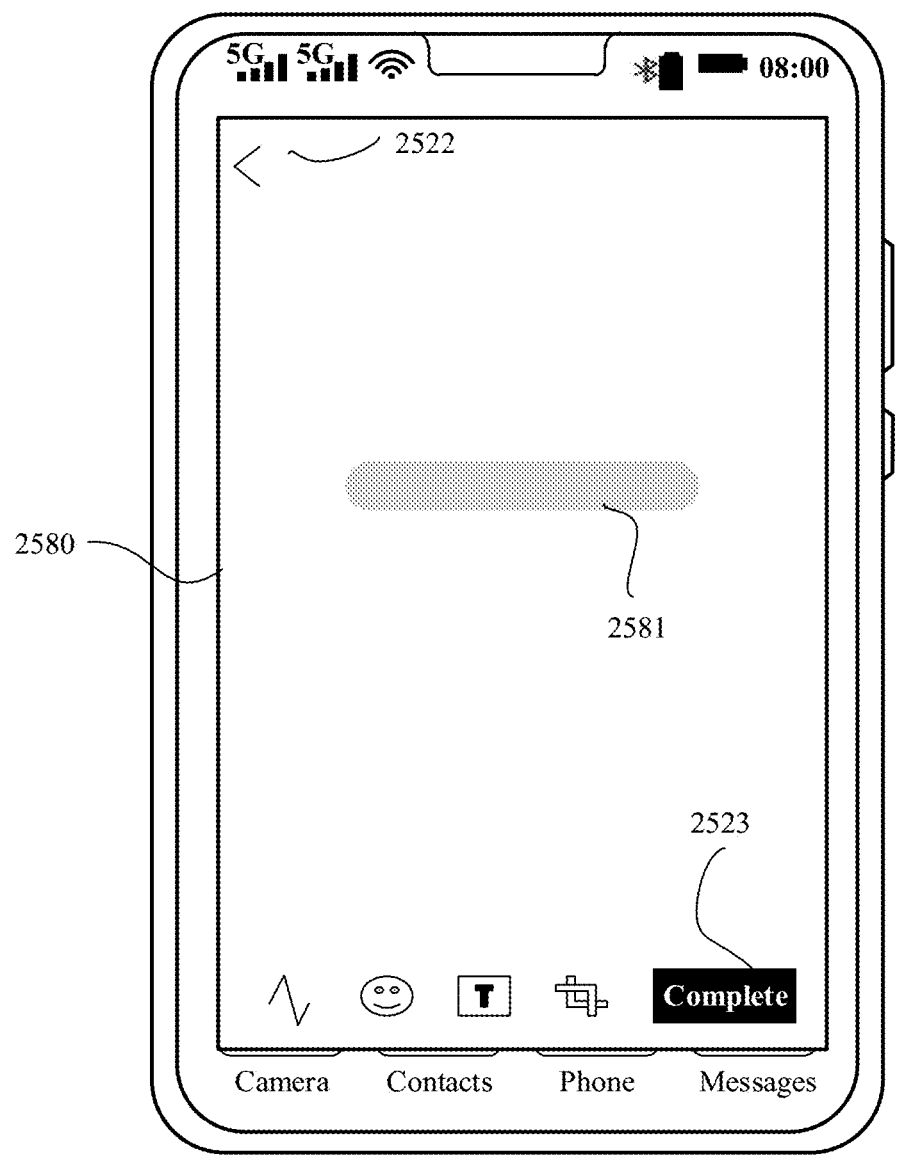

FIG. 25G shows an example of a shooting interface 2570 of a top/bottom picture of a headset case protective cover. To help the user first preview the shot picture and then determine whether to store the picture, in addition to the user interface 2570 shown in FIG. 25G, the electronic device 100 may further display a picture preview interface 2580 shown in FIG. 25H. For user interaction related to the user interface 2570 and the picture preview interface 2580, respectively refer to user interaction related to the user interface 2510 and the picture preview interface 2520. Details are not described herein again.

Optionally, in some embodiments of this application, to enable the electronic device 100 to perform more accurate search or modeling, pictures of the headset case protective cover may further need to be shot from more angles. Correspondingly, it may be understood that, in some embodiments of this application, a user interface for guiding the user to shoot pictures of the headset case protective cover from more angles may be further included. In an example, pictures of the headset case protective cover from six dimensional angle of views may be included, for example, a main view, a rear view, a bottom view, a left view, a right view, and a top view. In another embodiment, more pictures from other angle of views may be further included. This is not limited in this application.

Optionally, in some embodiments of this application, the electronic device 100 may continuously shoot a plurality of pictures of the headset case protective cover from different angles at a time, so that the plurality of pictures are used as a basis for subsequently searching for a headset theme on a network or local modeling. It should be noted that in this embodiment of this application, a sequence of shooting the front picture, the back picture, the left/right picture, and the top/bottom picture of the headset case protective cover may be changed. This is not limited herein.

Figure 26:
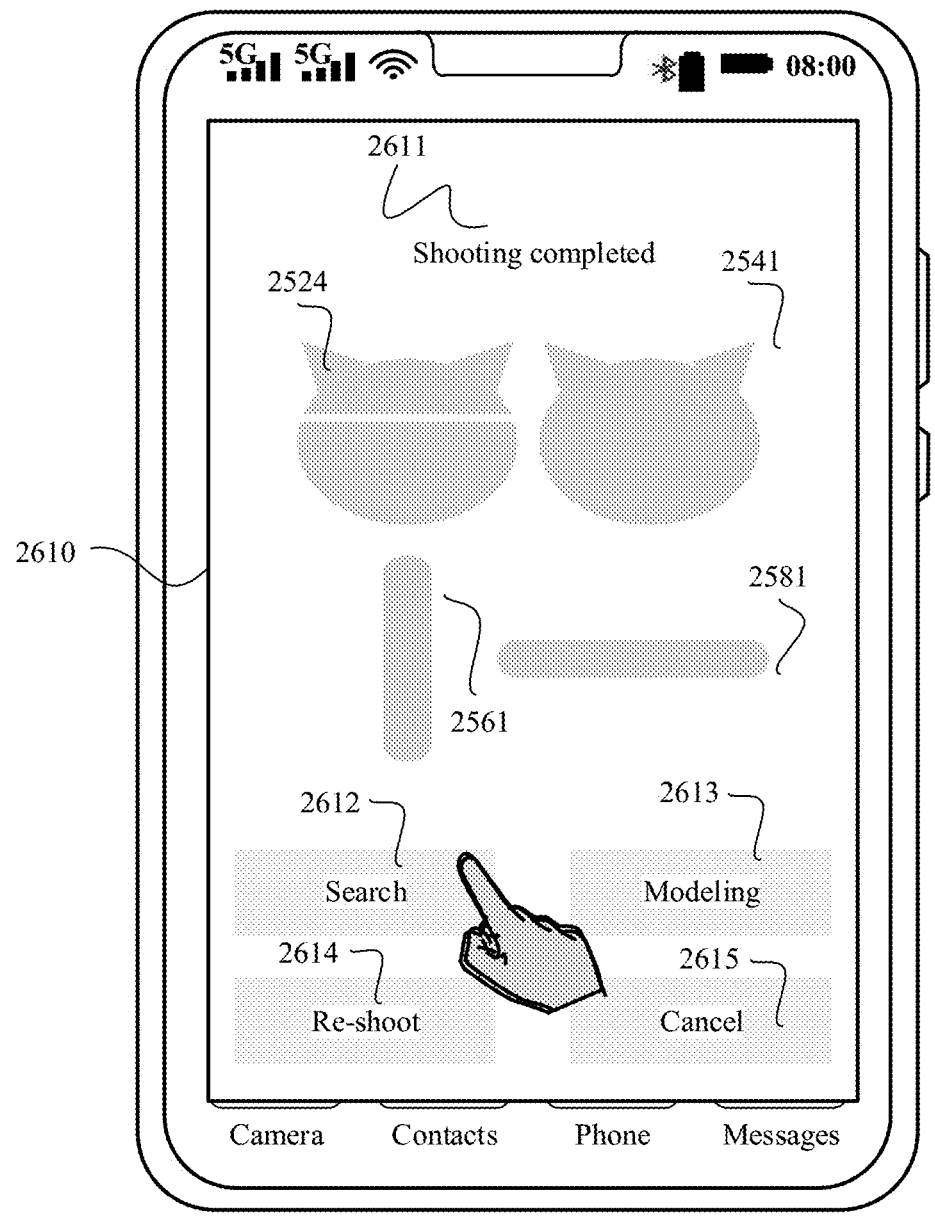
FIG. 26 is a schematic diagram of an interface according to an embodiment of this application.

(3) FIG. 26 shows an example of a user interface in which shooting of a headset case protective cover is completed.

When detecting that a user completes shooting of the headset case protective cover, the electronic device 100 may display an example user interface 2610 shown in FIG. 26. As shown in FIG. 26, the user interface 2610 may display a front picture 2521 of the headset case protective cover, a rear picture 2541 of the headset case protective cover, a left/right picture 2561 of the headset case protective cover, and a top/bottom picture 2581 of the headset case protective cover. The user interface 2610 may further display a prompt 2611, and the prompt 2611 may be used to indicate the user that shooting of the headset case protective cover is completed. The user interface 2610 may further display but is not limited to the following options: a search option 2612, a modeling option 2613, a re-shoot option 2614, and a cancel option 2615.

The electronic device 100 may detect a user operation performed on the search option 2612, for example, a tap operation on the search option 2612. In response to the operation, the electronic device 100 may search for a headset theme on a network by using a picture of the headset case protective cover that is shot by a camera. A user interface for searching for the headset theme is described in the following embodiments in FIG. 27A to FIG. 27D. Details are not described herein.

Alternatively, the electronic device 100 may detect a user operation performed on the modeling option 2613, for example, a tap operation on the modeling option 2613. In response to the operation, the electronic device 100 may generate a headset image theme through local modeling by using a picture of the headset case protective cover that is shot by a camera. A user interface for generating a headset image theme through local modeling is described in the following embodiments in FIG. 27E to FIG. 27I. Details are not described herein.

Alternatively, the electronic device 100 may detect a user operation performed on the re-shoot option 2614, for example, a tap operation on the re-shoot option 2614. In response to the operation, the electronic device 100 may return to the user interface shown in FIG. 25A, to re-guide the user to shoot the headset case protective cover.

Alternatively, the electronic device 100 may detect a user operation performed on the cancel option 2615, for example, a tap operation on the cancel option 2615. In response to the operation, the electronic device 100 may return to the user interface shown in FIG. 24A, to cancel shooting the headset case protective cover.

(4) FIG. 27A to FIG. 27D show examples of user interfaces for searching for a headset theme based on a shot picture and replacing a previously used headset theme with a found headset theme.

Figure 27A:
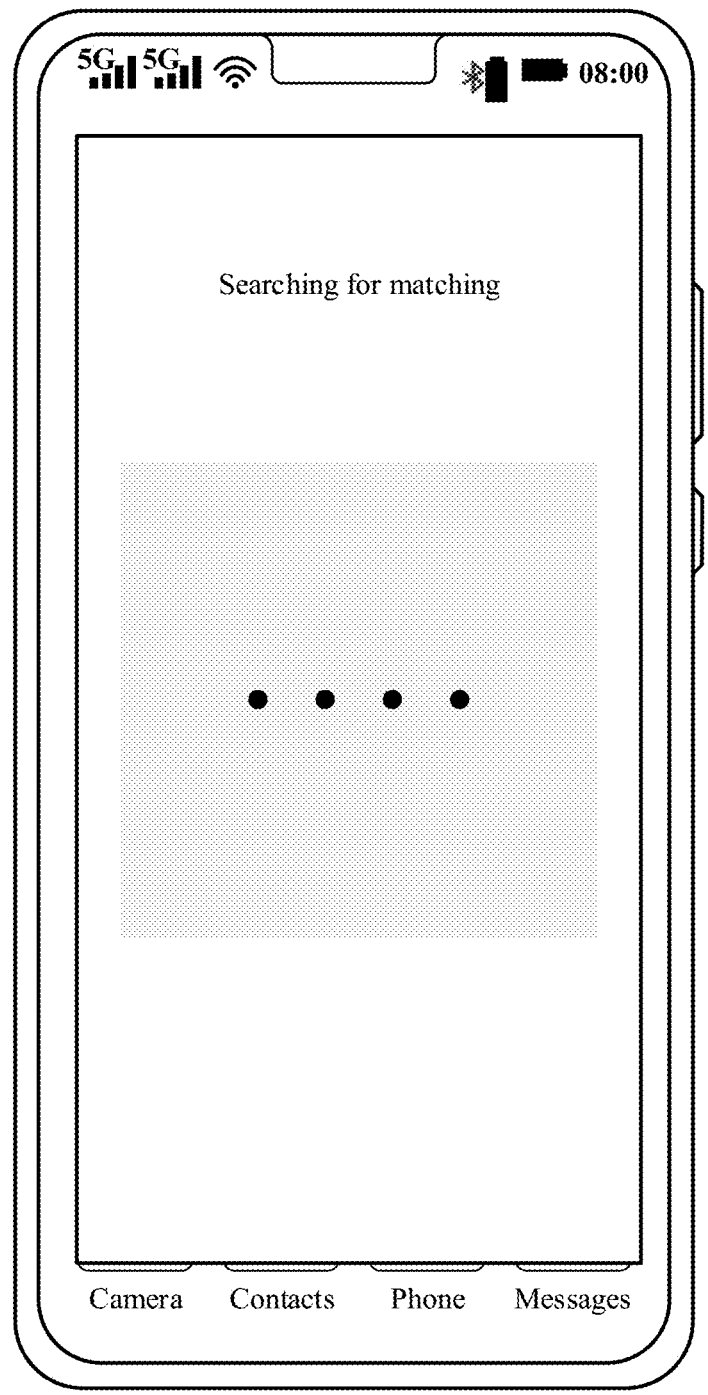
FIG. 27A to FIG. 27I are schematic diagrams of another group of interfaces according to an embodiment of this application.

As shown in FIG. 26 and FIG. 27A, after detecting that a user completes shooting of a picture, the electronic device 100 may further detect an operation that the user selects a "search" manner to obtain a headset theme. In response to the operation, the electronic device 100 may search for a matched headset theme on a network by using the shot picture. Herein, the matched headset theme is a headset theme in which a referenced image resource (for example, a picture or an icon) and a shot picture have exactly same or partially same image content.

Figure 27B:
Figure 27C:
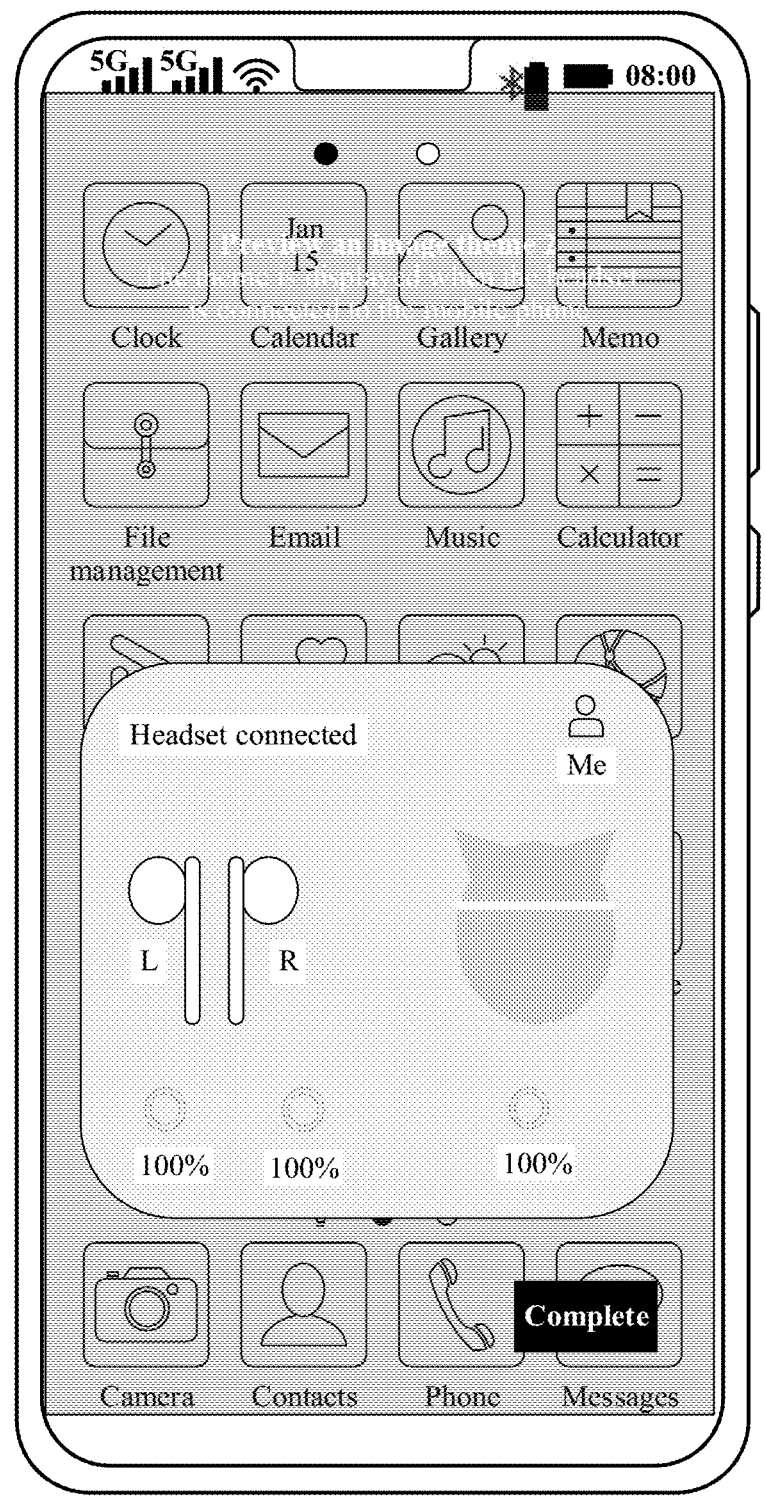

After finding the matched headset theme, the electronic device 100 may provide (that is, display) example theme preview interfaces shown in FIG. 27B and FIG. 27C, so that the user can preview the found headset theme, and the user can further determine whether to replace the headset theme.

Figure 27D:
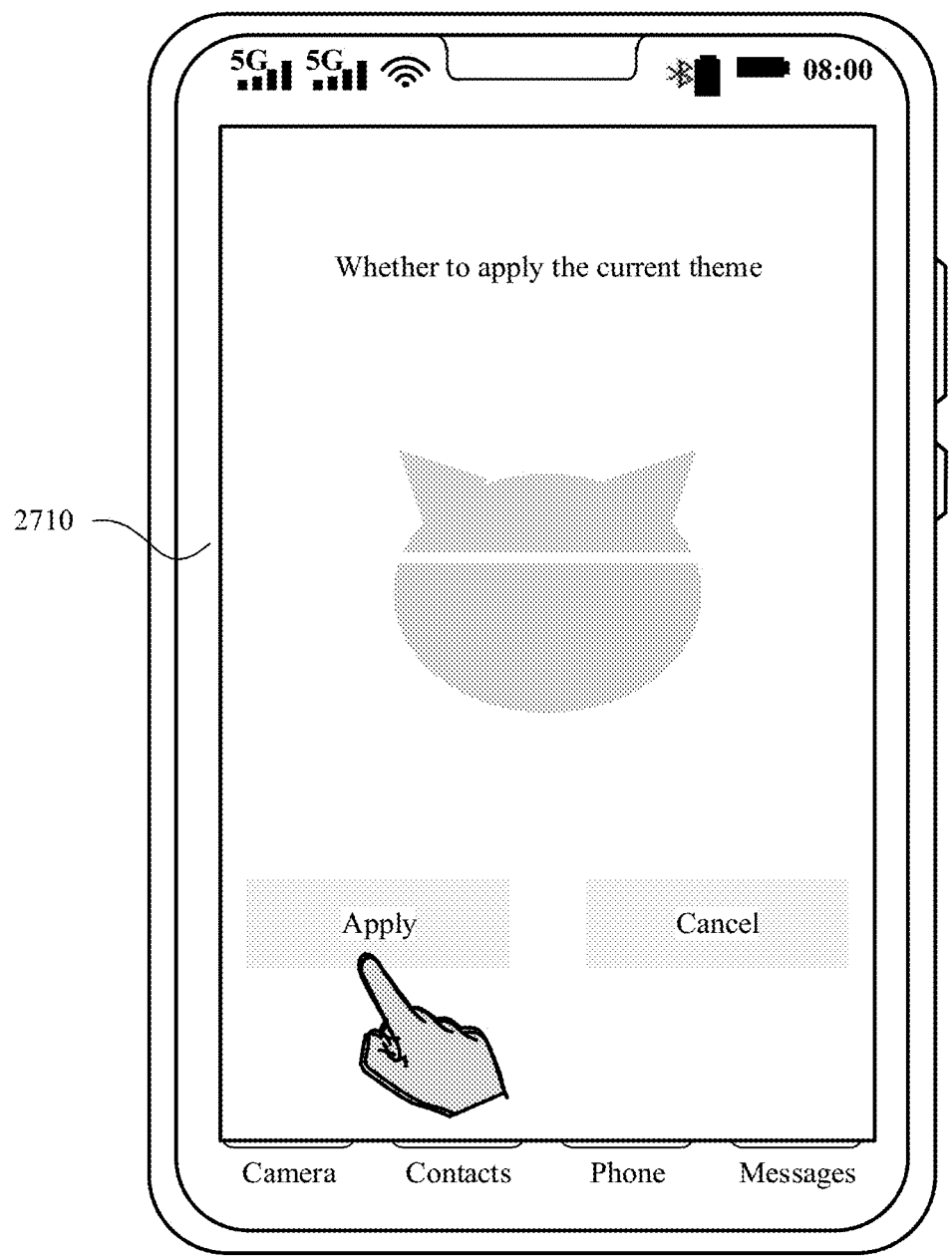

In addition, the electronic device 100 may further provide an example user interface 2710 shown in FIG. 27D, so that the user can apply the found headset theme. In response to a user operation for applying a found headset theme that is detected in the user interface 2710, for example, a tap operation on an "apply" option, the electronic device 100 may replace a previously used headset theme with the found headset theme.

The previously used headset theme may be the example default headset theme shown in FIG. 3A and FIG. 3B, or may be a replaced headset theme, for example, a replaced headset theme by using the method provided in embodiments of this application.

Herein, replacing the previously used headset theme with the found headset theme may be specifically implemented in the following manner: The electronic device 100 replaces, with an image resource (for example, a picture or an icon) referenced by the found headset theme, an image resource referenced by the previously used headset theme. During specific replacement, the electronic device 100 may replace image resources in a one-to-one correspondence based on a framework of the headset theme. The framework of the headset theme specifies mapping relationships between image interface elements in the headset theme and image resources to be referenced by the image interface elements. For example, the framework of the headset theme may be shown in Table 1. The electronic device 100 replaces, with an image resource (for example, a picture or an icon) referenced by the found headset theme, an image resource referenced by the previously used headset theme. During specific replacement, the electronic device 100 may replace image resources in a one-to-one correspondence based on a framework of the headset theme. The framework of the headset theme specifies mapping relationships between image interface elements in the headset theme and image resources to be referenced by the image interface elements. For example, the framework of the headset theme may be shown in Table 1.

During replacement of a headset theme package, image resources may be replaced in a one-to-one correspondence based on image interface elements. For example, an image resource referenced by a left earbud icon in a leftmost screen usage scenario in a headset theme package B is correspondingly replaced with an image resource referenced by the left earbud icon in the leftmost screen usage scenario in a headset theme package A.

(5) FIG. 27E to FIG. 27I show examples of user interfaces for generating a headset image theme based on a shot picture or video through local modeling and replacing a previously used headset image theme with the headset image theme generated through local modeling.

Figure 27E:
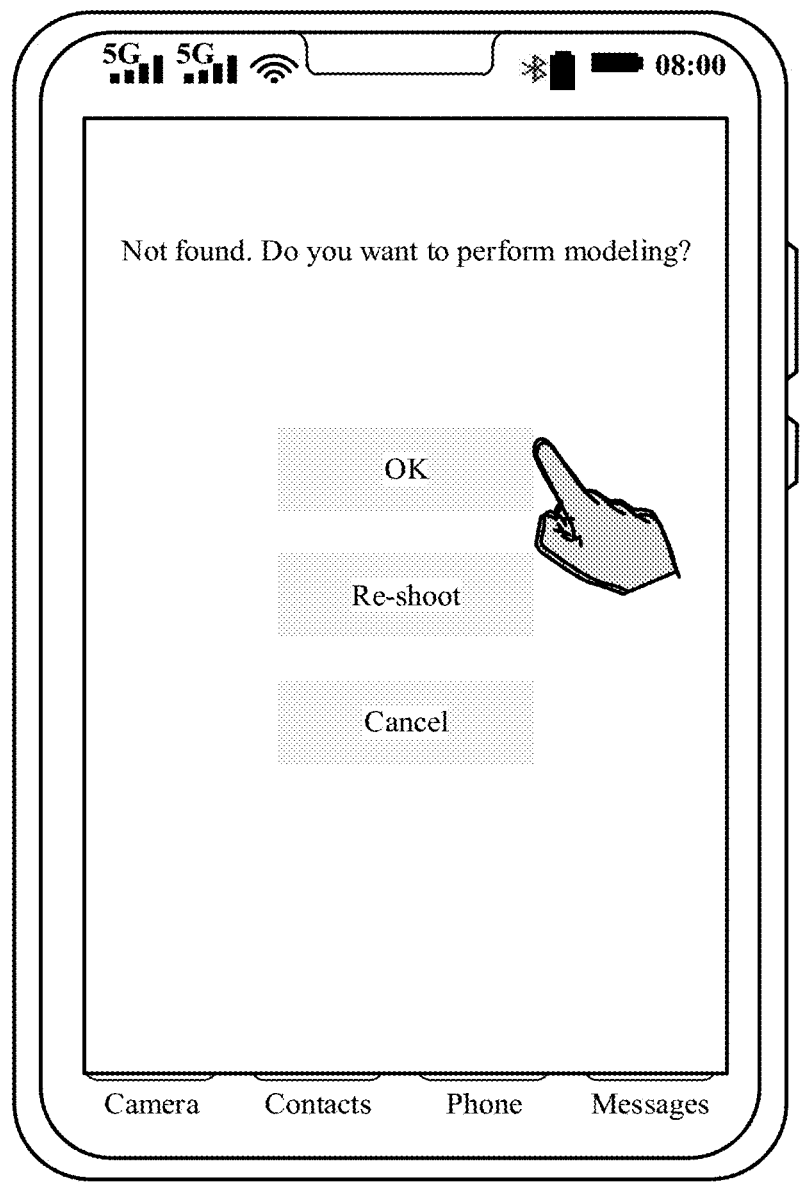

As shown in FIG. 27E, when the electronic device 100 does not find a corresponding headset theme, a dialog box shown in FIG. 27E may be used to prompt the user. The user may choose to perform re-shooting, or cancel the search, or the user may determine to generate a corresponding headset theme through search.

Figure 27F:
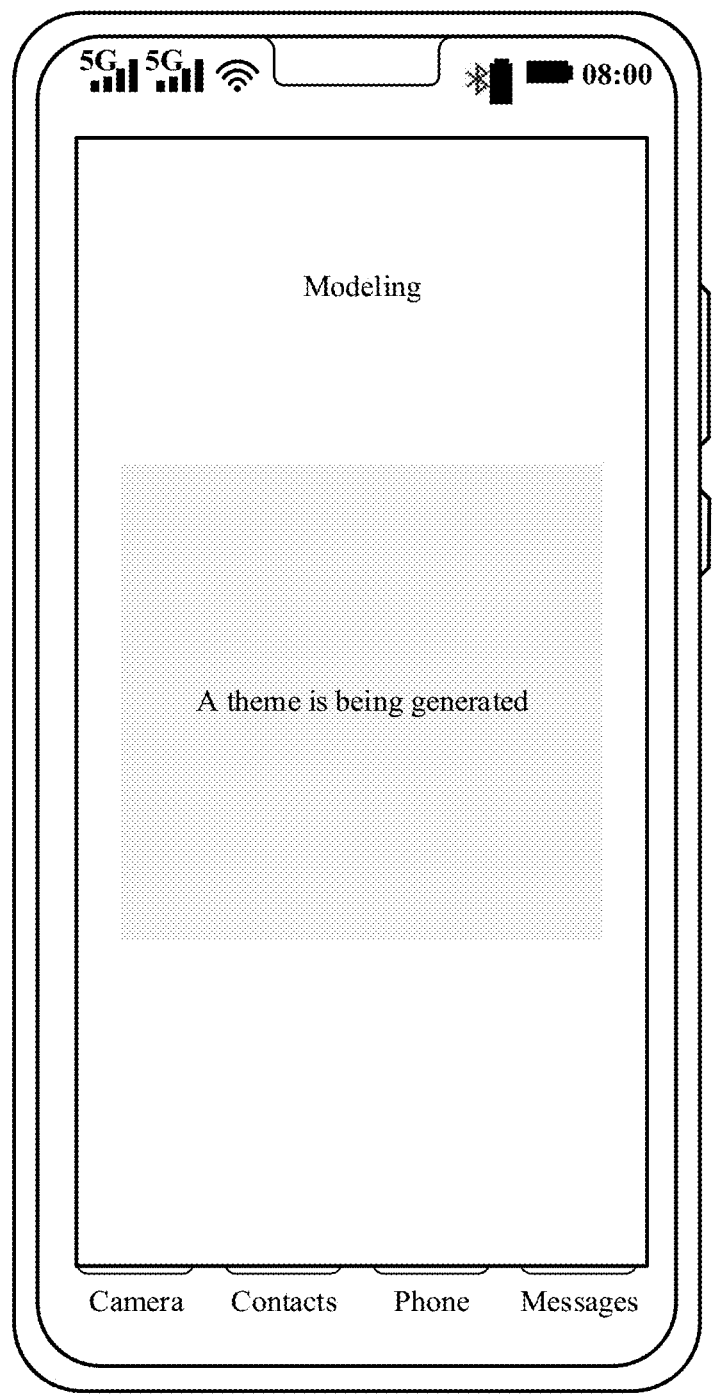

As shown in FIG. 27E and FIG. 27F, after detecting that the user completes shooting of the picture, the electronic device 100 may further detect an operation that the user selects a "modeling" manner to generate the headset image theme. In response to the operation, the electronic device 100 may generate the headset image theme by using the shot picture.

In this embodiment of this application, the electronic device 100 may generate the headset image theme based on a framework of the headset image theme by using the shot picture. For example, the framework of the headset image theme may be shown in Table 1. The electronic device 100 may specifically convert the shot picture into an image resource referenced by each image interface element in the framework of the headset image theme, for example, scale down a front picture of a headset case protective cover to a picture of a small size, to become an image resource that needs to be referenced by a headset case icon in a leftmost screen usage scenario in Table 1.

Figure 27G:
Figure 27H:
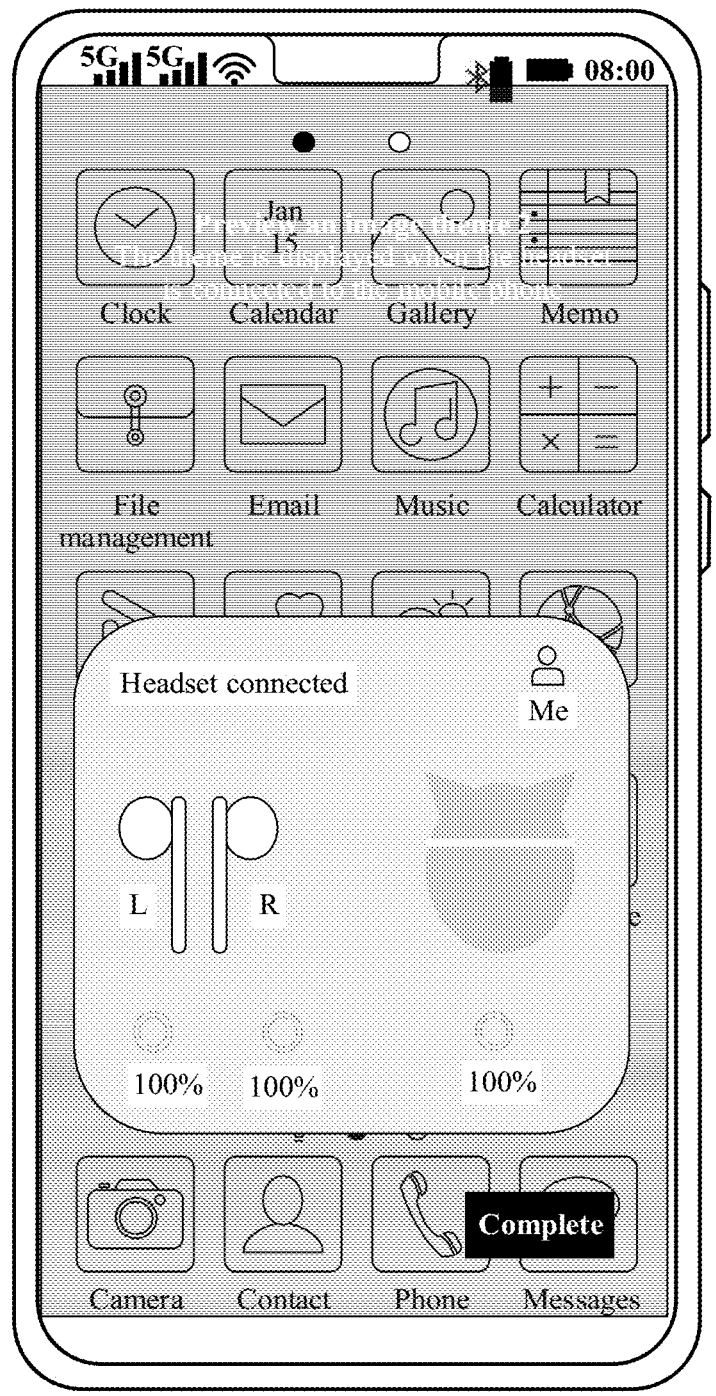

After generating the headset image theme, the electronic device 100 may provide (that is, display) example theme preview interfaces shown in FIG. 27G and FIG. 27H, so that the user can preview the generated headset theme, and the user can further determine whether to replace the headset theme.

Figure 27I:
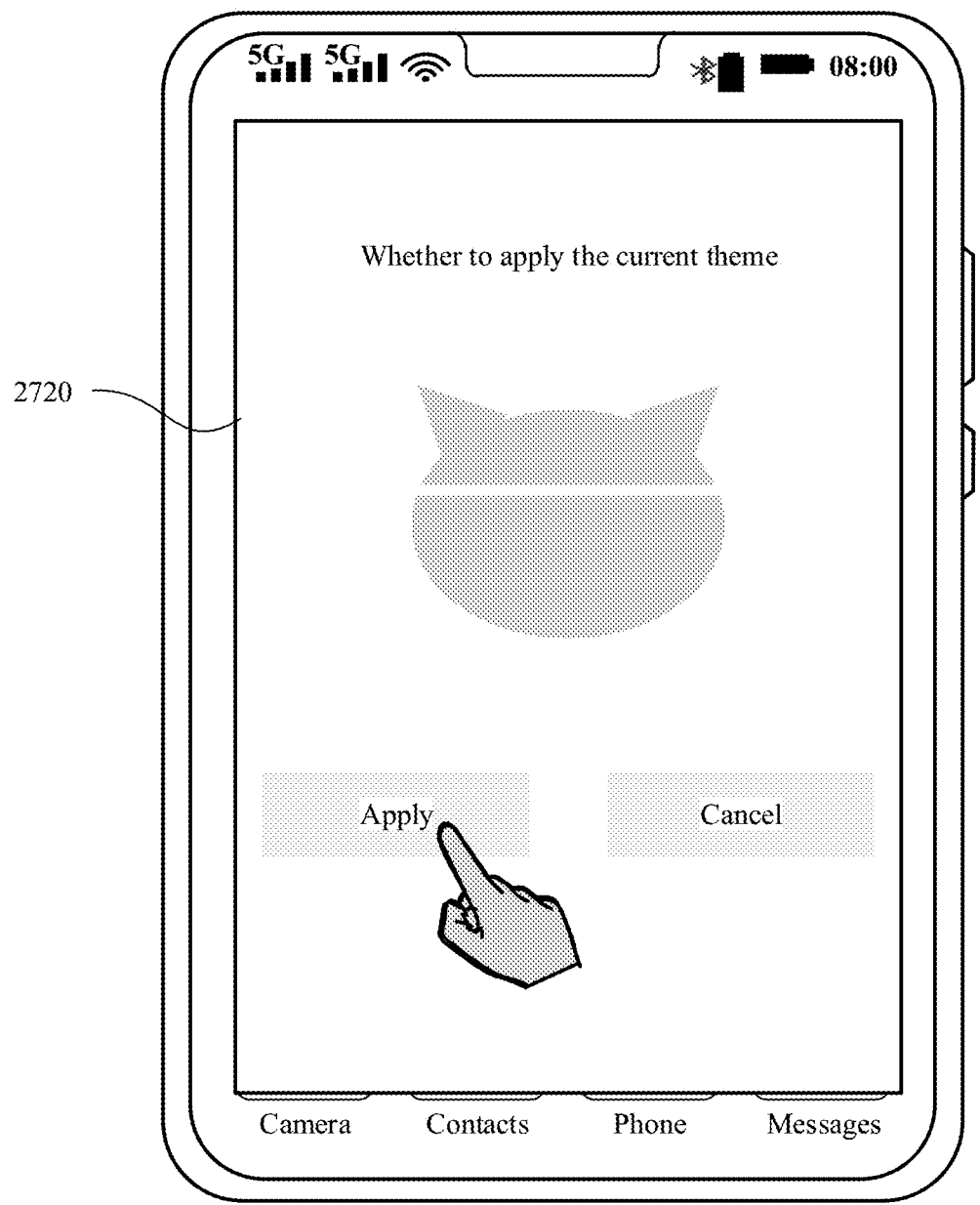

In addition, the electronic device 100 may further provide an example user interface 2720 shown in FIG. 27I, so that the user can apply the generated headset theme. In response to a user operation for applying a generated headset theme that is detected in the user interface 2720, for example, a tap operation on an "apply" option, the electronic device 100 may replace a previously used headset theme with the generated headset theme.

In addition to shooting an accessory device such as a headset by using a camera to obtain a photo of the accessory device to search for a headset theme or generate a headset image theme through local modeling, the electronic device 100 may further record an accessory such as a headset by using a camera to obtain a video of the accessory device to search for a headset theme or generate a headset image theme through local modeling.

In addition to shooting an accessory device such as a headset by using a camera to obtain a photo or a video of the accessory device to search for a headset theme or generate a headset image theme through local modeling, the electronic device 100 may further search for a headset theme or generate a headset image theme through local modeling by using a picture or a video selected by a user from a gallery.

Figure 28A:
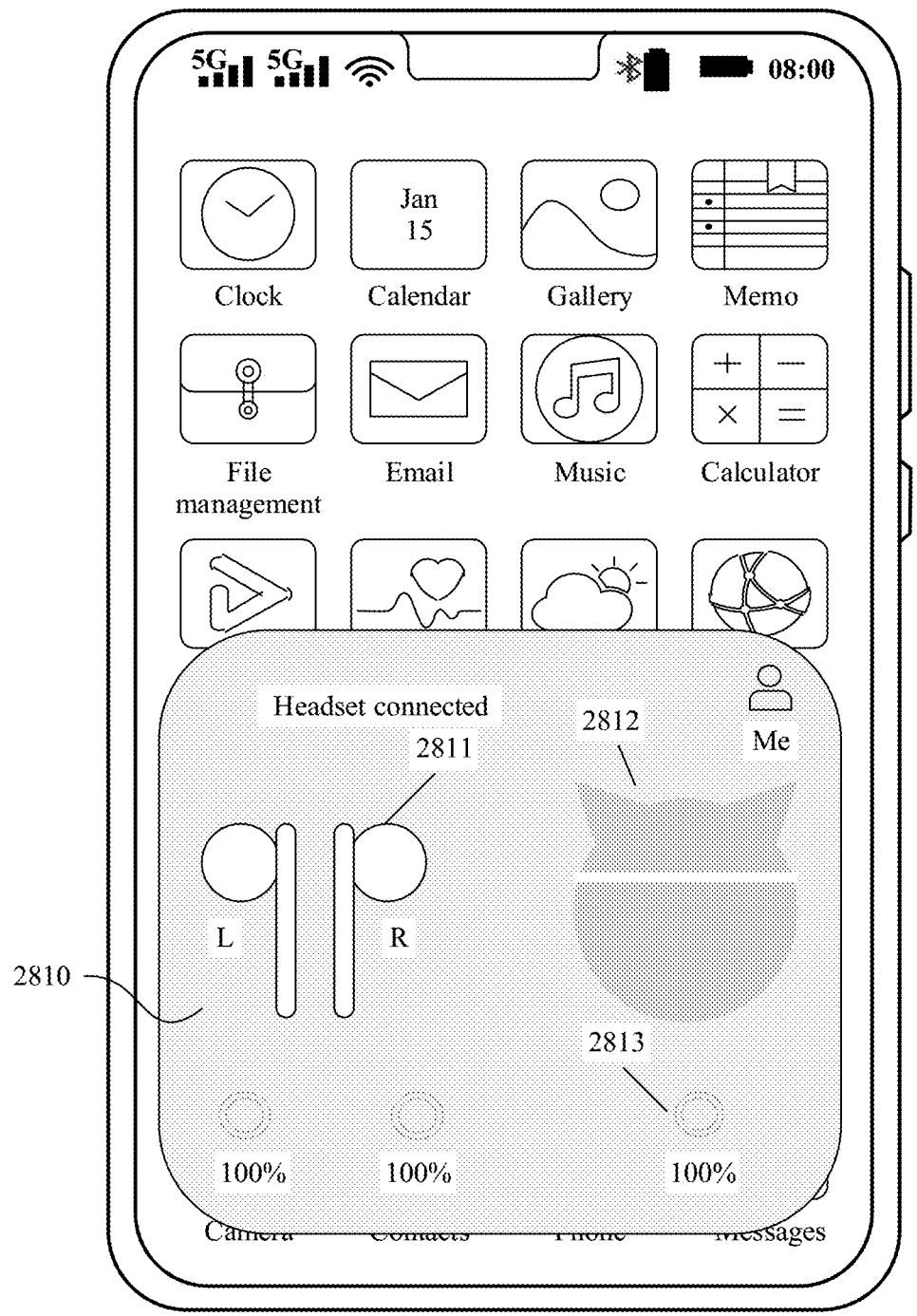
FIG. 28A and FIG. 28B are schematic diagrams of another group of interfaces according to an embodiment of this application.
Figure 28B:
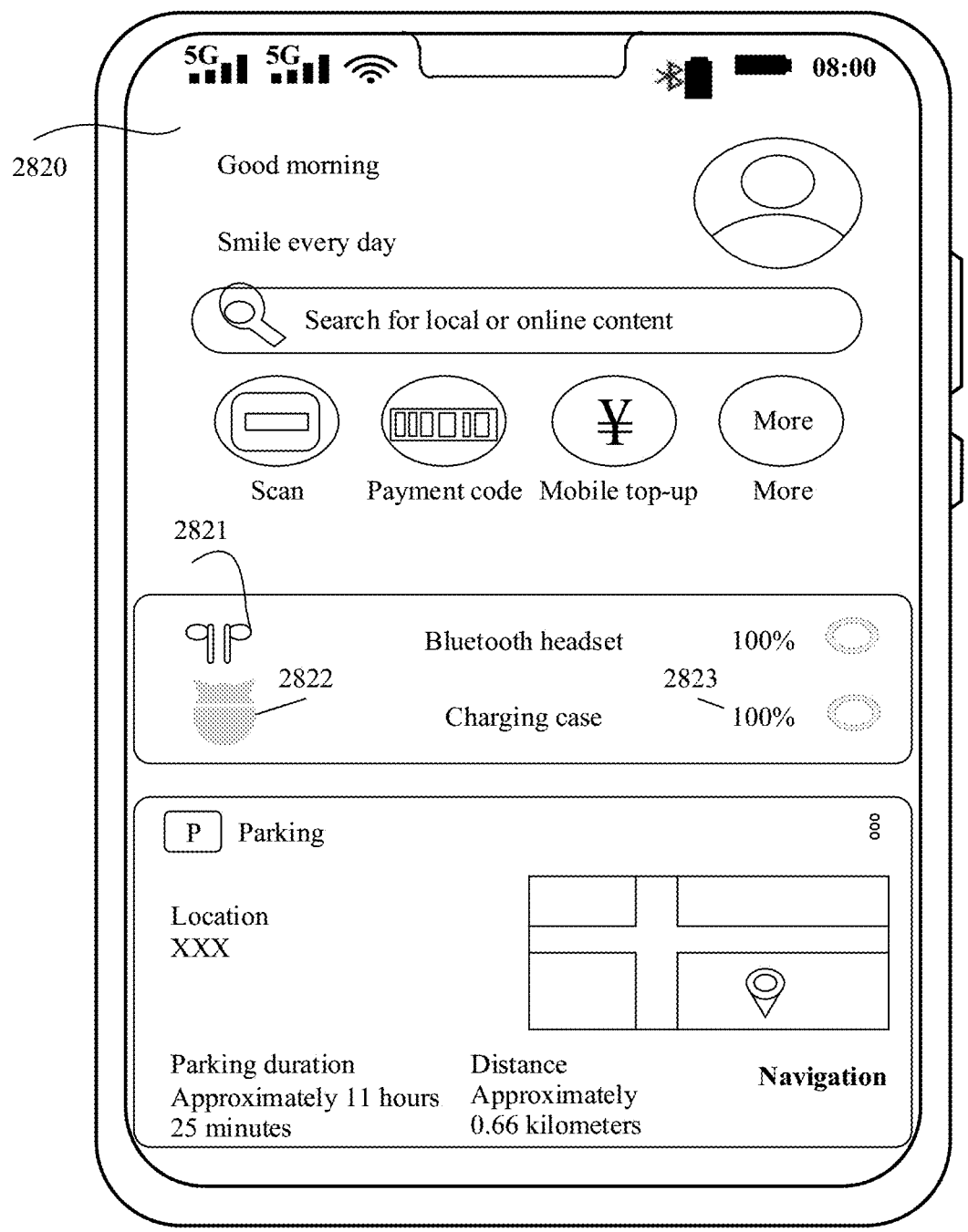

FIG. 28A and FIG. 28B show examples of a series of user interfaces for applying a replaced headset image theme.

As shown in FIG. 28A, when TWS earbuds are connected to an electronic device 100, the electronic device 100 may display a pop-up window interface 2810. The pop-up window interface 2810 displays a series of image interface elements, for example, a headset background 2811, a headset case protective cover background 2812, and a headset case battery level icon 2813.

As shown in FIG. 28B, after the TWS earbuds are connected to the electronic device 100, the electronic device 100 may display a series of image interface elements in a user interface 2820 (which may also be referred to as a "leftmost screen"), for example, a headset background 2821, a headset case background 2822, and a headset case battery level icon 2823.

In addition to the headset image themes shown in FIG. 28A and FIG. 28B, the electronic device 100 may further present a newly generated headset image theme in another headset usage scenario, for example, a usage scenario of selecting an audio channel during a call.

It can be learned that, a difference from the previously used headset themes shown in FIG. 3A and FIG. 3B lies in that the headset case protective cover backgrounds shown in FIG. 28A and FIG. 28B correspondingly replace the headset case backgrounds in FIG. 3A and FIG. 3B, that is, the electronic device 100 replaces the previously used headset theme with a generated headset theme. In this way, a personalized requirement of the user is met and user experience is improved.

Figure 29A:
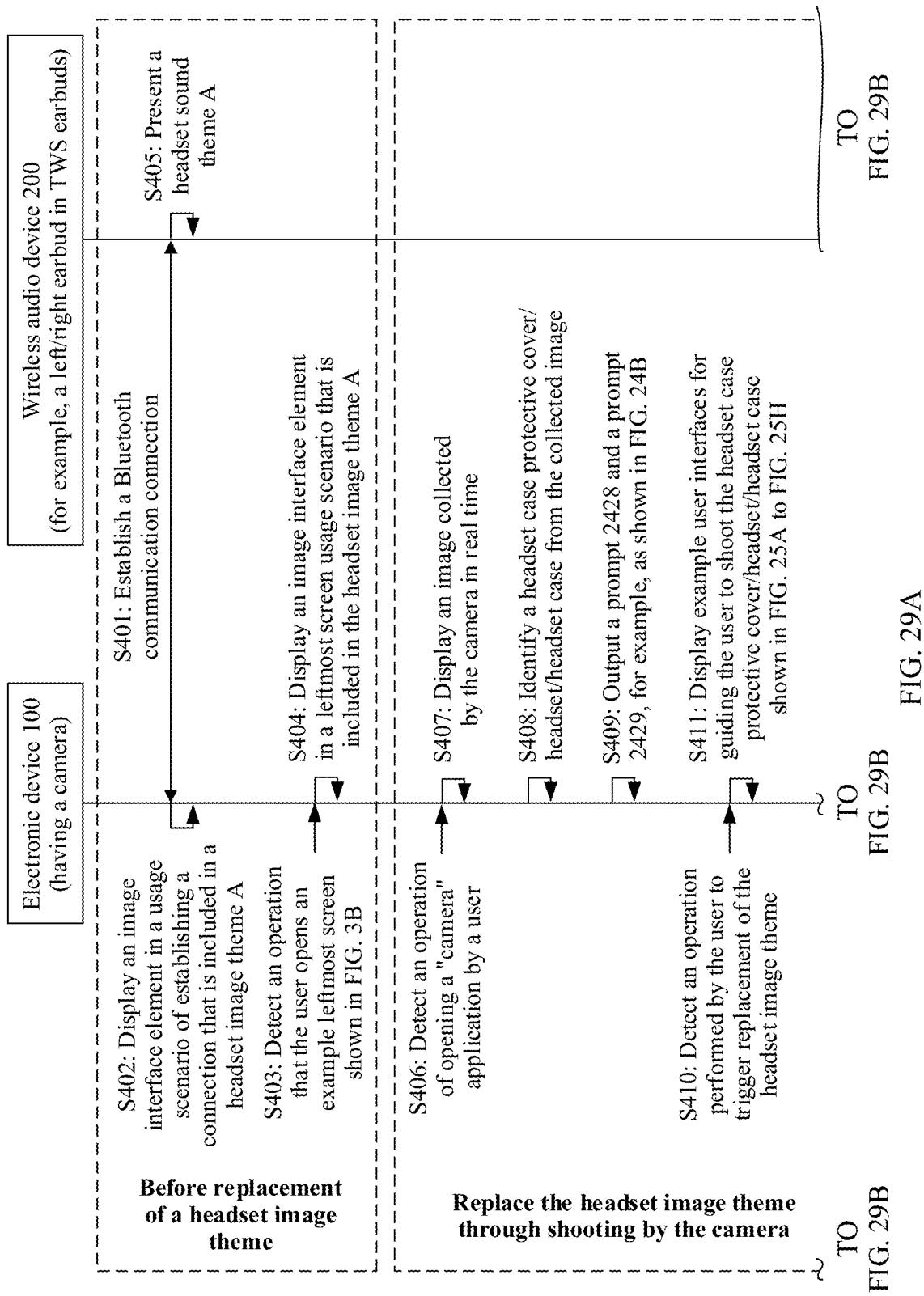
FIG. 29A and FIG. 29B show a procedure of a method for replacing a headset image theme through shooting by a camera according to an embodiment of this application.
Figure 29B:
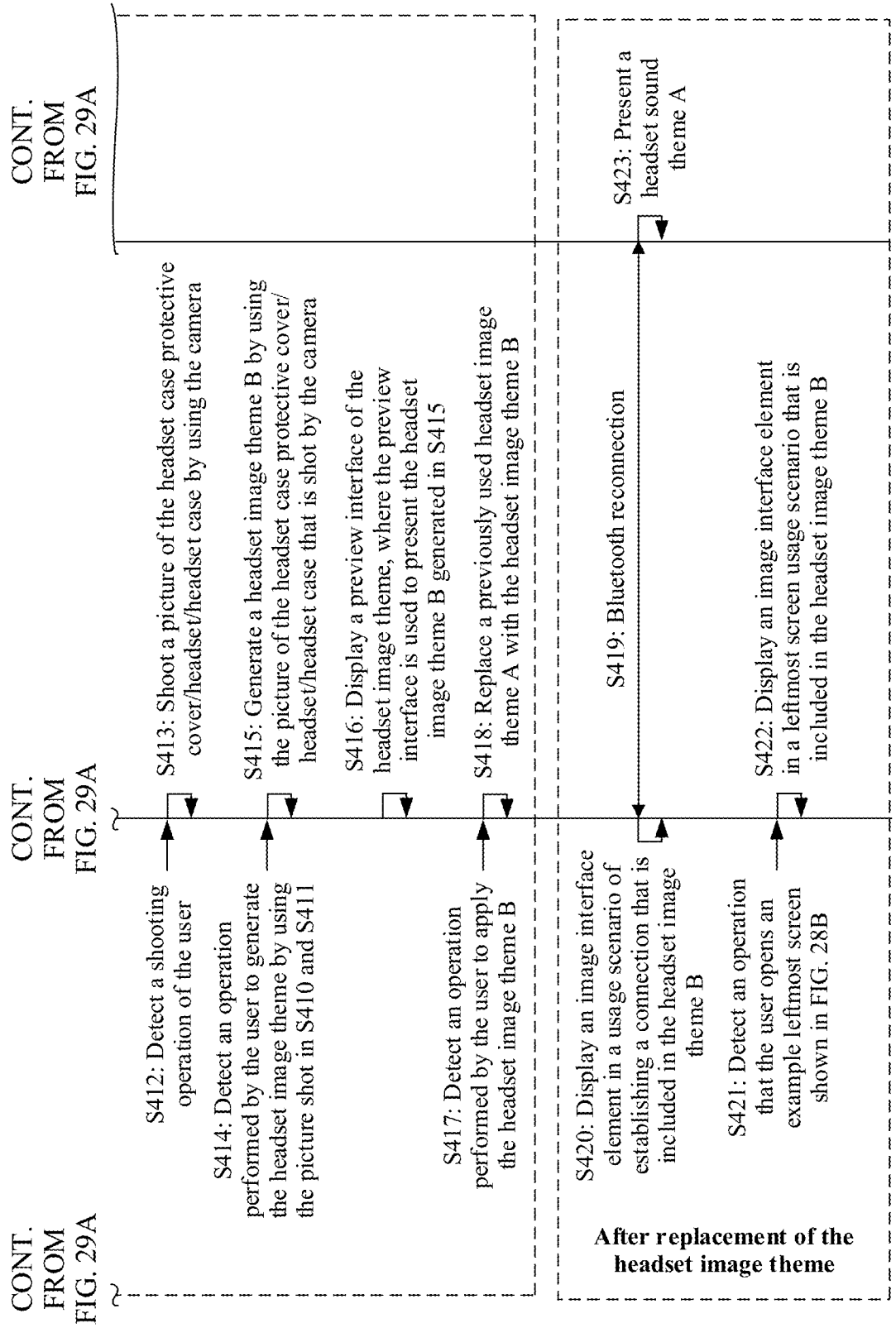

FIG. 29A and FIG. 29B show an example of a procedure of a method for replacing a headset image theme through shooting by a camera according to an embodiment of this application. Details are provided below.

Phase 1 (S401 to S405): Before Replacement of a Headset Image Theme

S401: Establishes a Bluetooth communication connection between an electronic device 100 and a headset.

The electronic device 100 and the headset may exchange audio data, a play control message, a call control message, and the like based on the Bluetooth communication connection. In addition to the Bluetooth communication connection, a connection established between the electronic device 100 and the accessory may also be another communication connection, for example, a Wi-Fi direct connection or a cellular mobile communication connection.

S402 to S404: After the Bluetooth communication connection is established, the electronic device 100 may present a headset image theme A.

That the electronic device 100 presents a headset image theme A may mean that the electronic device 100 displays an image interface element included in the headset image theme A. Specifically, the electronic device 100 may present the headset image theme A in different usage scenarios (referring to Table 1).

For example, in S402, in a usage scenario of establishing a (Bluetooth communication) connection, the electronic device 100 may display an image interface element in the usage scenario of establishing a connection that is included in the headset image theme A, for example, a series of image interface elements related to the headset in the pop-up window shown in FIG. 3A, such as the headset background 311, the headset case background 312, and the headset case battery level icon 313.

For example, in S403 and S404, in a leftmost screen usage scenario, as shown in FIG. 3B, when detecting an operation (for example, a rightward sliding operation in the user interface 320) of opening a leftmost screen by the user, the electronic device 100 may display an image interface element in the leftmost screen usage scenario that is included in the headset image theme A, for example, a series of image interface elements related to the headset on the leftmost screen shown in FIG. 3B, such as the headset background 321, the headset case background 322, and the headset case battery level icon 323.

In addition to the usage scenario of establishing a (Bluetooth communication) connection and the leftmost screen usage scenario, the electronic device 100 may further present the headset image theme A in another usage scenario, for example, a usage scenario of selecting an audio channel during a call in Table 1. Different from a headset image theme B to be mentioned below, the headset image theme A may be referred to as a previously used headset image theme, an old headset image theme, or the like.

S405: After the Bluetooth communication connection is established, the headset may present a headset sound theme A.

That the headset presents a headset sound theme A may mean that the headset outputs a sound included in the headset sound theme A. Specifically, the headset may present the headset sound theme A in different usage scenarios (referring to Table 2).

In a usage scenario of establishing a (Bluetooth communication) connection, the headset may output (or play) a sound in the usage scenario of establishing a connection that is included in the headset sound theme A, for example, a sound "tinkling".

In a usage scenario of breaking a (Bluetooth communication) connection, the headset may output (or play) a sound in the usage scenario of breaking a connection that is included in the headset sound theme A, for example, a sound "drip".

In a usage scenario in which a battery level of a headset is low, the headset may output (or play) a sound in the usage scenario in which a battery level of a headset is low that is included in the headset sound theme A, for example, a sound "knock".

In addition to the usage scenario of establishing a connection, the usage scenario of breaking a connection, and the usage scenario in which a battery level of a headset is low, the headset may further present the headset sound theme A in another usage scenario, for example, a usage scenario in which a user wears a headset or a usage scenario of enabling noise reduction. Different from a headset sound theme B to be mentioned below, the headset sound theme A may be referred to as a previously used headset sound theme, an old headset sound theme, or the like.

Phase 2 (S406 to S418): Obtain a Headset Image Theme B by Using a Picture Shot by the Camera S406 and S407: The electronic device 100 detects an operation of opening a "camera" application by the user (for example, an operation of tapping the camera application icon 2411 in the example home screen interface shown in FIG. 24A) In response to the operation, the electronic device 100 may display the example shooting interface 2420 of the camera application shown in FIG. 24B. An image collected by the camera in real time is displayed in the preview box 2422 in the shooting interface.

For the shooting interface of the camera application, refer to the related descriptions in FIG. 24B. Details are not described herein again.

S408 and S409: Identify a headset case protective cover/headset/headset case from images displayed in the preview box 2422. For example, as shown in FIG. 24B, the electronic device 100 may output the prompt 2428 and the prompt 2429 in the preview box 2422, where the prompt 2428 may be used to indicate the user that a current shooting scenario is identified as a shooting scenario of the headset case protective cover, and the prompt 2429 may be used to prompt the user to replace the headset image theme.

Specifically, the electronic device 100 may identify, by using an AI image recognition technology, for example, a trusted neural network trained by using a large quantity of data samples, the headset case protective cover/headset/headset case from the images displayed in the preview box 2422.

S410 and S411: The electronic device 100 may detect an operation performed by the user to trigger replacement of the headset image theme, for example, the operation 2430 shown in FIG. 24B. In response to the operation 2430, the electronic device 100 may display an example user interface for guiding the user to shoot the headset case protective cover/headset/headset case that is shown in FIG. 25A to FIG. 25H.

That is, when the current shooting scenario is identified (for example, through AI recognition) as the shooting scenario of the headset case protective cover, the electronic device 100 may further guide the user to shoot an image of the headset case protective cover, to provide an image resource for subsequently generating a new headset image theme.

In addition to identifying the headset case protective cover/headset/headset case from the images displayed in the preview box 2422 in S408 and S409, when detecting one or more of the following events, the electronic device 100 may also guide the user to shoot a user interface of the headset case protective cover/headset/headset case, to replace the headset image theme: the headset changes from wearing no protective cover to wearing a protective cover, and the protective cover worn on the headset changes. Specifically, these events may be reported by the headset to the electronic device 100.

S412 and S413: The electronic device 100 may detect a shooting operation, for example, an operation of tapping the shooting control 2425. In response to the operation, the electronic device 100 may shoot a picture of the headset case protective cover/headset/headset case by using the camera.

The shooting operation may be detected by the electronic device 100 in the example user interface shown in FIG. 25A to FIG. 25H, that is, the user shoots the picture based on guidance in the example user interface shown in FIG. 25A to FIG. 25H.

S414: The electronic device 100 may detect an operation for generating a headset image theme by using the picture shot in S410 and S411.

For example, as shown in FIG. 26, when detecting that the user completes shooting of the headset case protective cover, the electronic device 100 may provide an option for generating the headset image theme, for example, a search option 2612 and a modeling option 2613. That is, the operation for generating the headset image theme that is detected by the electronic device 100 may be an operation of selecting the search option 2612 or the modeling option 2613. In addition to the search option 2612 or the modeling option 2613 in the example user interface shown in FIG. 26, the electronic device 100 may further receive, in another interaction manner, the operation for generating the headset image theme.

S415: The electronic device 100 may generate an example headset image theme B by using the picture of the headset case protective cover/headset/headset case that is shot by the camera, as shown in FIG. 27A to FIG. 27I.

Specifically, a manner of generating the headset image theme includes but is not limited to: searching for the headset theme on a network based on the picture shot in S410 and S411 (briefly referred to as a "search" manner), and generating the headset image theme through modeling based on the picture shot in S410 and S411 (briefly referred to as a "modeling" manner).

When detecting that the user selects the "search" manner to obtain the headset theme, for example, detecting an operation that the user taps the search option 2612 in the example user interface shown in FIG. 26, the electronic device 100 may search for a matched headset theme B on a network by using the shot picture. For a definition of matching, refer to related content in the embodiments in FIG. 27A to FIG. 27D. Details are not described herein again.

When detecting that the user selects the "modeling" manner to obtain the headset image theme, for example, detecting an operation that the user taps the modeling option 2613 in the example user interface shown in FIG. 26, the electronic device 100 may generate the headset image theme B based on a framework of the headset image theme by using the shot picture. The electronic device 100 may specifically convert the shot picture into an image resource referenced by each image interface element in the headset image theme B. For the framework of the headset image theme, refer to related content in the embodiments in FIG. 27E to FIG. 27I. Details are not described herein again.

S416: The electronic device 100 may display a preview interface of the headset image theme, where the preview interface is used to present the headset image theme B generated in S415, so that the user can preview the headset image theme B, and the user can further determine whether to replace the headset image theme.

The preview interface may be used to display an image interface element included in the headset image theme B. As shown in FIG. 27G and FIG. 27H, the preview interface may include a plurality of pages, which are separately used to display image interface elements in different usage scenarios that are included in the headset image theme B. Specifically, a page shown in FIG. 27H may be used to display an image interface element in a usage scenario of "establishing a connection", to present a headset image theme B in the usage scenario of "establishing a connection". Specifically, a page shown in FIG. 27G may be used to display an image interface element in a "leftmost screen" usage scenario, to present a headset image theme B in the "leftmost screen" usage scenario. In addition, the preview interface may be further used to display an image interface element in another usage scenario, for example, an image interface element in a usage scenario of "selecting an audio channel during a call", to present a headset image theme B in the another usage scenario.

S417 and S418: The electronic device 100 may detect a user operation for applying the headset image theme B, for example, an operation of tapping an "apply" option in the user interface 2720 shown in FIG. 27I. In response to the operation, the electronic device 100 may replace the previously used headset image theme A with the headset image theme B.

Herein, replacing the headset image theme A with the headset image theme B may be specifically implemented in the following manner: The electronic device 100 replaces, with an image resource (for example, a picture or an icon) referenced by the headset image theme B, an image resource referenced by the headset image theme A. During specific replacement, the electronic device 100 may replace image resources in a one-to-one correspondence based on a framework of the headset image theme. The framework of the headset image theme specifies mapping relationships between image interface elements in the headset image theme and image resources to be referenced by the image interface elements. The headset image theme B and the headset image theme A may be formed based on a same framework of the headset image theme, that is, both the headset image theme B and the headset image theme A are formed by organizing a same image interface element.

That is, during specific replacement, the electronic device 100 may replace, with an image resource referenced by an image interface element in the headset image theme B, an image resource referenced by a same image interface element in the headset image theme A, to accurately replace theme. After the replacement, the image resource referenced by the interface element in the headset image theme B may be different from the image resource referenced by the same interface element in the headset image theme A. For example, an image resource (a picture of an appearance similar to a round headset case) referenced by the icon 312 for displaying an appearance of the headset case shown in FIG. 3A becomes an image resource (a picture of an appearance similar to a cat-ear-shaped headset case) referenced by an icon 2812 for displaying an appearance of the headset case shown in FIG. 28A. In this way, the user can observe a change of the image referenced by the same interface element (for example, an icon) and feel a change of a theme style.

Phase 3 (S419 to S423): After Replacement of the Headset Image Theme

S419: Re-establish a Bluetooth communication connection between the electronic device 100 and the headset.

S419 is performed when the Bluetooth communication connection previously established between the electronic device 100 and the headset is broken.

S420 to S422: The electronic device 100 may present a headset image theme B.

For details, refer to an implementation of S402 in which the electronic device 100 presents the headset image theme A. For S420, refer to S402. For S421 and S422, refer to S403 and S404.

S423: The headset may present a headset sound theme A. For details, refer to S405.

During replacement of a headset sound theme, the headset sound theme presented by the headset is different from the headset sound theme A. For example, when a battery level of the headset is low, the headset may output a sound "knock knock", which is different from a sound "knock" in a usage scenario in which a battery level of a headset is low in the headset sound theme A. Specifically, the electronic device 100 may obtain a complete headset theme by using a picture shot by a camera, where the headset theme may include a headset image theme and a headset sound theme. For example, the user finds a headset theme by scanning the headset case protective cover, where the found headset theme may include a headset sound theme. For example, the user may find an official Pikachu theme by scanning a Pikachu-shaped headset case. Then, this theme may be associated with a set of Pikachu alert tones. When the user uses the Pikachu theme, an alert tone is also replaced with the Pikachu tone. How to replace the headset sound theme is described in detail in the following embodiments. Details are not described herein.

It can be learned that in the embodiment in FIG. 29A and FIG. 29B, the user may be supported in replacing the headset image theme through shooting by the camera, to meet a personalized requirement of the user and improve user experience. In addition to interaction forms shown in FIG. 24A and FIG. 24B, FIG. 25A to FIG. 25H, FIG. 26, and FIG. 27A to FIG. 27I, various user operations mentioned in the embodiment in FIG. 29A and FIG. 29B may also be other interaction forms, such as a voice instruction and an air gesture.

The headset theme stored in the electronic device 100 may also be shared by another electronic device. Descriptions are provided in detail below with reference to FIG. 30A to FIG. 30D, FIG. 31A to FIG. 31F, FIG. 32A to FIG.

32D, FIG. 33A to FIG. 33F, FIG. 34A to FIG. 34F, FIG. 35A to FIG. 35D, FIG. 36A to FIG. 36C, and FIG. 37A to FIG. 37D.

FIG. 30A to FIG. 30D, FIG. 31A to FIG. 31F, and FIG. 32A to FIG. 32D show examples of a series of user interfaces in which a sharing party ("user 1") actively shares a headset theme with a shared party ("user 2").

(1) FIG. 30A to FIG. 30D show examples of user interfaces in which a sharing party selects a headset theme (including a headset image theme and a headset sound theme) and shares the headset theme with a shared party.

Figure 30A:
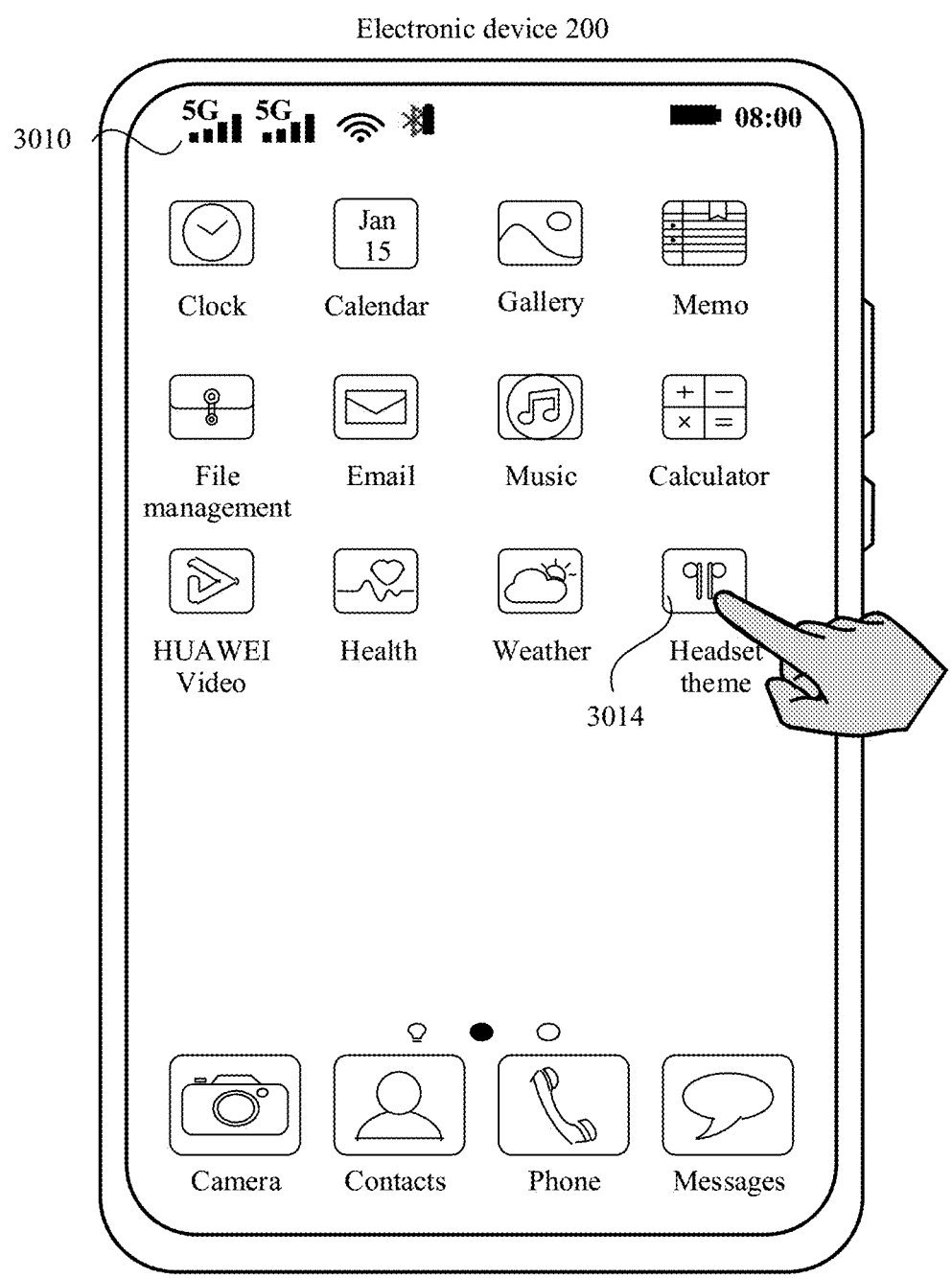
FIG. 30A to FIG. 30D are schematic diagrams of another group of interfaces according to an embodiment of this application.

An electronic device 200 of the sharing party may detect an operation of opening/viewing a headset theme by a user (for example, the sharing party, that is, the "user 1"), for example, an operation of tapping a "Headset theme" application icon 3014 in a user interface 3010 shown in FIG. 30A. In response to the operation, the electronic device 200 may display an example user interface 3020 shown in FIG. 30B. The user interface 3020 may display options of one or more headset themes.

The electronic device 200 of the sharing party may detect an operation that the user (for example, the sharing party, that is, the "user 1") selects a headset theme 3022 from the one or more headset themes and shares the headset theme 3022 with an electronic device 100 of the shared party. The operation may be a series of operations, for example, operations of first selecting the headset theme 3022 from the one or more headset themes displayed in the user interface 3020 shown in FIG. 30B, then tapping a share control 3025 in a user interface 3020 shown in FIG. 30C, and finally selecting the electronic device 100 of the shared party from a list 3026 displayed in a user interface 3020 shown in FIG. 30D. In response to the operation, the electronic device 200 sends the headset theme 3022 to the electronic device 100.

The list 3026 may display device identification information (for example, a device name and model) of one or more devices, and the one or more devices are devices connected to the electronic device 200 or devices discovered by the electronic device 200. As shown in FIG. 30D, the electronic device 100 of the shared party is "Mobile phone of the user 2", and "Mobile phone of the user 2" is the shared party.

Figure 30B:
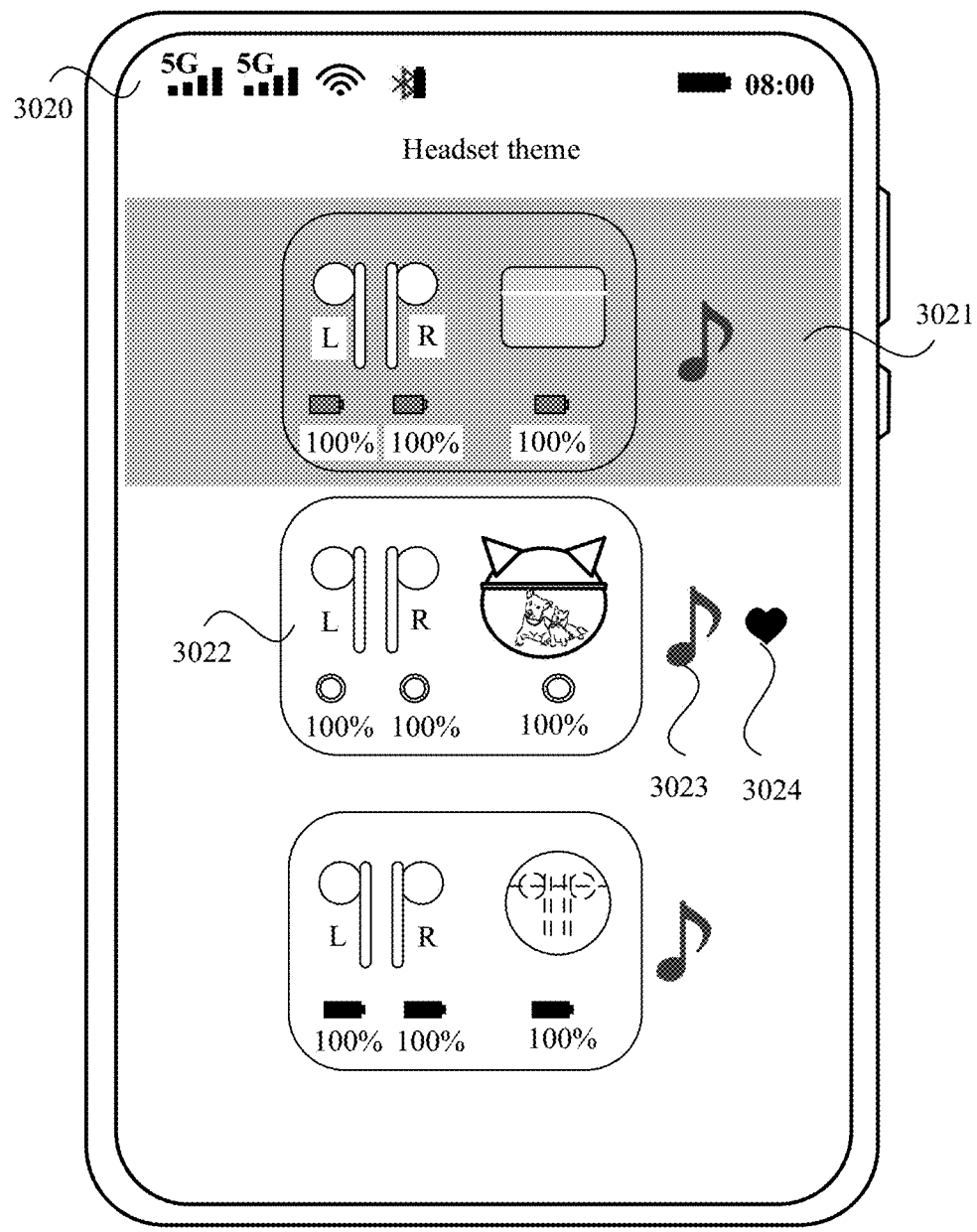

A love icon following the headset theme in the user interface 3020 shown in FIG. 30B indicates that the headset theme is currently used by a headset 400 of the electronic device 200. A note icon 3023 represents a headset sound theme, and various alert tones of the headset may be presented when the user performs an operation on the note icon 3023. An option 3021 of a headset theme displayed in grayscale cannot be selected by the user for sharing, and the headset theme may be a headset theme that does not adapt to a headset of the shared party. When a model of a headset adapted to a headset theme is inconsistent with a model of the headset of the shared party, it may be determined that the headset theme cannot be shared with the shared party.

(2) FIG. 31A to FIG. 31F show examples of user interfaces in which a shared party receives, previews, and applies a headset theme (including a headset image theme and a headset sound theme) from a sharing party.

Figure 31A:
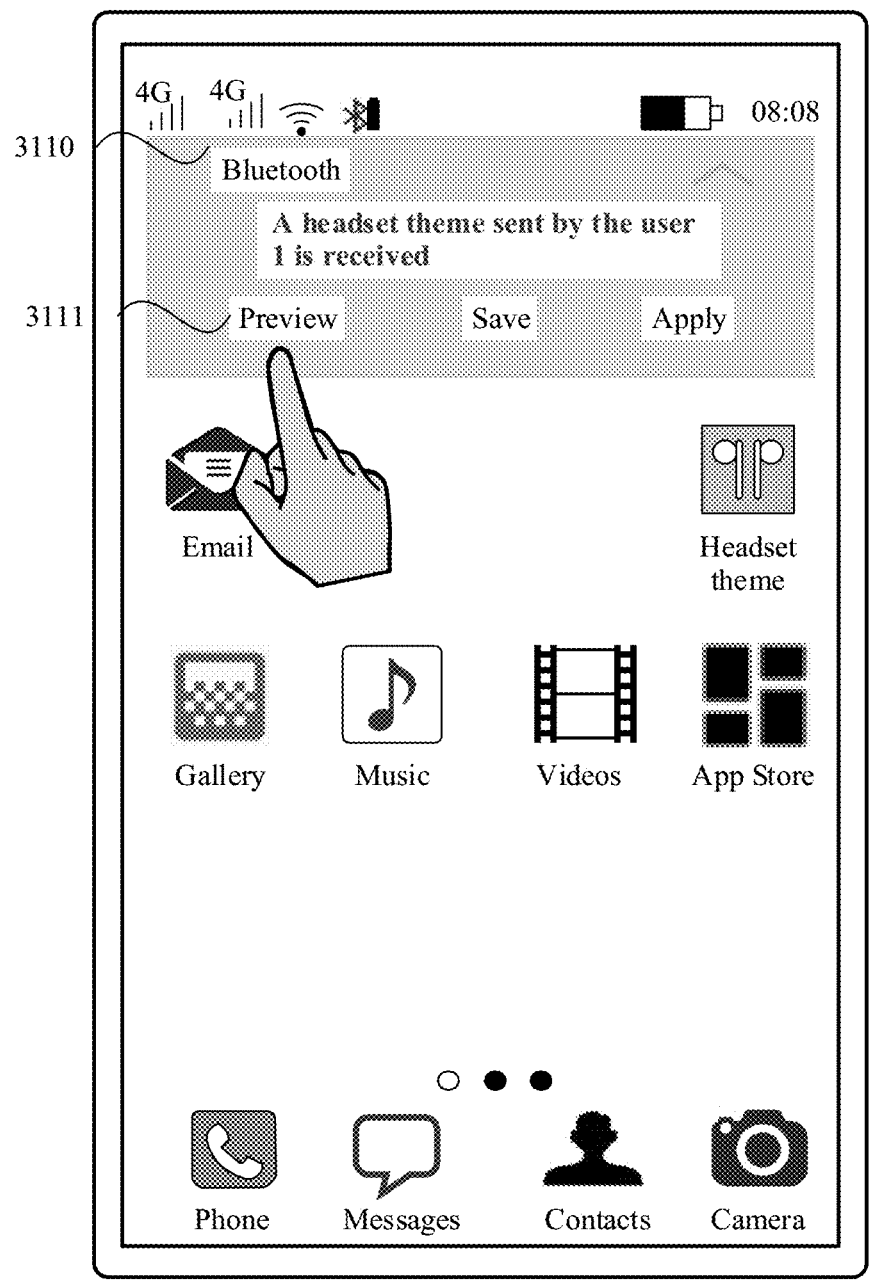
FIG. 31A to FIG. 31F are schematic diagrams of another group of interfaces according to an embodiment of this application.
Figure 31B:
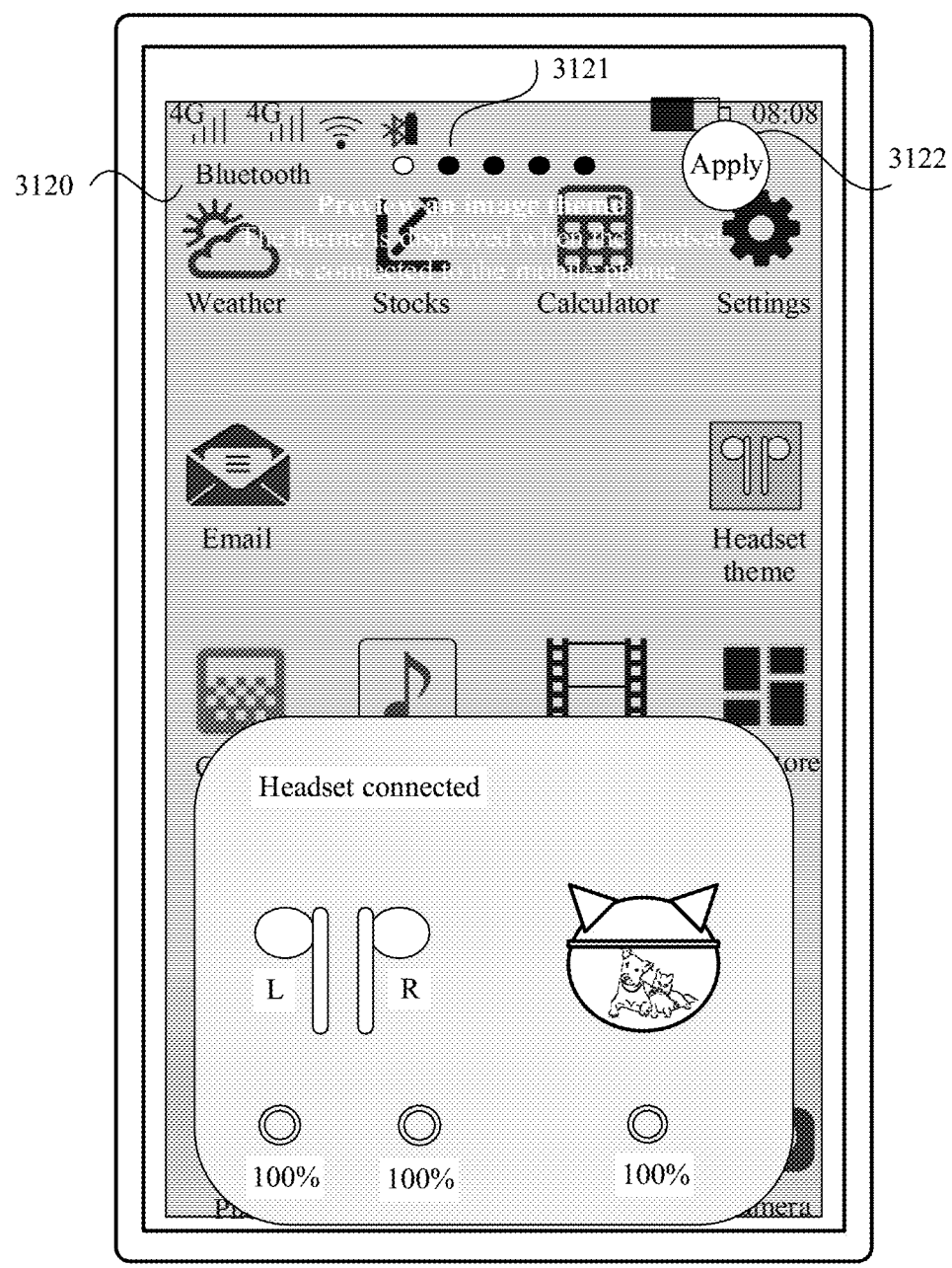
Figure 31C:
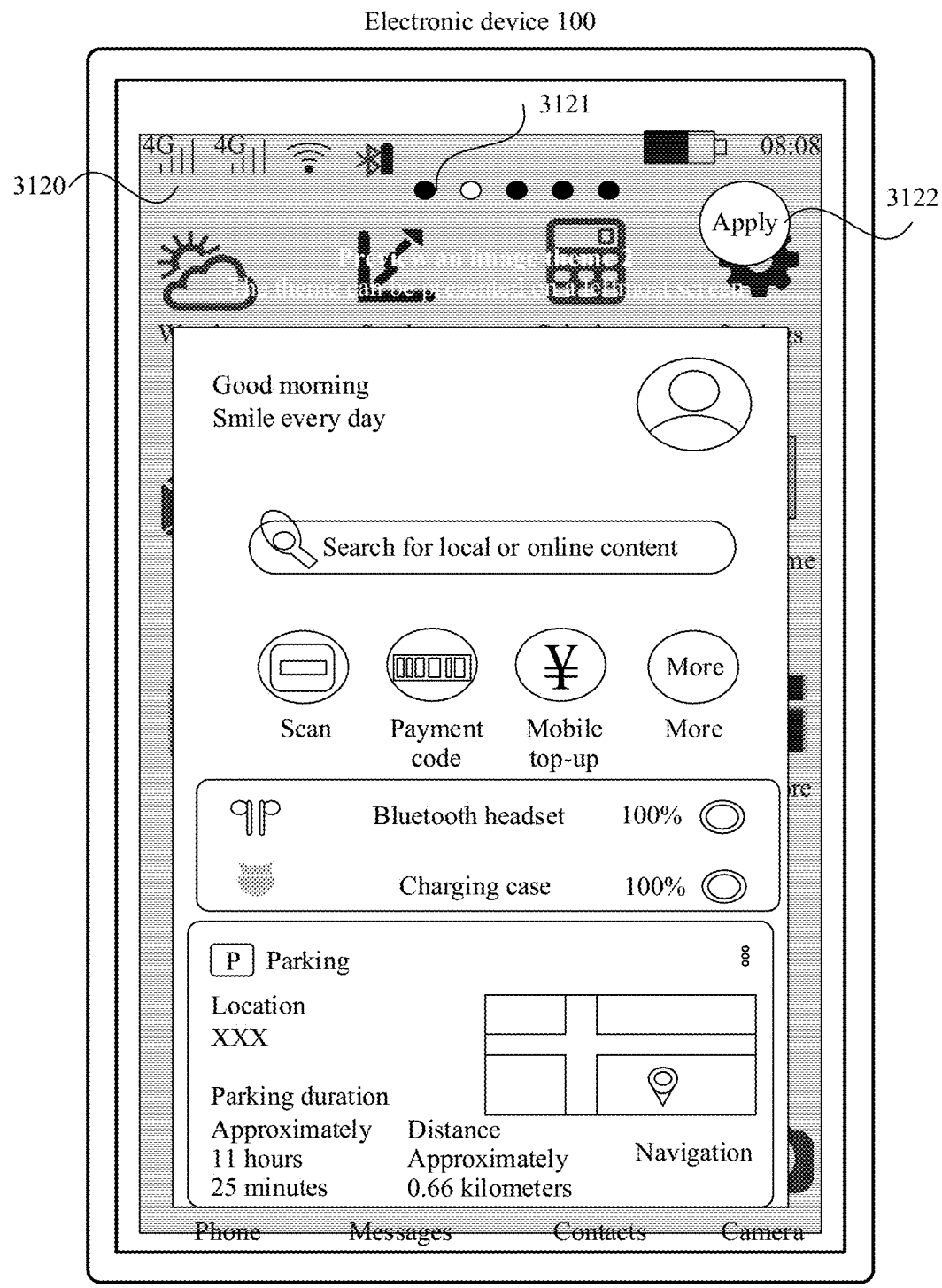
Figure 31D:
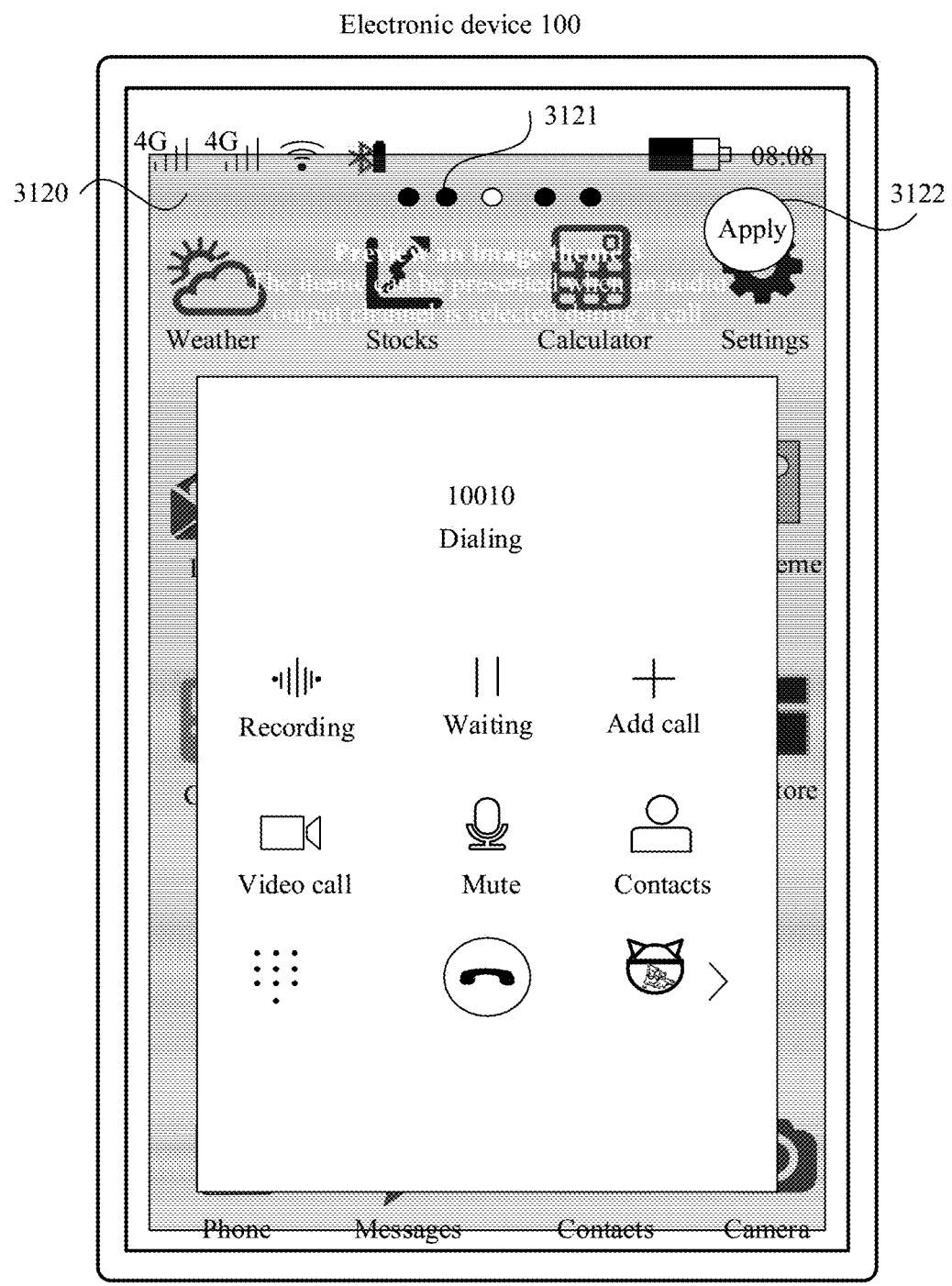
Figure 31E:
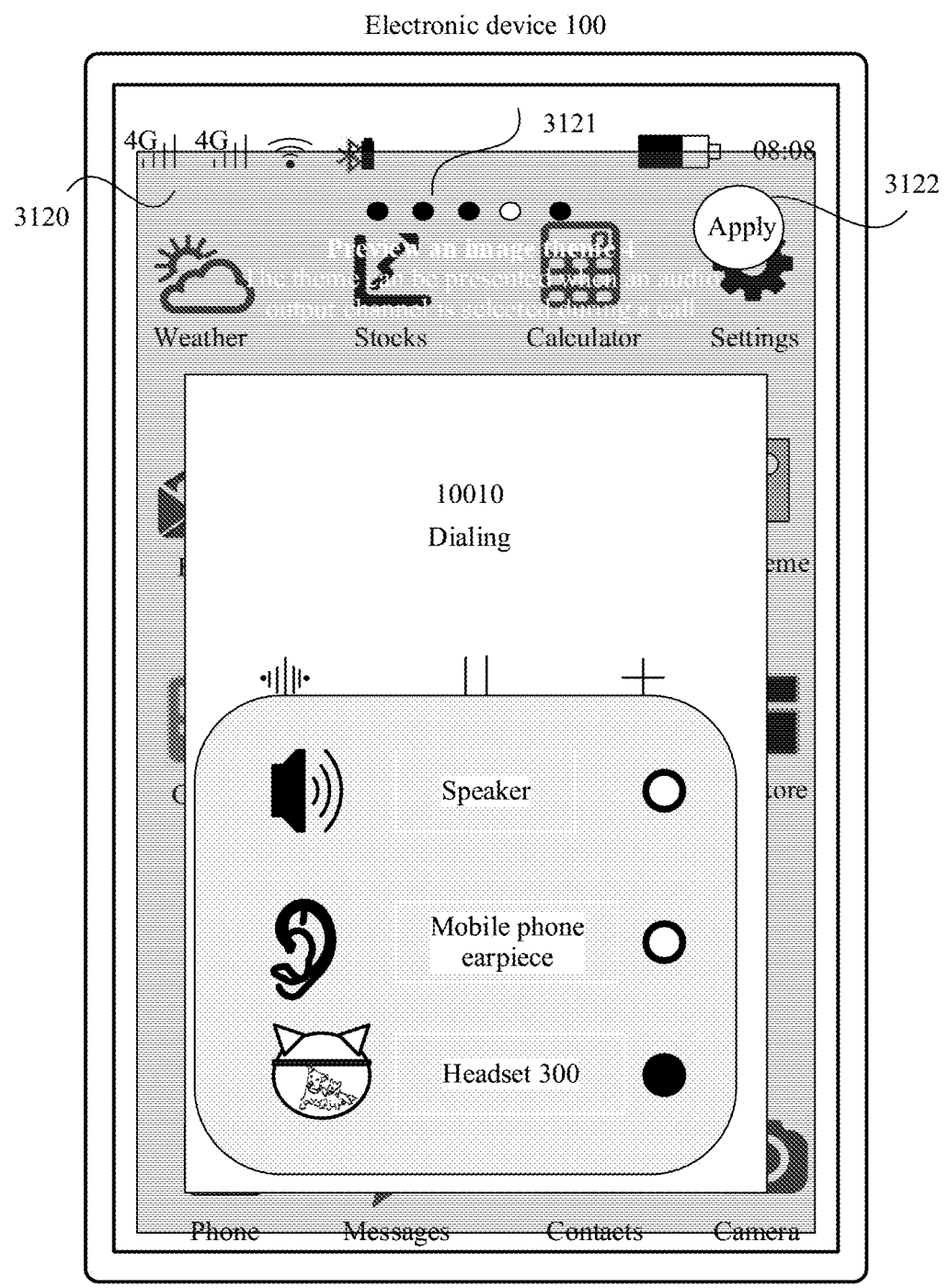

After receiving the headset theme 3022 shared by the electronic device 200, the electronic device 100 of the shared party may display an example notification 3110 shown in FIG. 31A, where the notification 3110 may be used to indicate that the headset theme 3022 shared by the sharing party is received.

Figure 31F:
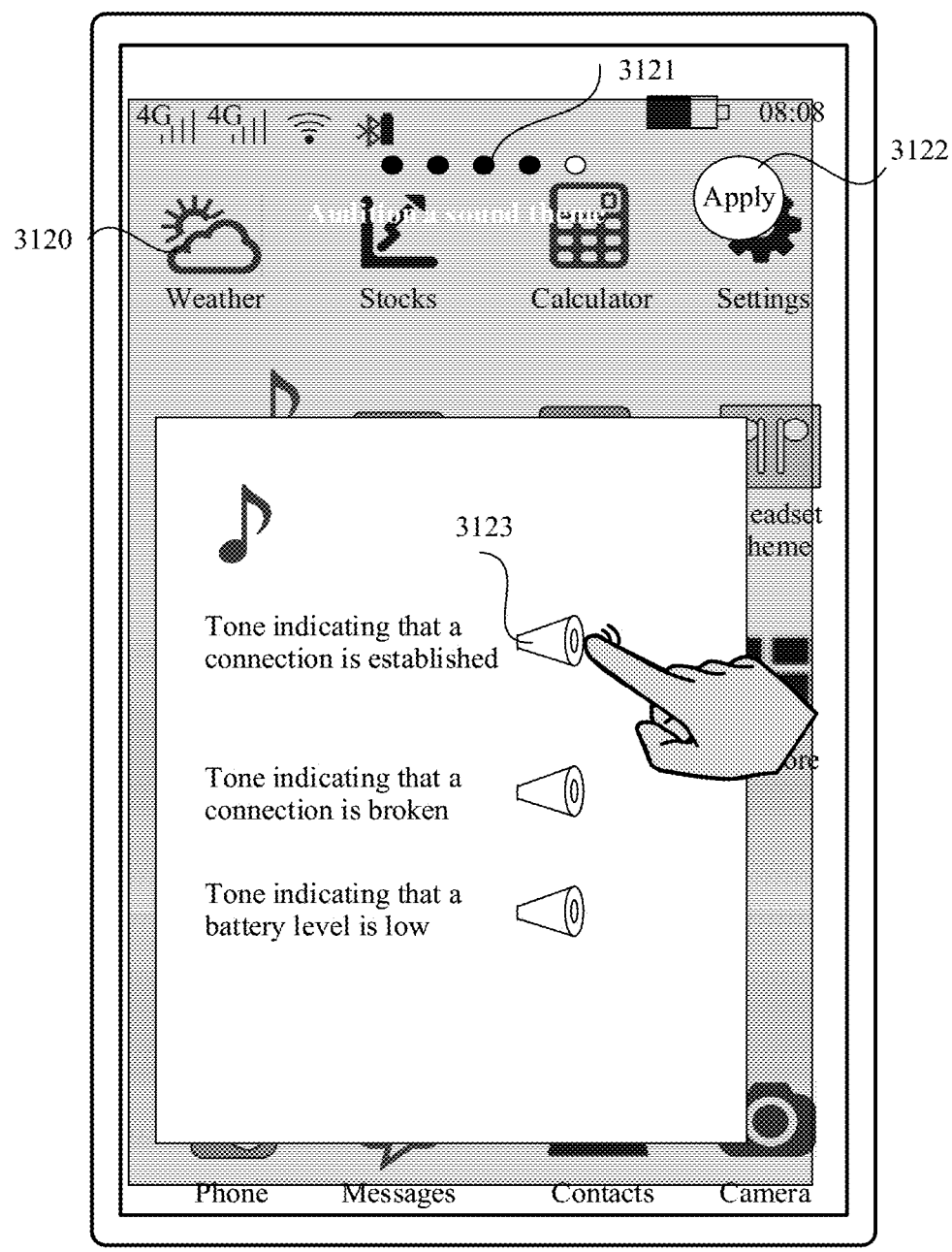

The electronic device 100 of the shared party may detect an operation performed by the user to preview the headset image theme 3022 or audition the headset sound theme 3022, for example, an operation of tapping a preview control 3111 in the notification 3110 shown in FIG. 31A. In response to the operation, as shown in FIG. 31B to FIG. 31E, the electronic device 100 may display a preview interface of the headset image theme, where the preview interface is used to present the headset image theme 3022 from the sharing party. As shown in FIG. 31F, the electronic device 100 may display an audition interface of the headset sound theme, where the audition interface is used to present the headset sound theme 3022 from the sharing party.

As shown in FIG. 31B to FIG. 31E, the electronic device 100 may display a preview interface 3120 of the headset image theme, where the preview interface 3120 is used to present the headset image theme 3022 from the sharing party.

The preview interface 3120 may be used to display an image interface element included in the headset image theme 3022. As shown in FIG. 31B to FIG. 31E, the preview interface may include a plurality of pages, which are separately used to display image interface elements in different usage scenarios that are included in the headset image theme 3022. Specifically, a page shown in FIG. 31B may be used to display an image interface element in a usage scenario of "establishing a connection", to present a headset image theme 3022 in the usage scenario of "establishing a connection". Specifically, a page shown in FIG. 31C may be used to display an image interface element in a "leftmost screen" usage scenario, to present a headset image theme 3022 in the "leftmost screen" usage scenario. Specifically, a page shown in FIG. 31D and FIG. 31E may be used to display an image interface element in a usage scenario of "selecting an audio output channel during a call", to present a headset image theme 3022 in the usage scenario of "selecting an audio output channel during a call". The electronic device may detect an operation of tapping a speaker icon 3123 in the user interface 3120 shown in FIG. 31F. In response to the operation, the electronic device 100 may play an alert tone in the headset sound theme A.

A page indicator 3121 and an apply icon 3122 are further included on the top of the preview interface. The page indicator 3121 indicates a location relationship between a currently displayed page and another page, and headset image themes in different cases may be viewed by sliding leftward or rightward in the preview interface.

The electronic device 100 of the shared party may detect an operation performed by the user to apply the headset image theme 3022, for example, an operation of tapping the apply control 3122 shown in FIG. 31B to FIG. 31E. In response to the operation, the electronic device 100 may replace the previously used headset image theme with the headset image theme 3022.

The previously used headset image theme may be an example headset image theme used by default by the electronic device 100 of the shared party shown in FIG. 3A to FIG. 3C, or may be a replaced headset image theme, for example, a replaced headset image theme by using the method provided in embodiments of this application.

Herein, that the electronic device 100 replaces the original headset image theme with the headset image theme 3022 may be specifically implemented in the following manner: The electronic device 100 replaces, with an image resource (for example, an icon or a picture) referenced by the headset image theme 3022, an image resource referenced by the previous headset image theme. During specific replacement, the electronic device 100 may replace image resources in a one-to-one correspondence based on a framework of the headset image theme. The framework of the headset image theme specifies mapping relationships between image interface elements in the headset image theme and image resources to be referenced by the image interface elements. For example, the framework of the headset image theme may be shown in Table 1.

During replacement of a headset image theme package, image resources may be replaced in a one-to-one correspondence based on image interface elements. For example, an image resource referenced by a left earbud icon in a leftmost screen usage scenario in a headset image theme package B is correspondingly replaced with an image resource referenced by the left earbud icon in the leftmost screen usage scenario in a headset image theme package A.

The electronic device 100 of the shared party may detect an operation performed by the user to apply the headset theme 3022, for example, an operation of tapping the apply control 3122 shown in FIG. 31B to FIG. 31F. In response to the operation, the electronic device 100 may replace the previously used headset theme with the headset theme 3022.

(3) FIG. 32A to FIG. 32D show examples of user interfaces obtained after a shared party uses a headset theme (including a headset image theme and a headset sound theme) from a sharing party.

Figure 32A:
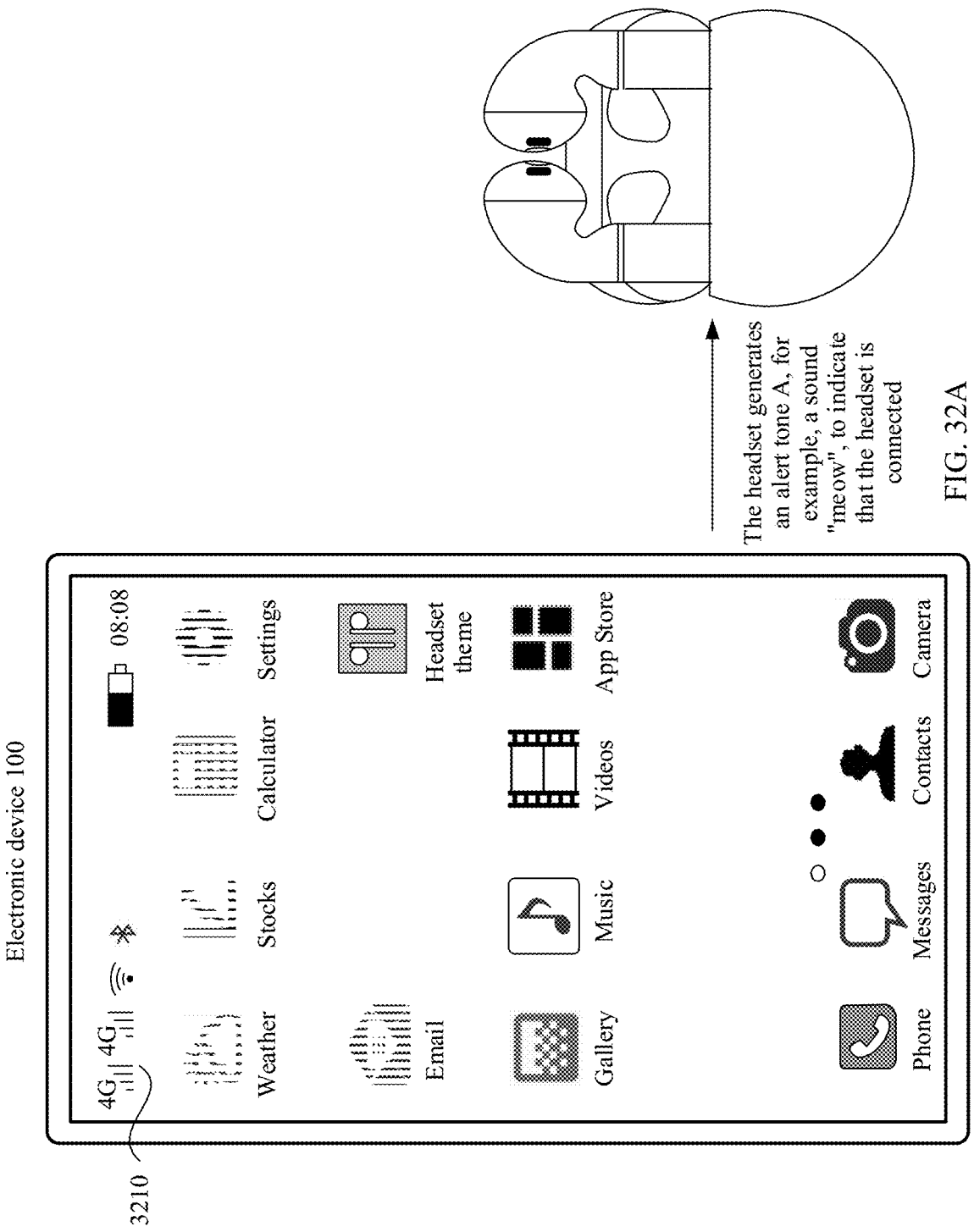
FIG. 32A to FIG. 32D are schematic diagrams of another group of interfaces according to an embodiment of this application.

As shown in FIG. 32A, after the shared party replaces, with the headset sound theme from the sharing party, a headset sound theme originally used by the shared party, when the electronic device 100 of the shared party is reconnected to a Bluetooth headset 300, a user who wears the headset hears a sound "meow".

Figure 32B:
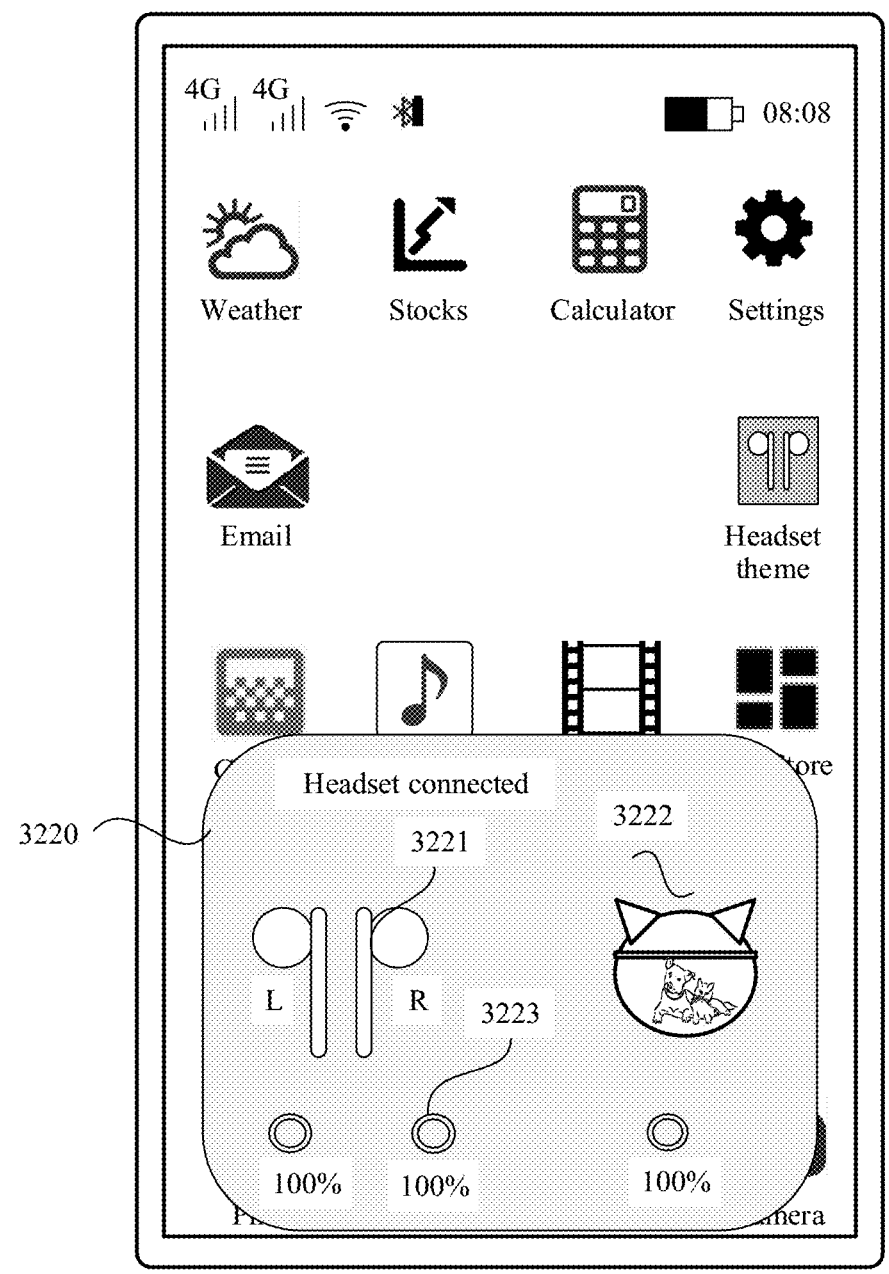

As shown in FIG. 32B, when the electronic device 100 is reconnected to TWS earbuds, the electronic device 100 may display a pop-up window interface 3220. The pop-up window interface 3220 displays a series of image interface elements, for example, a headset background 3221, a headset case protective cover background 3222, and a headset case battery level icon 3223.

Figure 32C:
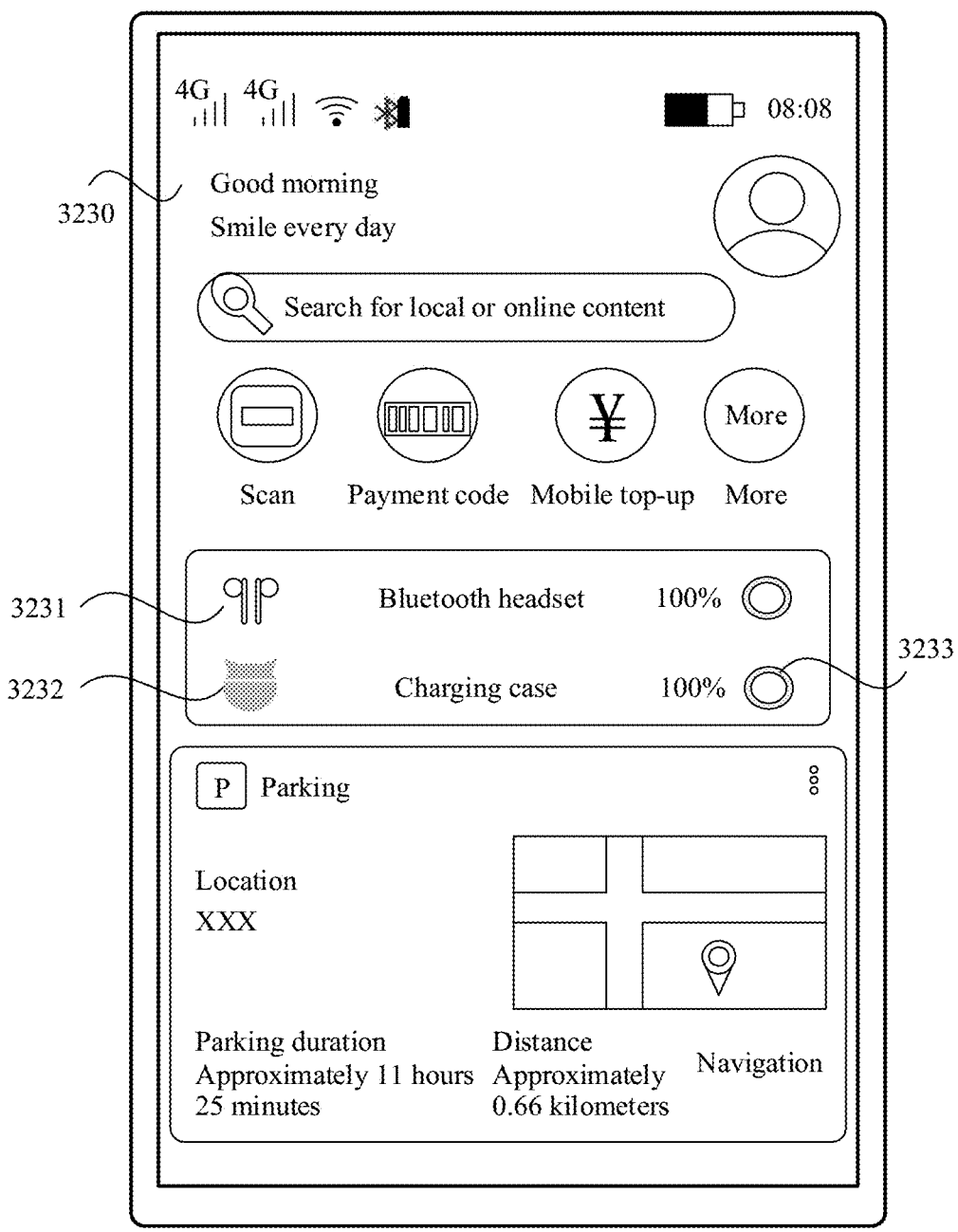

As shown in FIG. 32C, after the TWS earbuds are connected to the electronic device 100, the electronic device 100 may display a series of graphical interface elements in a user interface 3230 (which may also be referred to as a "leftmost screen"), for example, a headset background 3231, a headset case background 3232, and a headset case battery level icon 3233.

Figure 32D:
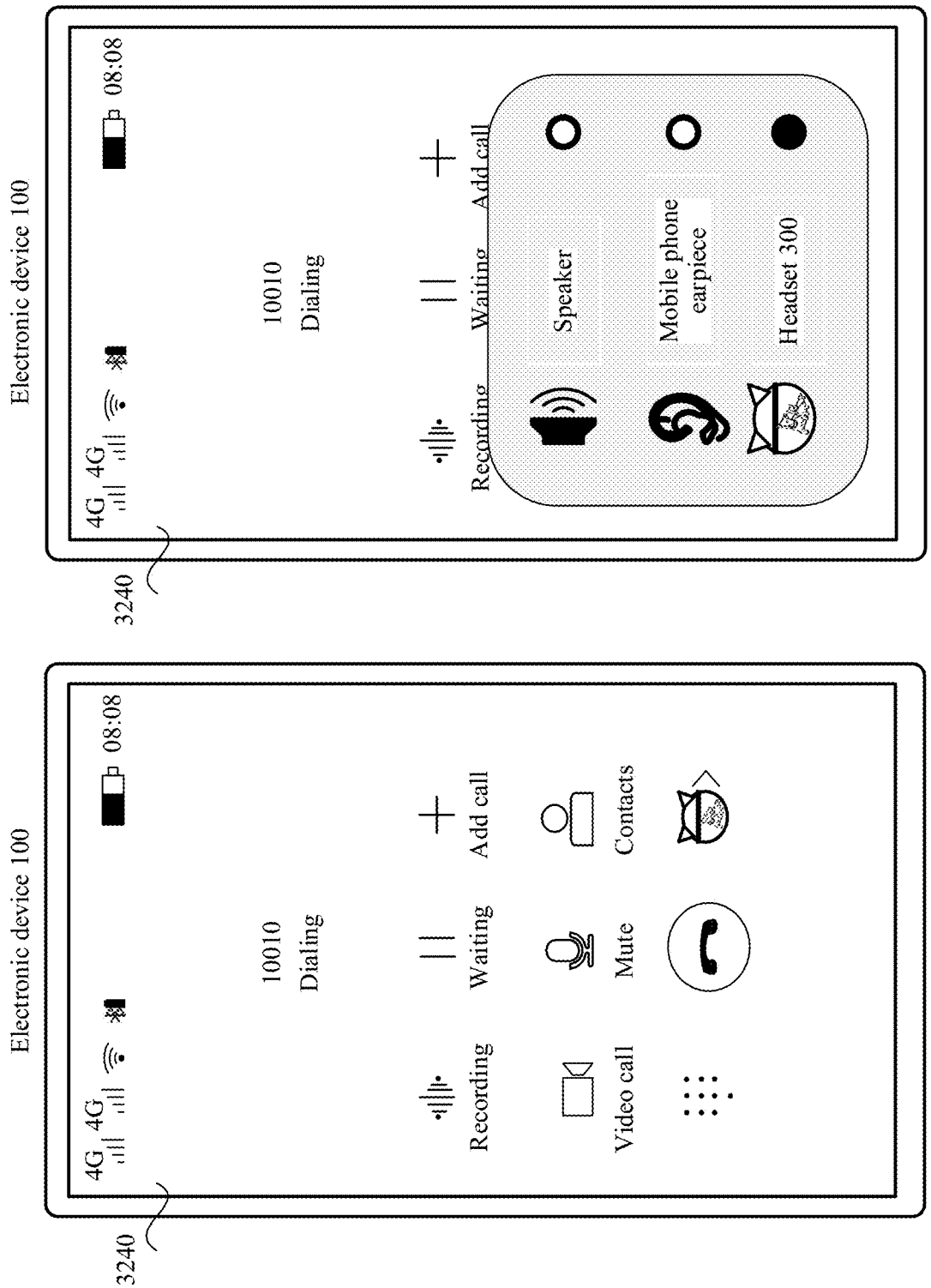

As shown in FIG. 32D, after the TWS earbuds are connected to the electronic device 100, the electronic device 100 displays a graphical interface element in the headset image theme 3022 when selecting an audio output channel during a call.

It can be learned that, a difference from the previously used headset image themes shown in FIG. 3A and FIG. 3B lies in that the headset case protective cover backgrounds shown in FIG. 32B and FIG. 32C correspondingly replace the headset case backgrounds in FIG. 3A and FIG. 3B, and the headset alert tone presented in FIG. 32A correspondingly replaces the headset alert tone presented in FIG. 3E, that is, the electronic device 100 replaces the previously used headset theme with the headset theme shared by the sharing party. In this way, a personalized requirement of the user is met and user experience is improved.

To further help the user quickly share the headset theme, this embodiment of this application further provides a series of user interfaces for sharing the headset theme in an NFC OneHop manner. Descriptions are provided below with reference to FIG. 33A to FIG. 33F, FIG. 34A to FIG. 34F, and FIG. 35A to FIG. 35D.

FIG. 33A to FIG. 33F, FIG. 34A to FIG. 34F, and FIG. 35A to FIG. 35D show examples of a series of user interfaces for sharing a headset theme in an NFC OneHop manner.

(1) FIG. 33A to FIG. 33F show examples of user interfaces in which a sharing party shares a headset theme with a shared party in an NFC OneHop manner in a usage scenario in which the sharing party views the headset theme.

Figure 33A:
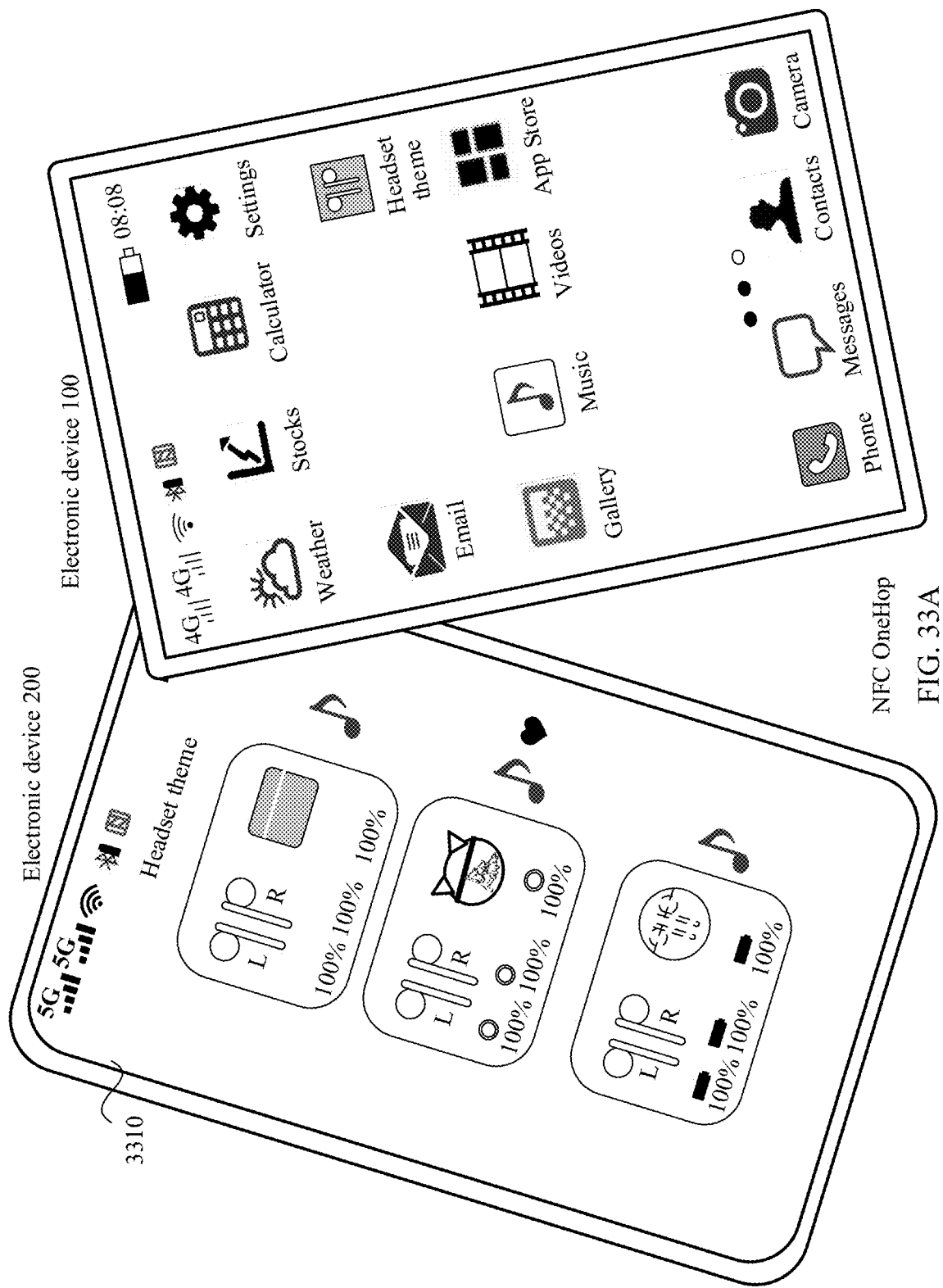
FIG. 33A to FIG. 33F are schematic diagrams of another group of interfaces according to an embodiment of this application.

As shown in FIG. 33A, in a scenario in which the electronic device 200 displays a user interface 3310, the electronic device 200 discovers the electronic device 100 through NFC, that is, the electronic device 200 detects an NFC OneHop operation, and the electronic device 200 may send a request to the electronic device 100 through NFC, to query a model of a headset of the shared party. Herein, the headset of the shared party is a headset matching the electronic device 100, and may be a headset connected to or being connected to the electronic device 100.

Figure 33B:
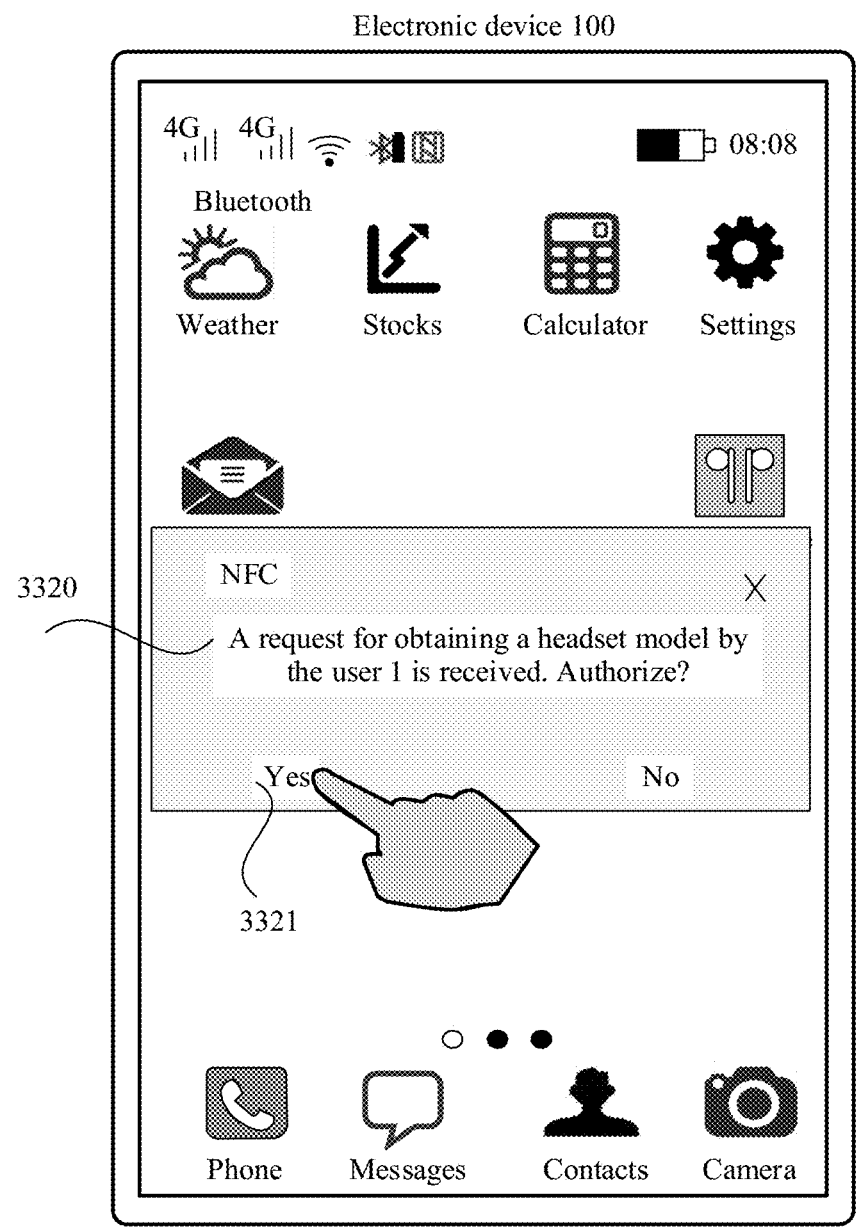

Correspondingly, the electronic device 100 may receive, through NFC, the request sent by the electronic device 200. In addition, as shown in FIG. 33B, the electronic device 100 may display a notification 3320, where the notification 3320 may be used to remind that the request from the sharing party is received. The electronic device 100 may detect an operation performed by the user to authorize to send the model of the headset to the sharing party, for example, an operation of tapping an option ("Yes") 3321 in a user interface shown in FIG. 33B. In response to the operation, the electronic device 100 may send the model of the headset of the shared party to the electronic device 200 through NFC.

Figure 33C:
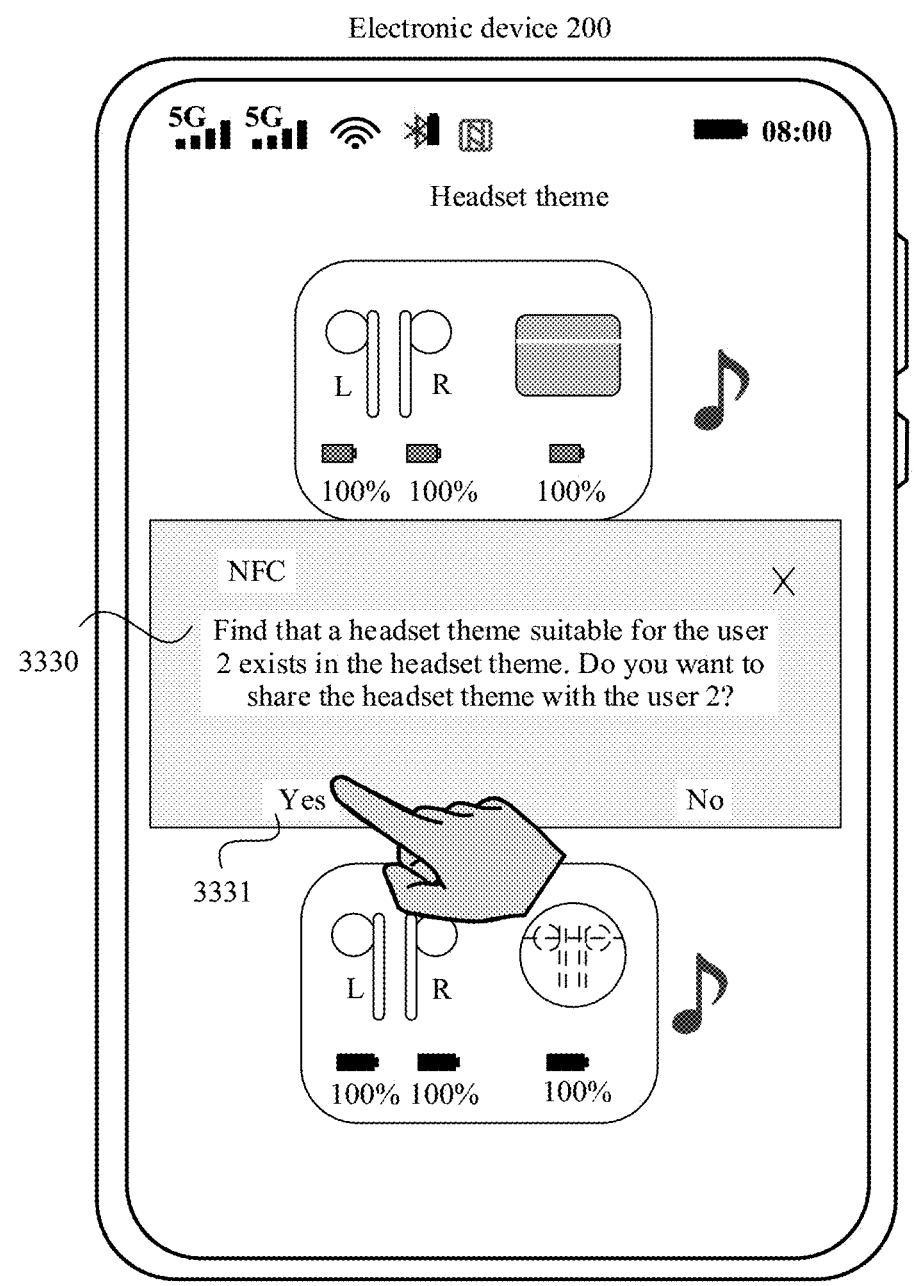

When receiving the model of the headset of the shared party from the electronic device 200, as shown in FIG. 33C, the electronic device 200 may display a notification 3330, where the notification 3330 may be used to remind the sharing party that there is a headset theme adapted to the shared party. The electronic device 200 may detect an operation performed by a user of the sharing party to agree to share the headset theme, for example, an operation of tapping an option ("Yes") 3331 in a user interface shown in FIG. 33C. In response to the operation, the electronic device 200 may display an example user interface 3340 shown in FIG. 33D. The user interface 3340 may display options of one or more headset themes adapted to the electronic device 100.

The electronic device 200 of the sharing party may detect an operation that the user (for example, the sharing party, that is, the "user 1") selects a headset theme 3341 from the one or more headset themes and shares the headset theme 3341 with the electronic device 100 of the shared party. The operation may be a series of operations, for example, operations of first selecting the headset theme 3341 from the one or more headset themes displayed in the user interface 3340 shown in FIG. 33D, then tapping a share control 3342 in a user interface 3340 shown in FIG. 33E, and finally selecting the electronic device 100 of the shared party from a list 3351 displayed in a user interface 3350 shown in FIG. 33F. In response to the operation, the electronic device 200 sends the headset theme 3341 to the electronic device 100.

The list 3351 may display device identification information (for example, a device name and model) of one or more devices, and the one or more devices are devices connected to the electronic device 200 or devices discovered by the electronic device 200. As shown in FIG. 17A, the electronic device 100 of the shared party is "Mobile phone of the user 2", and the "user 2" is the shared party.

(2) FIG. 34A to FIG. 34F show examples of user interfaces in which a shared party receives, previews, and applies a headset theme (including a headset image theme and a headset sound theme) from a sharing party.

Figure 34A:
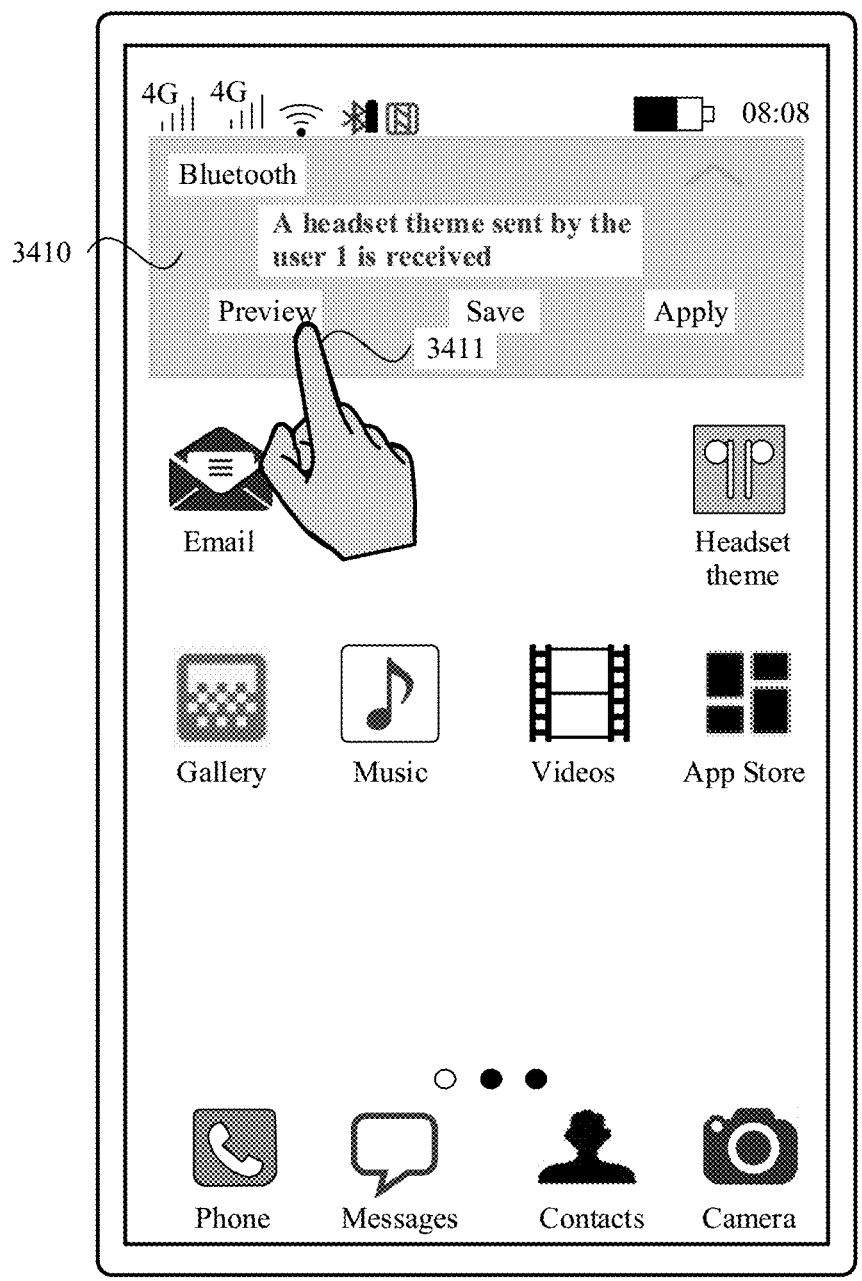
FIG. 34A to FIG. 34F are schematic diagrams of another group of interfaces according to an embodiment of this application.
Figure 34B:
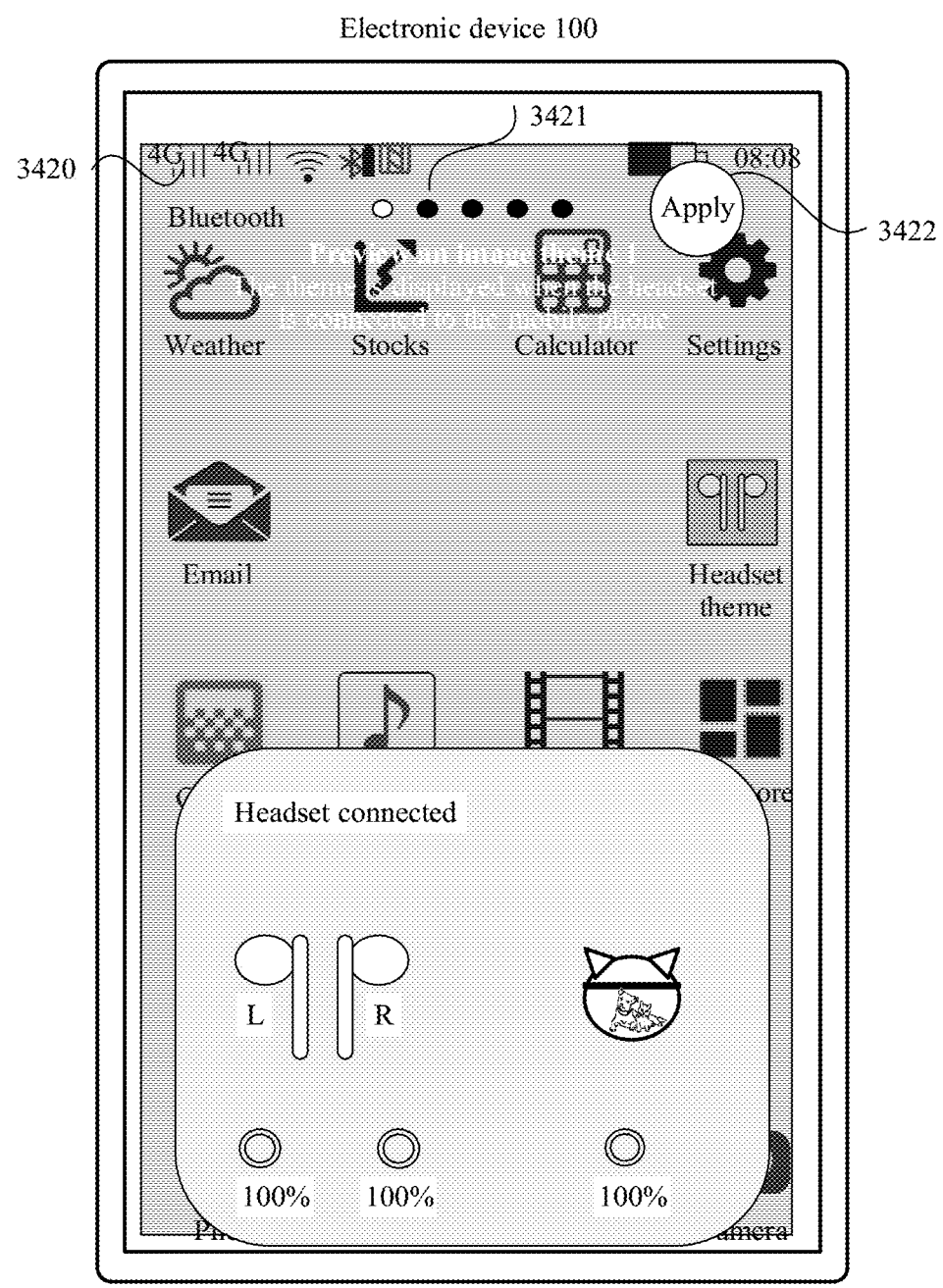
Figure 34C:
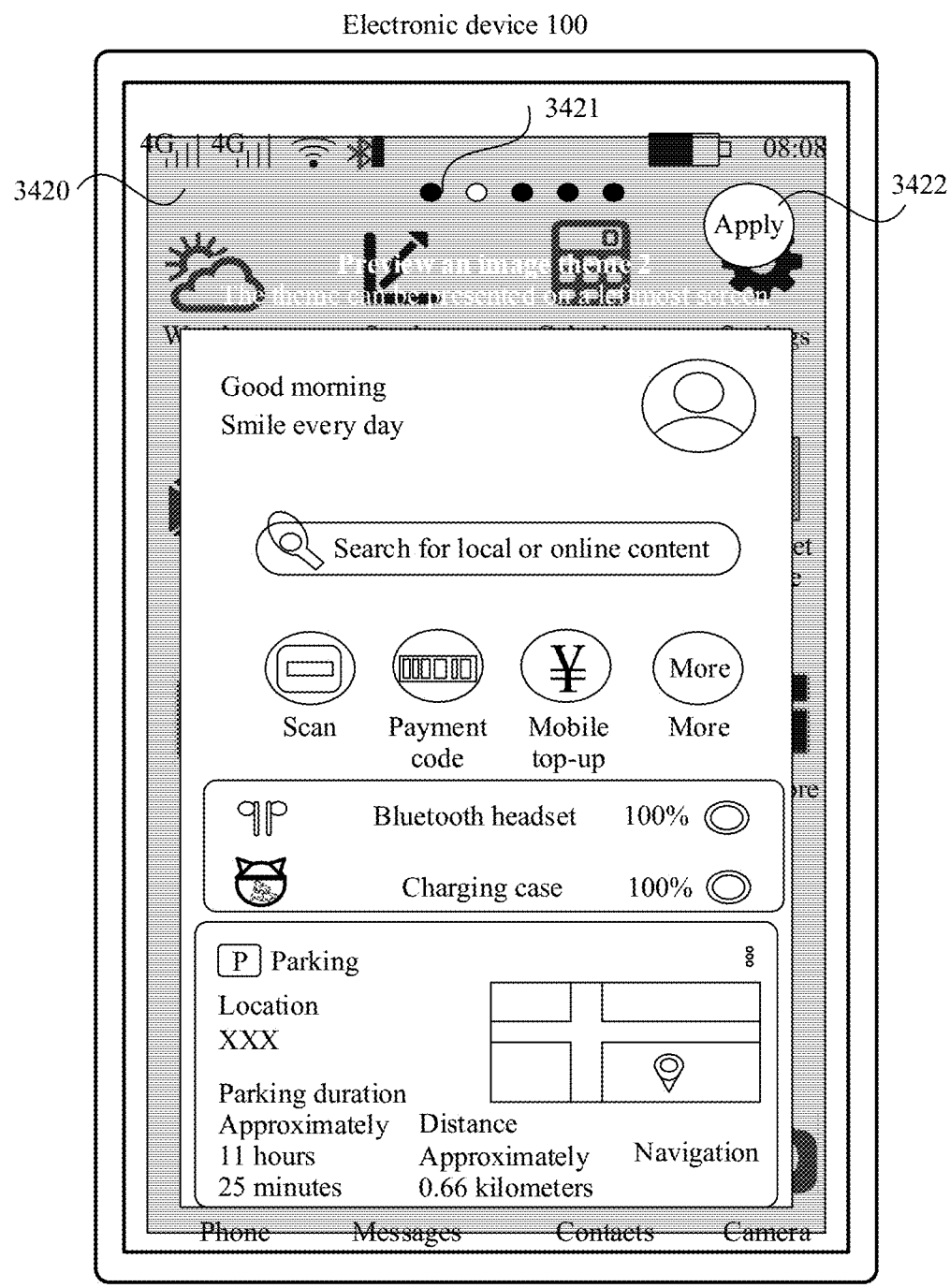
Figure 34D:
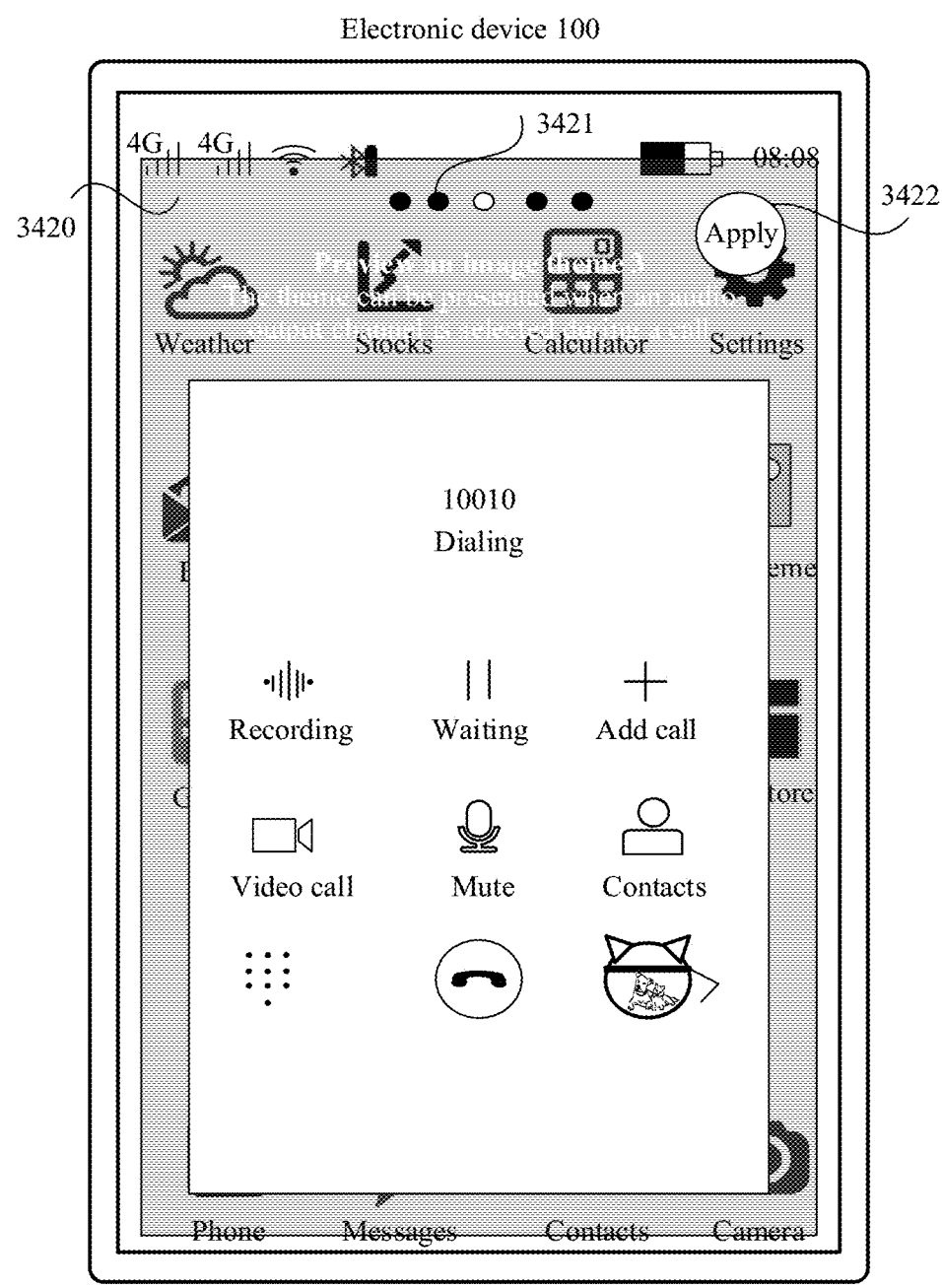
Figure 34E:
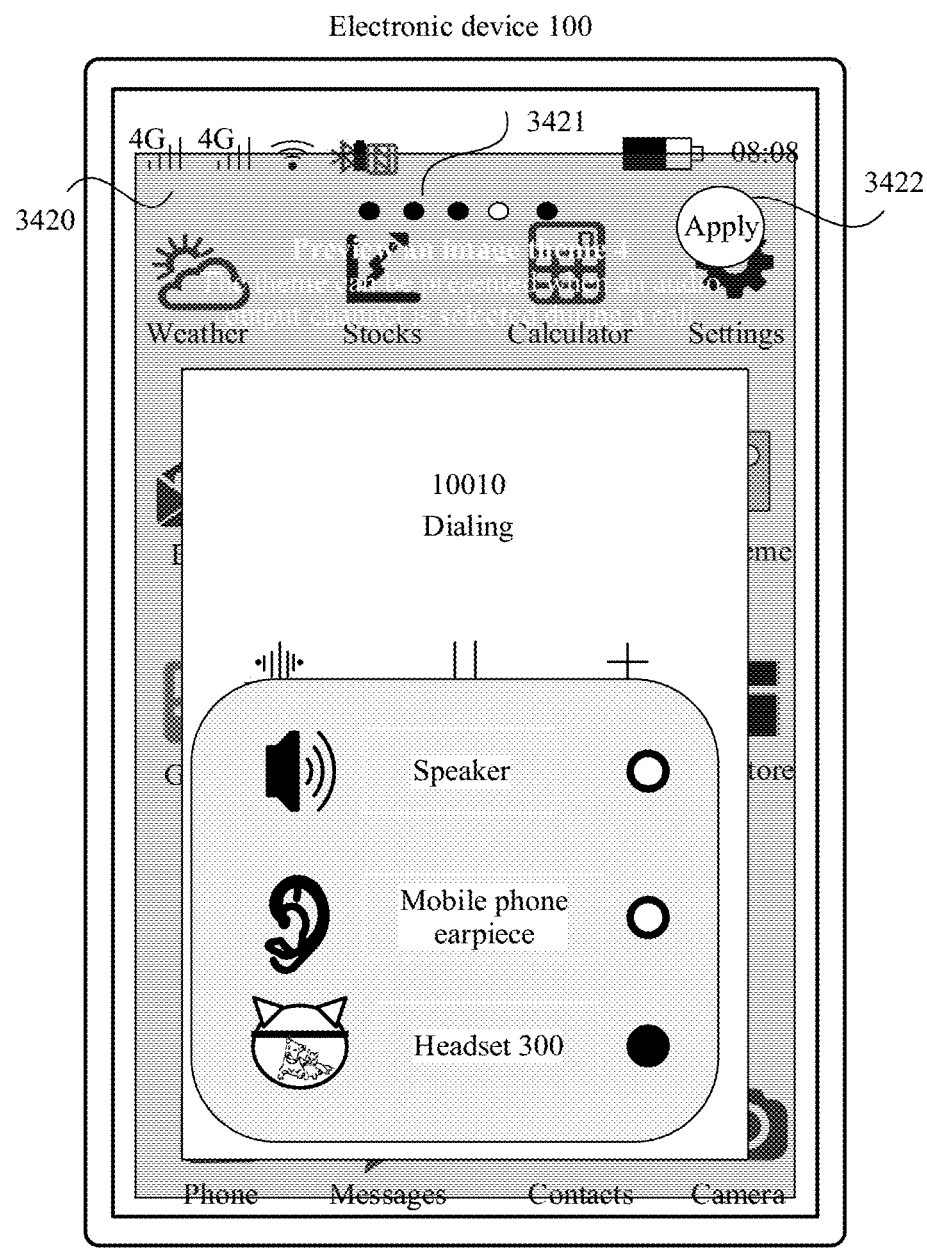

After receiving the headset theme 3341 shared by the electronic device 200, the electronic device 100 of the shared party may display an example notification 3410 shown in FIG. 34A, where the notification 3410 may be used to indicate that the headset theme 3341 shared by the sharing party is received.

Figure 34F:
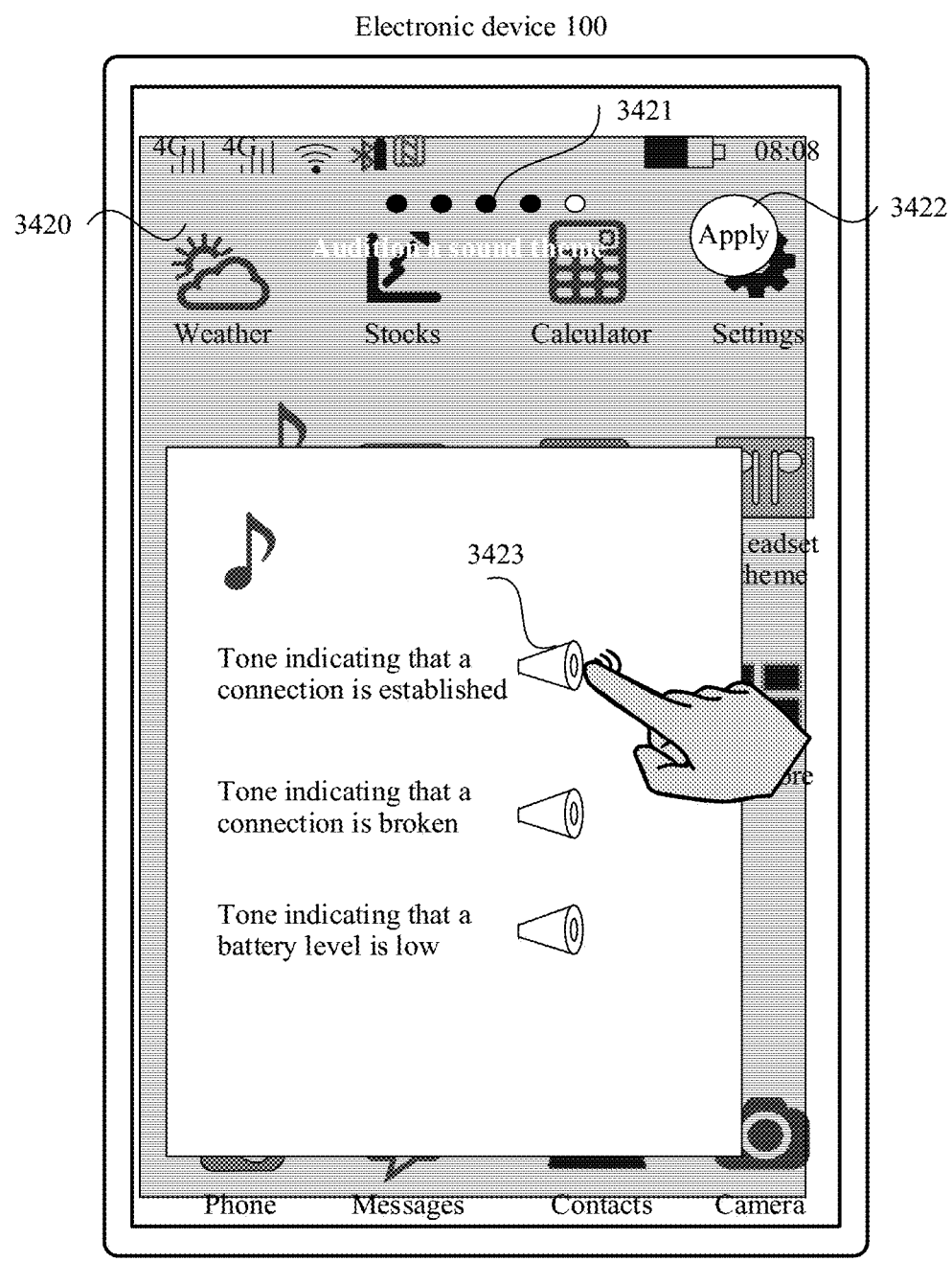

The electronic device 100 of the shared party may detect an operation performed by the user to preview the headset image theme 3341 or audition the headset sound theme 3341, for example, an operation of tapping a preview control 3411 in the notification 3410 shown in FIG. 34A. In response to the operation, as shown in FIG. 34B to FIG. 34E, the electronic device 100 may display a preview interface 3420 of the headset image theme, where the preview interface 3420 is used to present the headset image theme 3341 from the sharing party. As shown in FIG. 34F, the electronic device 100 may display an audition interface of the headset sound theme, where the audition interface is used to audition the headset sound theme 3341 from the sharing party. The electronic device 100 detects an operation of tapping a speaker icon 3423 in the user interface 3420 shown in FIG. 34F. In response to the operation, the electronic device 100 may play an alert tone in the headset sound theme 3341.

For the user interface 3420 shown in FIG. 34B to FIG. 34E, refer to the foregoing descriptions of FIG. 31B to FIG. 31E. For the user interface 3420 shown in FIG. 34F, refer to the foregoing descriptions of FIG. 31F. Details are not described herein again.

The electronic device 100 of the shared party may detect an operation performed by the user to apply the headset theme 3341, for example, an operation of tapping an apply control 3422 shown in FIG. 34B to FIG. 34F. In response to the operation, the electronic device 100 may replace the previously used headset theme with the headset theme 3341.

(3) FIG. 35A to FIG. 35D show examples of user interfaces obtained after a shared party uses a headset theme (including a headset image theme and a headset sound theme) from a sharing party.

As shown in FIG. 35A, after the shared party replaces, with the headset sound theme from the sharing party, a headset sound theme originally used by the shared party, when the electronic device 100 of the shared party is reconnected to a headset 300, a user who wears the headset hears a sound "meow".

Figure 35B:
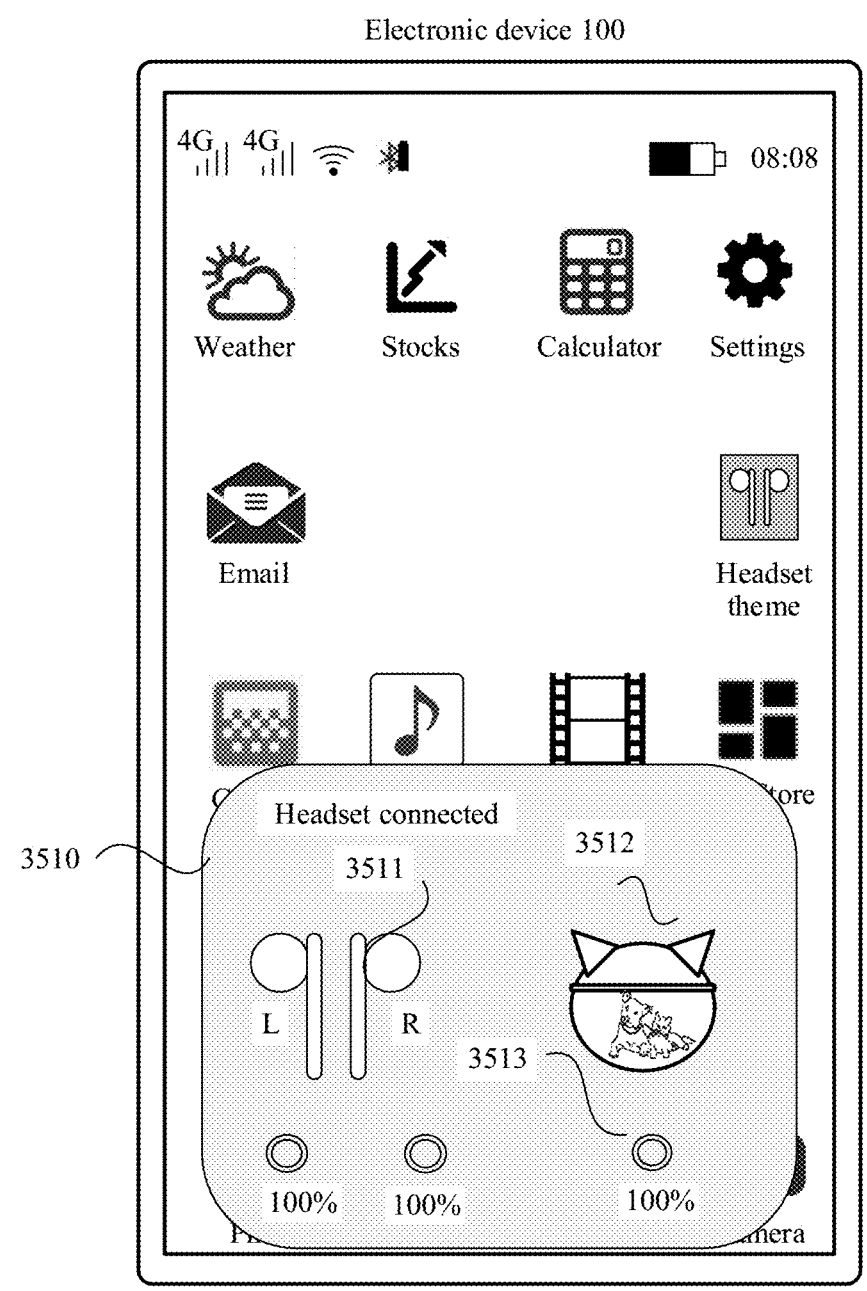

As shown in FIG. 35B, when the electronic device 100 is reconnected to TWS earbuds, the electronic device 100 may display a pop-up window interface 3510. FIG. 35B is the same as FIG. 28A, and descriptions of FIG. 28A are also applicable to FIG. 35B. Details are not repeated herein.

Figure 35C:
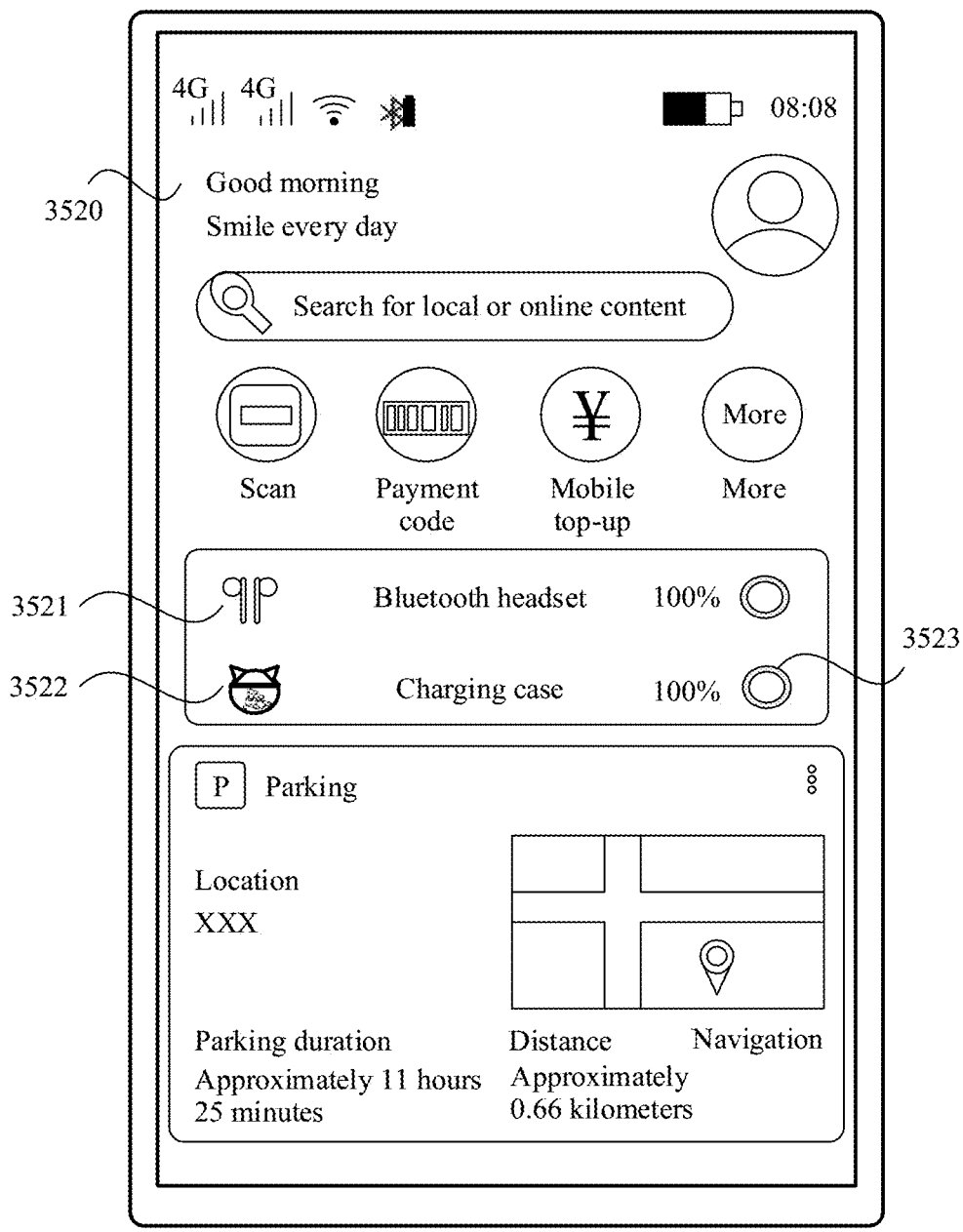

As shown in FIG. 35C, after the TWS earbuds are connected to the electronic device 100, the electronic device 100 may display a series of graphical interface elements in a user interface 3520 (which may also be referred to as a "leftmost screen"). FIG. 35C is the same as FIG. 28B, and descriptions of FIG. 28B are also applicable to FIG. 35C. Details are not repeated herein.

Figure 35D:
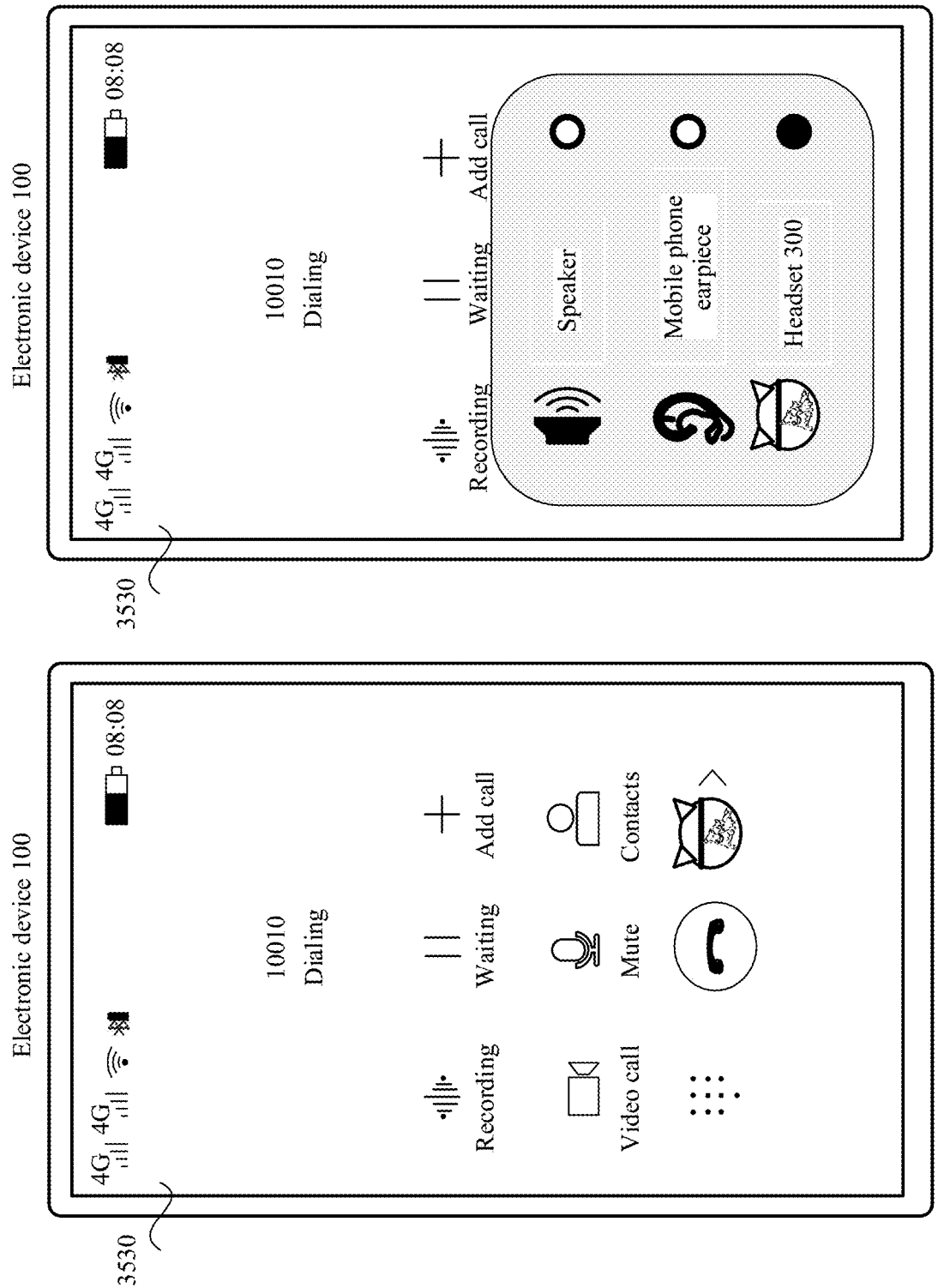

As shown in FIG. 35D, after the TWS earbuds are connected to the electronic device 100, the electronic device 100 displays a graphical interface element in the headset image theme A when selecting an audio output channel during a call.

It can be learned that, a difference from the previously used headset image themes shown in FIG. 3A and FIG. 3B lies in that the headset case protective cover backgrounds shown in FIG. 35B and FIG. 35C correspondingly replace the headset case backgrounds in FIG. 3A and FIG. 3B, and the headset alert tone presented in FIG. 35A correspondingly replaces the headset alert tone presented in FIG. 3E, that is, the electronic device 100 replaces the previously used headset theme with the headset theme shared by the sharing party. In this way, a personalized requirement of the user is met and user experience is improved.

In addition to sharing the entire headset theme package described above, when detecting NFC OneHop, the sharing party may also share the headset image theme or the headset sound theme only.

It can be learned from the foregoing series of user interfaces that, in this embodiment of this application, the user can be supported in sharing the headset theme, so that a sharing experience requirement of the user can be met, and a quantity of user interactions can be increased.

With reference to the foregoing series of user interfaces, the following describes, in detail by using an example in which accessory devices of the electronic device 100 and the electronic device 200 are the audio output devices 201 and 202 (briefly referred to as headsets below) in FIG. 1, a main procedure of an accessory theme replacement method provided in embodiments of this application. For an audio device such as a headset, an accessory theme such as a headset theme may include the following two aspects: a headset image theme and a headset sound theme. In the method provided in embodiments of this application, separate sharing of the headset image theme and the headset sound theme can be supported, or package sharing of the headset image theme and the headset sound theme can be supported. Descriptions are provided below.

Figure 36A:
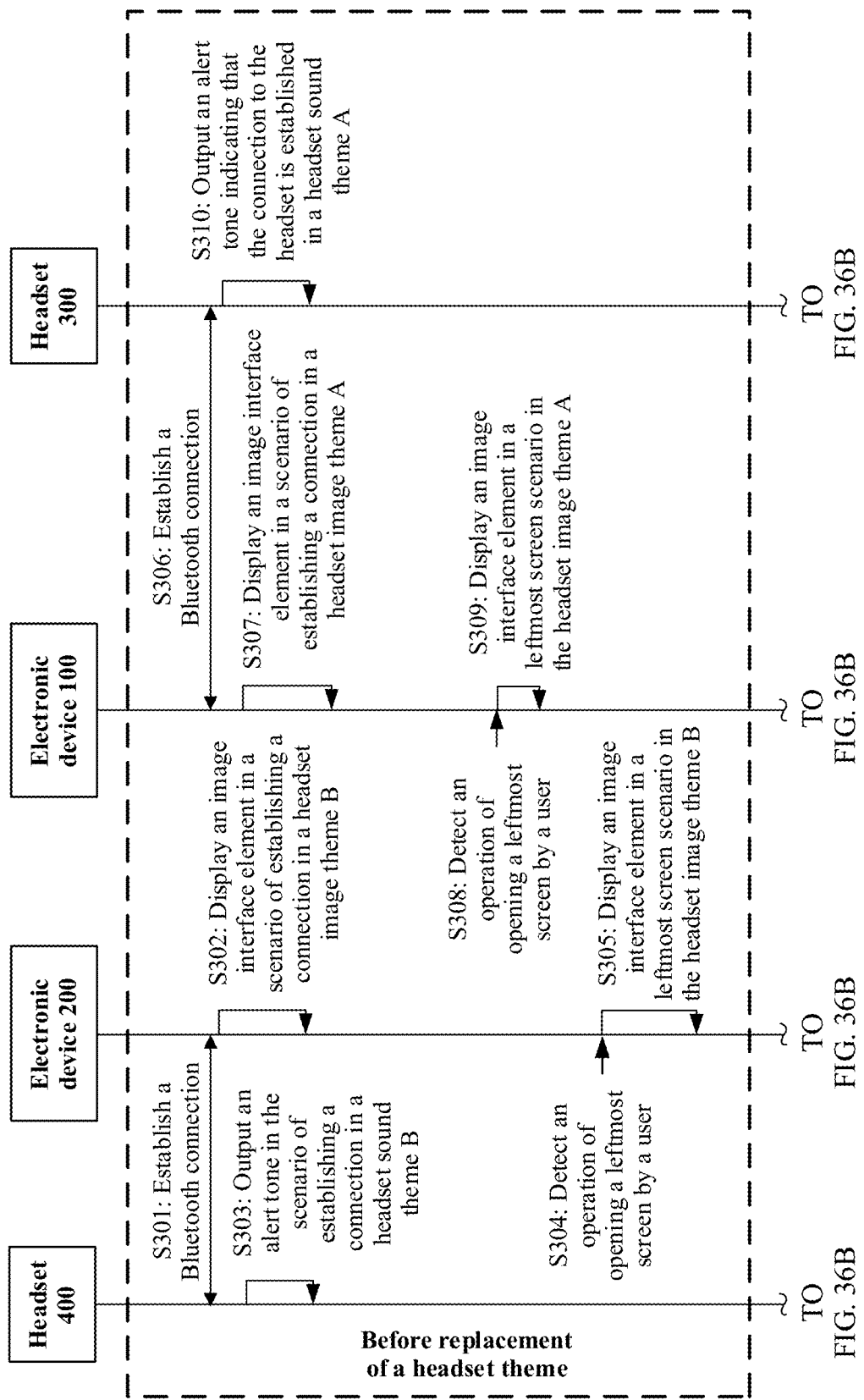
FIG. 36A to FIG. 36C show a procedure of a method for sharing a headset image theme according to an embodiment of this application.
Figure 36B:
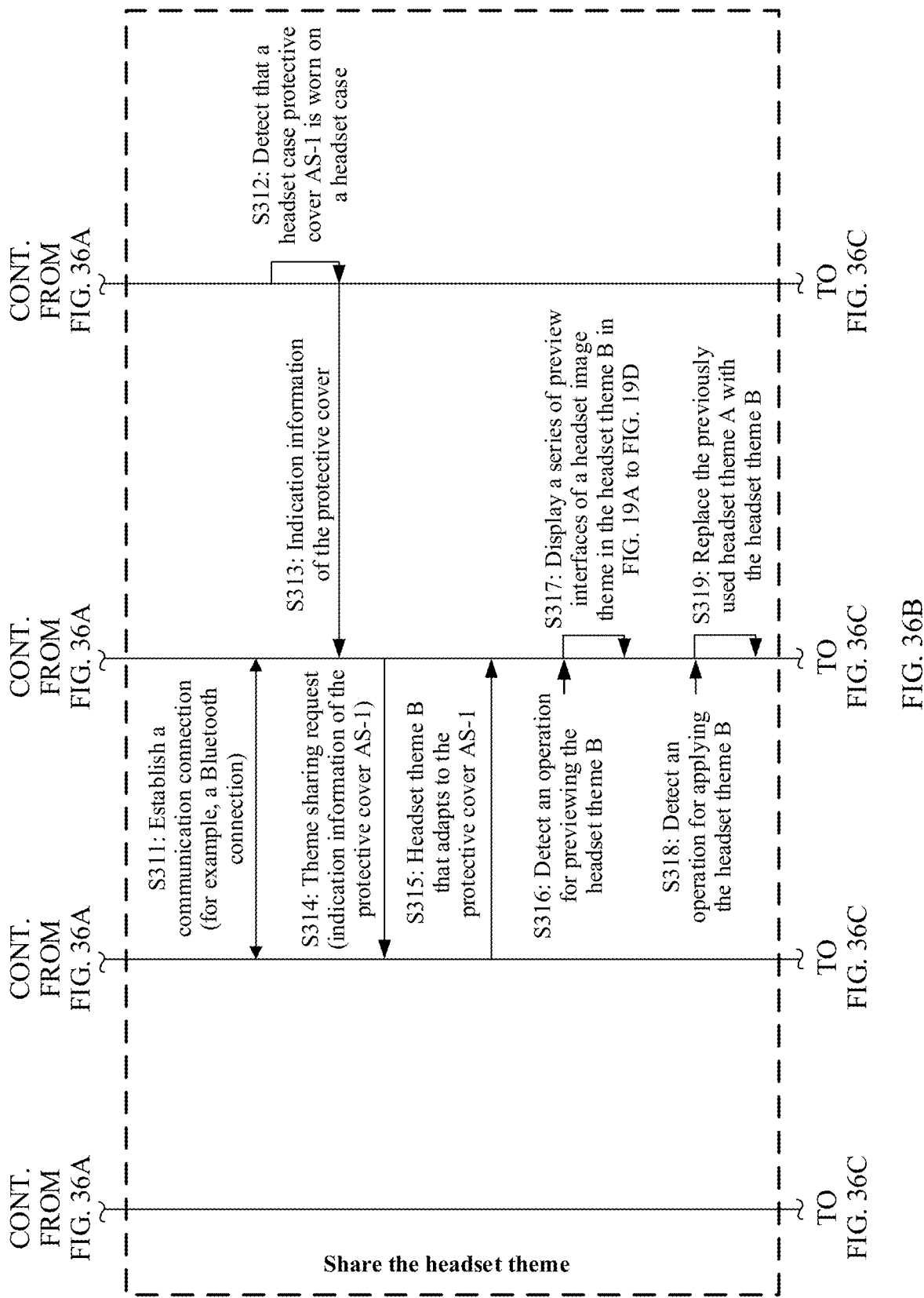
Figure 36C:
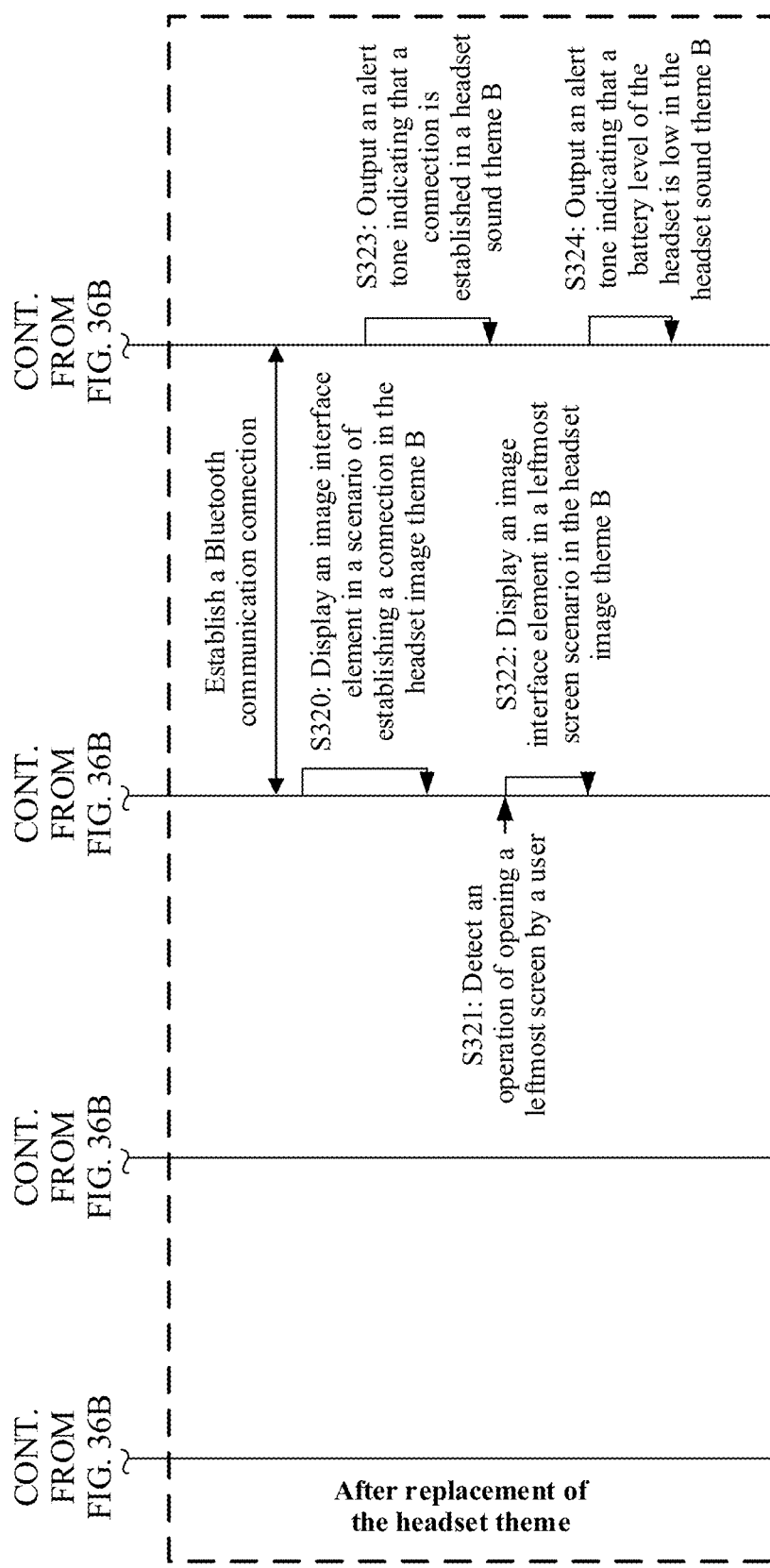
Figure 37A:
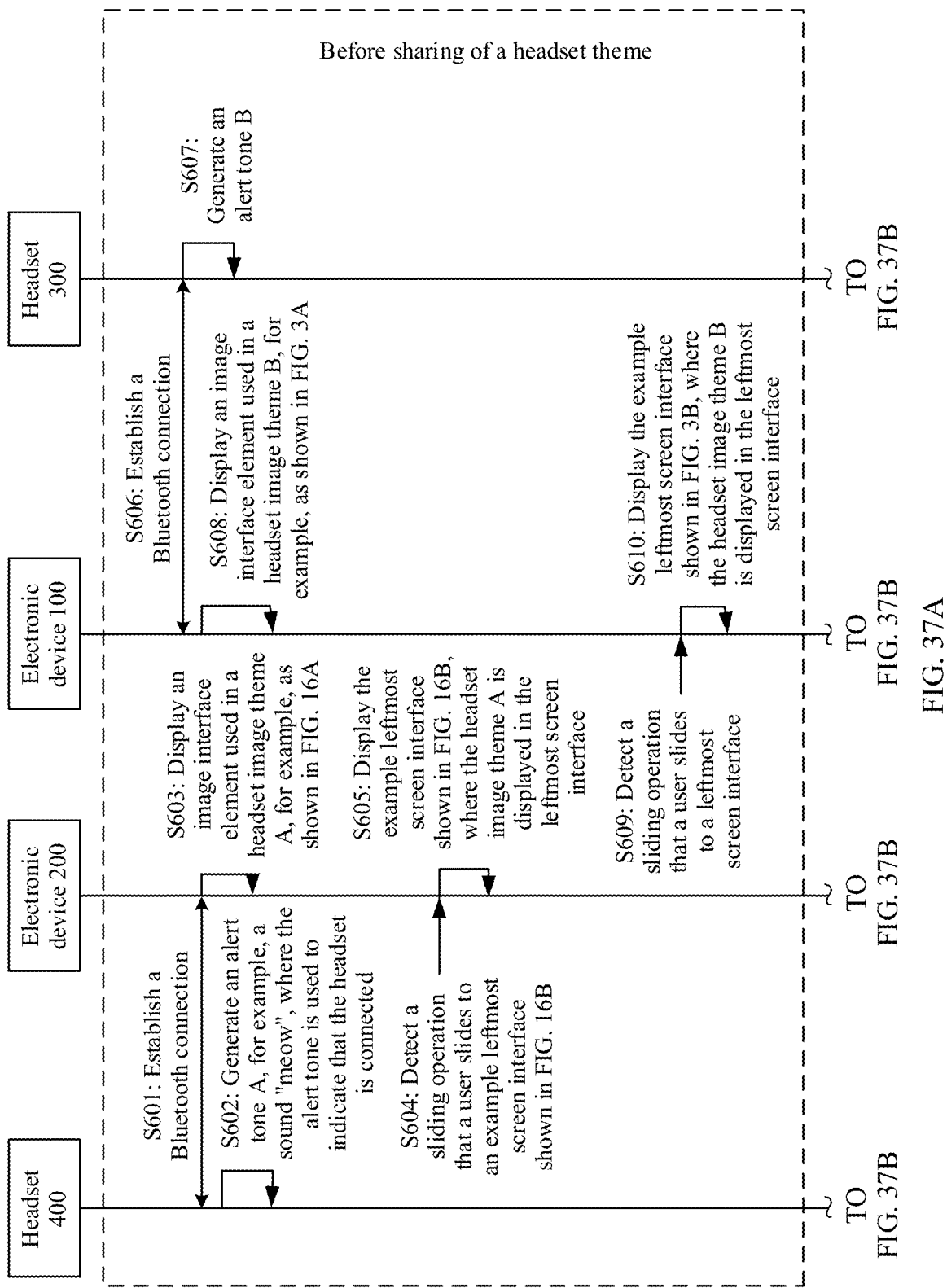
FIG. 37A to FIG. 37D show a procedure of a method for automatically triggering sharing of a headset theme according to an embodiment of this application.
Figure 37B:
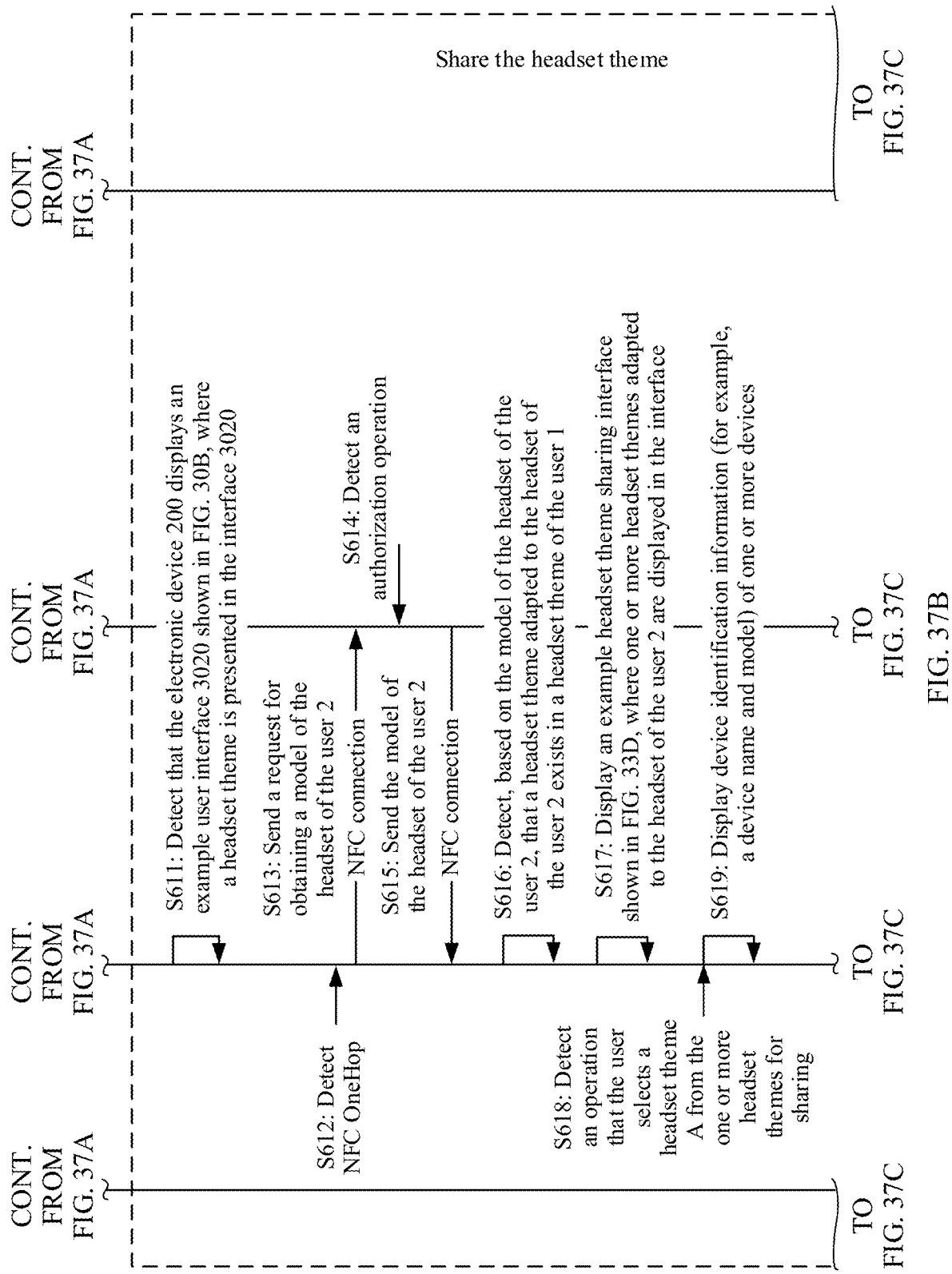
Figure 37C:
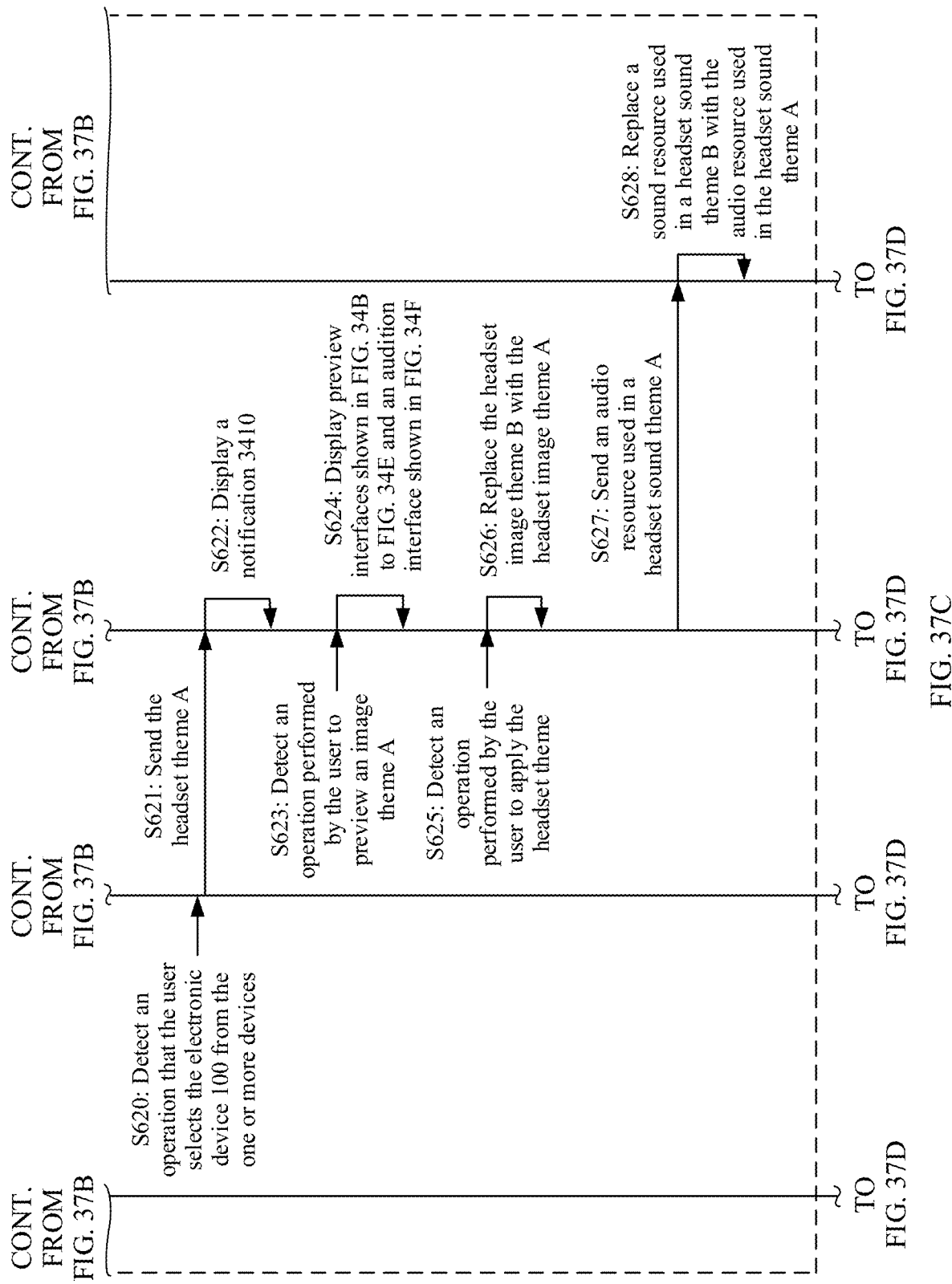
Figure 37D:
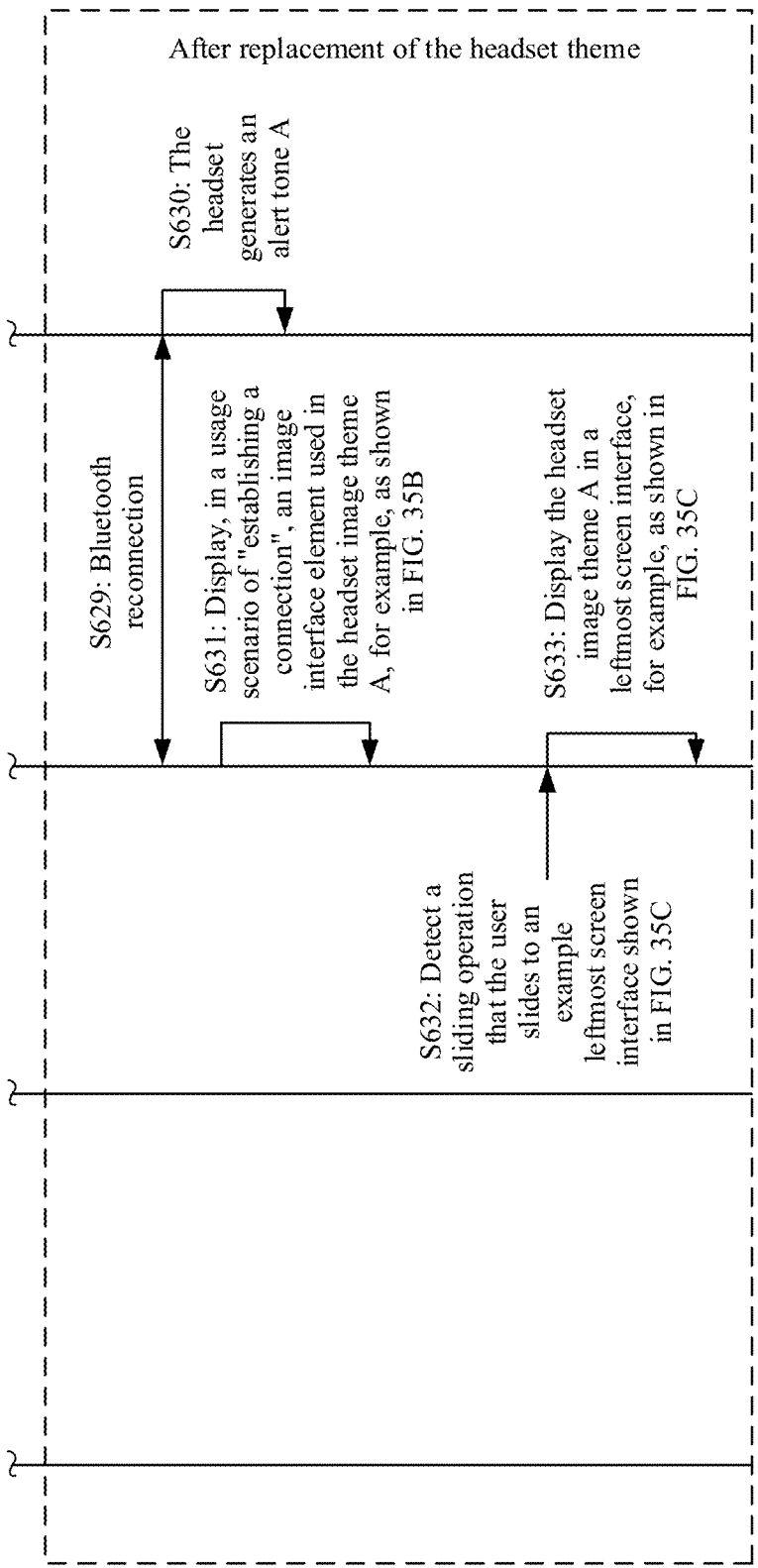

FIG. 36A to FIG. 36C show a procedure of a method for sharing a headset theme according to an embodiment of this application. Details are provided below.

Phase 1 (S501 to S510): Before Sharing of a Headset Theme (1) Before a Sharing Party Shares the Headset Theme (S501 to S505)

S501: Establish a Bluetooth connection between an electronic device 200 of the sharing party ("user 1") and a headset 400 of the sharing party ("user 1").

The electronic device 200 and the headset 400 may exchange audio data, a play control message, a call control message, and the like based on the Bluetooth connection. In addition to the Bluetooth connection, a connection established between the electronic device 200 and the accessory may also be another communication connection, for example, a Wi-Fi direct connection or a cellular mobile communication connection.

S502: After the Bluetooth connection to the electronic device 200 is established, the headset 400 presents a headset sound theme A.

That the headset 400 presents a headset sound theme A may mean that the headset outputs a sound included in the headset sound theme A. Specifically, the headset may present the headset sound theme A in different usage scenarios (referring to Table 2).

In a usage scenario of establishing a (Bluetooth communication) connection, the headset 400 may output (or play) a sound in the usage scenario of establishing a connection that is included in the headset sound theme A, for example, a sound "meow".

In a usage scenario of breaking a (Bluetooth communication) connection, the headset 400 may output (or play) a sound in the usage scenario of breaking a connection that is included in the headset sound theme A, for example, a sound "rattling rattling".

In a usage scenario in which a battery level of a headset is low, the headset 400 may output (or play) a sound in the usage scenario in which a battery level of a headset is low that is included in the headset sound theme A, for example, a sound "rattling".

For example, in S502, in the usage scenario of establishing a (Bluetooth communication) connection, the headset 400 may present the headset sound theme A. For example, the headset 400 generates an alert tone A, for example, a sound "meow", to indicate that the headset 400 is connected.

In addition to the usage scenario of establishing a connection, the usage scenario of breaking a connection, and the usage scenario in which a battery level of a headset is low, the electronic device 200 may further present the headset sound theme A in another usage scenario, for example, a usage scenario in which a user wears a headset or a usage scenario of enabling noise reduction.

S503 to S505: After the Bluetooth connection to the headset 400 is established, the electronic device 200 may present a headset image theme A.

That the electronic device 200 presents a headset image theme A may mean that the electronic device 200 displays an image interface element included in the headset image theme A. Specifically, the electronic device 200 may present the headset image theme A in different usage scenarios (referring to Table 1).

For example, in S503, in a usage scenario of establishing a (Bluetooth communication) connection, the electronic device 200 may display an image interface element in the usage scenario of establishing a connection that is included in the headset image theme A, for example, a series of graphical interface elements related to the headset in the pop-up window shown in FIG. 16A.

For example, in S504 and S505, in a leftmost screen usage scenario, as shown in FIG. 16B, when detecting an operation (for example, a rightward sliding operation performed by the user on the home screen) of opening a leftmost screen by the user, the electronic device 200 may display an image interface element in the leftmost screen usage scenario that is included in the headset image theme A, for example, a series of graphical interface elements related to the headset on the leftmost screen shown in FIG. 16B.

In addition to the usage scenario of establishing a (Bluetooth communication) connection and the leftmost screen usage scenario, the electronic device 200 may further present the headset image theme A in another usage scenario. For example, as shown in FIG. 16C, in a usage scenario of selecting an audio output channel during a call, the electronic device 200 presents the headset image theme A.

(2) Before the Shared Party Shares the Headset Theme (S506 to S510)

S506: Establish a Bluetooth connection between the electronic device 100 of the shared party ("user 2") and a headset 300 of the shared party ("user 2").

The electronic device 100 and the headset 300 may exchange audio data, a play control message, a call control message, and the like based on the Bluetooth connection. In addition to the Bluetooth connection, a connection established between the electronic device 100 and the accessory may also be another communication connection, for example, a Wi-Fi direct connection or a cellular mobile communication connection.

S507: After the Bluetooth connection to the electronic device 200 is established, the headset 300 may present a headset sound theme B.

That the headset 300 presents a headset sound theme B may mean that the headset 300 outputs a sound included in the headset sound theme B. Specifically, the headset may present the headset sound theme B in different usage scenarios (referring to Table 2).

In a usage scenario of establishing a (Bluetooth communication) connection, the headset 300 may output (or play) a sound in the usage scenario of establishing a connection that is included in the headset sound theme B, for example, a sound "tinkling".

In a usage scenario of breaking a (Bluetooth communication) connection, the headset 300 may output (or play) a sound in the usage scenario of breaking a connection that is included in the headset sound theme B, for example, a sound "beep beep".

In a usage scenario in which a battery level of a headset is low, the headset 300 may output (or play) a sound in the usage scenario in which a battery level of a headset is low that is included in the headset sound theme B, for example, a sound "beep".

In addition to the usage scenario of establishing a connection, the usage scenario of breaking a connection, and the usage scenario in which a battery level of a headset is low, the electronic device may further present the headset sound theme A in another usage scenario, for example, a usage scenario in which a user wears a headset or a usage scenario of enabling noise reduction. Different from a headset sound theme B to be mentioned below, the headset sound theme A may be referred to as a previously used headset sound theme, an old headset sound theme, or the like.

For example, in S507, in the usage scenario of establishing a (Bluetooth communication) connection, the headset 300 may present the headset sound theme B. For example, as shown in FIG. 3E, the headset 300 generates an alert tone B, for example, a sound "tinkling", to indicate that the headset 300 is connected.

In addition to the usage scenario of establishing a connection, the usage scenario of breaking a connection, and the usage scenario in which a battery level of a headset is low, the electronic device 100 may further present the headset sound theme B in another usage scenario, for example, a usage scenario in which a user wears a headset or a usage scenario of enabling noise reduction.

S508 to S510: After the Bluetooth connection to the headset 300 is established, the electronic device 100 may present a headset image theme B.

That the electronic device 100 presents a headset image theme B may mean that the electronic device 200 displays an image interface element included in the headset image theme B. Specifically, the electronic device 100 may present the headset image theme B in different usage scenarios (referring to Table 1).

For example, in S508, in a usage scenario of establishing a (Bluetooth communication) connection, the electronic device 100 may display an image interface element in the usage scenario of establishing a connection that is included in the headset image theme B, for example, a series of graphical interface elements related to the headset in the pop-up window shown in FIG. 3A, such as the headset background 311, the headset case background 312, and the headset battery level icon 313.

For example, in S509 and S510, in a leftmost screen usage scenario, as shown in FIG. 3B, when detecting an operation (for example, a rightward sliding operation on the home screen) of opening a leftmost screen by the user, the electronic device 100 may display an image interface element in the leftmost screen usage scenario that is included in the headset image theme B, for example, a series of graphical interface elements related to the headset on the leftmost screen shown in FIG. 3B, such as the headset picture 321, the headset case picture 322, and the headset battery level icon 323.

In addition to the usage scenario of establishing a (Bluetooth communication) connection and the leftmost screen usage scenario, the electronic device 100 may further present the headset image theme B in another usage scenario, for example, as shown in FIG. 3C, a usage scenario of selecting an audio channel during a call.

Phase 2 (S511 to S522): Share the Headset theme

S511: Establish a communication connection between the electronic device 100 and the electronic device 200.

The communication connection may be established before the shared party shares the headset theme with the sharing party, or may be established when the sharing party shares the headset theme with the shared party. This is not limited in this embodiment of the present invention.

The communication connection may be a Bluetooth connection. FIG. 17A and FIG. 17B show examples of user interfaces for establishing a Bluetooth connection between an electronic device 100 of a sharing party and an electronic device 200 of a shared party.

The user interface is described in a series of user interfaces in which the shared party ("user 2") actively shares a headset theme with the sharing party ("user 1"). Details are not described herein again.

S512 and S513: The electronic device 200 of the sharing party may detect an operation of opening/viewing a headset image theme by a user (for example, the sharing party, that is, the "user 1"), for example, an operation of tapping a "Headset theme" application icon 3014 in the user interface 3010 shown in FIG. 30A, and the electronic device 200 may display the example user interface 3020 shown in FIG. 30B. The user interface 3020 may display options of one or more headset themes.

For descriptions of the one or more headset themes, refer to the foregoing related content. Details are not described herein again.

S514 to S517: The electronic device 200 of the sharing party may detect an operation that the user (for example, the sharing party, that is, the "user 1") selects a headset theme A (headset theme 3022) from the one or more headset themes and shares the headset theme A with the electronic device 100 of the shared party ("user 2"). In response to the operation, the electronic device 200 may send the headset theme A to the electronic device 100.

Figure 30C:
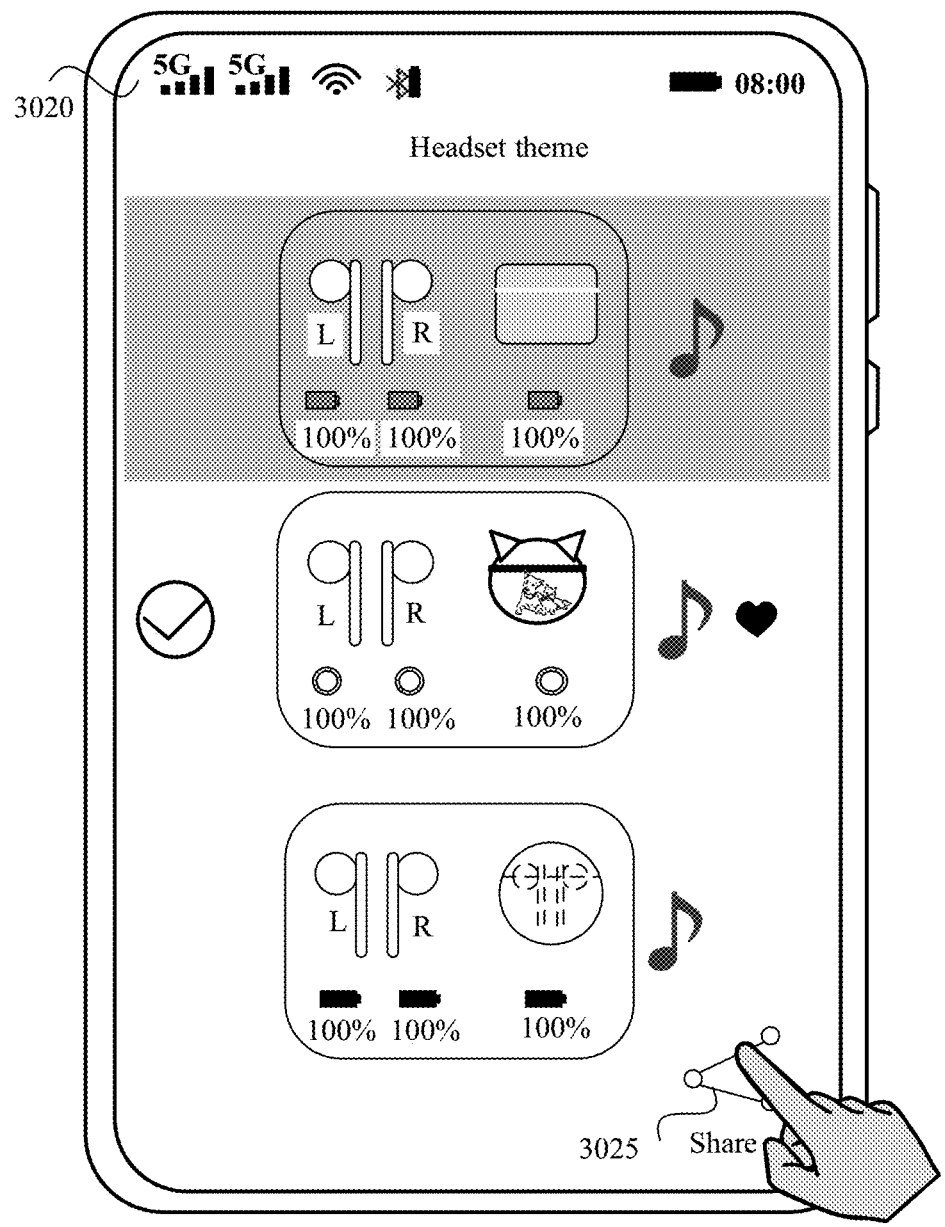
Figure 30D:
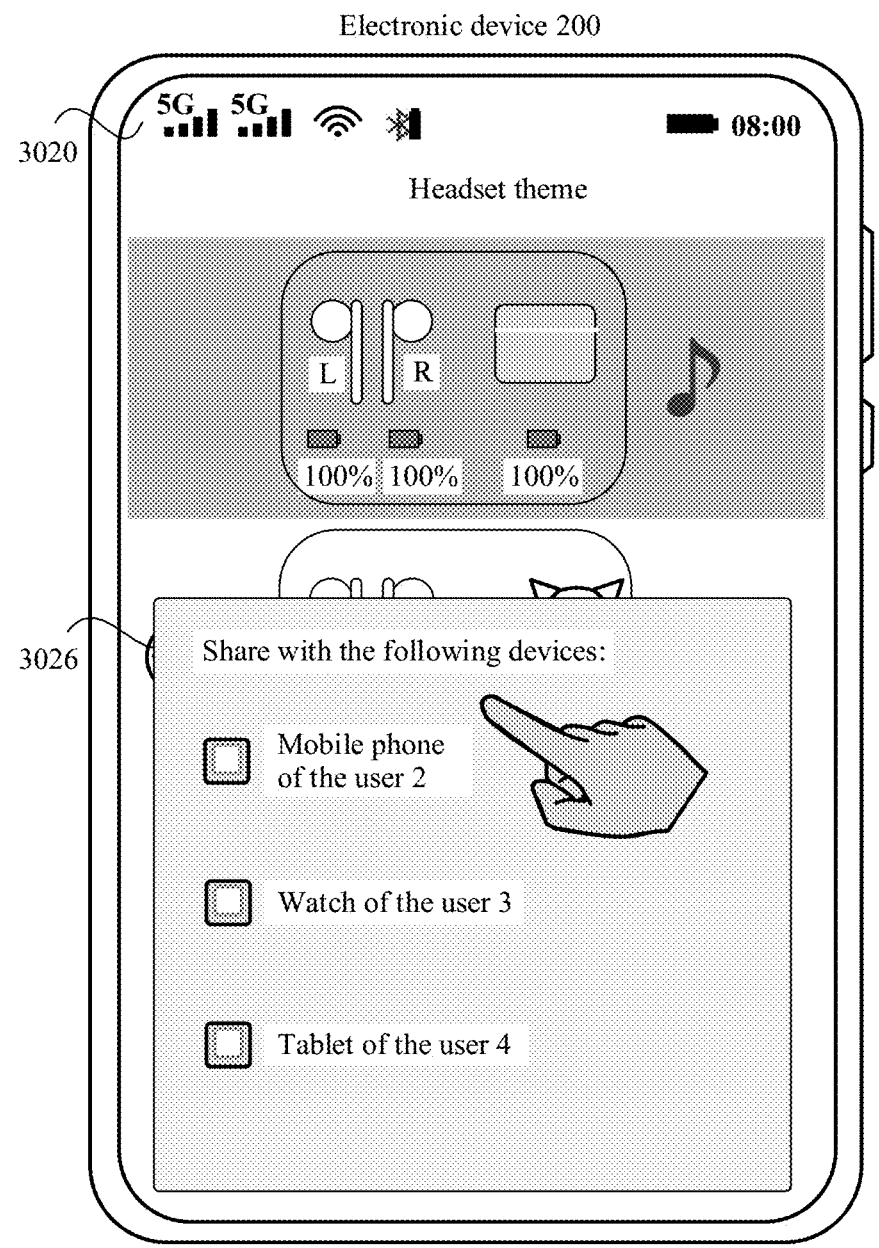

The operation may be a series of operations, for example, as shown in FIG. 30B to FIG. 30D, may be operations of first selecting the headset theme A (headset theme 3022) from the one or more headset themes displayed in the user interface 3020 shown in FIG. 30B, tapping the share control 3025 in the user interface 3020 shown in FIG. 30C, and then selecting the mobile phone of the shared party, that is, the user 2, from the list 3026 displayed in the user interface 3020 shown in FIG. 30D.

For descriptions of the list 3026, refer to the foregoing related content. Details are not described herein again.

Correspondingly, the electronic device 100 of the shared party ("user 1") may receive the headset theme A from the electronic device 200.

S518: After receiving the headset theme A shared by the electronic device 200, the electronic device 100 of the shared party ("user 2") may display an example notification 3110 shown in FIG. 31A, where the notification 3110 may be used to indicate that the headset image theme A shared by the sharing party ("user 1") is received.

S519 and S520: The electronic device 100 of the shared party ("user 2") may detect, in the user interface 3120 shown in FIG. 30B, an operation performed by the user to preview the headset theme A, for example, an operation of tapping a preview control 3122. In response to the operation, the electronic device 100 may display a preview interface of the headset theme, where the preview interface is used to present the headset theme A from the sharing party ("user 1"). In this way, the shared party ("user 2") can preview the headset theme A, and the user can further determine whether to replace the headset theme.

The preview interface may be used to display an image interface element included in the headset theme A. As shown in FIG. 31B to FIG. 31E, the preview interface may include a plurality of pages, which are separately used to display image interface elements in different usage scenarios that are included in the headset theme A. Specifically, a page shown in FIG. 31B may be used to display an image interface element in a usage scenario of "establishing a connection", to present a headset image theme A in the usage scenario of "establishing a connection". Specifically, a page shown in FIG. 31C may be used to display an image interface element in a "leftmost screen" usage scenario, to present a headset image theme A in the "leftmost screen" usage scenario. Specifically, a page shown in FIG. 31E may be used to display an image interface element in a usage scenario of "selecting an audio output channel during a call", to present a headset image theme A in the usage scenario of "selecting an audio output channel during a call". In addition, the preview interface may further include an audition page of the headset theme A shown in FIG. 31F, and the page is used to audition a headset sound theme included in the headset theme A shared by the user 1.

In addition, the preview interface may be further used to display an image interface element in another usage scenario, to present a headset image theme A in the another usage scenario.

S521 and S522: The electronic device 100 of the shared party ("user 1") may detect an operation performed by the user to apply the headset theme A, for example, detect, in the user interface 3120 shown in FIG. 31B to FIG. 31F, an operation of tapping the apply icon 3122 by the user. In response to the operation, the electronic device 100 may replace the previously used headset theme with the headset theme A.

For other descriptions of replacing the headset image theme, refer to the foregoing related content. Details are not described herein again.

Phase 3 (S523 to S527): After Replacement of the Headset Theme

S523: Re-establish a Bluetooth connection between the electronic device 100 and the headset.

S523 is performed when the Bluetooth connection previously established between the electronic device 100 and the headset 300 is broken.

S524: The headset may present a headset sound theme A. For details, refer to S507.

S525 to S527: The electronic device 100 may present the headset image theme A.

For details, refer to an implementation of S503 in which the electronic device 200 presents the headset image theme A. For S525, refer to S503. For S526 and S527, refer to S504 and S505.

During replacement of a headset image theme, the headset image theme presented by the electronic device 100 is different from the headset image theme B. For example, in a usage scenario of establishing a (Bluetooth communication) connection, the electronic device 100 may display an image interface element in the usage scenario of establishing a connection that is included in the headset image theme A, for example, a series of graphical interface elements related to the headset in the pop-up window shown in FIG. 32B, such as the headset background 3221, the headset case background 3222, and the headset battery level icon 3223. How to replace the headset image theme is described in detail above. Details are not described herein again. The headset sound theme presented by the electronic device 100 is also different from the headset sound theme B. For example, the headset generates an alert tone A, for example, a sound "meow" shown in 32A, and the alert tone is used to indicate that the headset is connected.

It can be learned that in the embodiment in FIG. 36A to FIG. 36C, the user can be supported in sharing the headset theme with another user, to meet a sharing experience requirement of the user, perform more interactions with the user, and improve user experience.

In addition to actively sharing the headset theme by the sharing party, the shared party may also request to share the theme.

FIG. 37A to FIG. 37D show an example of a procedure of a method for automatically triggering sharing of a headset theme according to an embodiment of this application. Details are provided below.

Phase 1 (S601 to S610): Before Sharing a Headset Theme

For Phase 1, refer to Phase 1 in the embodiment in FIG. 36A. Details are not described herein again.

Phase 2 (S611 to S628): Share the Headset Theme

S611: The electronic device 200 of the sharing party may detect that the electronic device 200 displays an example user interface 3020 shown in FIG. 30B.

S612 to S615: As shown in FIG. 33A, in a scenario in which the electronic device 200 displays a user interface 3310, the electronic device 200 discovers the electronic device 100 through NFC, that is, the electronic device 200 detects an NFC OneHop operation, and the electronic device 200 may send a request to the electronic device 100 through NFC, to query a model of a headset of the shared party. As shown in FIG. 33B, the electronic device 100 may display a notification 3320, where the notification 3320 may be used to remind that the request from the sharing party is received. The electronic device 100 may detect an operation performed by the user to authorize to send the model of the headset to the sharing party, for example, an operation of tapping an option ("Yes") 3321 in a user interface shown in FIG. 33B. In response to the operation, the electronic device 100 may send the model of the headset of the shared party to the electronic device 200 through NFC.

In addition to the scenario in which the electronic device 200 displays the user interface 3310, when detecting an NFC OneHop operation, the electronic device 200 may directly query the model of the headset from the electronic device 100 through NFC to initiate sharing of the headset theme, or after detecting the operation performed by the user to authorize to share the headset theme, the electronic device 200 may query the model of the headset from the electronic device 100 to initiate sharing of the headset theme, or the electronic device 100 may actively send the model of the headset of the shared party to the electronic device 200 and request to share the headset theme.

S616 and S617: After the electronic device 200 detects that a headset theme suitable for the user 2 exists in the headset theme of the electronic device 200 of the sharing party, and determines to share the headset theme with the electronic device 100 of the shared party, the electronic device 200 of the sharing party may display, in the example user interface 3340 shown in FIG. 33D, options of one or more headset themes adapted to the electronic device 100.

S618 to S621: The electronic device 200 of the sharing party may detect an operation that the user (for example, the sharing party, that is, the "user 1") selects the headset theme A, that is, the headset theme 3341 (including a headset image theme and a headset sound theme) from the one or more headset themes and shares the headset theme A with the electronic device 100 of the shared party ("user 2"). In response to the operation, the electronic device 200 may send the headset theme A (including the headset image theme and the headset sound theme) to the electronic device 100.

Figure 33D:
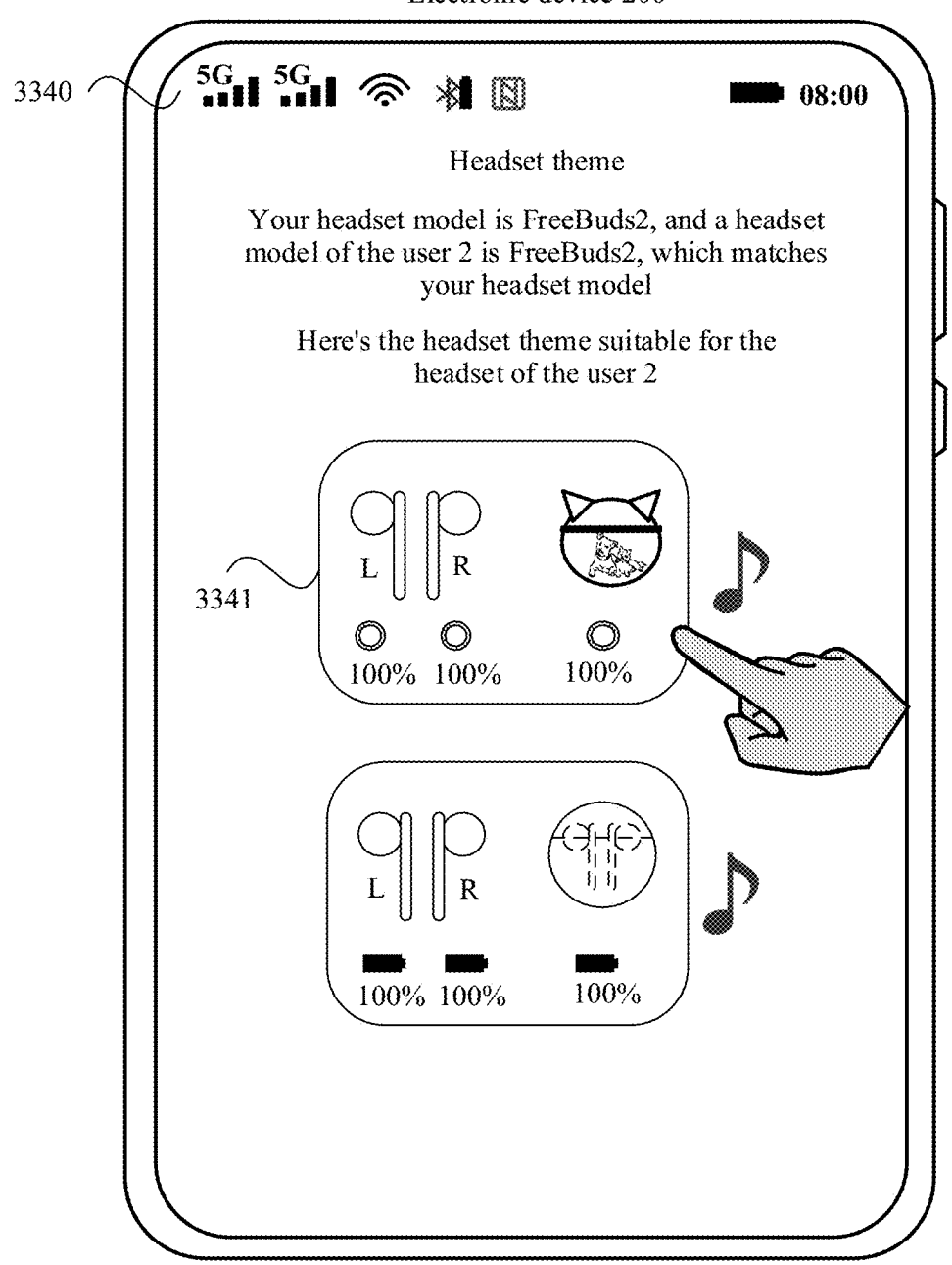
Figure 33E:
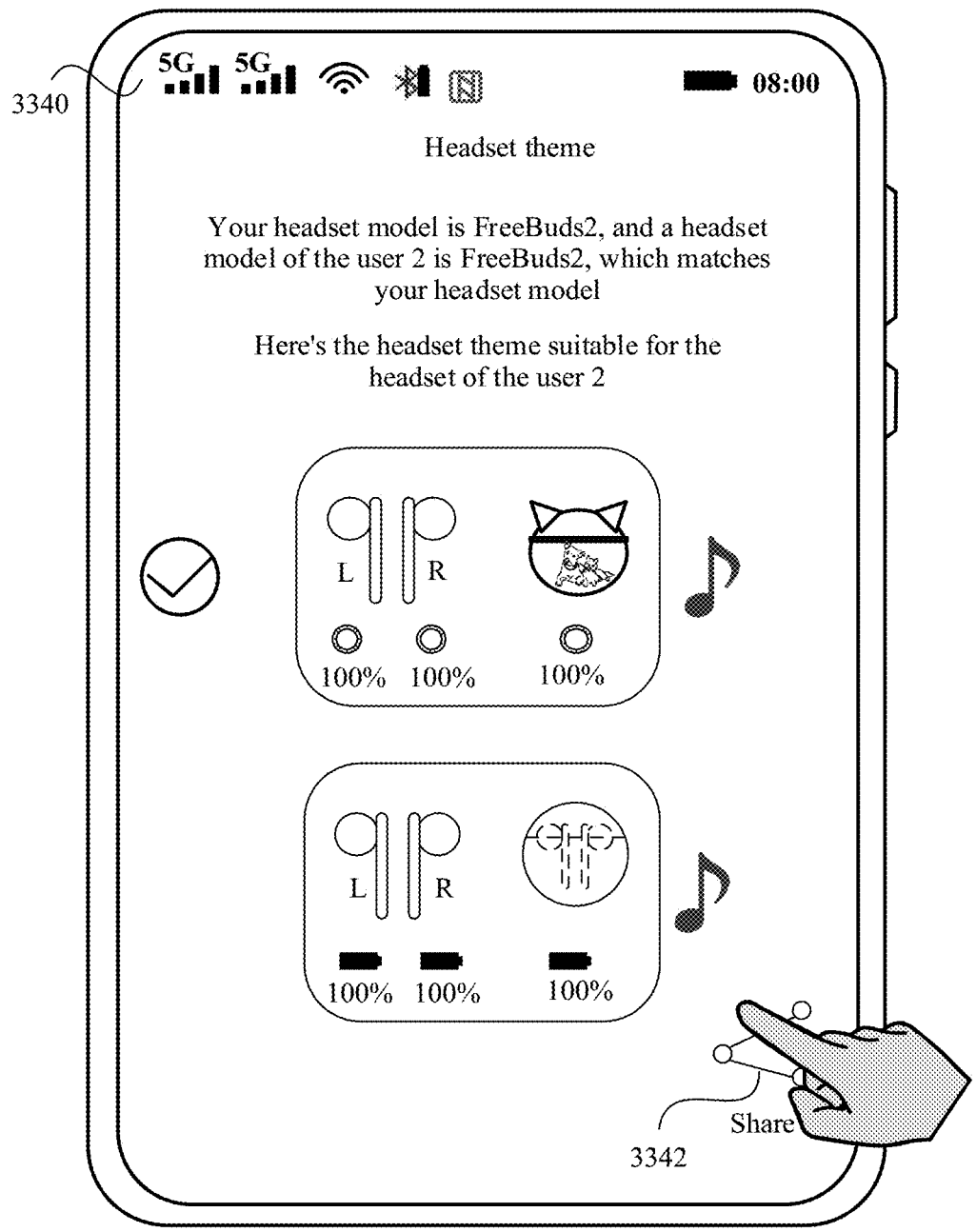
Figure 33F:
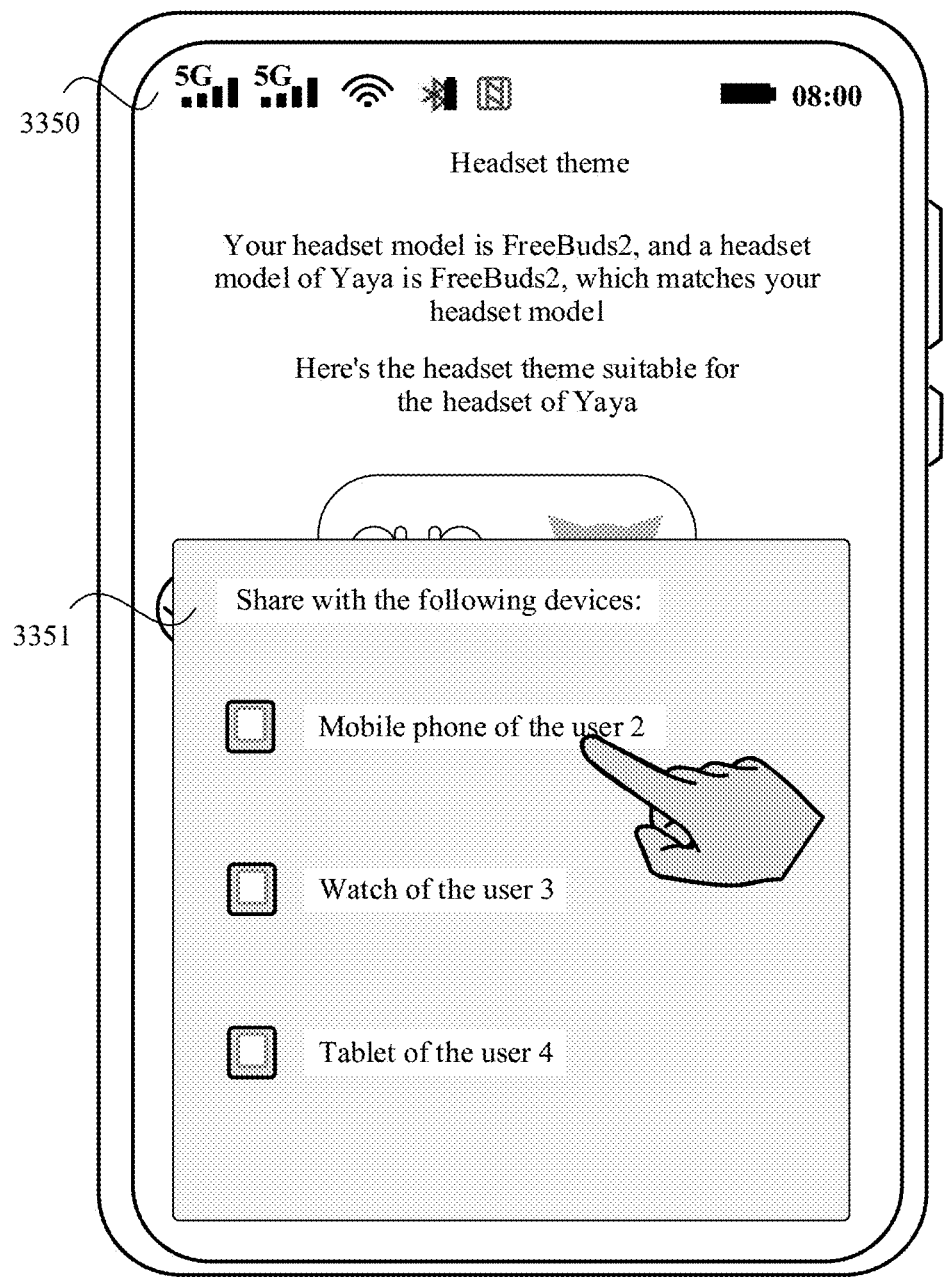

The operation may be a series of operations, for example, operations of first selecting the headset theme A from the one or more headset themes displayed in the user interface 3340 shown in FIG. 33D, then tapping a share control 3342 in a user interface 3340 shown in FIG. 33E, and finally selecting the mobile phone of the shared party, that is, the user 2 from a list 3351 displayed in a user interface 3350 shown in FIG. 33F.

The list 3351 may display device identification information (for example, a device name and model) of one or more devices, and the one or more devices are devices connected to the electronic device 200 or devices discovered by the electronic device 200. As shown in FIG. 33F, the electronic device 100 of the shared party is "Mobile phone of the user 2", and the "user 2" is the shared party.

Correspondingly, the electronic device 100 of the shared party ("user 2") may receive the headset theme A from the electronic device 200.

S622: After receiving the headset theme A shared by the electronic device 200, the electronic device 100 of the shared party may display an example notification 3410 shown in FIG. 34A, where the notification 3410 may be used to indicate that the headset theme A shared by the sharing party is received.

S623 and S624: The electronic device 100 of the shared party ("user 2") may detect, in the user interface 3410 shown in FIG. 34A, an operation performed by the user to preview the headset theme A, for example, an operation of tapping a preview control 3411. In response to the operation, as shown in FIG. 34B to FIG. 34F, the electronic device 100 may display a preview interface of the headset image theme. The preview interface may be used to display an image interface element included in the headset image theme and audition various alert tones included in the headset theme. As shown in FIG. 34F, the electronic device 100 may display an audition interface of the headset sound theme, where the audition interface is used to audition the headset sound theme A from the sharing party.

For descriptions of the preview interface, refer to the foregoing related content. Details are not described herein again.

S625 to S628: The electronic device 100 of the shared party ("user 2") may detect an operation performed by the user to apply the headset theme A (including a headset image theme A and a headset sound theme A), for example, an operation of tapping an apply control 3422 shown in FIG. 34B to FIG. 34F. In response to the operation, the electronic device 100 may replace the previously used headset theme with the headset theme A. The electronic device 100 sends the headset sound theme A to the headset 400, and the headset 400 may replace the previously used headset sound theme with the headset sound theme A.

For other descriptions of replacing the headset image theme and the headset sound theme, refer to the foregoing related content. Details are not described herein again.

Phase 3 (S629 to S633): After Replacement of the Headset Theme

S629: Re-establish a Bluetooth connection between the electronic device 100 and the headset.

S629 is performed when the Bluetooth connection previously established between the electronic device 100 and the headset 400 is broken.

S630: The headset may present a headset sound theme A. For details, refer to S602.

During replacement of a headset sound theme, the headset sound theme presented by the headset is different from the headset sound theme B.

S631 to S633: The electronic device 100 may present a headset image theme A.

During replacement of a headset image theme, the headset image theme presented by the electronic device 100 is different from the headset image theme B. For details, refer to an implementation of S603 in which the electronic device 200 presents the headset image theme A. For S631, refer to S603. For S632 and S633, refer to S604 and S605.

It can be learned that in the embodiment in FIG. 37A to FIG. 37D, the user can be supported in quickly sharing the headset theme with another user in an NFC OneHop manner, to meet a personalized requirement of the user for replacing the headset theme and improve user experience.

This application further provides an electronic device, configured to cooperate with the audio output device to perform the methods and steps in all the foregoing embodiments. The following describes a hardware structure of the electronic device. The electronic device may be understood as the electronic device 100 and/or the electronic device 200 shown in FIG. 1.

Figure 38:
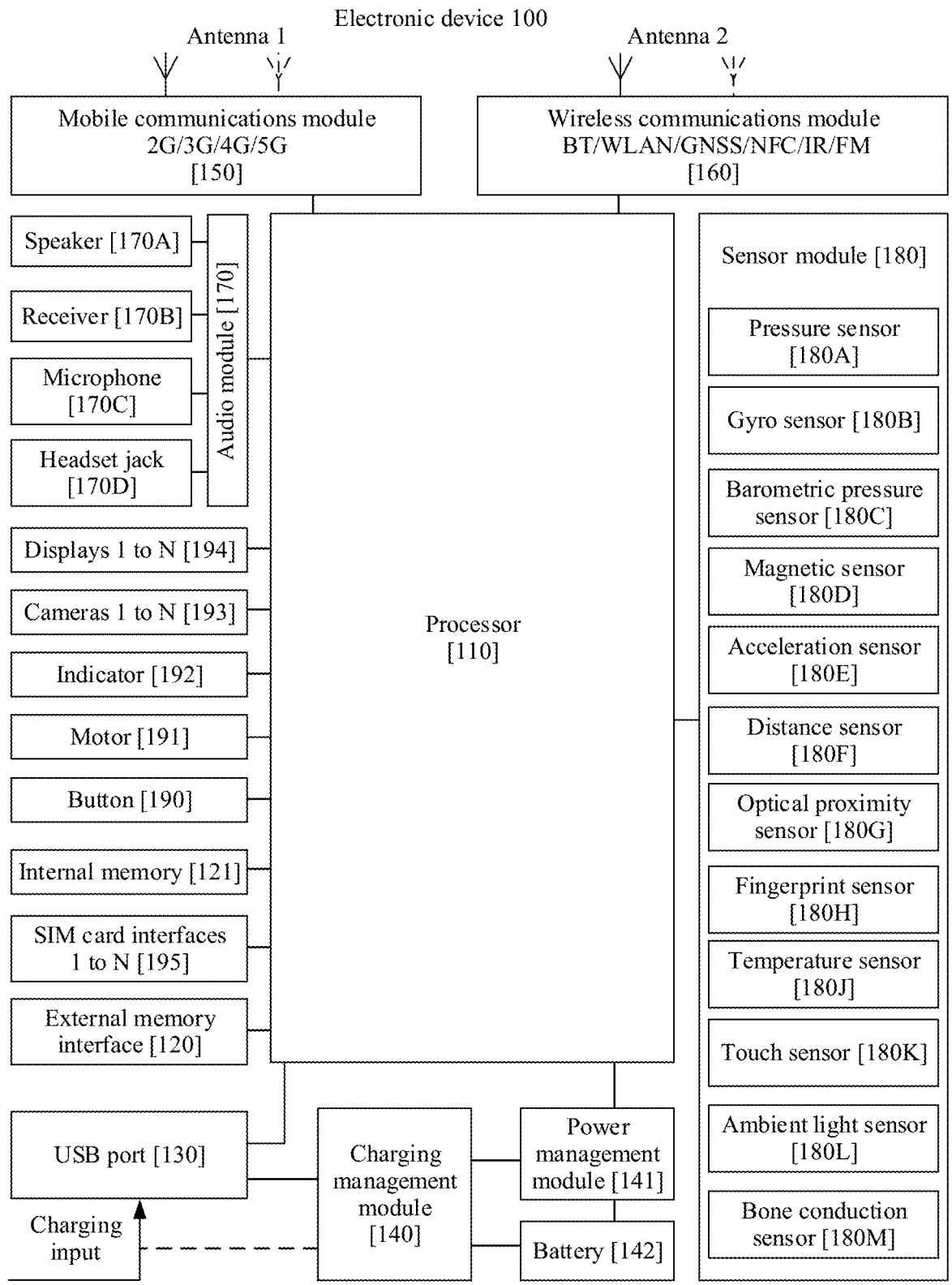
FIG. 38 is a schematic diagram of a structure of an electronic device according to an embodiment of this application.

FIG. 38 is a schematic diagram of a structure of an electronic device according to an embodiment of this application.

As shown in FIG. 38, the electronic device may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access and reduces a waiting time of the processor 110, to improve system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like.

It may be understood that, an interface connection relationship between the modules shown in this embodiment of this application is merely an example for description, and does not constitute a limitation on the structure of the electronic device. In some other embodiments of this application, the electronic device may alternatively use an interface connection manner different from that in the foregoing embodiment, or a combination of a plurality of interface connection manners.

The charging management module 140 is configured to detect a charging input from a charger. The charger may be a wireless charger or a wired charger. The power management module 141 is configured to connect the battery 142 and the charging management module 140 to the processor 110. The power management module 141 detects an input of the battery 142 and/or the charging management module 140, and supplies power to the processor 110, the internal memory 121, an external memory 120, the display 194, the camera 193, the wireless communications module 160, and the like. The power management module 141 may be further configured to monitor parameters such as a battery capacity, a battery cycle count, and a battery health status (electric leakage or impedance).

A wireless communication function of the electronic device may be implemented by using the antenna 1, the antenna 2, the mobile communications module 150, the wireless communications module 160, the modem processor, the baseband processor, and the like.

The antenna 1 and the antenna 2 are configured to: transmit and detect electromagnetic wave signals. Each antenna in the electronic device may be configured to cover one or more communication frequency bands. Different antennas may be further multiplexed, to improve antenna utilization.

The mobile communications module 150 may provide a wireless communication solution that includes 2G/3G/4G/5G or the like and that is applied to the electronic device. The mobile communications module 150 may include at least one filter, a switch, a power amplifier, a low noise amplifier (LNA), and the like. The mobile communications module 150 may detect an electromagnetic wave through the antenna 1, perform processing such as filtering or amplification on the detected electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a detected electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio output device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device. The wireless communications module 160 may be one or more components integrating at least one communications processor module. The wireless communications module 160 detects an electromagnetic wave through the antenna 2, performs frequency modulation and filtering processing on the electromagnetic wave signal, and sends a processed signal to the processor 110. The wireless communications module 160 may further detect a to-be-sent signal from the processor 110, perform frequency modulation and amplification on the signal, and convert a processed signal into an electromagnetic wave for radiation through the antenna 2. For example, the wireless communications module 160 may include a Bluetooth module, a Wi-Fi module, and the like.

In some embodiments, in the electronic device, the antenna 1 and the mobile communications module 150 are coupled, and the antenna 2 and the wireless communications module 160 are coupled, so that the electronic device can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to a DSP for processing. The DSP converts the digital image signal into a standard image signal in an RGB format, a YUV format, or the like. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to: compress or decompress a digital video. The electronic device may support one or more video codecs. In this way, the electronic device may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transfer between human brain neurons, and may further continuously perform self-learning. The NPU may be used to implement an application such as intelligent cognition of the electronic device, for example, image recognition, facial recognition, speech recognition, and text understanding.

In this embodiment of this application, when the camera 193 captures an image of a headset/headset case/headset case protective cover, the display 194 displays the image that is of the headset/headset case/headset case protective cover and that is captured by the camera 193. In this case, the NPU may identify the image. For example, as shown in FIG. 24B, the display 194 may display a prompt indicating that a headset accessory is detected, such as "The headset/headset case/headset case protective cover is detected" and ask a user whether to change a theme of a headset image. For a specific implementation of changing the headset theme, refer to the detailed descriptions of the foregoing embodiments. Details are not described herein again.

The electronic device may implement an audio function such as music playing and recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an electrical audio signal into a sound signal. The electronic device may be used to listen to music or answer a hands-free call by using the speaker 170A.

The receiver 170B, also referred to as an "earpiece", is configured to convert an electrical audio signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call or sending voice information, a user may make a sound near the microphone 170C through the mouth of the user, to input the sound signal to the microphone 170C. At least one microphone 170C may be disposed in the electronic device. In some other embodiments, two microphones 170C may be disposed in the electronic device, to implement a noise reduction function in addition to capturing a sound signal. In some other embodiments, three, four, or more microphones 170C may alternatively be disposed in the electronic device, to collect a sound signal, reduce noise, identify a sound source, implement a directional recording function, and the like.

The headsetjack 170D is configured to connect to a wired headset. The headsetjack 170D may be the USB port 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. When a touch operation is performed on the display 194, the electronic device detects intensity of the touch operation based on the pressure sensor 180A. The electronic device may also calculate a touch location based on a detection signal of the pressure sensor 180A.

The gyro sensor 180B may be configured to determine a motion posture of the electronic device. In some embodiments, an angular velocity of the electronic device around three axes (that is, axes x, y, and z) may be determined through the gyro sensor 180B.

The barometric pressure sensor 180C is configured to measure barometric pressure. In some embodiments, the electronic device calculates an altitude based on a value of the barometric pressure measured by the barometric pressure sensor 180C, to assist in positioning and navigation.

The magnetic sensor 180D includes a Hall sensor. The electronic device may detect opening and closing of a flip cover by using the magnetic sensor 180D.

The acceleration sensor 180E may detect magnitudes of accelerations of the electronic device in all directions (usually on three axes), and may detect a magnitude and a direction of gravity when the electronic device is stationary. The acceleration sensor may be further configured to identify a posture of the electronic device, and applied to an application such as switching between landscape mode and portrait mode or a pedometer.

The distance sensor 180F is configured to measure a distance. The electronic device may measure the distance through infrared or laser. In some embodiments, in a photographing scenario, the electronic device may measure the distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device emits infrared light by using the light-emitting diode. The electronic device detects infrared reflected light from a nearby object by using the photodiode, and may determine whether there is an object near the electronic device. The ambient light sensor 180L is configured to sense ambient light brightness. The electronic device may adaptively adjust brightness of the display 194 based on the sensed ambient light brightness. The fingerprint sensor 180H is configured to collect a fingerprint. The electronic device may use a feature of the collected fingerprint to implement fingerprint-based unlocking, application lock access, fingerprint-based photographing, fingerprint-based call answering, and the like. The temperature sensor 180J is configured to detect a temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194.

The button 190 includes a power button, a volume button, and the like. The button 190 may be a mechanical button, or may be a touch button. The electronic device may detect a key input, and generate a key signal input related to a user setting and function control of the electronic device.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information detection, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device. The electronic device may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device interacts with a network by using the SIM card, to implement functions such as calling and data communication. In some embodiments, the electronic device uses an eSIM, that is, an embedded SIM card. The eSIM card may be embedded into the electronic device, and cannot be separated from the electronic device.

The foregoing describes in detail this embodiment of this application by using the electronic device as an example. It should be understood that the structure shown in this embodiment of this application does not constitute a specific limitation on the electronic device. The electronic device may have more or fewer components than those shown in the figure, may combine two or more components, or may have different component configurations. The components shown in the figure may be implemented by hardware including one or more signal processing and/or application-specific integrated circuits, software, or a combination of hardware and software.

For example, the electronic device shown in FIG. 38 may display, through the display 194, user interfaces described in the foregoing embodiments. The electronic device may detect a touch operation in each user interface by using the touch sensor 180K, for example, a tap operation (for example, a touch operation or a double-tap operation on an icon) in each user interface, or an upward sliding operation or a downward sliding operation or a gesture operation of drawing a circle in each user interface. In some embodiments, the electronic device may detect, by using the gyro sensor 180B, the acceleration sensor 180E, or the like, a motion gesture made by the user by holding the electronic device, for example, shaking the electronic device. In some embodiments, the electronic device may detect a non-touch gesture operation by using the camera 193 (for example, a 3D camera or a depth camera).

This application further provides an audio output device 300, configured to cooperate with the electronic device 100 and/or the electronic device 200 to perform the methods and steps mentioned in all the foregoing embodiments. The following describes a hardware structure of the audio output device 300.

Figure 39:
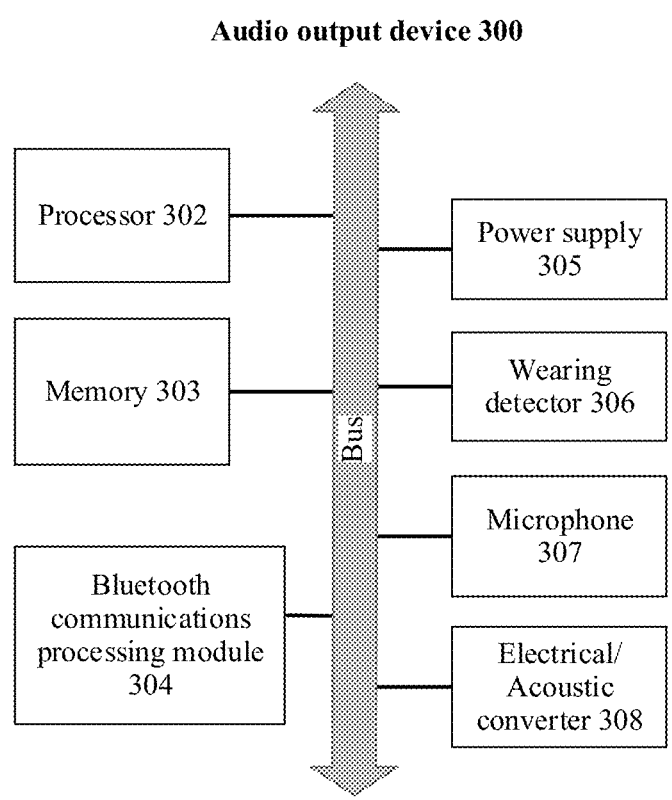
FIG. 39 is a schematic diagram of a structure of a wireless audio output device according to an embodiment of this application.

FIG. 39 is a schematic diagram of a structure of an audio output device 300 according to an embodiment of this application.

The audio output device 300 may be the audio output device 201 or the audio output device 202 in the wireless audio device 200 shown in FIG. 1. The audio output device 300 may be usually used as an audio detection device (audio sink), such as a headset or a speaker, may transmit audio data to another audio source (audio source), such as a mobile phone or a tablet computer, and may convert the detected audio data into sound. In some scenarios, if a sound collection component such as a microphone/receiver is configured, the audio output device 300 may also be used as an audio source, and transmit audio data (for example, audio data converted from a voice of a user that is collected by a headset) to another audio detection device (audio sink) (for example, a mobile phone).

FIG. 39 shows an example of a schematic diagram of a structure of an audio output device 300 according to an embodiment of this application. As shown in FIG. 39, the audio output device 300 may include a processor 302, a memory 303, a Bluetooth communications processing module 304, a power supply 305, a wearing detector 306, a microphone 307, and an electrical/acoustic converter 308. These components may be connected through a bus.

The processor 302 may be configured to: read and execute computer-readable instructions. In a specific implementation, the processor 302 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and an address conversion. The register is mainly responsible for storing a quantity of register operations, intermediate operation results, and the like that are temporarily stored during instruction execution. In a specific implementation, a hardware architecture of the processor 302 may be an application-specific integrated circuit (ASIC) architecture, an MIPS architecture, an ARM architecture, an NP architecture, or the like.

In some embodiments, the processor 302 may be configured to parse a signal detected by the Bluetooth communications processing module 304, for example, a signal encapsulated with audio data, a content control message, or a flow control message. The processor 302 may be configured to perform a corresponding processing operation based on a parsing result, for example, drive the electrical/acoustic converter 308 to start, temporarily stop, or stop converting the audio data into sound.

In some embodiments, the processor 302 may be further configured to generate a signal sent by the Bluetooth communications processing module 304 to the outside, for example, a Bluetooth broadcast signal or a beacon signal, or audio data converted from collected sound.

The memory 303 is coupled to the processor 302, and is configured to store various software programs and/or a plurality of sets of instructions. In a specific implementation, the memory 303 may include a high-speed random access memory, and may further include a nonvolatile memory, for example, one or more magnetic disk storage devices, a flash memory device, or another nonvolatile solid-state storage device. The memory 303 may store an operating system, for example, an embedded operating system such as uCOS, VxWorks, or RTLinux. The memory 303 may further store a communication program, and the communication program may be used to communicate with an electronic device, one or more servers, or an additional device.

The Bluetooth (BT) communication processing module 304 may detect a signal transmitted by another device (for example, an electronic device), for example, a scanning signal, a broadcast signal, a signal encapsulated with audio data, a content control message, or a flow control message. The Bluetooth (BT) communication processing module 304 may also transmit a signal, for example, a broadcast signal, a scanning signal, a signal encapsulated with audio data, a content control message, or a flow control message.

The power supply 305 may be configured to supply power to other internal components such as the processor 302, the memory 303, the Bluetooth communications processing module 304, the wearing detector 306, and the electrical/acoustic converter 308.

The wearing detector 306 may be configured to detect a status indicating that the audio output device 300 is worn by a user, for example, a non-worn state or a worn state, or even a wearing tightness state. In some embodiments, the wearing detector 306 may be implemented by one or more of a distance sensor, a pressure sensor, and the like. The wearing detector 306 may transmit the detected wearing status to the processor 302. In this way, the processor 302 can be powered on when the audio output device 300 is worn by the user, and powered off when the audio output device 300 is not worn by the user, to save power consumption.

The microphone 307 may be configured to collect sound, for example, a voice of a user, and may output the collected sound to the electrical/acoustic converter 308. In this way, the electrical/acoustic converter 308 may convert the sound collected by the microphone 307 into audio data.

The electrical/acoustic converter 308 may be configured to convert sound into an electrical signal (audio data), for example, convert the sound collected by the microphone 307 into the audio data, and may transmit the audio data to the processor 302. In this way, the processor 302 may trigger the Bluetooth (BT) communication processing module 304 to transmit the audio data. The electrical/acoustic converter 308 may be further configured to convert an electrical signal (audio data) into sound, for example, convert audio data output by the processor 302 into sound. The audio data output by the processor 302 may be detected by the Bluetooth (BT) communication processing module 304.

In some implementations, the processor 302 may implement a host in a Bluetooth protocol framework, the Bluetooth (BT) communication processing module 304 may implement a controller in the Bluetooth protocol framework, and the host and the controller communicate with each other through an HCl. That is, functions of the Bluetooth protocol framework are distributed on two chips.

In some other embodiments, the processor 302 may implement a host and a controller in a Bluetooth protocol framework. That is, all functions of the Bluetooth protocol framework are placed on a same chip. That is, the host and the controller are placed on the same chip. Because the host and the controller are placed on the same chip, a physical HCl is unnecessary, and the host and the controller directly interact with each other through an application programming interface API.

It may be understood that the structure shown in FIG. 39 does not constitute a specific limitation on the audio output device 300. In some other embodiments of this application, the audio output device 300 may include more or fewer components than those shown in the figure, or may combine some components, or may split some components, or may have different component arrangements. The components shown in the figure may be implemented by hardware, software, or a combination of software and hardware.

The foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

It should be understood that terms used in the foregoing embodiments of this application are merely for the purpose of describing specific embodiments, but are not intended to limit this application. As used in the specification and appended claims of this application, terms "a", "one", "the", "the foregoing", and "this" of singular forms are intended to also include plural forms, unless otherwise clearly specified in the context. It should be further understood that the term "and/or" used in this application refers to and includes any or all possible combinations of one or more listed items. For example, A and/or B include/includes three cases: A, B, and A and B. A feature limited by "first" or "second" may explicitly or implicitly include one or more features. In the descriptions of embodiments of this application, the word such as "example" or "for example" is used to represent giving an example, an illustration, or a description. Any embodiment or design solution described as an "example" or "for example" in embodiments of this application should not be explained as being more preferred or having more advantages than another embodiment or design solution. Exactly, use of words such as "example" or "for example" is intended to present a related concept in a specific manner.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures of the methods in the foregoing embodiments may be implemented by a computer program instructing related hardware. The program may be stored in a computer-readable storage medium. When the program is executed, the procedures of the methods in embodiments may be performed. The foregoing storage medium includes any medium that can store program code, such as a ROM or a random access memory RAM, a magnetic disk, or an optical disc.

What is claimed is:

1. An accessory theme adaptation method, applied to a wireless communications system, wherein the wireless communications system comprises a first electronic device and a first accessory device, and the method comprises:
   displaying, by the first electronic device, a first interface element in response to the first electronic device detecting that the first electronic device is in a first usage scenario,
      wherein the first interface element is an interface element in a first accessory theme, the first accessory theme comprises at least one interface element, and the first accessory device does not wear an appearance part or wears a first appearance part; and
   displaying, by the first electronic device, a second interface element in response to the first electronic device detecting that the first accessory device wears a second appearance part and the first electronic device is in the first usage scenario,
      wherein the second appearance part is different from the first appearance part, the second interface element is an interface element in a second accessory theme, the second accessory theme comprises at least one interface element, the second interface element is different from the first interface element, and the second interface element corresponds to the second appearance part, and
   wherein the first usage scenario comprises at least one of:
      a usage scenario in which the first electronic device establishes a communication connection to the first accessory device; and
      a usage scenario in which a user views a device status of the first accessory device after the communication connection is established.

2. The method according to claim 1, wherein before displaying the second interface element, the method further comprises:
   receiving, by the first electronic device, indication information of the second appearance part; and
   obtaining, by the first electronic device, the second accessory theme in response to the first electronic device receiving the indication information of the second appearance part.

3. The method according to claim 2, wherein obtaining the second accessory theme comprises:
   obtaining, by the first electronic device, the second accessory theme from a cloud server by using the received indication information of the second appearance part; or
   obtaining, by the first electronic device by using the received indication information of the second appearance part, the second accessory theme from an accessory theme stored in the first electronic device.

4. The method according to claim 3, wherein the accessory theme stored in the first electronic device comprises at least one of the following:
   an accessory theme downloaded by the first electronic device from the cloud server,
   an accessory theme that is shared by a second electronic device and that is received by the first electronic device,
   an accessory theme searched for and downloaded by the first electronic device on a network based on an image shot by a camera, or
   an accessory theme generated by the first electronic device based on the image shot by the camera.

5. The method according to claim 2, wherein receiving the indication information of the second appearance part comprises:
   receiving, by the first electronic device, indication information that is of the second appearance part and that is sent by the first accessory device,
      wherein the indication information is obtained by the first accessory device from the second appearance part based on the first accessory device detecting that the first accessory device wears the second appearance part; or
   receiving, by the first electronic device, indication information that is of the second appearance part and that is sent by the second appearance part,
      wherein the indication information is sent by the second appearance part to the first electronic device based on the second appearance part detecting that the first accessory device wears the second appearance part.

6. The method according to claim 2, wherein after obtaining the second accessory theme, and before displaying the second interface element, the method further comprises:
   replacing, by the first electronic device, the first accessory theme with the second accessory theme, including:
      replacing, by the first electronic device, an image resource referenced by an interface element in the first accessory theme with an image resource reference by an interface element in the second accessory theme; and
      replacing, by the first electronic device, an audio resource referenced by an alert tone in the first accessory theme with an audio resource referenced by an alert tone in the secondary accessory theme.

7. The method according to claim 1, wherein that the first electronic device detects that the first accessory device wears the second appearance part comprises:
   receiving, by the first electronic device, first event information sent by the first accessory device,
      wherein the first event information indicates that the first accessory device wears the second appearance part, and the first event information is sent by the first accessory device based on the first accessory device detecting that the first accessory device wears the second appearance part; or
   receiving, by the first electronic device, second event information sent by the second appearance part,
      wherein the second event information indicates that the first accessory device wears the second appearance part, and the second event information is sent by the second appearance part based on the second appearance part detecting that the first accessory device wears the second appearance part.

8. The method according to claim 1, wherein the first accessory device comprises a headset, and the first usage scenario further comprises the following usage scenario: selecting an audio output channel during a call.

9. The method according claim 1, wherein the second appearance part comprises a headset case or a headset case protective cover.

10. The method according to claim 1, wherein the indication information of the second appearance part comprises one or more of the following: device identification information of the second appearance part, theme identification information of an accessory theme adapted to the second appearance part, and appearance description information of the second appearance part.

11. A wireless communications system comprising a first electronic device and a first accessory device, wherein
the first electronic device displays a first interface element in response to the first electronic device detecting that the first electronic device is in a first usage scenario,
wherein the first interface element is an interface element in a first accessory theme, the first accessory theme comprises at least one interface element, and the first accessory device does not wear an appearance part or wears a first appearance part; and
the first electronic device displays a second interface element in response to the first electronic device detecting that the first accessory device wears a second appearance part and the first electronic device is in the first usage scenario,
wherein the second appearance part is different from the first appearance part, the second interface element is an interface element in a second accessory theme, the second accessory theme comprises at least one interface element, the second interface element is different from the first interface element, and the second interface element corresponds to the second appearance part, and
wherein the first usage scenario comprises at least one of:
a usage scenario in which the first electronic device establishes a communication connection to the first accessory device, and
a usage scenario in which a user views a device status of the first accessory device after the communication connection is established.

12. The wireless communications system according to claim 11, wherein before the first electronic device displays the second interface element, the first electronic device is further configured to:
receive indication information of the second appearance part; and
obtain the second accessory theme in response to the first electronic device receiving the indication information of the second appearance part.

13. The wireless communications system according to claim 12, wherein in obtaining the second accessory theme, the first electronic device is further configured to:
obtain, by using the received indication information of the second appearance part, the second accessory theme from a cloud server; or
obtain, by using the received indication information of the second appearance part, the second accessory theme from an accessory theme stored in the first electronic device.

14. The wireless communications system according to claim 13, wherein the accessory theme stored in the first electronic device comprises at least one of the following:
an accessory theme downloaded by the first electronic device from the cloud server,
an accessory theme that is shared by a second electronic device and that is received by the first electronic device,
an accessory theme searched for and downloaded by the first electronic device on a network based on an image shot by a camera, or
an accessory theme generated by the first electronic device based on the image shot by the camera.

15. The wireless communications system according to claim 12, wherein that the first electronic device receives the indication information of the second appearance part comprises:
the first electronic device receives indication information that is of the second appearance part and that is sent by the first accessory device,
wherein the indication information is obtained by the first accessory device from the second appearance part based on the first accessory device detecting that the first accessory device wears the second appearance part; or
the first electronic device receives indication information that is of the second appearance part and that is sent by the second appearance part,
wherein the indication information is sent by the second appearance part to the first electronic device based on the second appearance part detecting that the first accessory device wears the second appearance part.

16. The wireless communications system according to claim 12, wherein after the first electronic device obtains the second accessory theme, and before the first electronic device displays the second interface element, the first electronic device is further configured to replace the first accessory theme with the second accessory theme, including:
replacing an image resource referenced by an interface element in the first accessory theme with an image resource referenced by an interface element in the second accessory; theme and
an audio resource referenced by an alert tone in the second accessory theme.

17. The wireless communications system according to claim 11, wherein that the first electronic device detects that the first accessory device wears the second appearance part comprises:
the first electronic device receives first event information sent by the first accessory device,
wherein the first event information indicates that the first accessory device wears the second appearance part, and the first event information is sent by the first accessory device based on the first accessory device detecting that the first accessory device wears the second appearance part; or
the first electronic device receives second event information sent by the second appearance part,
wherein the second event information indicates that the first accessory device wears the second appearance part, and the second event information is sent by the second appearance part based on the second appearance part detecting that the first accessory device wears the second appearance part.

18. The wireless communications system according to claim 11, wherein the first accessory device comprises a headset, and the first usage scenario further comprises the following usage scenario: selecting an audio output channel during a call.

19. The wireless communications system according to claim 11, wherein the second appearance part comprises a headset case or a headset case protective cover.

20. The wireless communications system according to claim 11, wherein the indication information of the second appearance part comprises one or more of the following: device identification information of the second appearance part, theme identification information of an accessory theme adapted to the second appearance part, and appearance description information of the second appearance part.

* * * * *